US012675202B2

(12) United States Patent
Bacim De Araujo E Silva et al.

(10) Patent No.: US 12,675,202 B2
(45) Date of Patent: Jul. 7, 2026

(54) THREE-DIMENSIONAL USER INTERFACES

(71) Applicant: Apple Inc., Cupertino, CA (US)

(72) Inventors: Felipe Bacim De Araujo E Silva, San Jose, CA (US); Brian T. Gleeson, Mountain View, CA (US); Seung Wook Kim, San Jose, CA (US); Claire Puginier, Oakland, CA (US); Samantha K. Raja, San Francisco, CA (US); Wing Shan Wong, Woodside, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/007,357

(22) Filed: Dec. 31, 2024

(65) Prior Publication Data

US 2025/0217002 A1 Jul. 3, 2025

Related U.S. Application Data

(60) Provisional application No. 63/737,578, filed on Dec. 20, 2024, provisional application No. 63/720,088, filed on Nov. 13, 2024, provisional application No. 63/617,358, filed on Jan. 3, 2024.

(51) Int. Cl.
| | |
|---|---|
| *G06F 3/04815* | (2022.01) |
| *G06F 3/0484* | (2022.01) |
| *G06F 3/04845* | (2022.01) |
| *G06F 3/0487* | (2013.01) |

(52) U.S. Cl.
CPC ........ *G06F 3/04815* (2013.01); *G06F 3/0484* (2013.01); *G06F 3/0487* (2013.01); *G06F 3/04845* (2013.01)

(58) Field of Classification Search
CPC .. G06F 3/04815; G06F 3/0484; G06F 3/0487; G06F 3/04845
See application file for complete search history.

(56) References Cited

U.S. PATENT DOCUMENTS

| | | | |
|---|---|---|---|
| 2011/0320969 A1 | 12/2011 | Hwang et al. | |
| 2012/0081359 A1* | 4/2012 | Lee ..................... | G06F 3/04815 |
| | | | 345/173 |
| 2012/0249475 A1 | 10/2012 | Murphy et al. | |
| 2013/0069937 A1 | 3/2013 | Kim | |
| 2013/0141435 A1* | 6/2013 | Cho ..................... | H04N 13/261 |
| | | | 345/426 |
| 2013/0268882 A1 | 10/2013 | Roh et al. | |
| 2014/0002457 A1 | 1/2014 | Swindell et al. | |
| 2014/0013263 A1* | 1/2014 | Bailiang .............. | G09B 29/106 |
| | | | 715/771 |
| 2015/0342477 A1 | 12/2015 | Hingorani et al. | |
| 2020/0218198 A1 | 7/2020 | Kline et al. | |
| 2023/0421749 A1 | 12/2023 | Dudrenov et al. | |

FOREIGN PATENT DOCUMENTS

| | | |
|---|---|---|
| EP | 2656318 B1 | 12/2017 |
| KR | 10-2016-0002590 A | 1/2016 |

OTHER PUBLICATIONS

International Search Report and Written Opinion received for PCT Patent Application No. PCT/US2025/010125, mailed on Apr. 1, 2025, 19 pages.

* cited by examiner

*Primary Examiner* — Cory A Almeida
(74) *Attorney, Agent, or Firm* — YHE Law LLP

(57) ABSTRACT

The present disclosure generally relates to providing and/or displaying three-dimensional user interfaces.

26 Claims, 62 Drawing Sheets

Portable Multifunction Device 100

210 is SIM card slot
212 is headphone jack

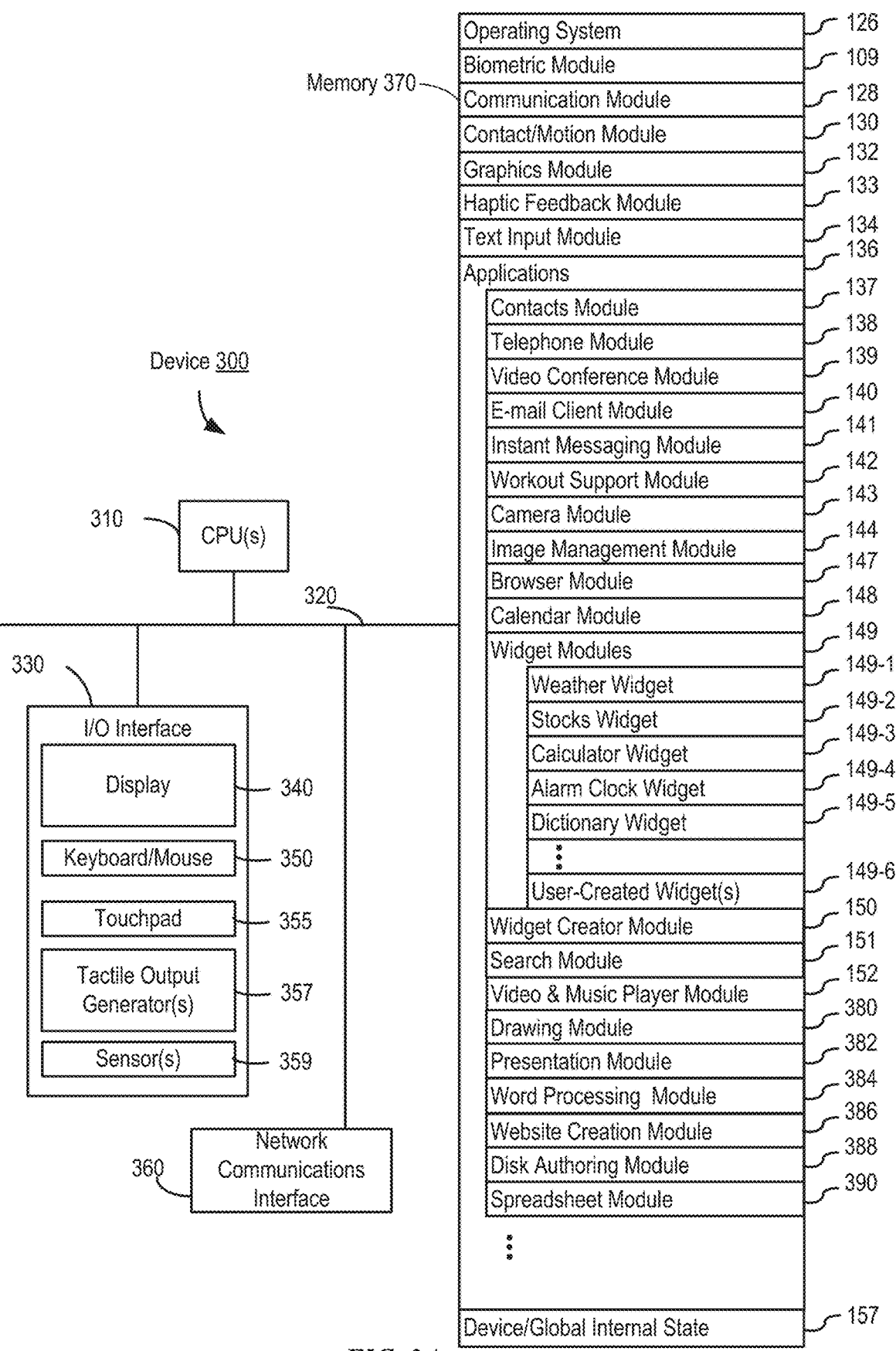

| Operating System | 126 |
| Biometric Module | 109 |
| Communication Module | 128 |
| Contact/Motion Module | 130 |
| Graphics Module | 132 |
| Haptic Feedback Module | 133 |
| Text Input Module | 134 |
| Applications | 136 |
| Contacts Module | 137 |
| Telephone Module | 138 |
| Video Conference Module | 139 |
| E-mail Client Module | 140 |
| Instant Messaging Module | 141 |
| Workout Support Module | 142 |
| Camera Module | 143 |
| Image Management Module | 144 |
| Browser Module | 147 |
| Calendar Module | 148 |
| Widget Modules | 149 |
| Weather Widget | 149-1 |
| Stocks Widget | 149-2 |
| Calculator Widget | 149-3 |
| Alarm Clock Widget | 149-4 |
| Dictionary Widget | 149-5 |
| User-Created Widget(s) | 149-6 |
| Widget Creator Module | 150 |
| Search Module | 151 |
| Video & Music Player Module | 152 |
| Drawing Module | 380 |
| Presentation Module | 382 |
| Word Processing  Module | 384 |
| Website Creation Module | 386 |
| Disk Authoring Module | 388 |
| Spreadsheet Module | 390 |
| Device/Global Internal State | 157 |

Memory 370

Device 300

310 — CPU(s)

320

330 — I/O Interface

Display — 340

Keyboard/Mouse — 350

Touchpad — 355

Tactile Output Generator(s) — 357

Sensor(s) — 359

360 — Network Communications Interface

*FIG. 3A*

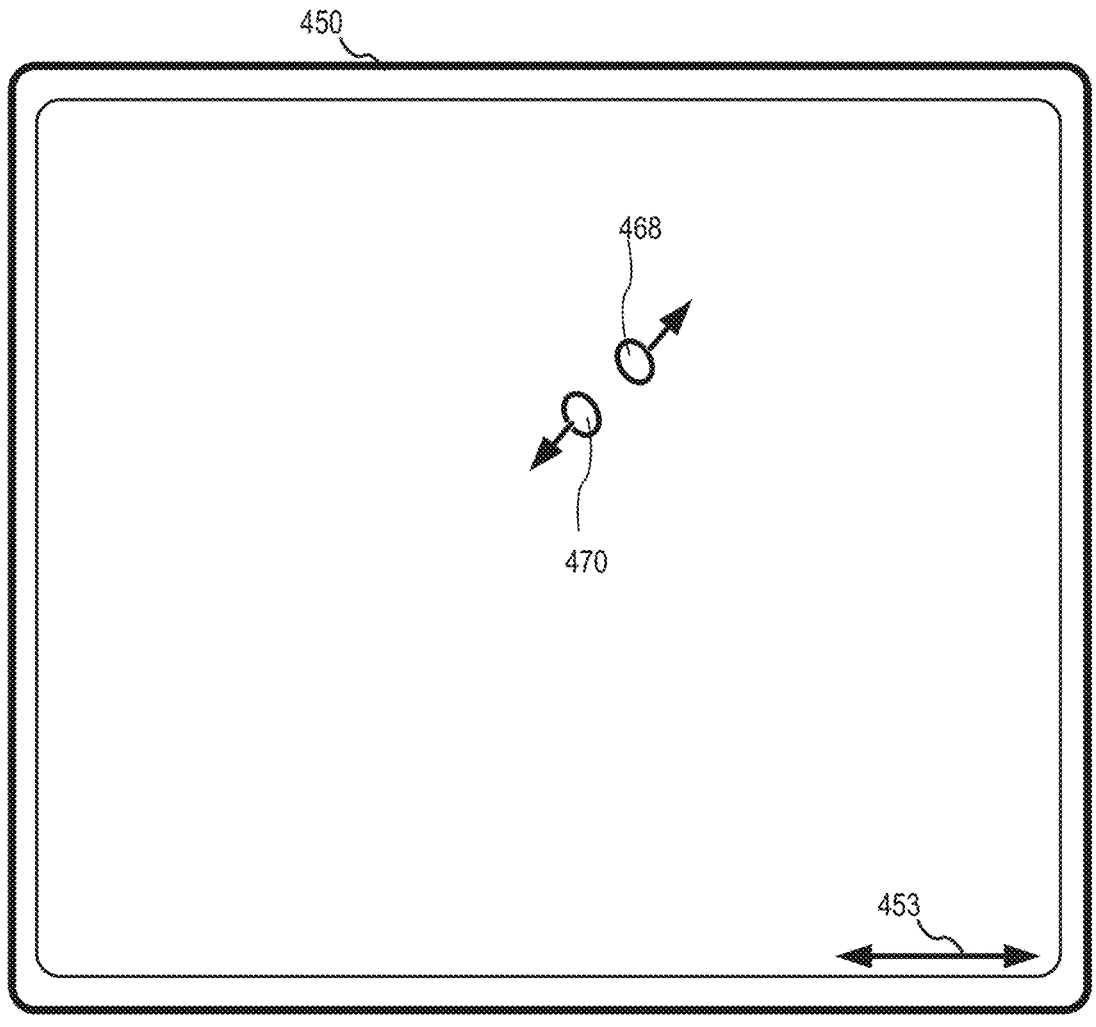
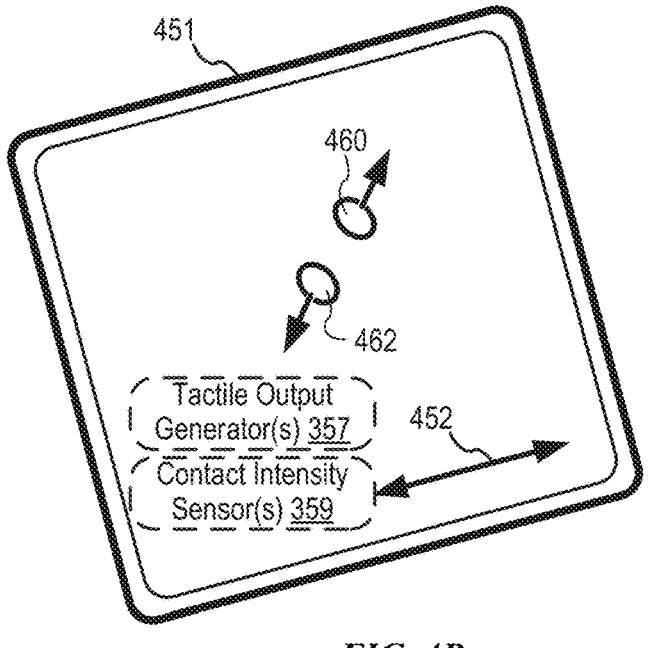
*FIG. 4B*

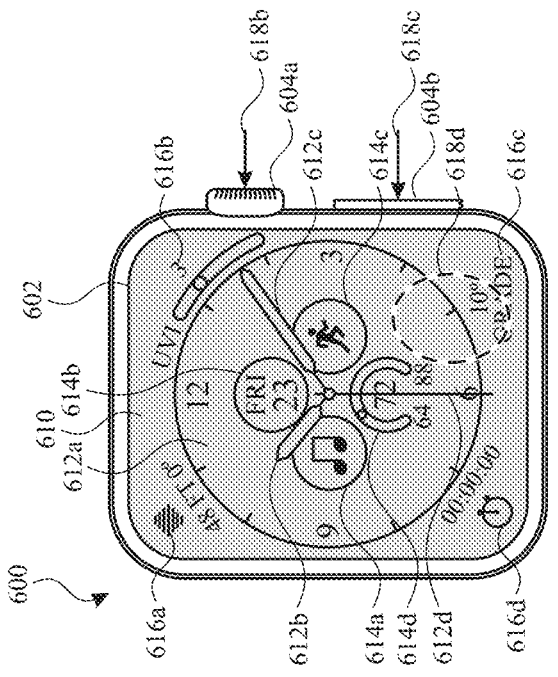
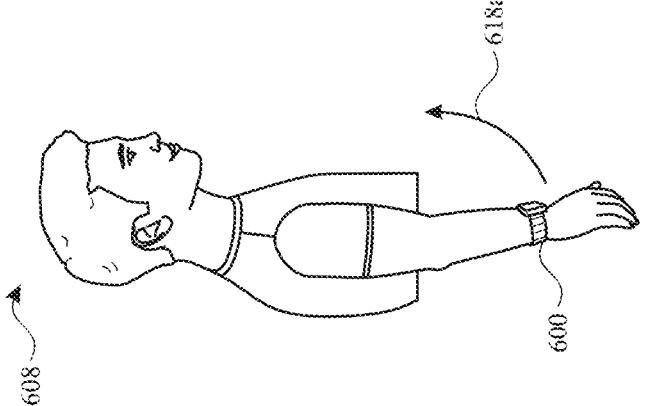
FIG. 6A

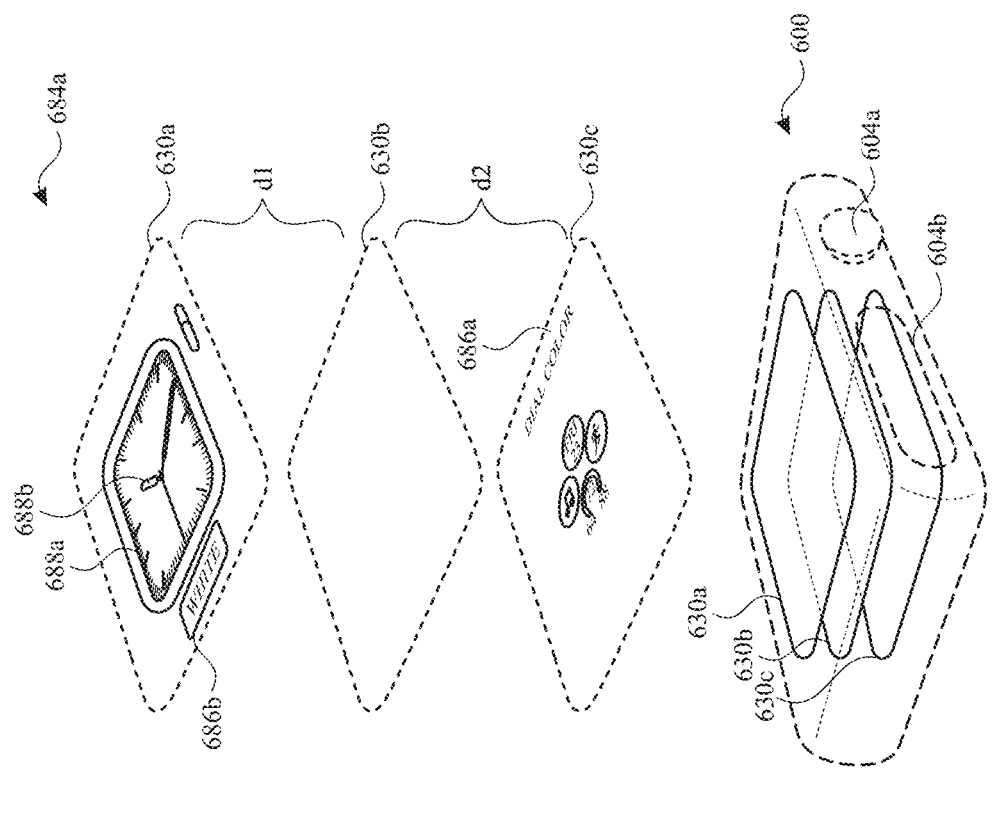
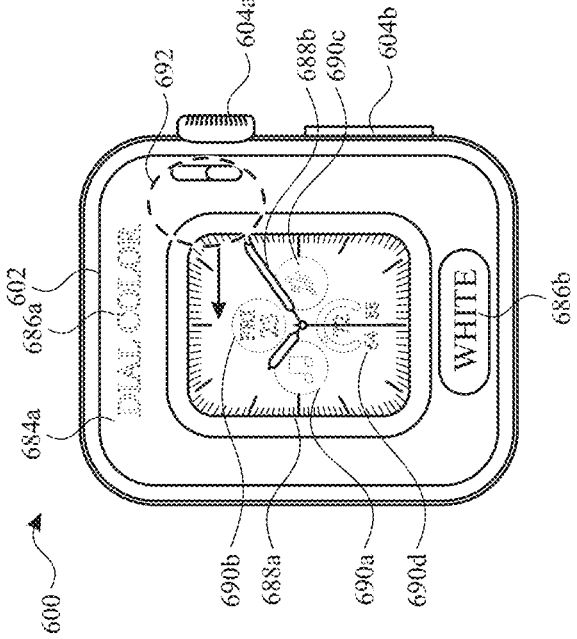
*FIG. 6S*

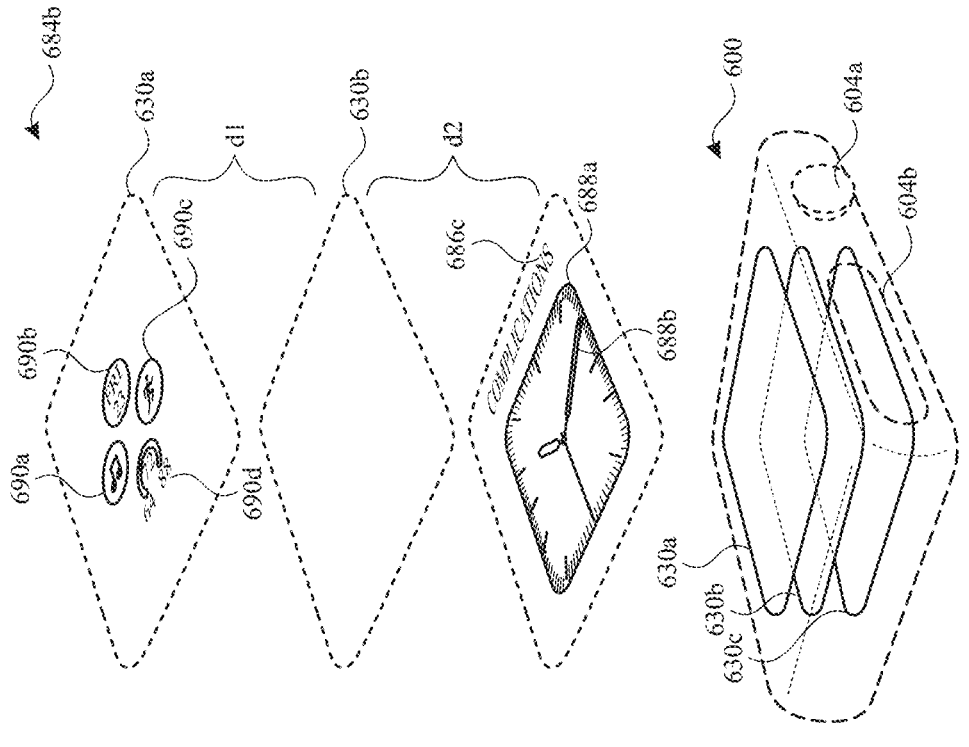
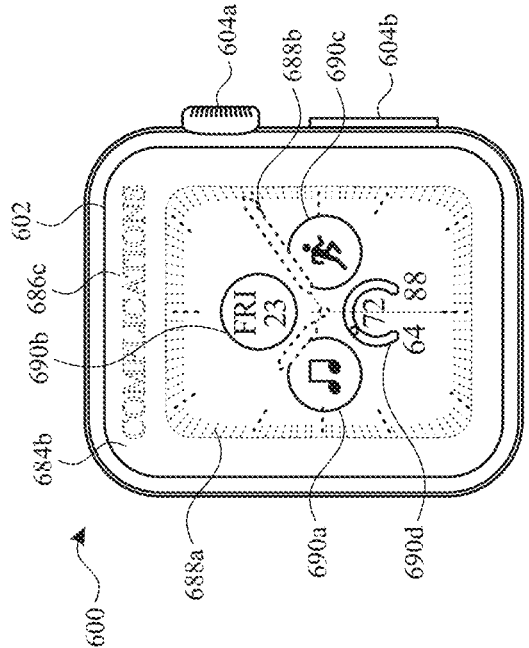
*FIG. 6T*

Figure 7:
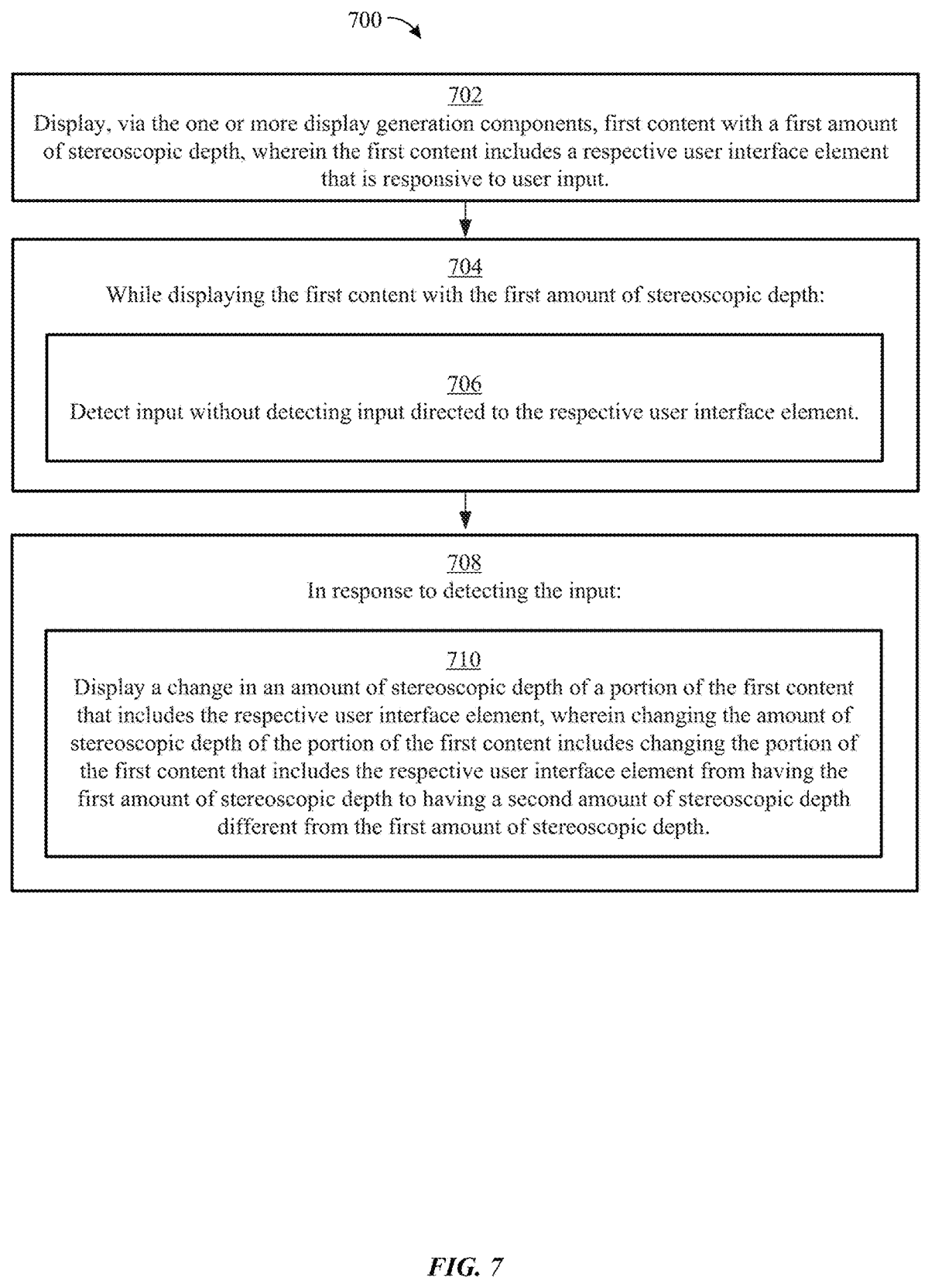

700 ⬎

---

702
Display, via the one or more display generation components, first content with a first amount of stereoscopic depth, wherein the first content includes a respective user interface element that is responsive to user input.

↓

704
While displaying the first content with the first amount of stereoscopic depth:

706
Detect input without detecting input directed to the respective user interface element.

↓

708
In response to detecting the input:

710
Display a change in an amount of stereoscopic depth of a portion of the first content that includes the respective user interface element, wherein changing the amount of stereoscopic depth of the portion of the first content includes changing the portion of the first content that includes the respective user interface element from having the first amount of stereoscopic depth to having a second amount of stereoscopic depth different from the first amount of stereoscopic depth.

Figure 9:
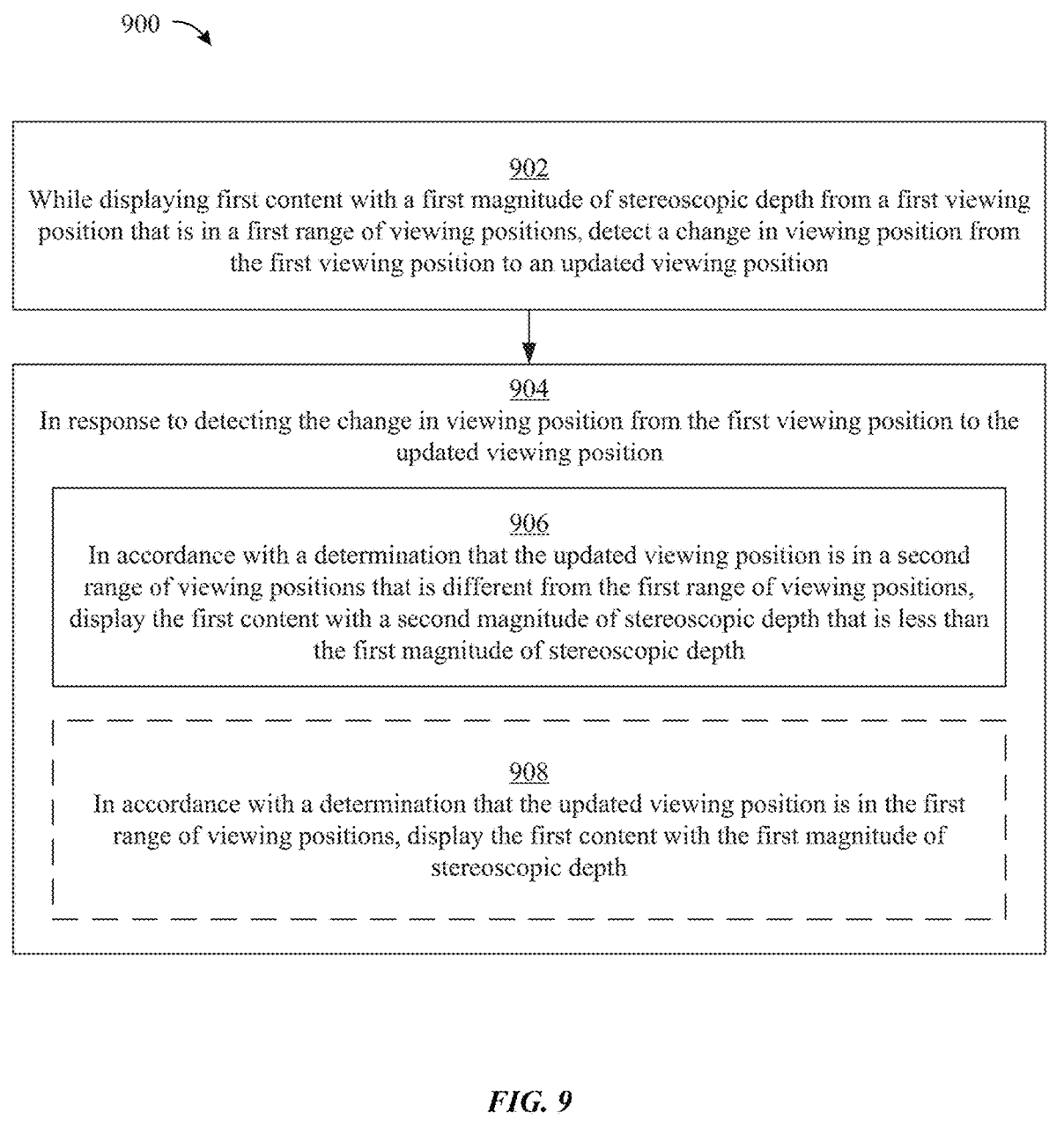

902
While displaying first content with a first magnitude of stereoscopic depth from a first viewing position that is in a first range of viewing positions, detect a change in viewing position from the first viewing position to an updated viewing position

904
In response to detecting the change in viewing position from the first viewing position to the updated viewing position

906
In accordance with a determination that the updated viewing position is in a second range of viewing positions that is different from the first range of viewing positions, display the first content with a second magnitude of stereoscopic depth that is less than the first magnitude of stereoscopic depth

908
In accordance with a determination that the updated viewing position is in the first range of viewing positions, display the first content with the first magnitude of stereoscopic depth

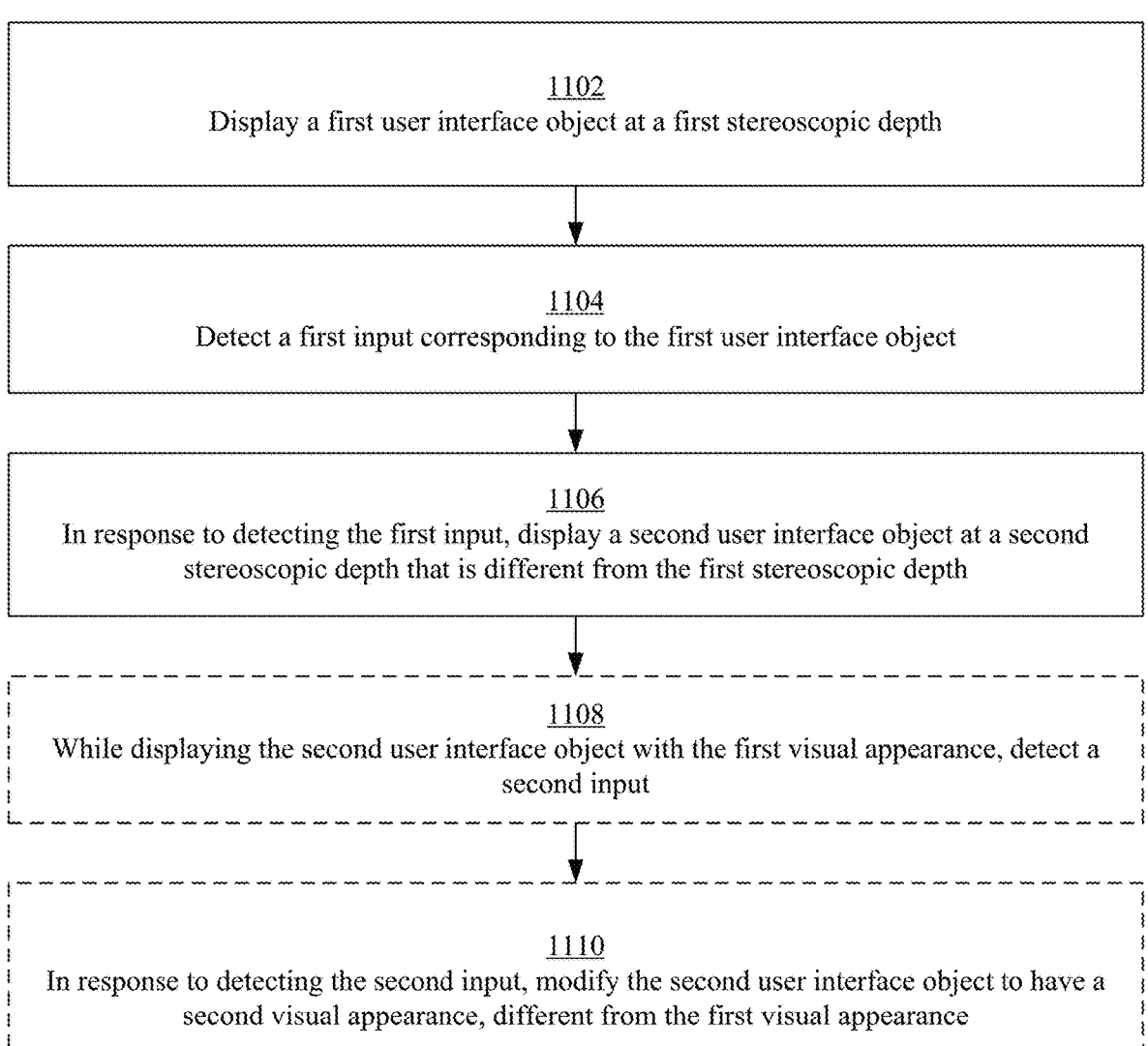

1102
Display a first user interface object at a first stereoscopic depth

1104
Detect a first input corresponding to the first user interface object

1106
In response to detecting the first input, display a second user interface object at a second stereoscopic depth that is different from the first stereoscopic depth

1108
While displaying the second user interface object with the first visual appearance, detect a second input

1110
In response to detecting the second input, modify the second user interface object to have a second visual appearance, different from the first visual appearance

*FIG. 11*

THREE-DIMENSIONAL USER INTERFACES

CROSS-REFERENCE TO RELATED APPLICATIONS

This application claims priority to U.S. Provisional Patent Application No. 63/737,578, entitled "THREE-DIMENSIONAL USER INTERFACES" and filed on Dec. 20, 2024, and U.S. Provisional Patent Application No. 63/720,088, entitled "THREE-DIMENSIONAL USER INTERFACES" and filed on Nov. 13, 2024, and U.S. Provisional Patent Application No. 63/617,358, entitled "THREE-DIMENSIONAL USER INTERFACES" and filed on Jan. 3, 2024, the contents of each of which are hereby incorporated by reference in their entireties.

BACKGROUND

Computer systems use input devices to detect user inputs. Based on the detected user inputs, computer systems perform operations and provide the user with feedback. For example, in response to user inputs, certain computer systems display visual feedback by displaying content on one or more displays. By providing different user inputs, users can cause computer systems to perform various operations.

BRIEF SUMMARY

Some techniques for providing and/or displaying three-dimensional user interfaces using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for providing and/or displaying three-dimensional user interfaces. Such methods and interfaces optionally complement or replace other methods for providing and/or displaying three-dimensional user interfaces. Such methods and interfaces reduce the cognitive burden on a user and produce a more efficient human-machine interface. For battery-operated computing devices, such methods and interfaces conserve power and increase the time between battery charges. Furthermore, such methods and interfaces provide a more efficient user interface that is able to provide the user with more information in limited display space.

In some embodiments, a method is disclosed. The method comprises: at a computer system that is in communication with one or more display generation components and one or more input devices: displaying, via the one or more display generation components, first content with a first amount of stereoscopic depth, wherein the first content includes a respective user interface element that is responsive to user input; while displaying the first content with the first amount of stereoscopic depth, detecting input without detecting input directed to the respective user interface element; and in response to detecting the input, displaying, via the one or more display generation components, a change in an amount of stereoscopic depth of a portion of the first content that includes the respective user interface element, wherein changing the amount of stereoscopic depth of the portion of the first content includes changing the portion of the first content that includes the respective user interface element from having the first amount of stereoscopic depth to having a second amount of stereoscopic depth different from the first amount of stereoscopic depth.

In some embodiments, a non-transitory computer-readable storage medium is disclosed. The non-transitory computer-readable storage medium stores one or more programs configured to be executed by one or more processors of a computer system that is in communication with one or more display generation components and one or more input devices, the one or more programs including instructions for: displaying, via the one or more display generation components, first content with a first amount of stereoscopic depth, wherein first the content includes a respective user interface element that is responsive to user input; while displaying the first content with the first amount of stereoscopic depth, detecting input without detecting input directed to the respective user interface element; and in response to detecting the input, displaying, via the one or more display generation components, a change in an amount of stereoscopic depth of a portion of the first content that includes the respective user interface element, wherein changing the amount of stereoscopic depth of the portion of the first content includes changing the portion of the first content that includes the respective user interface element from having the first amount of stereoscopic depth to having a second amount of stereoscopic depth different from the first amount of stereoscopic depth.

In some embodiments, a transitory computer-readable storage medium is disclosed. The transitory computer-readable storage medium stores one or more programs configured to be executed by one or more processors of a computer system that is in communication with one or more display generation components and one or more input devices, the one or more programs including instructions for: displaying, via the one or more display generation components, first content with a first amount of stereoscopic depth, wherein the first content includes a respective user interface element that is responsive to user input; while displaying the first content with the first amount of stereoscopic depth, detecting input without detecting input directed to the respective user interface element; and in response to detecting the input, displaying, via the one or more display generation components, a change in an amount of stereoscopic depth of a portion of the first content that includes the respective user interface element, wherein changing the amount of stereoscopic depth of the portion of the first content includes changing the portion of the first content that includes the respective user interface element from having the first amount of stereoscopic depth to having a second amount of stereoscopic depth different from the first amount of stereoscopic depth.

In some embodiments, a computer system is disclosed. The computer system is configured to communicate with one or more display generation components and one or more input devices, and comprises: one or more processors; and memory storing one or more programs configured to be executed by the one or more processors, the one or more programs including instructions for: displaying, via the one or more display generation components, first content with a first amount of stereoscopic depth, wherein the first content includes a respective user interface element that is responsive to user input; while displaying the first content with the first amount of stereoscopic depth, detecting input without detecting input directed to the respective user interface element; and in response to detecting the input, displaying, via the one or more display generation components, a change in an amount of stereoscopic depth of a portion of the first content that includes the respective user interface element, wherein changing the amount of stereoscopic depth of the portion of the first content includes changing the portion of the first content that includes the respective user interface element from having the first amount of stereoscopic depth to having a second amount of stereoscopic depth different from the first amount of stereoscopic depth.

In some embodiments, a computer system is disclosed. The computer system is configured to communicate with one or more display generation components and one or more input devices, and comprises: means for displaying, via the one or more display generation components, first content with a first amount of stereoscopic depth, wherein the first content includes a respective user interface element that is responsive to user input; means for, while displaying the first content with the first amount of stereoscopic depth, detecting input without detecting input directed to the respective user interface element; and means for, in response to detecting the input, displaying, via the one or more display generation components, a change in an amount of stereoscopic depth of a portion of the first content that includes the respective user interface element, wherein changing the amount of stereoscopic depth of the portion of the first content includes changing the portion of the first content that includes the respective user interface element from having the first amount of stereoscopic depth to having a second amount of stereoscopic depth different from the first amount of stereoscopic depth.

In some embodiments, a computer program product is disclosed. The computer program product comprises one or more programs configured to be executed by one or more processors of a computer system that is in communication with a display generation component and one or more input devices, the one or more programs including instructions for: displaying, via the one or more display generation components, first content with a first amount of stereoscopic depth, wherein the first content includes a respective user interface element that is responsive to user input; while displaying the first content with the first amount of stereoscopic depth, detecting input without detecting input directed to the respective user interface element; and in response to detecting the input, displaying, via the one or more display generation components, a change in an amount of stereoscopic depth of a portion of the first content that includes the respective user interface element, wherein changing the amount of stereoscopic depth of the portion of the first content includes changing the portion of the first content that includes the respective user interface element from having the first amount of stereoscopic depth to having a second amount of stereoscopic depth different from the first amount of stereoscopic depth.

In some embodiments, a method is disclosed. The method, comprises: at a computer system that is in communication with one or more input devices and one or more display generation components: while displaying, via the one or more display generation components, first content with a first magnitude of stereoscopic depth from a first viewing position that is in a first range of viewing positions, detecting, via the one or more input devices, a change in viewing position from the first viewing position to an updated viewing position; and in response to detecting the change in viewing position from the first viewing position to the updated viewing position: in accordance with a determination that the updated viewing position is in a second range of viewing positions that is different from the first range of viewing positions, displaying, via the one or more display generation components, the first content with a second magnitude of stereoscopic depth that is less than the first magnitude of stereoscopic depth.

In some embodiments, a non-transitory computer-readable storage medium is disclosed. The non-transitory computer-readable storage medium stories one or more programs configured to be executed by one or more processors of a computer system that is in communication with one or more input devices and one or more display generation components, the one or more programs including instructions for: while displaying, via the one or more display generation components, first content with a first magnitude of stereoscopic depth from a first viewing position that is in a first range of viewing positions, detecting, via the one or more input devices, a change in viewing position from the first viewing position to an updated viewing position; and in response to detecting the change in viewing position from the first viewing position to the updated viewing position: in accordance with a determination that the updated viewing position is in a second range of viewing positions that is different from the first range of viewing positions, displaying, via the one or more display generation components, the first content with a second magnitude of stereoscopic depth that is less than the first magnitude of stereoscopic depth.

In some embodiments, a transitory computer-readable storage medium is disclosed. The non-transitory computer-readable storage medium stories one or more programs configured to be executed by one or more processors of a computer system that is in communication with one or more input devices and one or more display generation components, the one or more programs including instructions for: while displaying, via the one or more display generation components, first content with a first magnitude of stereoscopic depth from a first viewing position that is in a first range of viewing positions, detecting, via the one or more input devices, a change in viewing position from the first viewing position to an updated viewing position; and in response to detecting the change in viewing position from the first viewing position to the updated viewing position: in accordance with a determination that the updated viewing position is in a second range of viewing positions that is different from the first range of viewing positions, displaying, via the one or more display generation components, the first content with a second magnitude of stereoscopic depth that is less than the first magnitude of stereoscopic depth.

In some embodiments, a computer system is disclosed. The computer system is configured to communicate with one or more input devices and one or more display generation components, the computer system comprises: one or more processors; and memory storing one or more programs configured to be executed by the one or more processors, the one or more programs including instructions for: while displaying, via the one or more display generation components, first content with a first magnitude of stereoscopic depth from a first viewing position that is in a first range of viewing positions, detecting, via the one or more input devices, a change in viewing position from the first viewing position to an updated viewing position; and in response to detecting the change in viewing position from the first viewing position to the updated viewing position: in accordance with a determination that the updated viewing position is in a second range of viewing positions that is different from the first range of viewing positions, displaying, via the one or more display generation components, the first content with a second magnitude of stereoscopic depth that is less than the first magnitude of stereoscopic depth.

In some embodiments, a computer system is disclosed. The computer system configured to communicate with one or more input devices and one or more display generation components, the computer system comprises: means for, while displaying, via the one or more display generation components, first content with a first magnitude of stereoscopic depth from a first viewing position that is in a first range of viewing positions, detecting, via the one or more input devices, a change in viewing position from the first viewing position to an updated viewing position; and means for, in response to detecting the change in viewing position from the first viewing position to the updated viewing position: in accordance with a determination that the updated viewing position is in a second range of viewing positions that is different from the first range of viewing positions, displaying, via the one or more display generation components, the first content with a second magnitude of stereoscopic depth that is less than the first magnitude of stereoscopic depth.

In some embodiments, a computer program product is disclosed. The computer program product, comprising one or more programs configured to be executed by one or more processors of a computer system that is in communication with one or more input devices and one or more display generation components, the one or more programs including instructions for: while displaying, via the one or more display generation components, first content with a first magnitude of stereoscopic depth from a first viewing position that is in a first range of viewing positions, detecting, via the one or more input devices, a change in viewing position from the first viewing position to an updated viewing position; and in response to detecting the change in viewing position from the first viewing position to the updated viewing position: in accordance with a determination that the updated viewing position is in a second range of viewing positions that is different from the first range of viewing positions, displaying, via the one or more display generation components, the first content with a second magnitude of stereoscopic depth that is less than the first magnitude of stereoscopic depth.

In some embodiments, a method is disclosed. The method, comprises: at a computer system that is in communication with a touch-sensitive surface and one or more stereoscopic display generation components: displaying, via the one or more stereoscopic display generation components, a first user interface object at a first stereoscopic depth; detecting, via the touch-sensitive surface, a first input corresponding to the first user interface object; and in response to detecting the first input, displaying, via the one or more stereoscopic display generation components, a second user interface object at a second stereoscopic depth that is different from the first stereoscopic depth.

In some embodiments, a non-transitory computer-readable storage medium is disclosed. The non-transitory computer-readable storage medium stories one or more programs configured to be executed by one or more processors of a computer system that is in communication with a touch-sensitive surface and one or more stereoscopic display generation components, the one or more programs including instructions for: displaying, via the one or more stereoscopic display generation components, a first user interface object at a first stereoscopic depth; detecting, via the touch-sensitive surface, a first input corresponding to the first user interface object; and in response to detecting the first input, displaying, via the one or more stereoscopic display generation components, a second user interface object at a second stereoscopic depth that is different from the first stereoscopic depth.

In some embodiments, a transitory computer-readable storage medium is disclosed. The non-transitory computer-readable storage medium stories one or more programs configured to be executed by one or more processors of a computer system that is in communication with a touch-sensitive surface and one or more stereoscopic display generation components, the one or more programs including instructions for: displaying, via the one or more stereoscopic display generation components, a first user interface object at a first stereoscopic depth; detecting, via the touch-sensitive surface, a first input corresponding to the first user interface object; and in response to detecting the first input, displaying, via the one or more stereoscopic display generation components, a second user interface object at a second stereoscopic depth that is different from the first stereoscopic depth.

In some embodiments, a computer system is disclosed. The computer system is configured to communicate with a touch-sensitive surface and one or more stereoscopic display generation components, the computer system comprises: one or more processors; and memory storing one or more programs configured to be executed by the one or more processors, the one or more programs including instructions for: displaying, via the one or more stereoscopic display generation components, a first user interface object at a first stereoscopic depth; detecting, via the touch-sensitive surface, a first input corresponding to the first user interface object; and in response to detecting the first input, displaying, via the one or more stereoscopic display generation components, a second user interface object at a second stereoscopic depth that is different from the first stereoscopic depth.

In some embodiments, a computer system is disclosed. The computer system configured to communicate with a touch-sensitive surface and one or more stereoscopic display generation components, the computer system comprises: means for displaying, via the one or more stereoscopic display generation components, a first user interface object at a first stereoscopic depth; means for detecting, via the touch-sensitive surface, a first input corresponding to the first user interface object; and means for, in response to detecting the first input, displaying, via the one or more stereoscopic display generation components, a second user interface object at a second stereoscopic depth that is different from the first stereoscopic depth.

In some embodiments, a computer program product is disclosed. The computer program product, comprising one or more programs configured to be executed by one or more processors of a computer system that is in communication with a touch-sensitive surface and one or more stereoscopic display generation components, the one or more programs including instructions for: displaying, via the one or more stereoscopic display generation components, a first user interface object at a first stereoscopic depth; detecting, via the touch-sensitive surface, a first input corresponding to the first user interface object; and in response to detecting the first input, displaying, via the one or more stereoscopic display generation components, a second user interface object at a second stereoscopic depth that is different from the first stereoscopic depth.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for providing and/or displaying three-dimensional user interfaces, thereby increasing the effectiveness, efficiency, and user satisfaction with such devices. Such methods and interfaces may complement or replace other methods for providing and/or displaying three-dimensional user interfaces.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 3A is a block diagram of an exemplary multifunction device with a display and a touch-sensitive surface in accordance with some embodiments.

FIG. 4B illustrates an exemplary user interface for a multifunction device with a touch-sensitive surface that is separate from the display in accordance with some embodiments.

FIG. 7 is a flow diagram illustrating methods of providing and/or displaying three-dimensional user interfaces.

FIG. 9 is a flow diagram illustrating methods of providing and/or displaying three-dimensional user interfaces based on a position of a user.

FIG. 11 is a flow diagram illustrating methods of providing and/or displaying a three-dimensional user interface based on input from a user.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for displaying content, including three-dimensional content. This is particularly true in portable devices that have smaller displays with limited display area. Such techniques can reduce the cognitive burden on a user who access and/or view content, thereby enhancing productivity. Further, such techniques can reduce processor and battery power otherwise wasted on redundant user inputs.

Figure 10A:
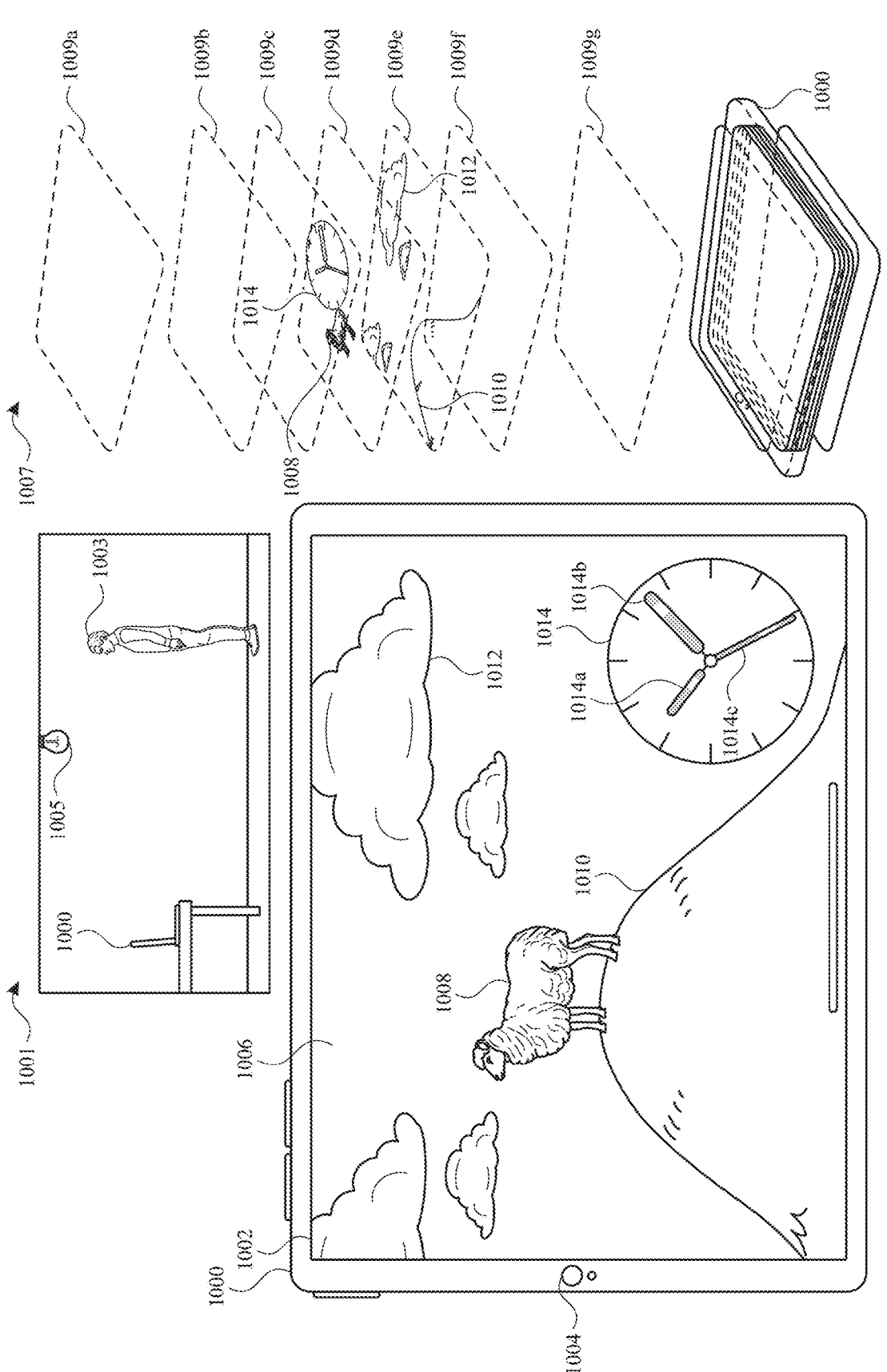
FIGS. 10A-10P illustrate exemplary devices and user interfaces for providing and/or displaying a three-dimensional user interface based on input from a user.
Figure 10B:
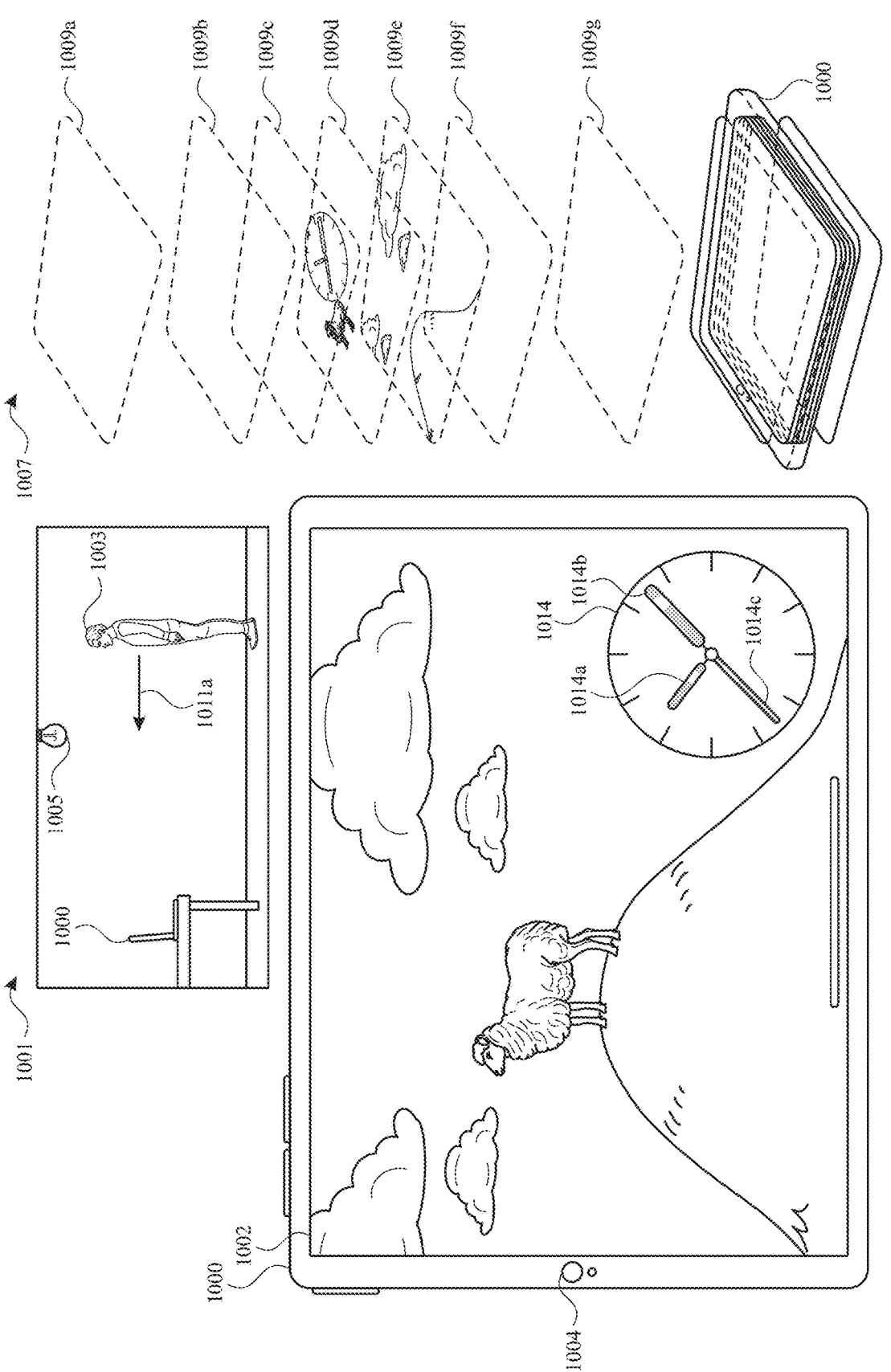

Below, FIGS. 1A-1B, 2, 3A-3H, 4A-4B, and 5A-5B provide a description of exemplary devices for performing the techniques for managing event notifications. FIGS. 6A-6T illustrate exemplary user interfaces for providing and/or displaying three-dimensional user interfaces. FIG. 7 is a flow diagram illustrating methods of providing and/or displaying three-dimensional user interfaces in accordance with some embodiments. The user interfaces in FIGS. 6A-6T are used to illustrate the processes described below, including the processes in FIG. 7. FIGS. 8A-8M illustrate exemplary devices and user interfaces for providing and/or displaying three-dimensional user interfaces based on a position of a user. FIG. 9 is a flow diagram illustrating methods of providing and/or displaying three-dimensional user interfaces based on a position of a user. The devices and user interfaces in FIGS. 8A-8M are used to illustrate the processes described below, including the processes in FIG. 9. FIGS. 10A-10P illustrate exemplary devices and user interfaces for providing and/or displaying a three-dimensional user interface based on input from a user. FIG. 11 is a flow diagram illustrating methods of providing and/or displaying a three-dimensional user interface based on input from a user. The devices and user interfaces in FIGS. 10A-10P are used to illustrate the processes described below, including the processes in FIG. 11.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
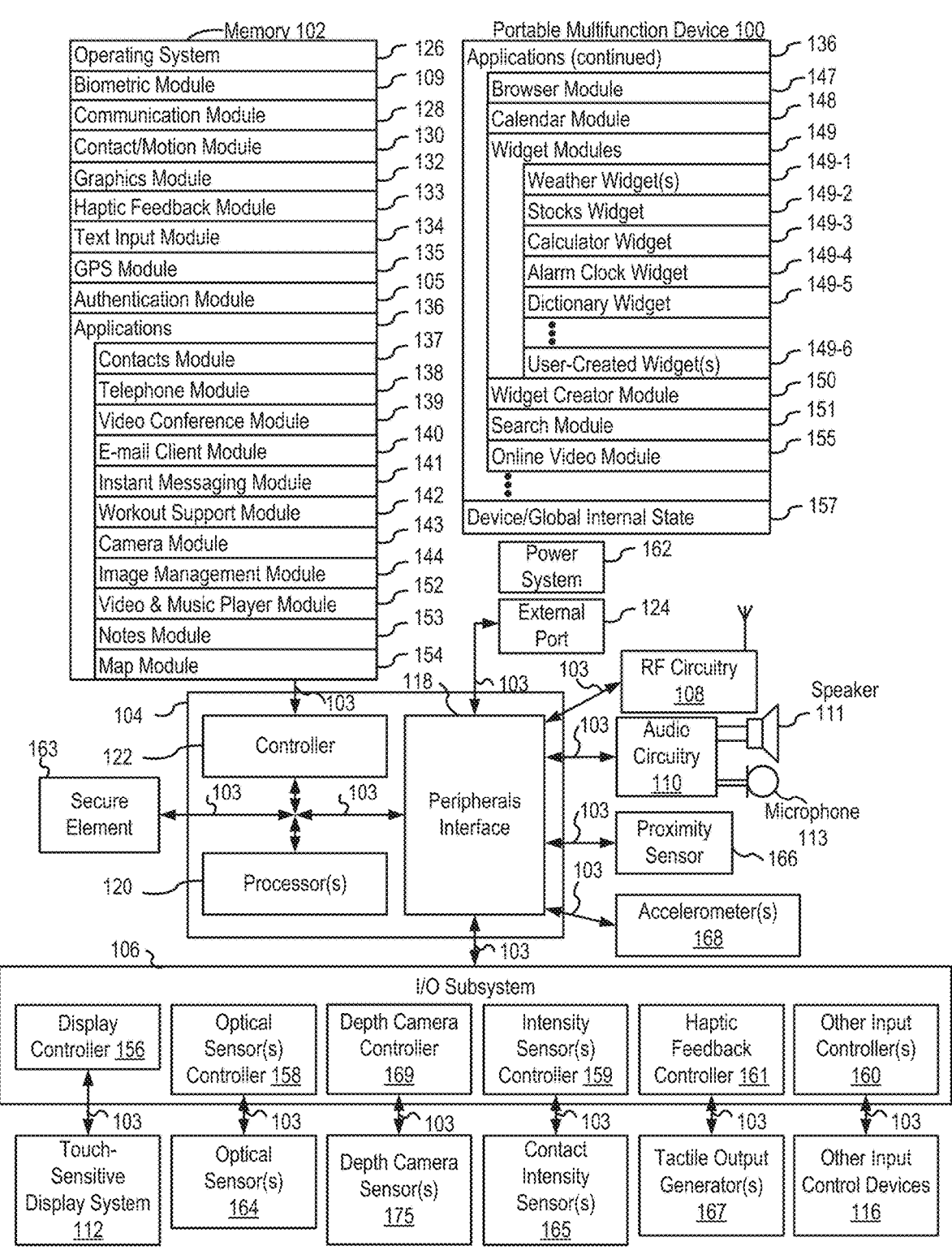
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes secure element 163 for securely storing information. In some embodiments, secure element 163 is a hardware component (e.g., a secure microcontroller chip) configured to securely store data or an algorithm. In some embodiments, secure element 163 provides (e.g., releases) secure information (e.g., payment information (e.g., an account number and/or a transaction-specific dynamic security code), identification information (e.g., credentials of a state-approved digital identification), and/or authentication information (e.g., data generated using a cryptography engine and/or by performing asymmetric cryptography operations)). In some embodiments, secure element 163 provides (or releases) the secure information in response to device 100 receiving authorization, such as a user authentication (e.g., fingerprint authentication; passcode authentication; detecting double-press of a hardware button when device 100 is in an unlocked state, and optionally, while device 100 has been continuously on a user's wrist since device 100 was unlocked by providing authentication credentials to device 100, where the continuous presence of device 100 on the user's wrist is determined by periodically checking that the device is in contact with the user's skin). For example, device 100 detects a fingerprint at a fingerprint sensor (e.g., a fingerprint sensor integrated into a button) of device 100. Device 100 determines whether the detected fingerprint is consistent with an enrolled fingerprint. In accordance with a determination that the fingerprint is consistent with the enrolled fingerprint, secure element 163 provides (e.g., releases) the secure information. In accordance with a determination that the fingerprint is not consistent with the enrolled fingerprint, secure element 163 forgoes providing (e.g., releasing) the secure information.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

In some embodiments, the software components stored in memory 102 include operating system 126, biometric module 109, communication module (or set of instructions) 128, contact/motion module (or set of instructions) 130, graphics module (or set of instructions) 132, text input module (or set of instructions) 134, Global Positioning System (GPS) module (or set of instructions) 135, authentication module 105, and applications (or sets of instructions) 136.

Furthermore, in some embodiments, memory 102 (FIG. 1A) or 370 (FIG. 3A) stores device/global internal state 157, as shown in FIGS. 1A and 3A-3H. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE- WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Biometric module 109 optionally stores information about one or more enrolled biometric features (e.g., fingerprint feature information, facial recognition feature information, eye and/or iris feature information) for use to verify whether received biometric information matches the enrolled biometric features. In some embodiments, the information stored about the one or more enrolled biometric features includes data that enables the comparison between the stored information and received biometric information without including enough information to reproduce the enrolled biometric features. In some embodiments, biometric module 109 stores the information about the enrolled biometric features in association with a user account of device 100. In some embodiments, biometric module 109 compares the received biometric information to an enrolled biometric feature to determine whether the received biometric information matches the enrolled biometric feature.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Authentication module 105 determines whether a requested operation (e.g., requested by an application of applications 136) is authorized to be performed. In some embodiments, authentication module 105 receives for an operation to be perform that optionally requires authentication. Authentication module 105 determines whether the operation is authorized to be performed, such as based on a series of factors, including the lock status of device 100, the location of device 100, whether a security delay has elapsed, whether received biometric information matches enrolled biometric features, and/or other factors. Once authentication module 105 determines that the operation is authorized to be performed, authentication module 105 triggers performance of the operation.

Applications 136 optionally include the following modules (or sets of instructions), or a subset or superset thereof:

Contacts module 137 (sometimes called an address book or contact list);

Telephone module 138;

Video conference module 139;

E-mail client module 140;

Instant messaging (IM) module 141;

Workout support module 142;

Camera module 143 for still and/or video images;

Image management module 144;

Video player module;

Music player module;

Browser module 147;

Calendar module 148;

Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
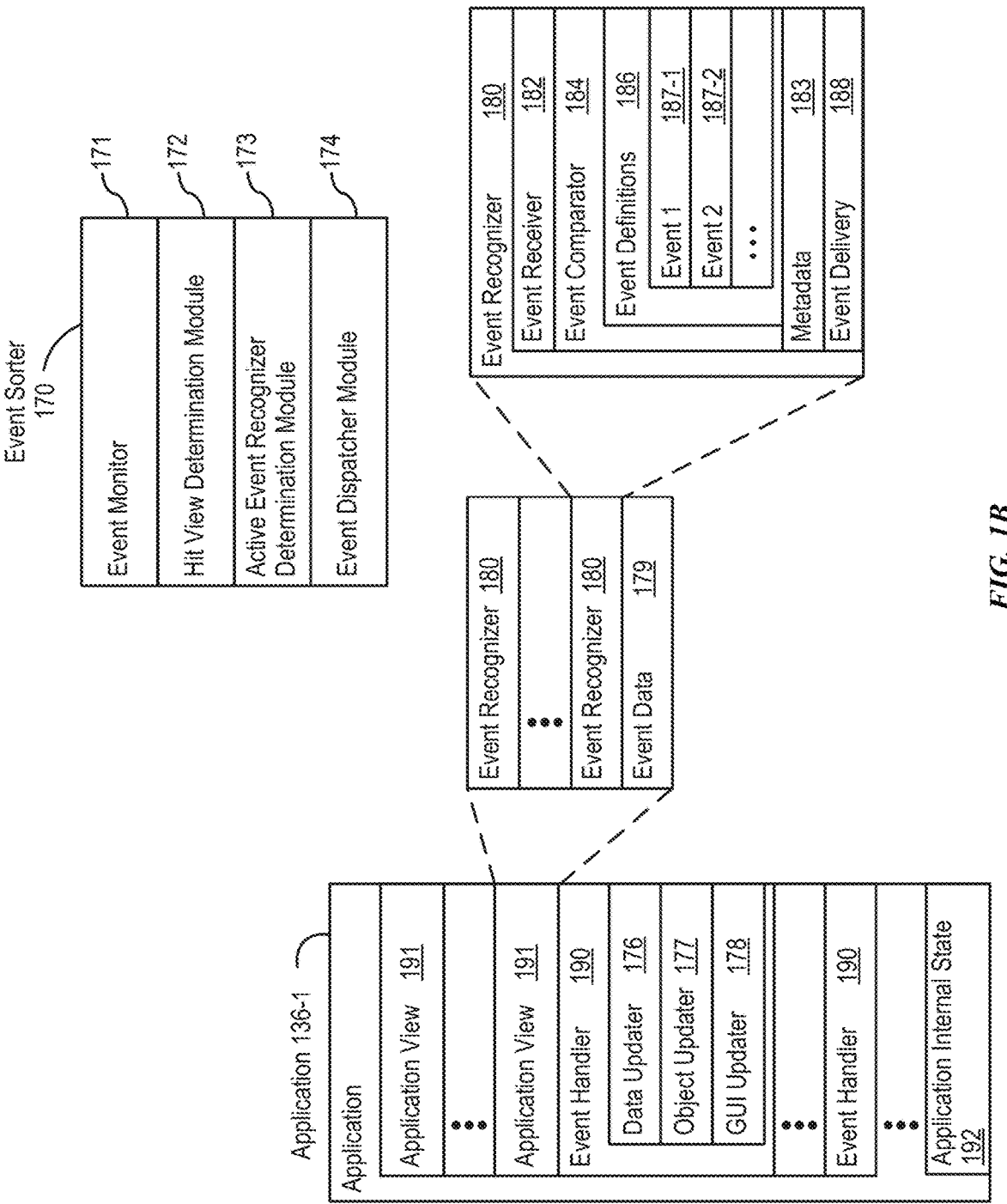
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3A) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a prede- termined phase, a second touch (touch begin) on the dis- played object for a predetermined phase, and a second liftoff (touch end) for a predetermined phase. In another example, the definition for event 2 (187-2) is a dragging on a dis- played object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch- sensitive display 112, when a touch is detected on touch- sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not corre- spond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recogniz- ers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indi- cate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recog- nized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 pre- pares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any com- bination thereof are optionally utilized as inputs correspond- ing to sub-events which define an event to be recognized.

Figure 2:
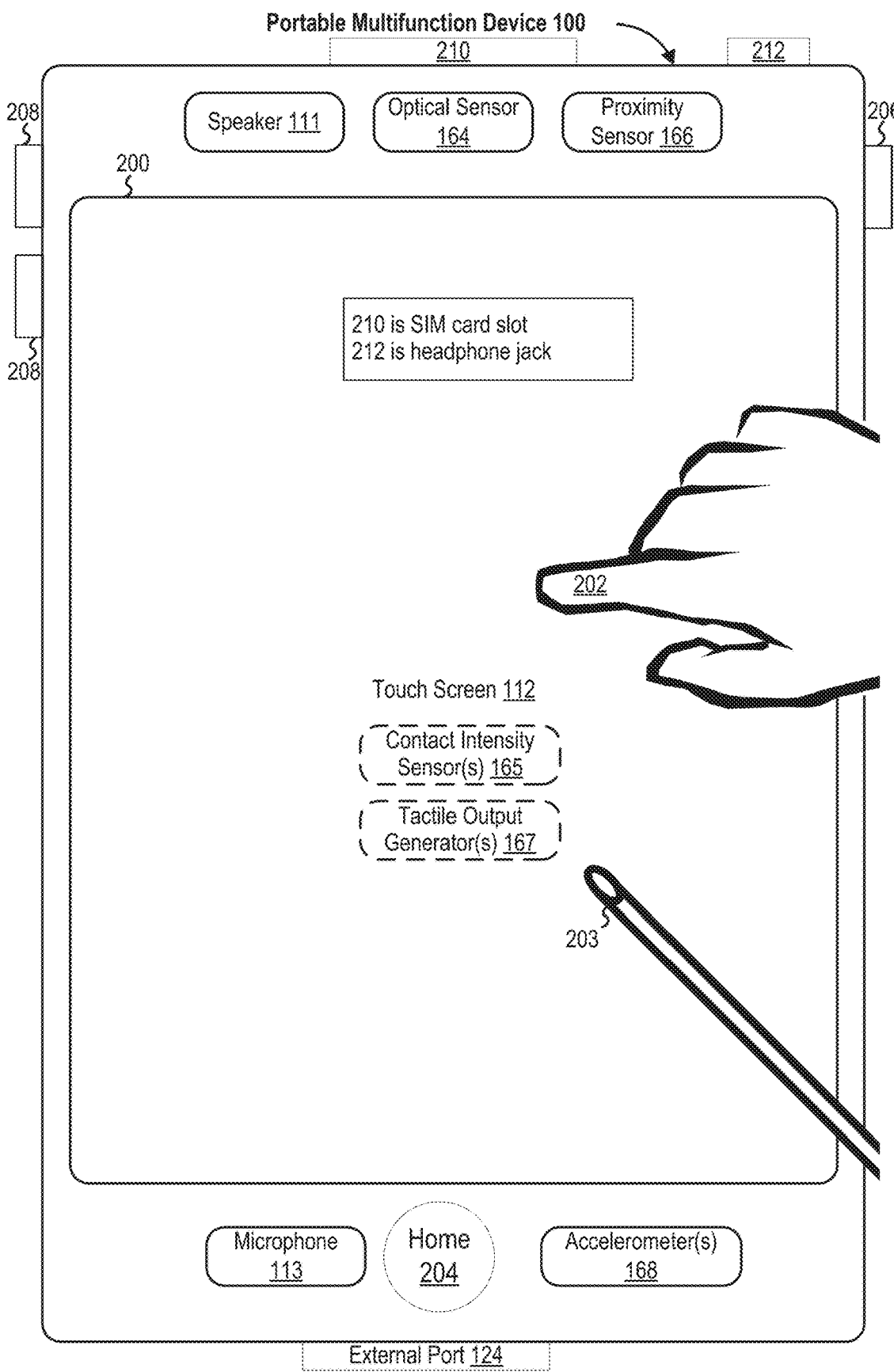
FIG. 2 illustrates a portable multifunction device having a touch screen in accordance with some embodiments.

FIG. 2 illustrates a portable multifunction device 100 having a touch screen 112 in accordance with some embodi- ments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selec- tion of one or more graphics occurs when the user breaks contact with the one or more graphics. In some embodi- ments, the gesture optionally includes one or more taps, one or more swipes (from left to right, right to left, upward and/or downward), and/or a rolling of a finger (from right to left, left to right, upward and/or downward) that has made contact with device 100. In some implementations or cir- cumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3A is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3A is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Implementations within the scope of the present disclosure can be partially or entirely realized using a tangible computer-readable storage medium (or multiple tangible computer-readable storage media of one or more types) encoding one or more computer-readable instructions. It should be recognized that computer-readable instructions can be organized in any format, including applications, widgets, processes, software, and/or components.

Figure 3B:
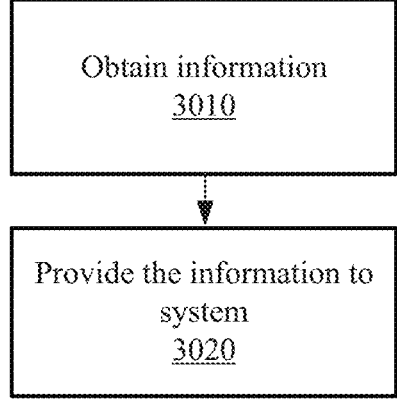
FIGS. 3B-3G illustrate the use of Application Programming Interfaces (APIs) to perform operations.
Figure 3C:
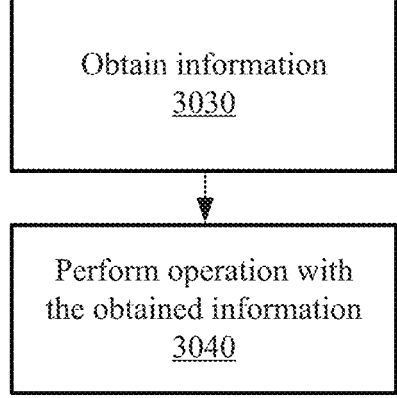

Implementations within the scope of the present disclosure include a computer-readable storage medium that encodes instructions organized as an application (e.g., application 3160) that, when executed by one or more processing units, control an electronic device (e.g., device 3150) to perform the method of FIG. 3B, the method of FIG. 3C, and/or one or more other processes and/or methods described herein.

It should be recognized that application 3160 (shown in FIG. 3D) can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application. In some embodiments, application 3160 is an application that is pre-installed on device 3150 at purchase (e.g., a first-party application). In some embodiments, application 3160 is an application that is provided to device 3150 via an operating system update file (e.g., a first-party application or a second-party application). In some embodiments, application 3160 is an application that is provided via an application store. In some embodiments, the application store can be an application store that is pre-installed on device 3150 at purchase (e.g., a first-party application store). In some embodiments, the application store is a third-party application store (e.g., an application store that is provided by another application store, downloaded via a network, and/or read from a storage device).

Figure 3D:
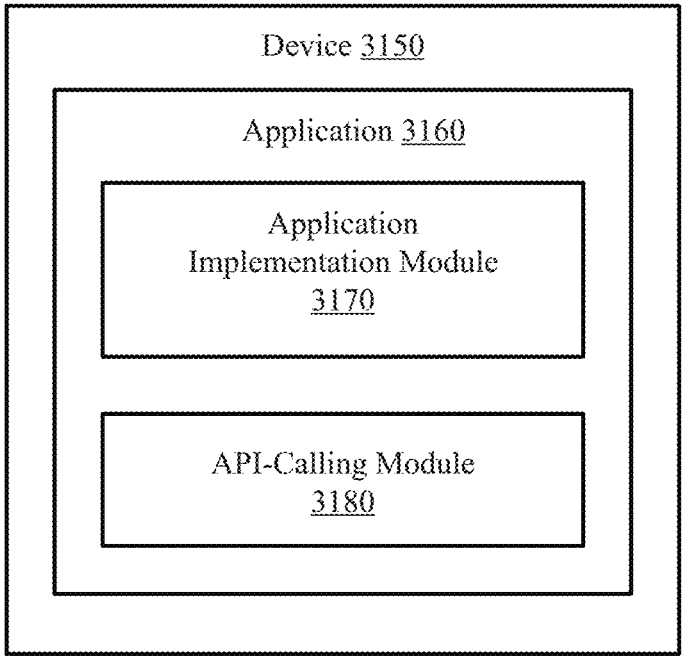
Figure 3E:
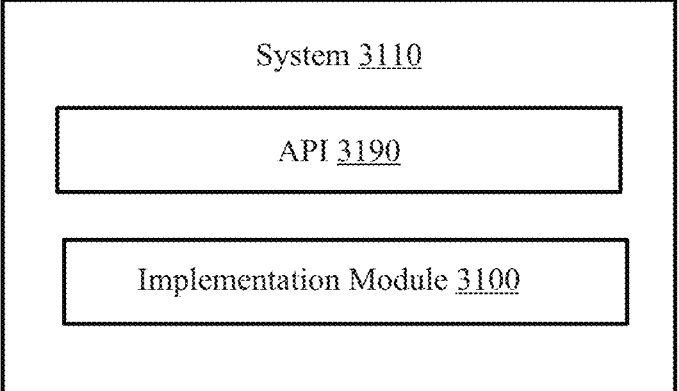
Figure 3F:
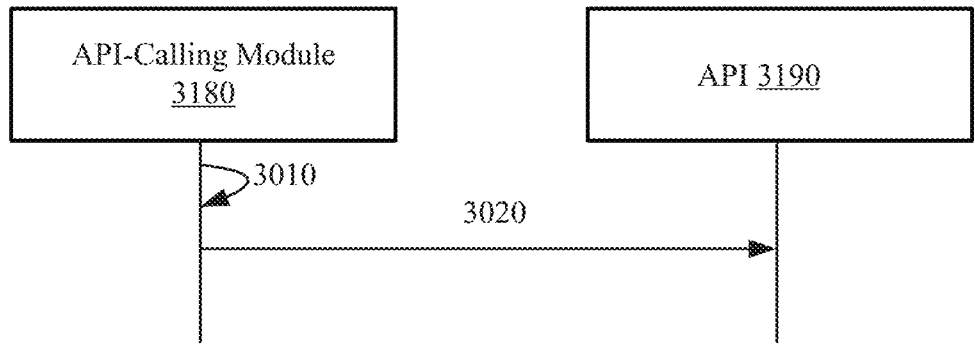

Referring to FIG. 3B and FIG. 3F, application 3160 obtains information (e.g., 3010). In some embodiments, at 3010, information is obtained from at least one hardware component of device 3150. In some embodiments, at 3010, information is obtained from at least one software module of device 3150. In some embodiments, at 3010, information is obtained from at least one hardware component external to device 3150 (e.g., a peripheral device, an accessory device, and/or a server). In some embodiments, the information obtained at 3010 includes positional information, time information, notification information, user information, environment information, electronic device state information, weather information, media information, historical information, event information, hardware information, and/or motion information. In some embodiments, in response to and/or after obtaining the information at 3010, application 3160 provides the information to a system (e.g., 3020).

In some embodiments, the system (e.g., 3110 shown in FIG. 3E) is an operating system hosted on device 3150. In some embodiments, the system (e.g., 3110 shown in FIG. 3E) is an external device (e.g., a server, a peripheral device, an accessory, and/or a personal computing device) that includes an operating system.

Figure 3G:
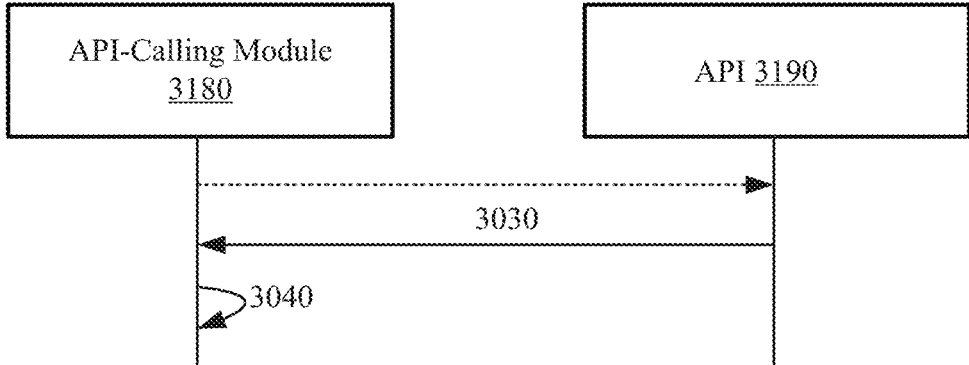

Referring to FIG. 3C and FIG. 3G, application 3160 obtains information (e.g., 3030). In some embodiments, the information obtained at 3030 includes positional information, time information, notification information, user information, environment information electronic device state information, weather information, media information, historical information, event information, hardware information, and/or motion information. In response to and/or after obtaining the information at 3030, application 3160 performs an operation with the information (e.g., 3040). In some embodiments, the operation performed at 3040 includes: providing a notification based on the information, sending a message based on the information, displaying the information, controlling a user interface of a fitness application based on the information, controlling a user interface of a health application based on the information, controlling a focus mode based on the information, setting a reminder based on the information, adding a calendar entry based on the information, and/or calling an API of system 3110 based on the information.

In some embodiments, one or more steps of the method of FIG. 3B and/or the method of FIG. 3C is performed in response to a trigger. In some embodiments, the trigger includes detection of an event, a notification received from system 3110, a user input, and/or a response to a call to an API provided by system 3110.

In some embodiments, the instructions of application 3160, when executed, control device 3150 to perform the method of FIG. 3B and/or the method of FIG. 3C by calling an application programming interface (API) (e.g., API 3190) provided by system 3110. In some embodiments, application 3160 performs at least a portion of the method of FIG. 3B and/or the method of FIG. 3C without calling API 3190.

In some embodiments, one or more steps of the method of FIG. 3B and/or the method of FIG. 3C includes calling an API (e.g., API 3190) using one or more parameters defined by the API. In some embodiments, the one or more parameters include a constant, a key, a data structure, an object, an object class, a variable, a data type, a pointer, an array, a list or a pointer to a function or method, and/or another way to reference a data or other item to be passed via the API.

Referring to FIG. 3D, device 3150 is illustrated. In some embodiments, device 3150 is a personal computing device, a smart phone, a smart watch, a fitness tracker, a head mounted display (HMD) device, a media device, a communal device, a speaker, a television, and/or a tablet. As illustrated in FIG. 3D, device 3150 includes application 3160 and an operating system (e.g., system 3110 shown in FIG. 3E). Application 3160 includes application implementation module 3170 and API-calling module 3180. System 3110 includes API 3190 and implementation module 3100. It should be recognized that device 3150, application 3160, and/or system 3110 can include more, fewer, and/or different components than illustrated in FIGS. 3D and 3E.

In some embodiments, application implementation module 3170 includes a set of one or more instructions corresponding to one or more operations performed by application 3160. For example, when application 3160 is a messaging application, application implementation module 3170 can include operations to receive and send messages. In some embodiments, application implementation module 3170 communicates with API-calling module 3180 to communicate with system 3110 via API 3190 (shown in FIG. 3E).

In some embodiments, API 3190 is a software module (e.g., a collection of computer-readable instructions) that provides an interface that allows a different module (e.g., API-calling module 3180) to access and/or use one or more functions, methods, procedures, data structures, classes, and/or other services provided by implementation module 3100 of system 3110. For example, API-calling module 3180 can access a feature of implementation module 3100 through one or more API calls or invocations (e.g., embodied by a function or a method call) exposed by API 3190 (e.g., a software and/or hardware module that can receive API calls, respond to API calls, and/or send API calls) and can pass data and/or control information using one or more parameters via the API calls or invocations. In some embodiments, API 3190 allows application 3160 to use a service provided by a Software Development Kit (SDK) library. In some embodiments, application 3160 incorporates a call to a function or method provided by the SDK library and provided by API 3190 or uses data types or objects defined in the SDK library and provided by API 3190. In some embodiments, API-calling module 3180 makes an API call via API 3190 to access and use a feature of implementation module 3100 that is specified by API 3190. In such embodiments, implementation module 3100 can return a value via API 3190 to API-calling module 3180 in response to the API call. The value can report to application 3160 the capabilities or state of a hardware component of device 3150, including those related to aspects such as input capabilities and state, output capabilities and state, processing capability, power state, storage capacity and state, and/or communications capability. In some embodiments, API 3190 is implemented in part by firmware, microcode, or other low level logic that executes in part on the hardware component.

In some embodiments, API 3190 allows a developer of API-calling module 3180 (which can be a third-party developer) to leverage a feature provided by implementation module 3100. In such embodiments, there can be one or more API-calling modules (e.g., including API-calling module 3180) that communicate with implementation module 3100. In some embodiments, API 3190 allows multiple API-calling modules written in different programming languages to communicate with implementation module 3100 (e.g., API 3190 can include features for translating calls and returns between implementation module 3100 and API-calling module 3180) while API 3190 is implemented in terms of a specific programming language. In some embodiments, API-calling module 3180 calls APIs from different providers such as a set of APIs from an OS provider, another set of APIs from a plug-in provider, and/or another set of APIs from another provider (e.g., the provider of a software library) or creator of the another set of APIs.

Examples of API 3190 can include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, photos API, camera API, and/or image processing API. In some embodiments, the sensor API is an API for accessing data associated with a sensor of device 3150. For example, the sensor API can provide access to raw sensor data. For another example, the sensor API can provide data derived (and/or generated) from the raw sensor data. In some embodiments, the sensor data includes temperature data, image data, video data, audio data, heart rate data, IMU (inertial measurement unit) data, lidar data, location data, GPS data, and/or camera data. In some embodiments, the sensor includes one or more of an accelerometer, temperature sensor, infrared sensor, optical sensor, heartrate sensor, barometer, gyroscope, proximity sensor, temperature sensor, and/or biometric sensor.

In some embodiments, implementation module 3100 is a system (e.g., operating system and/or server system) software module (e.g., a collection of computer-readable instructions) that is constructed to perform an operation in response to receiving an API call via API 3190. In some embodiments, implementation module 3100 is constructed to provide an API response (via API 3190) as a result of processing an API call. By way of example, implementation module 3100 and API-calling module 3180 can each be any one of an operating system, a library, a device driver, an API, an application program, or other module. It should be understood that implementation module 3100 and API-calling module 3180 can be the same or different type of module from each other. In some embodiments, implementation module 3100 is embodied at least in part in firmware, microcode, or hardware logic.

In some embodiments, implementation module 3100 returns a value through API 3190 in response to an API call from API-calling module 3180. While API 3190 defines the syntax and result of an API call (e.g., how to invoke the API call and what the API call does), API 3190 might not reveal how implementation module 3100 accomplishes the function specified by the API call. Various API calls are transferred via the one or more application programming interfaces between API-calling module 3180 and implementation module 3100. Transferring the API calls can include issuing, initiating, invoking, calling, receiving, returning, and/or responding to the function calls or messages. In other words, transferring can describe actions by either of API-calling module 3180 or implementation module 3100. In some embodiments, a function call or other invocation of API 3190 sends and/or receives one or more parameters through a parameter list or other structure.

In some embodiments, implementation module 3100 provides more than one API, each providing a different view of or with different aspects of functionality implemented by implementation module 3100. For example, one API of implementation module 3100 can provide a first set of functions and can be exposed to third-party developers, and another API of implementation module 3100 can be hidden (e.g., not exposed) and provide a subset of the first set of functions and also provide another set of functions, such as testing or debugging functions which are not in the first set of functions. In some embodiments, implementation module 3100 calls one or more other components via an underlying API and thus is both an API-calling module and an implementation module. It should be recognized that implementation module 3100 can include additional functions, methods, classes, data structures, and/or other features that are not specified through API 3190 and are not available to API-calling module 3180. It should also be recognized that API-calling module 3180 can be on the same system as implementation module 3100 or can be located remotely and access implementation module 3100 using API 3190 over a network. In some embodiments, implementation module 3100, API 3190, and/or API-calling module 3180 is stored in a machine-readable medium, which includes any mechanism for storing information in a form readable by a machine (e.g., a computer or other data processing system). For example, a machine-readable medium can include magnetic disks, optical disks, random access memory; read only memory, and/or flash memory devices.

An application programming interface (API) is an interface between a first software process and a second software process that specifies a format for communication between the first software process and the second software process. Limited APIs (e.g., private APIs or partner APIs) are APIs that are accessible to a limited set of software processes (e.g., only software processes within an operating system or only software processes that are approved to access the limited APIs). Public APIs that are accessible to a wider set of software processes. Some APIs enable software processes to communicate about or set a state of one or more input devices (e.g., one or more touch sensors, proximity sensors, visual sensors, motion/orientation sensors, pressure sensors, intensity sensors, sound sensors, wireless proximity sensors, biometric sensors, buttons, switches, rotatable elements, and/or external controllers). Some APIs enable software processes to communicate about and/or set a state of one or more output generation components (e.g., one or more audio output generation components, one or more display generation components, and/or one or more tactile output generation components). Some APIs enable particular capabilities (e.g., scrolling, handwriting, text entry, image editing, and/or image creation) to be accessed, performed, and/or used by a software process (e.g., generating outputs for use by a software process based on input from the software process). Some APIs enable content from a software process to be inserted into a template and displayed in a user interface that has a layout and/or behaviors that are specified by the template.

Many software platforms include a set of frameworks that provides the core objects and core behaviors that a software developer needs to build software applications that can be used on the software platform. Software developers use these objects to display content onscreen, to interact with that content, and to manage interactions with the software platform. Software applications rely on the set of frameworks for their basic behavior, and the set of frameworks provides many ways for the software developer to customize the behavior of the application to match the specific needs of the software application. Many of these core objects and core behaviors are accessed via an API. An API will typically specify a format for communication between software processes, including specifying and grouping available variables, functions, and protocols. An API call (sometimes referred to as an API request) will typically be sent from a sending software process to a receiving software process as a way to accomplish one or more of the following: the sending software process requesting information from the receiving software process (e.g., for the sending software process to take action on), the sending software process providing information to the receiving software process (e.g., for the receiving software process to take action on), the sending software process requesting action by the receiving software process, or the sending software process providing information to the receiving software process about action taken by the sending software process. Interaction with a device (e.g., using a user interface) will in some circumstances include the transfer and/or receipt of one or more API calls (e.g., multiple API calls) between multiple different software processes (e.g., different portions of an operating system, an application and an operating system, or different applications) via one or more APIs (e.g., via multiple different APIs). For example, when an input is detected the direct sensor data is frequently processed into one or more input events that are provided (e.g., via an API) to a receiving software process that makes some determination based on the input events, and then sends (e.g., via an API) information to a software process to perform an operation (e.g., change a device state and/or user interface) based on the determination. While a determination and an operation performed in response could be made by the same software process, alternatively the determination could be made in a first software process and relayed (e.g., via an API) to a second software process, that is different from the first software process, that causes the operation to be performed by the second software process. Alternatively, the second software process could relay instructions (e.g., via an API) to a third software process that is different from the first software process and/or the second software process to perform the operation. It should be understood that some or all user interactions with a computer system could involve one or more API calls within a step of interacting with the computer system (e.g., between different software components of the computer system or between a software component of the computer system and a software component of one or more remote computer systems). It should be understood that some or all user interactions with a computer system could involve one or more API calls between steps of interacting with the computer system (e.g., between different software components of the computer system or between a software component of the computer system and a software component of one or more remote computer systems).

In some embodiments, the application can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application.

In some embodiments, the application is an application that is pre-installed on the first computer system at purchase (e.g., a first-party application). In some embodiments, the application is an application that is provided to the first computer system via an operating system update file (e.g., a first-party application). In some embodiments, the application is an application that is provided via an application store. In some embodiments, the application store is pre-installed on the first computer system at purchase (e.g., a first-party application store) and allows download of one or more applications. In some embodiments, the application store is a third-party application store (e.g., an application store that is provided by another device, downloaded via a network, and/or read from a storage device). In some embodiments, the application is a third-party application (e.g., an app that is provided by an application store, downloaded via a network, and/or read from a storage device). In some embodiments, the application controls the first computer system to perform methods 700, 900 and/or 1100 (FIGS. 7, 9, and 11) by calling an application programming interface (API) provided by the system process using one or more parameters.

In some embodiments, exemplary APIs provided by the system process include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, a photos API, a camera API, and/or an image processing API.

In some embodiments, at least one API is a software module (e.g., a collection of computer-readable instructions) that provides an interface that allows a different module (e.g., API-calling module 3180) to access and use one or more functions, methods, procedures, data structures, classes, and/or other services provided by an implementation module of the system process. The API can define one or more parameters that are passed between the API-calling module and the implementation module. In some embodiments, API 3190 defines a first API call that can be provided by API-calling module 3180. The implementation module is a system software module (e.g., a collection of computer-readable instructions) that is constructed to perform an operation in response to receiving an API call via the API. In some embodiments, the implementation module is constructed to provide an API response (via the API) as a result of processing an API call. In some embodiments, the implementation module is included in the device (e.g., 3150) that runs the application. In some embodiments, the implementation module is included in an electronic device that is separate from the device that runs the application.

Attention is now directed towards embodiments of user interfaces that are, optionally, implemented on, for example, portable multifunction device 100.

Figure 4A:
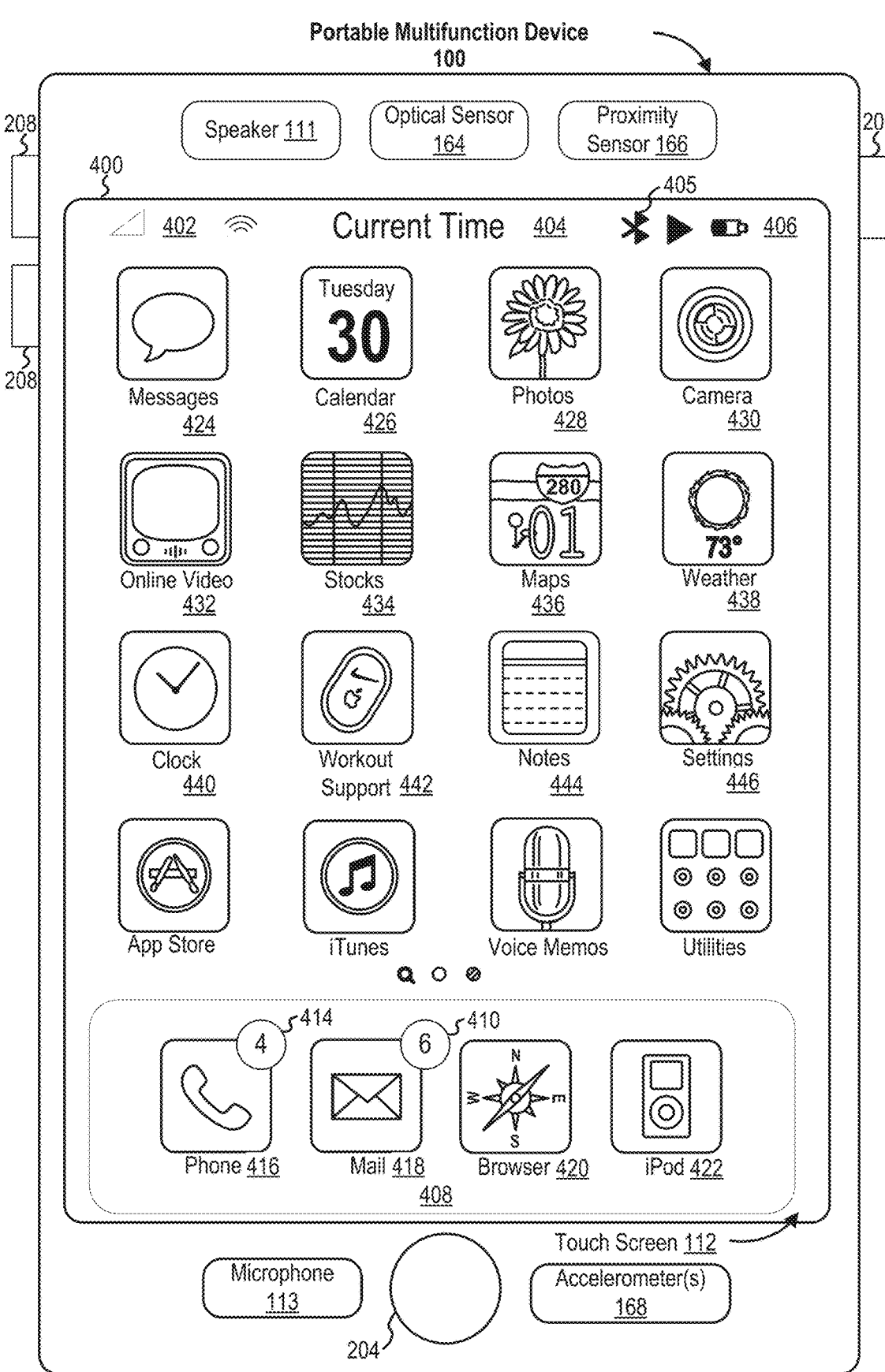
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3A) with a touch-sensitive surface 451 (e.g., a tablet or touchpad 355, FIG. 3A) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., touch-sensitive surface 451 in FIG. 4B) has a primary axis (e.g., 452 in FIG. 4B) that corresponds to a primary axis (e.g., 453 in FIG. 4B) on the display (e.g., display 450). In accordance with these embodiments, the device detects contacts (e.g., contact 460 and contact 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., touch-sensitive surface 451 in FIG. 4B) are used by the device to manipulate the user interface on the display (e.g., display 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
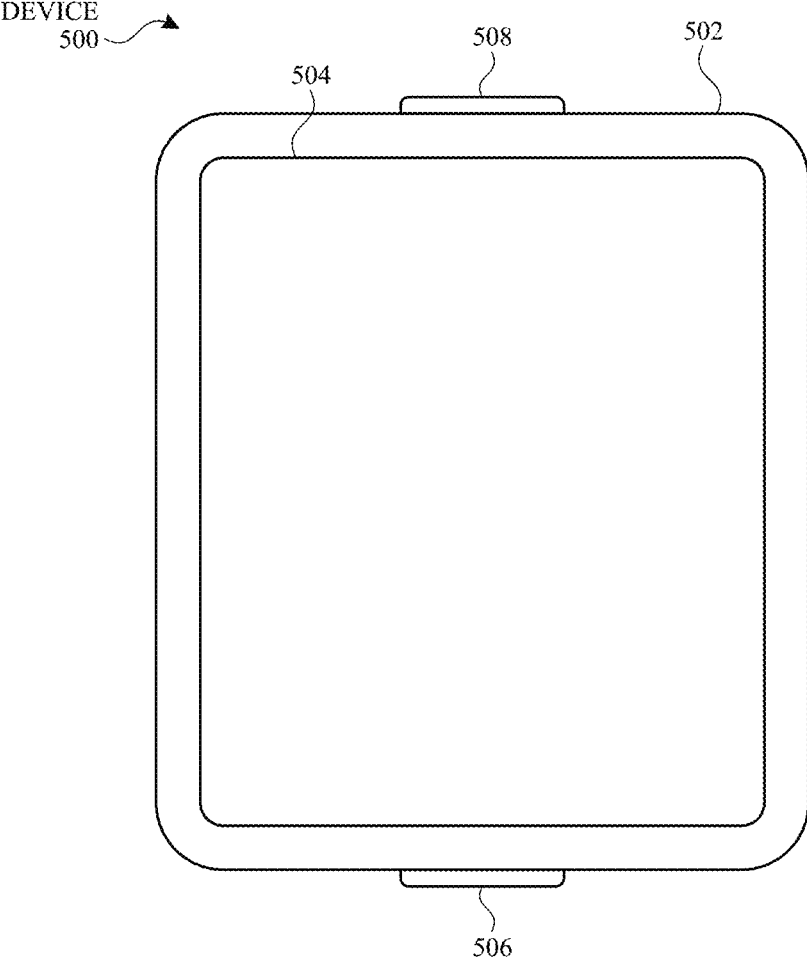
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
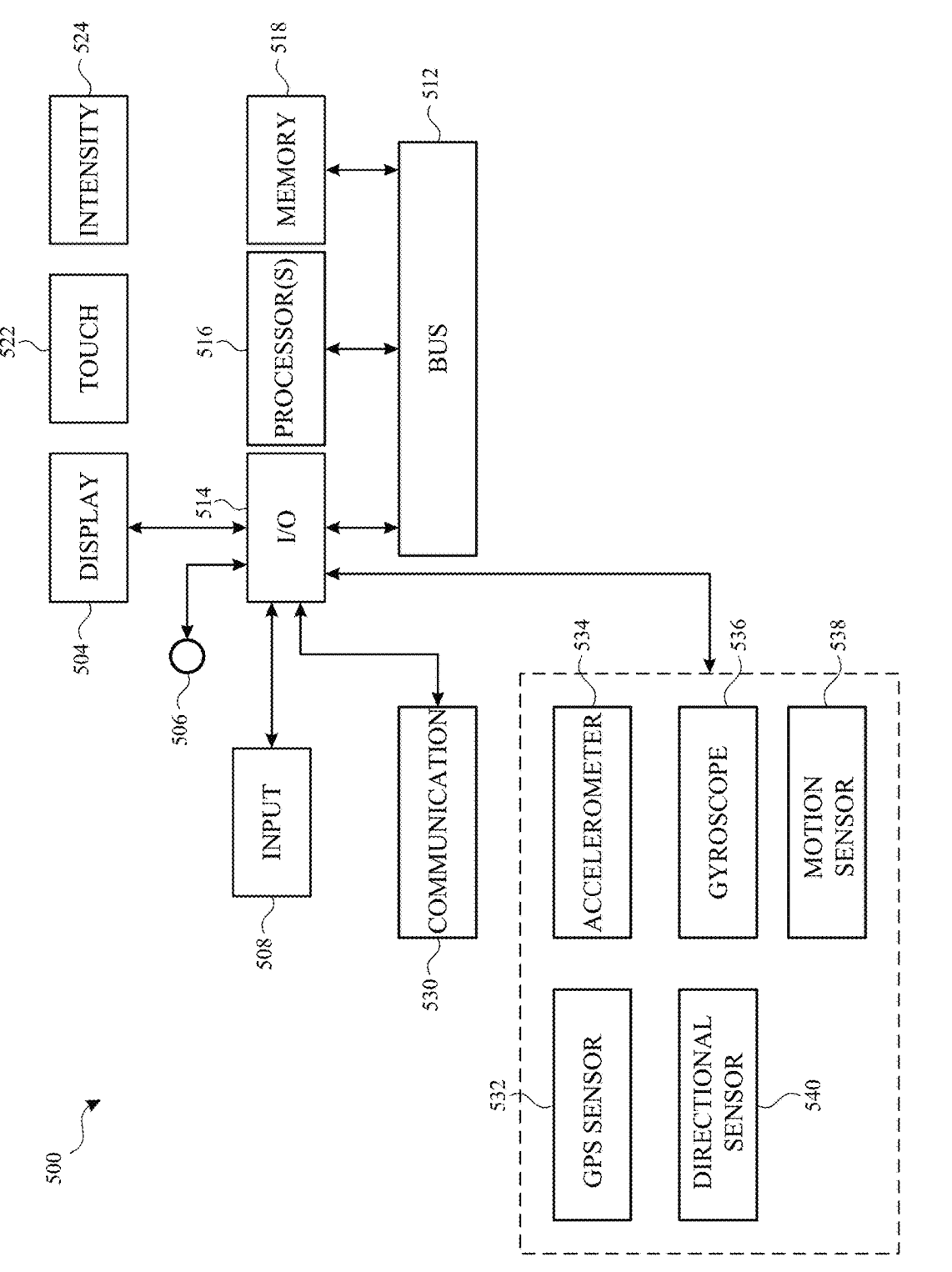
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3H. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7) and process 900 (FIG. 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3A-3H, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3A or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

In some embodiments, the computer system is in a locked state or an unlocked state. In the locked state, the computer system is powered on and operational but is prevented from performing a predefined set of operations in response to user input. The predefined set of operations optionally includes navigation between user interfaces, activation or deactivation of a predefined set of functions, and activation or deactivation of certain applications. The locked state can be used to prevent unintentional or unauthorized use of some functionality of the computer system or activation or deactivation of some functions on the computer system. In some embodiments, in the unlocked state, the computer system is powered on and operational and is not prevented from performing at least a portion of the predefined set of operations that cannot be performed while in the locked state. When the computer system is in the locked state, the computer system is said to be locked. When the computer system is in the unlocked state, the computer is said to be unlocked. In some embodiments, the computer system in the locked state optionally responds to a limited set of user inputs, including input that corresponds to an attempt to transition the computer system to the unlocked state or input that corresponds to powering the computer system off.

Attention is now directed towards embodiments of user interfaces ("UI") and associated processes that are implemented on an electronic device, such as portable multifunction device 100, device 300, or device 500.

FIGS. 6A-6T illustrate exemplary user interfaces for providing and/or displaying three-dimensional user interfaces, in accordance with some embodiments. The user interfaces in these figures are used to illustrate the processes described below, including the processes in FIG. 7.

FIG. 6A illustrates user 608 wearing computer system 600 (e.g., a smart watch), which includes display 602, rotatable and depressible input mechanism 604a, and button 604b. Although the depicted embodiments show an example in which computer system 600 is a wearable computer system, in other embodiments, computer system 600 is a different type of computer system (e.g., a non-wearable computer system, a smart phone, a tablet, a laptop computer, and/or a desktop computer). Computer system 600 includes display 602 (e.g., a touchscreen display), button 604a, and rotatable input mechanism 604b (e.g., a crown or a digital crown). In some embodiments, computer system 600 is a different type of wearable computer system (e.g., a headset, a ring, and/or glasses).

In some embodiments, display 602 is a display that is capable of displaying three-dimensional content and/or stereoscopic content. For example, in some embodiments, display 602 is a stereoscopic display that presents slightly different images to the two different eyes of a user to generate the perception and/or illusion of stereoscopic depth. In some embodiments, display 602 achieves the perception and/or illusion of stereoscopic depth by using two display generation components (e.g., an augmented-reality and/or virtual-reality device, and/or a head-mounted device) (e.g., a first display generation component displaying first content to a first eye of the user and a second display generation component displaying second content to a second eye of the user). In some embodiments, display 602 achieves the perception and/or illusion of stereoscopic depth by using special viewing glasses (e.g., to view different images for different eyes using color or polarization separation of the images). In some embodiments, display 602 achieves the perception and/or illusion of stereoscopic depth by using autostereoscopy (e.g., using a display that projects different images to different eyes using lenses such as lenticular lenses or optical barriers such as parallax barriers). In some embodiments, display 602 uses holographic and/or light field displays to produce a three-dimensional and/or stereoscopic depth effect. As will be described in greater detail below, display 602 displays different content at different stereoscopic depth positions such that certain content appears to be closer to the viewpoint of the user and other content appears to be further from the viewpoint of the user. In some embodiments, display 602 displays certain content at a stereoscopic depth position that appears to be positioned in front of display 602 and/or appears to extend in front of display 602. In some such embodiments, certain content appears to be closer to the viewpoint of the user than other content by appearing to be positioned further above and/or further in front of display 602. In some embodiments, display 602 displays certain content at a stereoscopic depth position that appears to be positioned behind display 602. In some such embodiments, certain content appears to be closer to the viewpoint of the user by being positioned closer to display 602, and other content appears to be further from the viewpoint of the user by being positioned further behind the position of display 602. Content that is displayed closer to the viewpoint of the user will sometimes be described herein as having a stereoscopic depth position that is "above" the stereoscopic depth positions of other content that is positioned further from the viewpoint of the user, and/or as having a greater or higher stereoscopic depth position than content that is positioned further from the viewpoint of the user. Content that is displayed further from the viewpoint of the user will sometimes be described herein as having a stereoscopic depth position that is "behind" the stereoscopic depth positions of other content that is positioned closer to the viewpoint of the user, and/or as having a lower stereoscopic depth position than content that is positioned closer to the viewpoint of the user. Furthermore, content and/or a collection of content (e.g., a user interface) that has a greater simulated and/or a greater perceived distance between a rearmost content item (e.g., a content item displayed with a lowest stereoscopic depth position of displayed content) and a frontmost content item (e.g., a content item displayed with a highest stereoscopic depth position of displayed content) is described as having a greater stereoscopic depth, whereas content and/or a collection of content (e.g., a user interface) that has a smaller simulated and/or perceived distance between the rearmost content item and the frontmost content item is described as having a smaller or lesser stereoscopic depth. These concepts will be described in greater detail below.

Stereoscopic displays are capable of displaying multiple two-dimensional images that are viewed from slightly different angles. When viewed together, the combination of the two-dimensional images creates the illusion of a three-dimensional image for the viewer. For example, a viewer's left eye may receive a first two-dimensional image and a viewer's right eye may receive a second, different two-dimensional image. The viewer perceives these two different two-dimensional images as a single three-dimensional image. There are numerous ways to implement a stereoscopic display (e.g., using a Lenticular Display, Parallax Barrier, Micro Lens Array, Volume Phase Holographic Gratings, Time-Multiplexing, Ray-based Light Field Display, and/or Wavefront-based Light Field Display). Display may be a lenticular display that uses lenticular lenses (e.g., elongated lenses that extend along parallel axes), may be a parallax barrier display that uses parallax barriers (e.g., an opaque layer with precisely spaced slits to create a sense of depth through parallax), may be a volumetric display, or may be any other desired type of stereoscopic display. Configurations in which display is a lenticular display are sometimes described herein as an example.

Figure 3H:
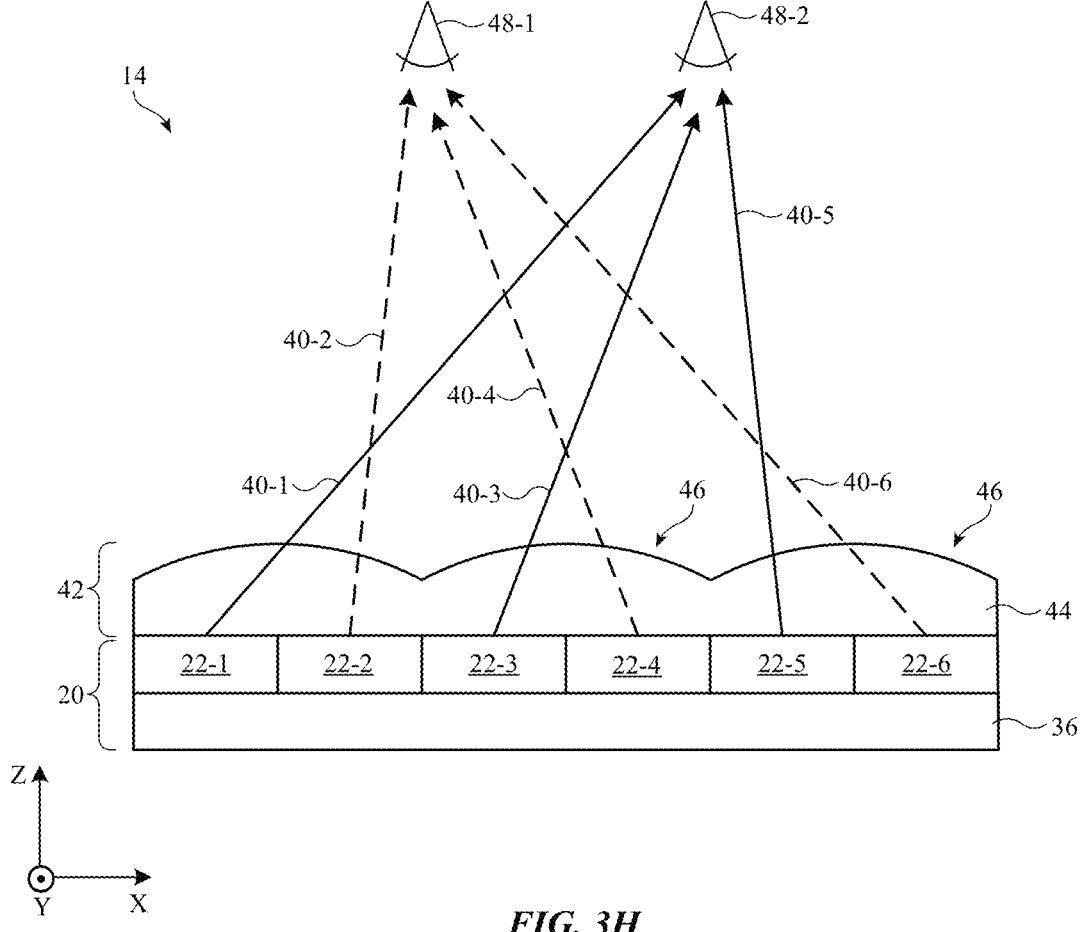
FIG. 3H is a cross-sectional side view of an illustrative lenticular display that provides images to a viewer in accordance with some embodiments.

FIG. 3H is a cross-sectional side view of an illustrative lenticular display that may be incorporated into electronic device 10. Display 14 includes a display panel 20 with pixels 22 on substrate 36. Substrate 36 may be formed from glass, metal, plastic, ceramic, or other substrate materials and pixels 22 may be organic light-emitting diode pixels, liquid crystal display pixels, or any other desired type of pixels. As shown in FIG. 3, lenticular lens film 42 may be formed over the display pixels. Lenticular lens film 42 (sometimes referred to as a light redirecting film, a lens film, etc.) includes lenses 46 and a base film portion 44 (e.g., a planar film portion to which lenses 46 are attached). Lenses 46 may be lenticular lenses that extend along respective longitudinal axes (e.g., axes that extend into the page parallel to the Y-axis). Lenses 46 may be referred to as lenticular elements 46, lenticular lenses 46, optical elements 46, etc. The lenses 46 of the lenticular lens film cover the pixels of display 14. An example is shown in FIG. 3H with display pixels 22-1, 22-2, 22-3, 22-4, 22-5, and 22-6. In this example, display pixels 22-1 and 22-2 are covered by a first lenticular lens 46, display pixels 22-3 and 22-4 are covered by a second lenticular lens 46, and display pixels 22-5 and 22-6 are covered by a third lenticular lens 46. The lenticular lenses may redirect light from the display pixels to enable stereoscopic viewing of the display.

Consider the example of display 14 being viewed by a viewer with a first eye (e.g., a right eye) 48-1 and a second eye (e.g., a left eye) 48-2. Light from pixel 22-1 is directed by the lenticular lens film in direction 40-1 towards left eye 48-2, light from pixel 22-2 is directed by the lenticular lens film in direction 40-2 towards right eye 48-1, light from pixel 22-3 is directed by the lenticular lens film in direction 40-3 towards left eye 48-2, light from pixel 22-4 is directed by the lenticular lens film in direction 40-4 towards right eye 48-1, light from pixel 22-5 is directed by the lenticular lens film in direction 40-5 towards left eye 48-2, light from pixel 22-6 is directed by the lenticular lens film in direction 40-6 towards right eye 48-1. In this way, the viewer's right eye 48-1 receives images from pixels 22-2, 22-4, and 22-6, whereas left eye 48-2 receives images from pixels 22-1, 22-3, and 22-5. Pixels 22-2, 22-4, and 22-6 may be used to display a slightly different image than pixels 22-1, 22-3, and 22-5. Consequently, the viewer may perceive the received images as a single three-dimensional image.

At FIG. 6A, computer system 600 is displaying, via display 602, watch face user interface 610. In FIG. 6A, watch face user interface 610 is displayed as a two-dimensional user interface that does not have any stereoscopic depth (e.g., all content in watch face user interface 610 is displayed at the same stereoscopic depth position). While watch face user interface 610 does not have any stereoscopic depth, watch face user interface 610 does have a stereoscopic depth position (e.g., a stereoscopic depth position that corresponds to the position of display 602). In other words, watch face user interface 610 is a two-dimensional user interface with no stereoscopic depth because all the content of watch face user interface 610 is displayed at the same stereoscopic depth position (e.g., displayed in the same plane). Watch face user interface includes background 612a, hour hand 612b, minute hand 612c, second hand 612d, complications 614a-614d, and corner complications 616a-616d. Complications 614a-614d and corner complications 616a-616d correspond to different functions and/or applications of computer system 600. For example, complication 614a corresponds to a music player application (e.g., complication 614a is selectable to open the music player application and/or display a music player application user interface); complication 614b corresponds to a calendar application (e.g., complication 614b is selectable to open a calendar application and/or display a calendar application user interface); complication 614c corresponds to a workout application (e.g., complication 614c is selectable to open a workout application and/or display a workout application user interface); complication 614d corresponds to a weather application (e.g., complication 614d is selectable to open a weather application and/or display a weather application user interface); corner complication 616a corresponds to an elevation function (e.g., corner complication 616a is selectable to open an elevation application and/or display an elevation user interface); corner complication 616b corresponds to a UV level function (e.g., corner complication 616b is selectable to open a UV level application and/or display a UV level user interface); corner complication 616c corresponds to a grade function (e.g., corner complication 616c is selectable to open a grade application and/or display a grade user interface); and corner complication 616d corresponds to a stopwatch application (e.g., corner complication 616d is selectable to open a stopwatch application and/or display a stopwatch user interface).

At FIG. 6A, computer system 600 is in a sleep state and/or a low power state. For example, in some embodiments, computer system 600 is in a low power state in which content is displayed at a lower brightness than in a high power state and/or displayed content is refreshed at a lower frequency than in a high power state. In some embodiments, the sleep state and/or the low power state is a state in which content is not displayed on display 602. FIG. 6A depicts different example scenarios in which computer system 600 detects user inputs 618a, 618b, 618c, and/or 618d. User input 618a is user 608 raising his hand while wearing computer system 600. User input 618b is a press of rotatable input mechanism 604a. User input 618c is a press of button 604b. User input 618d is a touch input on touch-sensitive display 602.

Figure 6B:
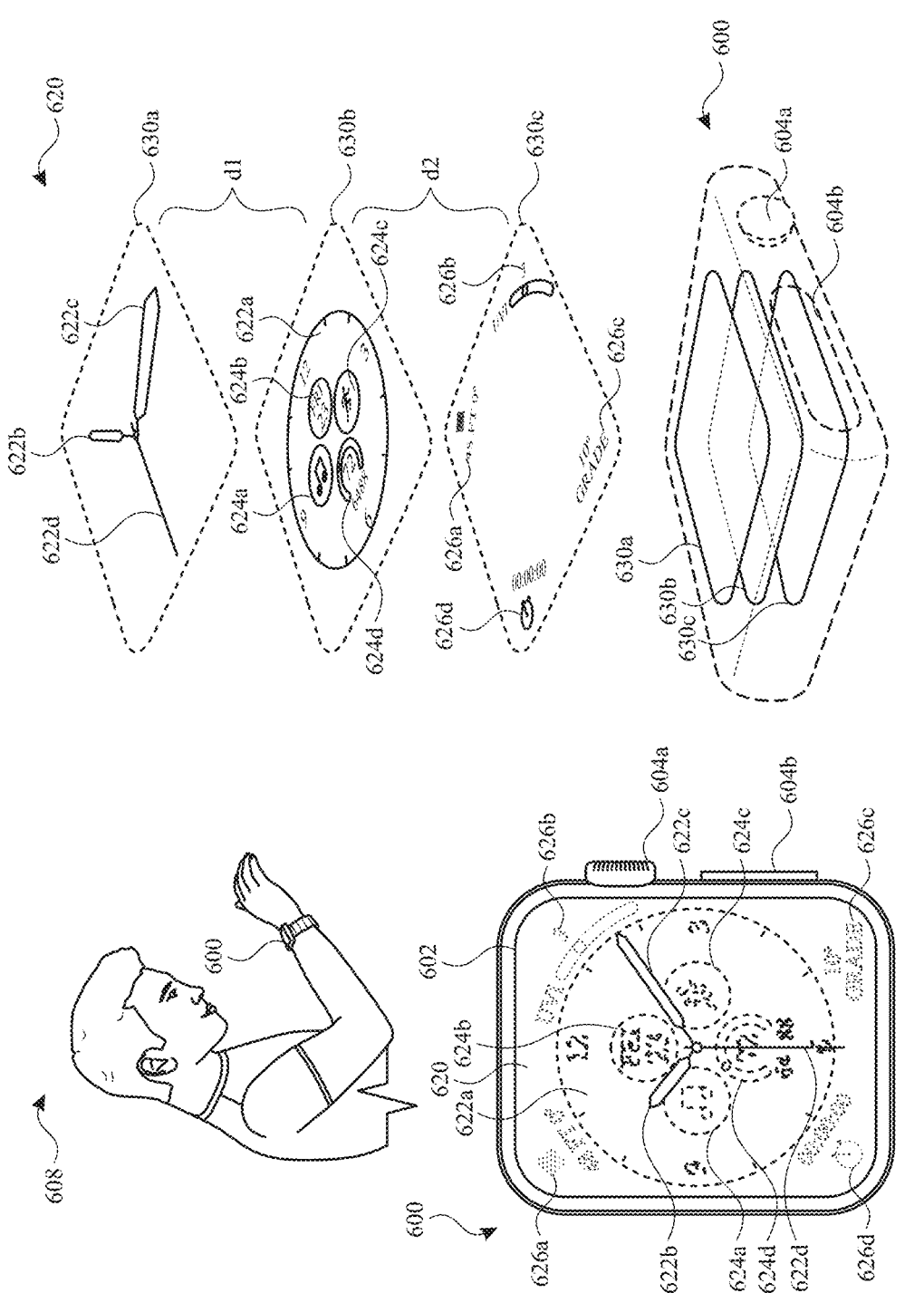
FIGS. 6A-6T illustrate exemplary devices and user interfaces for providing and/or displaying three-dimensional user interfaces.

At FIG. 6B, in response to user input 618a, user input 618b, user input 618c, and/or user input 618d, computer system 600 transitions from the low power state to a high power state. In some embodiments, the high power state is a state in which content is displayed at a higher brightness than in the low power state and/or displayed content is refreshed at a higher frequency than in the low power state.

In some embodiments, the high power state is a state in which content is displayed via display 602. Furthermore, in the depicted embodiments, in response to user input 618*a*, user input 618*b*, user input 618, and/or user input 618*d*, computer system 600 replaces display of user interface 610 with user interface 620. In some embodiments, user interface 620 is a high power state version of user interface 610. In some embodiments, user interface 620 is a three-dimensional version of user interface 610 (e.g., a version of user interface 610 that has greater and/or non-zero stereoscopic depth). As can be seen in FIG. 6B, user interface 620 is a three-dimensional user interface that has a greater amount of stereoscopic depth than user interface 610. User interface 620 includes background 622*a* (which corresponds to background 612*a*), hour hand 622*b* (which corresponds to hour hand 612*b*), minute hand 622*c* (which corresponds to minute hand 612*c*), second hand 622*d* (which corresponds to second hand 612*d*), complications 622*a*-622*d* (which correspond to complications 612*a*-612*d*, respectively), and corner complications 626*a*-626*d* (which correspond to corner complications 616*a*-616*d*, respectively).

On the bottom right-hand side of FIG. 6B, computer system 600 is shown as displaying three distinct layers 630*a*-630*c* having different stereoscopic depth positions. Layer 630*a* is a topmost layer that has a highest stereoscopic depth position (and/or a layer that has a higher stereoscopic depth position than layer 630*c* and layer 630*b*), layer 630*c* is a bottommost layer that has a lowest stereoscopic depth position (and/or a layer that has a lower stereoscopic depth position than layer 630*a* and layer 630*b*), and layer 630*b* is a middle layer that has a stereoscopic depth position between layer 630*a* and layer 630*c*. Layer 630*a* is shown as being separated from layer 630*b* by a first stereoscopic distance d1, and layer 630*b* is shown as being separated from layer 630*c* by a second stereoscopic distance d2. While the example embodiments are shown as having three distinct stereoscopic layers having three different stereoscopic depth positions, this is done for ease of understanding, and it should be appreciated that a different number of stereoscopic layers is possible (e.g., more stereoscopic layers or fewer stereoscopic layers) (e.g., two or more stereoscopic layers).

In FIG. 6B, hour hand 622*b*, minute hand 622*c*, and second hand 622*d* are shown in topmost layer 630*a* (e.g., a layer with a higher and/or highest stereoscopic depth position) (and/or a layer that has a higher stereoscopic position than layer 630*b* and layer 630*c*). Background 622*a*, and complications 624*a*-624*d* are shown in middle layer 630*b* (e.g., a layer with the second highest stereoscopic depth position and/or a layer with a lower stereoscopic depth position than layer 630*a* and higher stereoscopic depth position than layer 630*c*). Corner complications 626*a*-626*d* are shown in bottom layer 630*c* (e.g., with a lower and/or lowest stereoscopic depth position) (e.g., a layer with a lower stereoscopic depth position than layer 630*a* and layer 630*b*). When a user looks at display 602, the user will see the elements aligned on top of one another, as shown in the bottom left of FIG. 6B, with objects in layer 630*a* appearing closer to the user, and objects in layer 630*b* appearing behind (e.g., further from the viewpoint of the user than) objects in layer 630*a* and in front of (e.g., closer to the viewpoint of the user than) objects in layer 630*c*. In the bottom left of FIG. 6B, objects displayed in layer 630*a* are displayed with solid lines, objects displayed in layer 630*b* are displayed with dashed lines, and objects displayed in layer 630*c* are displayed with dotted lines in order to demonstrate that different content is displayed with different stereoscopic depth positions. These representations of stereoscopic depth position will be used throughout the figures, as appropriate. In some embodiments, as a part of displaying content with different stereoscopic depth positions, as the user moves his or her viewpoint relative display 602, displayed objects also move accordingly to simulate parallax.

Figure 6C:
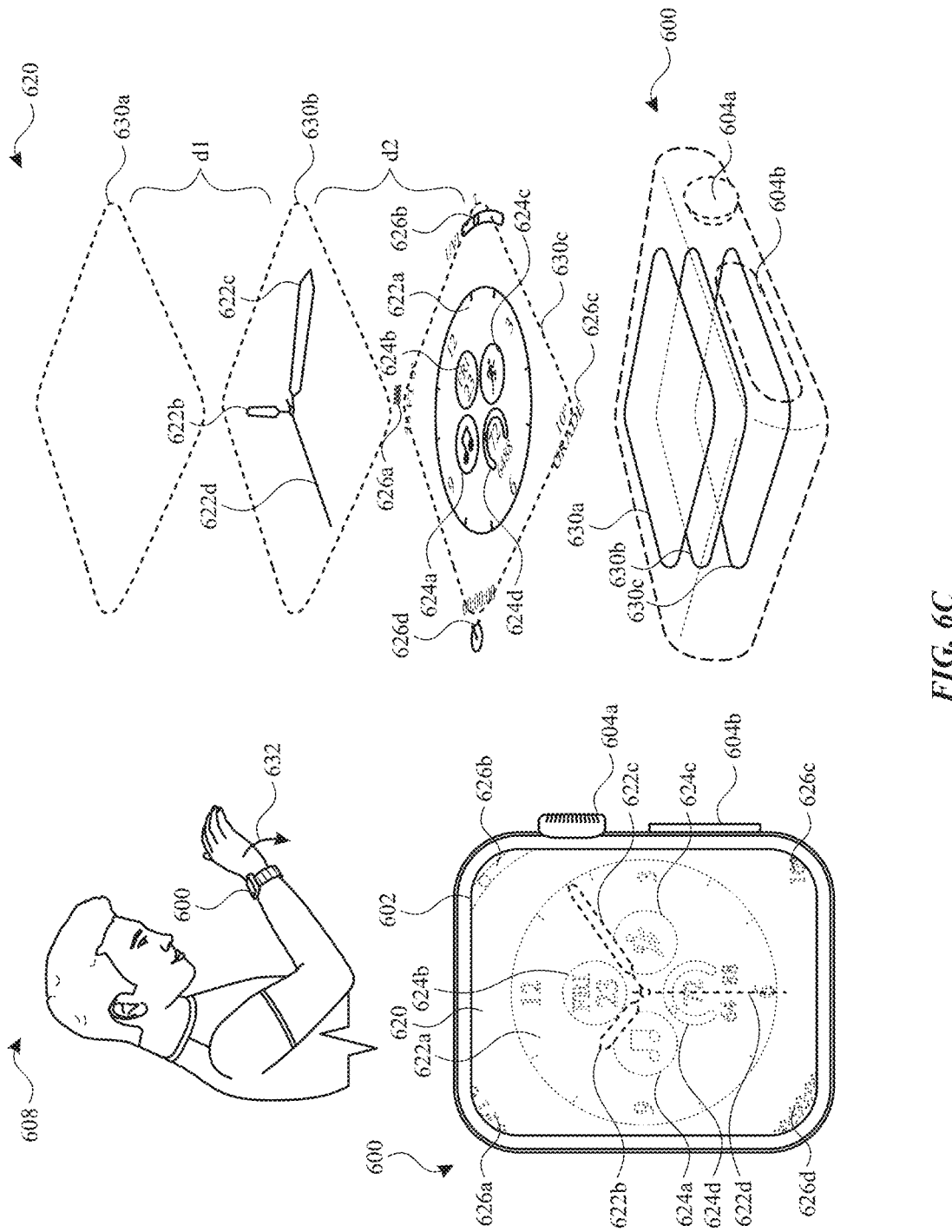

At FIG. 6C, after a threshold and/or predetermined duration of time has elapsed after detecting user input 618*a*, user input 618*b*, user input 618*c*, and/or user input 618*d* in FIG. 6A, computer system 600 displays user interface 620 changing from having a greater amount of stereoscopic depth (e.g., in FIG. 6B) to having less stereoscopic depth (e.g., in FIG. 6C) by moving content that was displayed in layer 630*a* to layer 630*b*, and moving content that was displayed in layer 630*b* to layer 630*c* (and maintaining content that was displayed in layer 630*c* in layer 630*c*). In FIG. 6B, the stereoscopic depth of user interface 620 was d1+d2 (e.g., the distance from the foremost content to the rearmost content), but in FIG. 6C, the stereoscopic depth of user interface 620 has decreased to d2.

In FIG. 6C, it can be seen that only a portion of corner complications 626*a*-626*d* are displayed by display 602. For example, the bottom left representation of computer system cuts off certain portions of corner complications 626*a*-626*d*, and in the top right, portions of corner complications 626*a*-626*d* extend behind the outer edge of display 602. At FIG. 6C, computer system 600 detects user input 632 in which a top left corner of computer system 600 is moved upwards and a bottom right corner of computer system 600 is moved downwards. For example, in some embodiments, in FIG. 6C, user 608 provides user input 632 by turning his wrist to cause this movement of computer system 600.

Figure 6D:
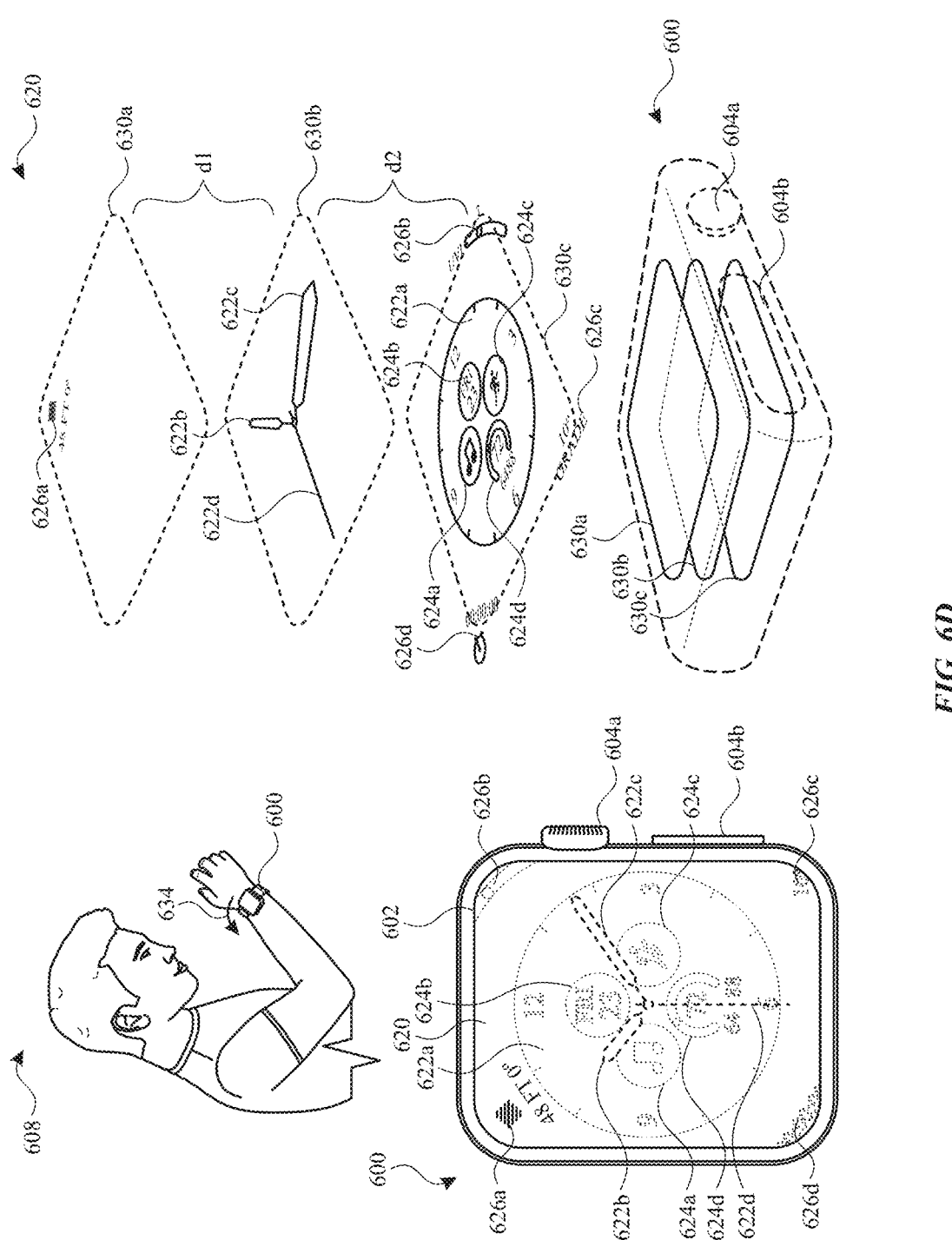

At FIG. 6D, in response to detecting user input 632 in which the top left corner of computer system 600 is moved upwards (e.g., towards the viewpoint of the user), computer system 600 moves corner complication 626*a* (positioned at a top left corner of user interface 620) from bottom layer 630*c* (and/or a layer with a lower stereoscopic depth position than layer 630*a* and layer 630*b*) to top layer 630*a* (and/or a layer with a higher stereoscopic depth position than layer 630*b* and layer 630*c*), and displays the entirety of corner complication 626*a*. In this way, a user is able to provide a user input (e.g., movement of computer system 600) to move content from a lower stereoscopic depth position to a higher stereoscopic depth position to make that content easier to see. At FIG. 6D, computer system 600 detects user input 634 in which a top right corner of computer system 600 is moved upwards and the top left corner of computer system 600 is moved downwards. For example, in some embodiments, in FIG. 6D, user 608 provides user input 634 by turning his wrist to cause this movement of computer system 600.

Figure 6E:
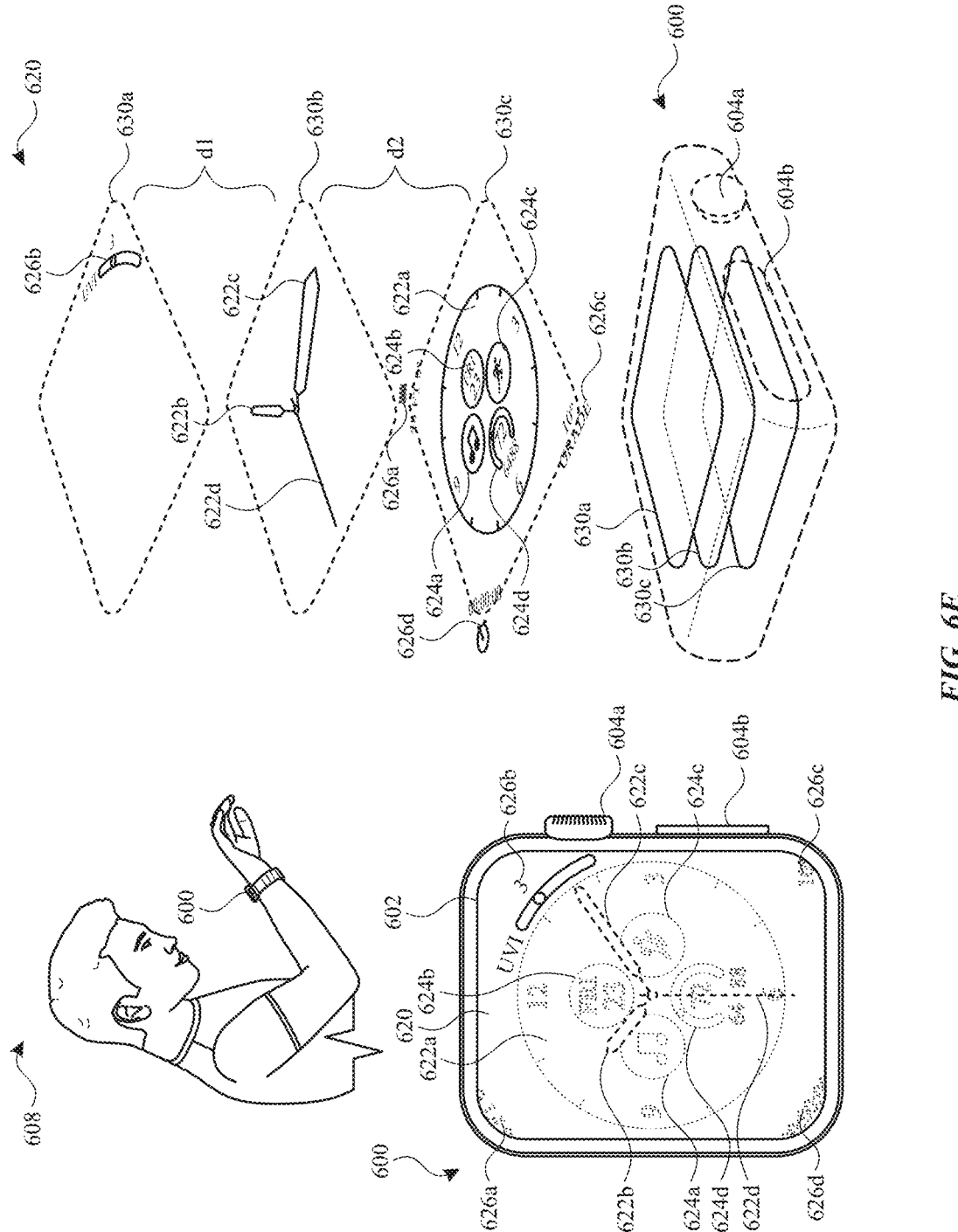

At FIG. 6E, in response to detecting user input 634 in which the top right corner of computer system 600 is moved upwards (e.g., towards the viewpoint of the user), computer system 600 moves corner complication 626*b* (positioned at a top right corner of user interface 620) from bottom layer 630*c* (and/or a layer that has a lower stereoscopic depth position than layer 630*a* and layer 630*b*) to top layer 630*a* (and/or a layer that has a higher stereoscopic depth position than layer 630*b* and layer 630*c*), and displays the entirety of corner complication 626*b*. Furthermore, in response to user input 634, in which the top left corner of computer system 600 is moved downwards (e.g., away from the viewpoint of the user), computer system 600 also moves corner complication 626*a* from top layer 630*a* to bottom layer 630*c*, where a portion of corner complication 626*a* is obscured and/or not displayed.

Figure 6F:
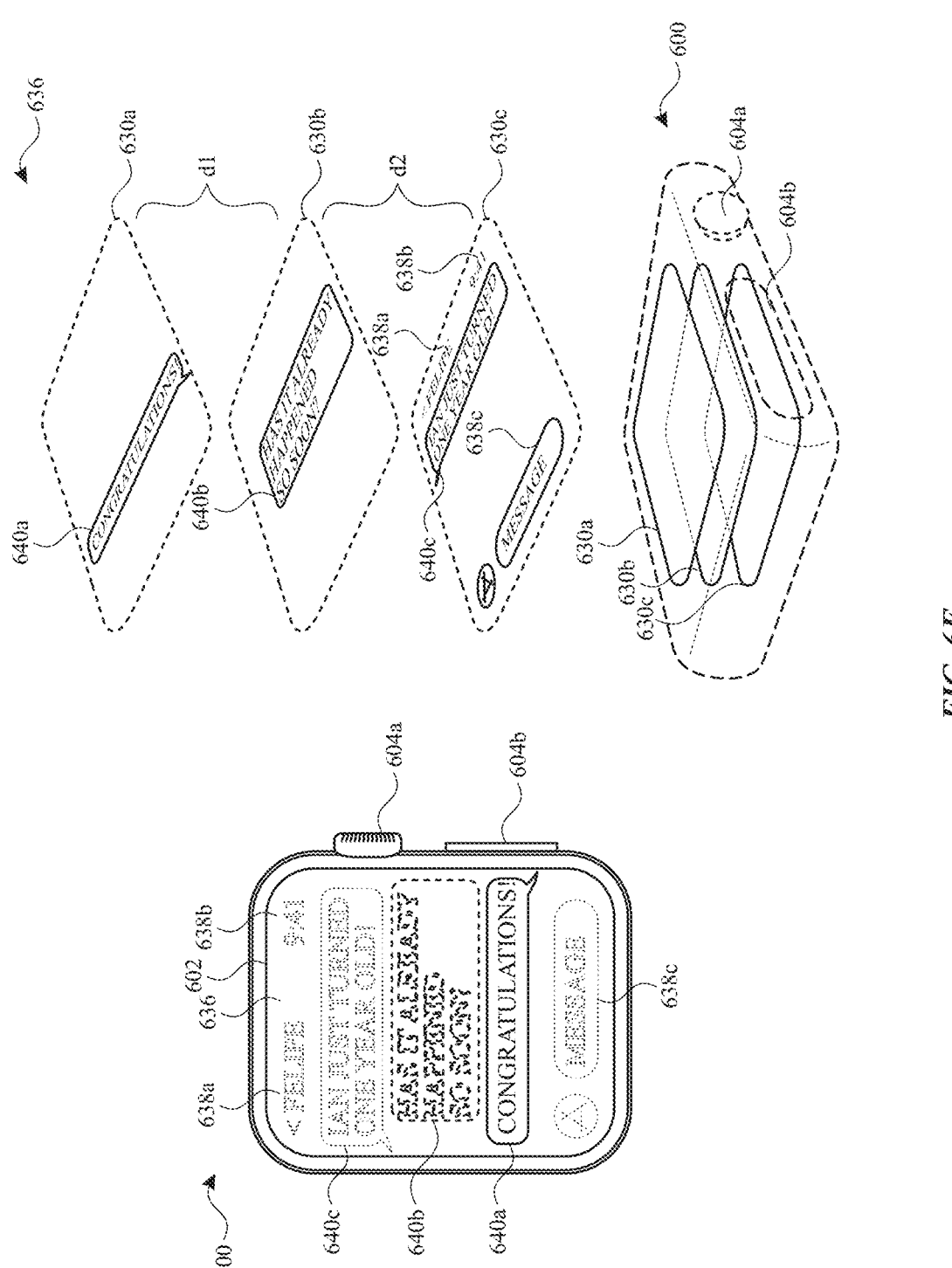

At FIG. 6F, computer system 600 displays messaging user interface 636, which is a three-dimensional user interface having a stereoscopic depth of d1+d2. Messaging user interface 636 includes affordance 638a that is selectable to return to a previous user interface, time indication 638b, and text entry field 638c for entering a text message to be transmitted into a messaging session. Messaging user interface 636 also includes messages 640a-640c that have previously been transmitted into the messaging session. In FIG. 6F, the most recently transmitted message, message 640a, is displayed in top layer 630a (e.g., at a higher or highest stereoscopic depth position). The second most recently transmitted message, message 640b, is displayed in middle layer 630b (e.g., at an intermediate or second highest stereoscopic depth position). Earlier messages, including message 640c, are displayed in bottom layer 630c (e.g., at a lower or a lowest stereoscopic depth position), along with affordance 638a, time indication 638b, and text entry field 638c. In FIG. 6F, message 640a has just been entered into the messaging session by a user of computer system 600.

Figure 6G:
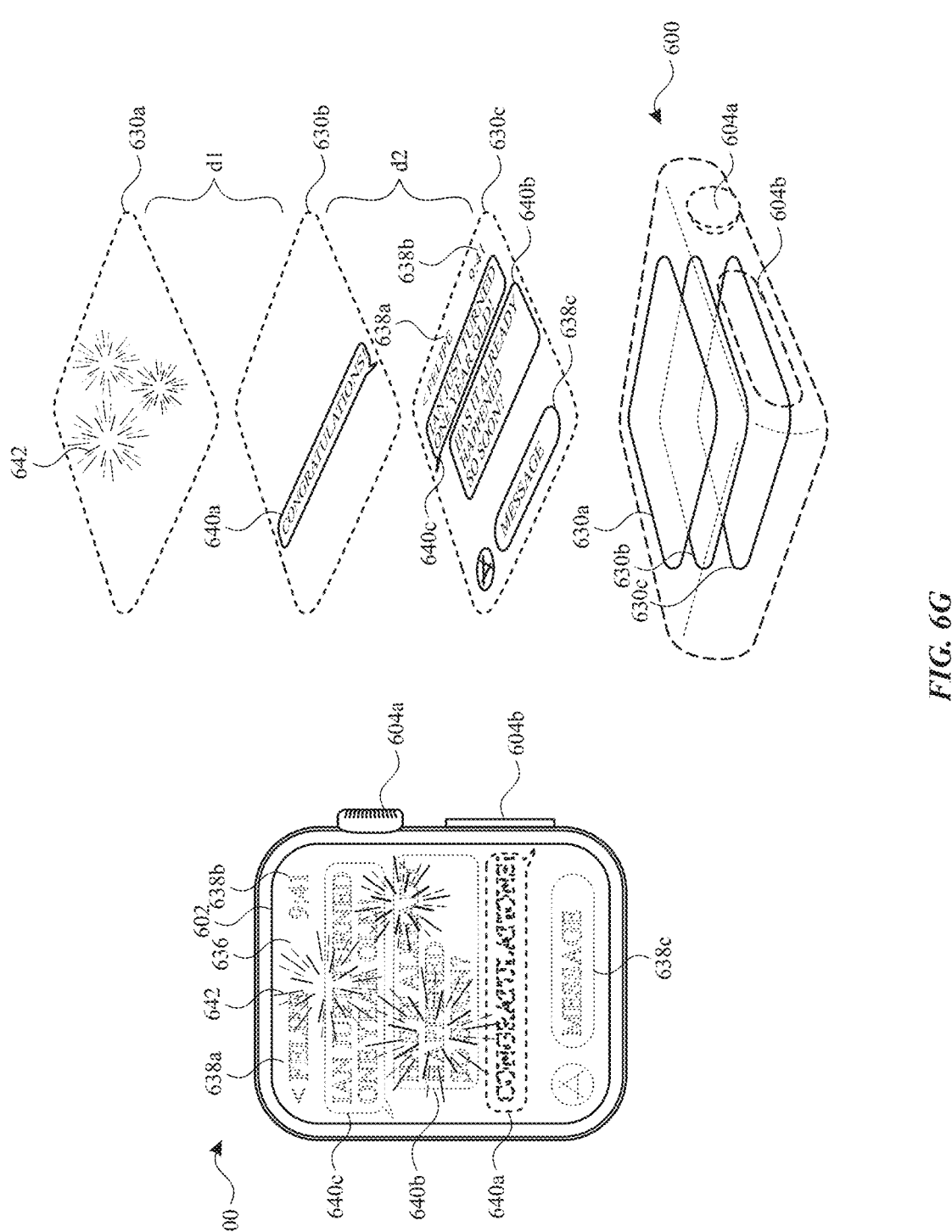

At FIG. 6G, based on the content of message 640a (e.g., "Congratulations!") and/or based on transmission of message 640a into the messaging session, computer system 600 displays animation 642 in top layer 630a (e.g., and/or a layer that has a higher stereoscopic depth position than layer 630b and layer 630c), moves message 640a into middle layer 630b (e.g., an intermediate layer), and moves message 640b into bottom layer 630c (e.g., and/or a layer that has a lower stereoscopic depth position than layer 630a and layer 630b) (e.g., while maintaining message 640c, affordance 638a, time indication 638b, and text entry field 638c in bottom layer 630c).

Figure 6H:
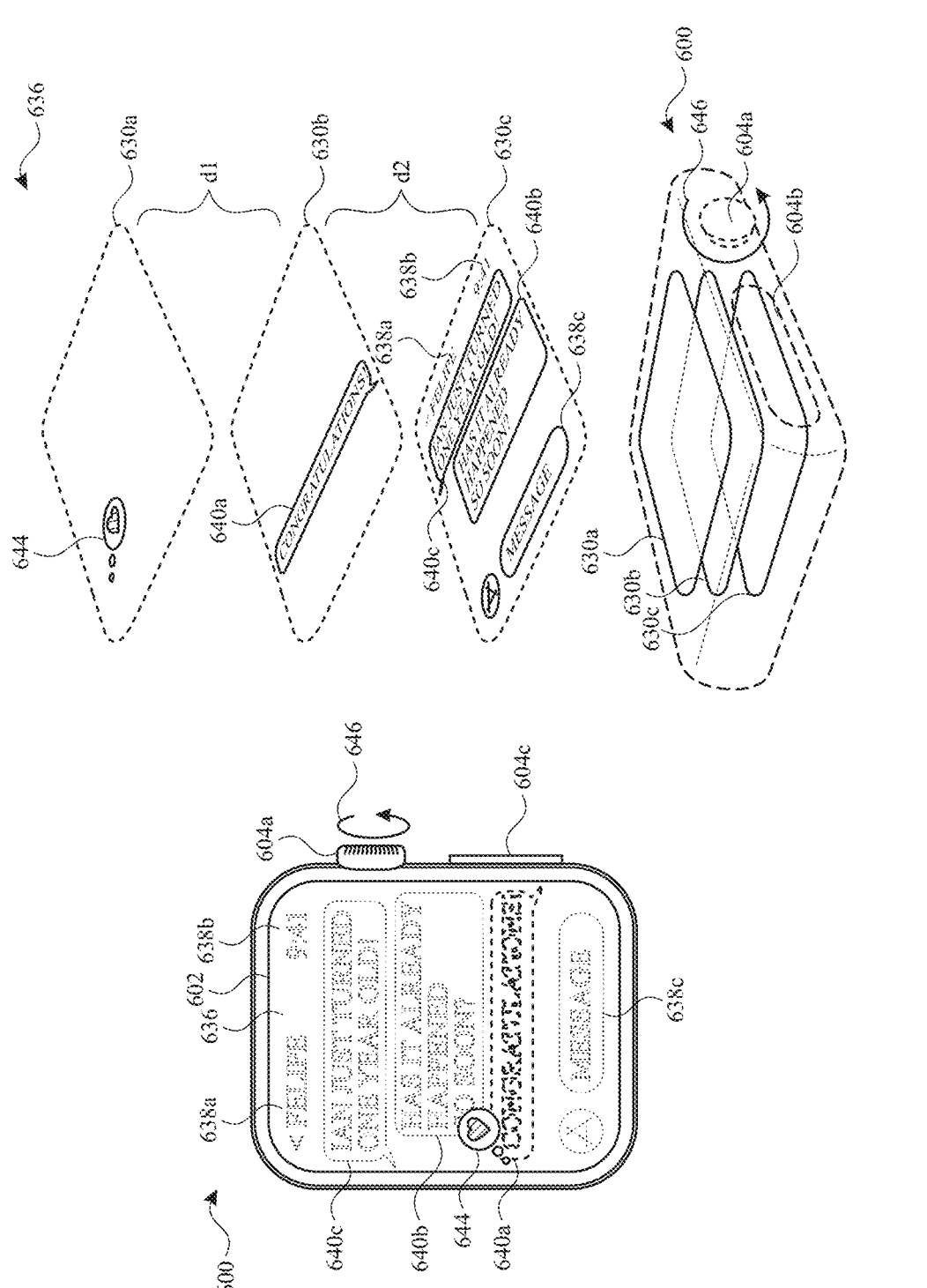
Figure 61:
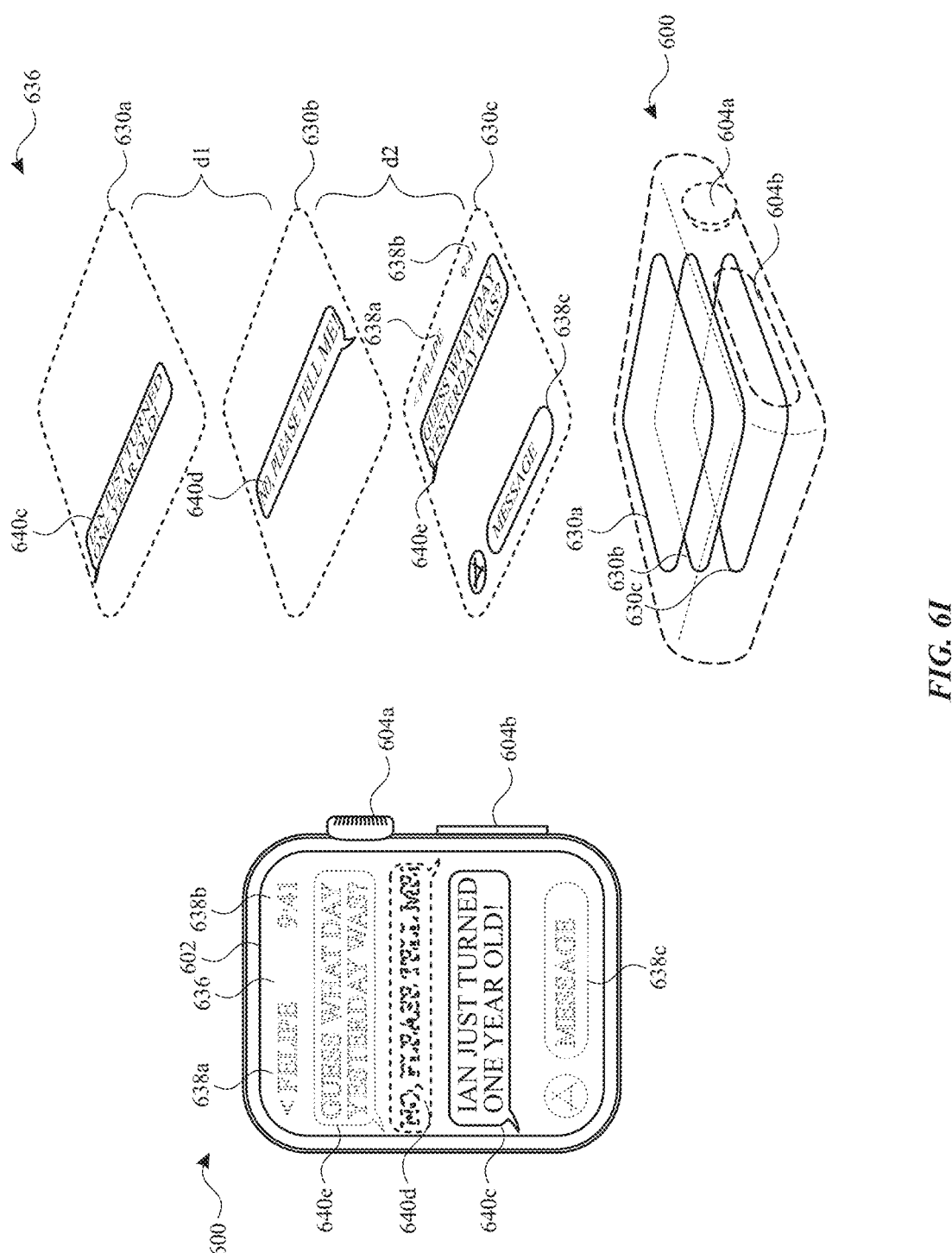

At FIG. 6H, computer system 600 receives an indication that a second participant in the messaging session (e.g., a different user from the user of computer system 600 and/or a user of a different computer system) has transmitted a reaction into the messaging session. In response to receiving the indication that the second participant has transmitted the reaction into the messaging session, computer system 600 displays reaction indication 644. Reaction indication 644 is displayed at top layer 630a (e.g., a layer that has a higher stereoscopic depth position than layer 630b and layer 630c) to indicate that it is a most recent transmission that has been received within the messaging session, and message 640a is displayed in middle layer 630b (e.g., an intermediate layer and/or a layer that has a lower stereoscopic depth position than layer 630a and higher than layer 630c) to indicate that it is the second most recent transmission that has been received within the messaging session. At FIG. 6H, computer system 600 detects user input 646, which is a rotation of rotatable input mechanism 604a.

At FIG. 6I, in response to user input 646, computer system 600 displays scrolling of user interface 636 to show previous messages that were transmitted into the messaging session. In FIG. 6I, in response to user input 646, message 640c has been scrolled towards the bottom of display 602, messages 640a, 640b have been scrolled downward off of display 602, and earlier messages 640d-640e, which were previously not displayed, are scrolled downward onto display 602 and are now displayed. In FIG. 6I, message 640c is the most recent displayed message. Accordingly, it is displayed in top layer 630a (e.g., a layer with a higher stereoscopic depth position than layer 630b and layer 630c). Message 640d is displayed in middle layer 630b (e.g., a layer with a higher stereoscopic depth position than layer 630c and lower than layer 630a) to indicate that it is the second most recently received message of the displayed messages, and message 640e is displayed in bottom layer 630c (e.g., a layer with a lower stereoscopic depth position than layer 630a and layer 630b). As such, in the depicted embodiments, as a user scrolls through messages, messages are transitioned between different stereoscopic depth position layers and a rotational visual effect is provided to the user. From FIG. 6I, a user is able to provide a rotation of rotatable input mechanism 604a in a first direction (e.g., the same direction as user input 646) to continue scrolling user interface 636 downwards (e.g., continue scrolling content downwards and/or scroll higher in the messaging session), or provide a rotation of rotatable input mechanism 604a in a second direction (e.g., in the opposite direction as user input 646) to scroll user interface 636 upwards to return to the state shown in FIG. 6H.

Figure 6J:
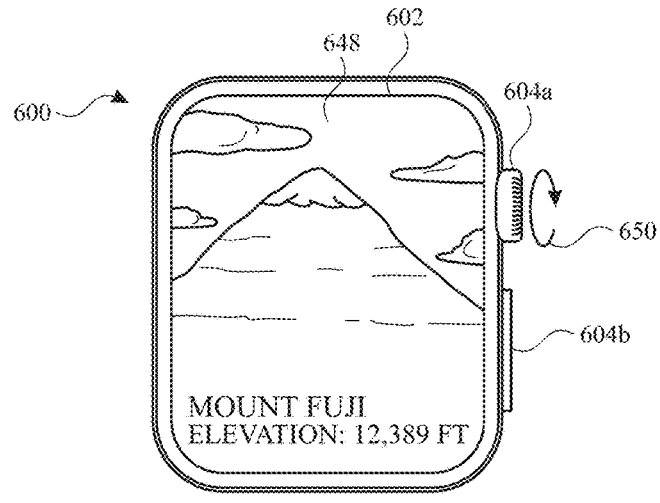

At FIG. 6J, computer system 600 displays user interface 648. User interface 648 is a two-dimensional user interface that does not have stereoscopic depth. User interface 648 displays information about Mount Fuji, and also displays a two-dimensional image of Mount Fuji. At FIG. 6J, computer system 600 detects user input 650, which is a rotation of rotatable input mechanism 604a.

Figure 6K:
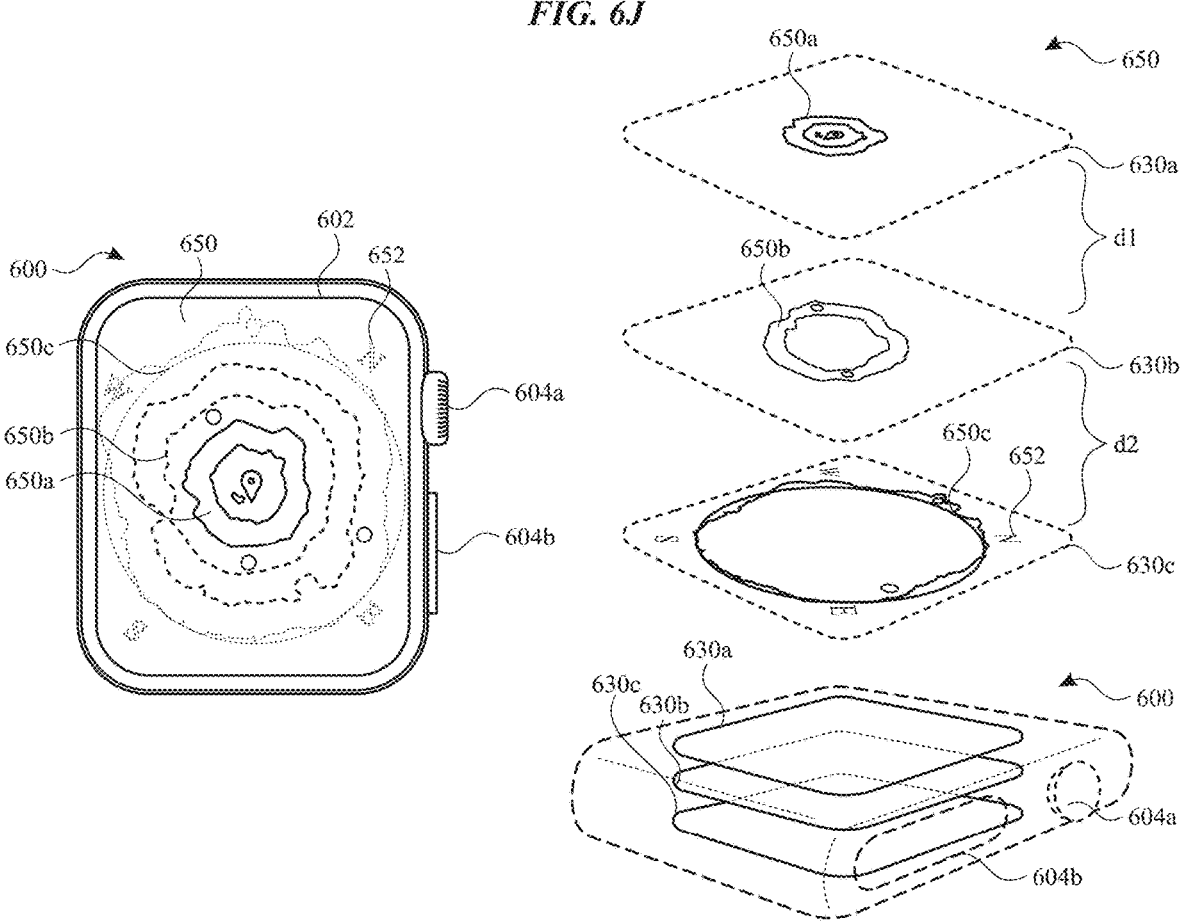

At FIG. 6K, in response to user input 650, computer system 600 ceases display of two-dimensional user interface 648, and displays, via display 602, three-dimensional user interface 650, which has greater stereoscopic depth than two-dimensional user interface 648. User interface 650 displays a topographical map of Mount Fuji. A first portion 650a of the topographical map, representing a topmost portion of Mount Fuji, is displayed in top layer 630a (e.g., a layer that has a higher stereoscopic depth position than layer 630b and layer 630c). A second portion 650b of the topographical map, representing a middle portion of Mount Fuji below portion 650a, is displayed in middle layer 630b (e.g., an intermediate layer and/or a layer that has a higher stereoscopic depth position than layer 630c and a lower stereoscopic depth position than layer 630a). A third portion 650c of the topographical map, representing a bottom portion of Mount Fuji, is displayed in bottom layer 630c (e.g., a layer that has a lower stereoscopic depth position than layer 630a and layer 630b). In some embodiments, from FIG. 6K, a user is able to provide a rotation of rotatable input mechanism 604a (e.g., in the opposite direction of user input 650) to return to the state shown in FIG. 6J. In some embodiments, from FIG. 6J to FIG. 6K, as the user provides further rotation of rotatable input mechanism 604a (e.g., as user input 650 progresses), layers 630a-630c move further away from one another such that the stereoscopic depth of user interface 650 increases as the user continues user input 650 (e.g., until a maximum permissible stereoscopic depth is reached). In some embodiments, should the user provide an opposite rotational input of rotatable input mechanism 604a from FIG. 6K, layers 630a-630c move closer together to one another until user interface 650 has less than a threshold amount of stereoscopic depth (e.g., a non-zero threshold amount of stereoscopic depth or zero stereoscopic depth), and user interface 650 is replaced with user interface 648.

Figure 6L:
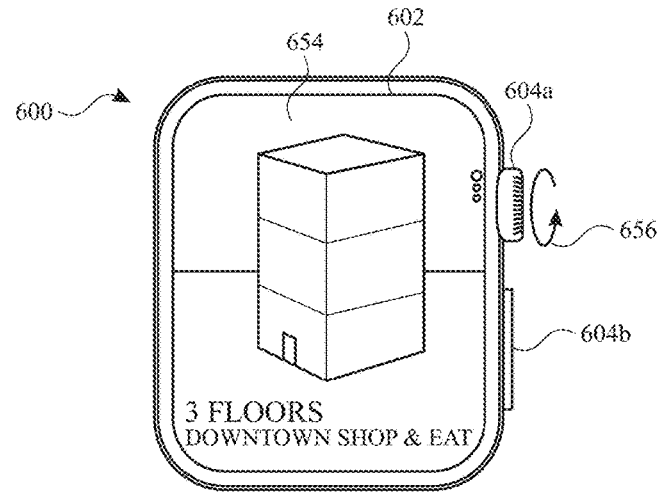

At FIG. 6L, computer system 600 displays user interface 654. User interface 654 is a two-dimensional user interface that does not have stereoscopic depth. User interface 654 displays information about a physical building (e.g., a shopping center), and also displays a two-dimensional image of the physical building. At FIG. 6L, computer system 600 detects user input 656, which is a rotation of rotatable input mechanism 604a.

Figure 6M:
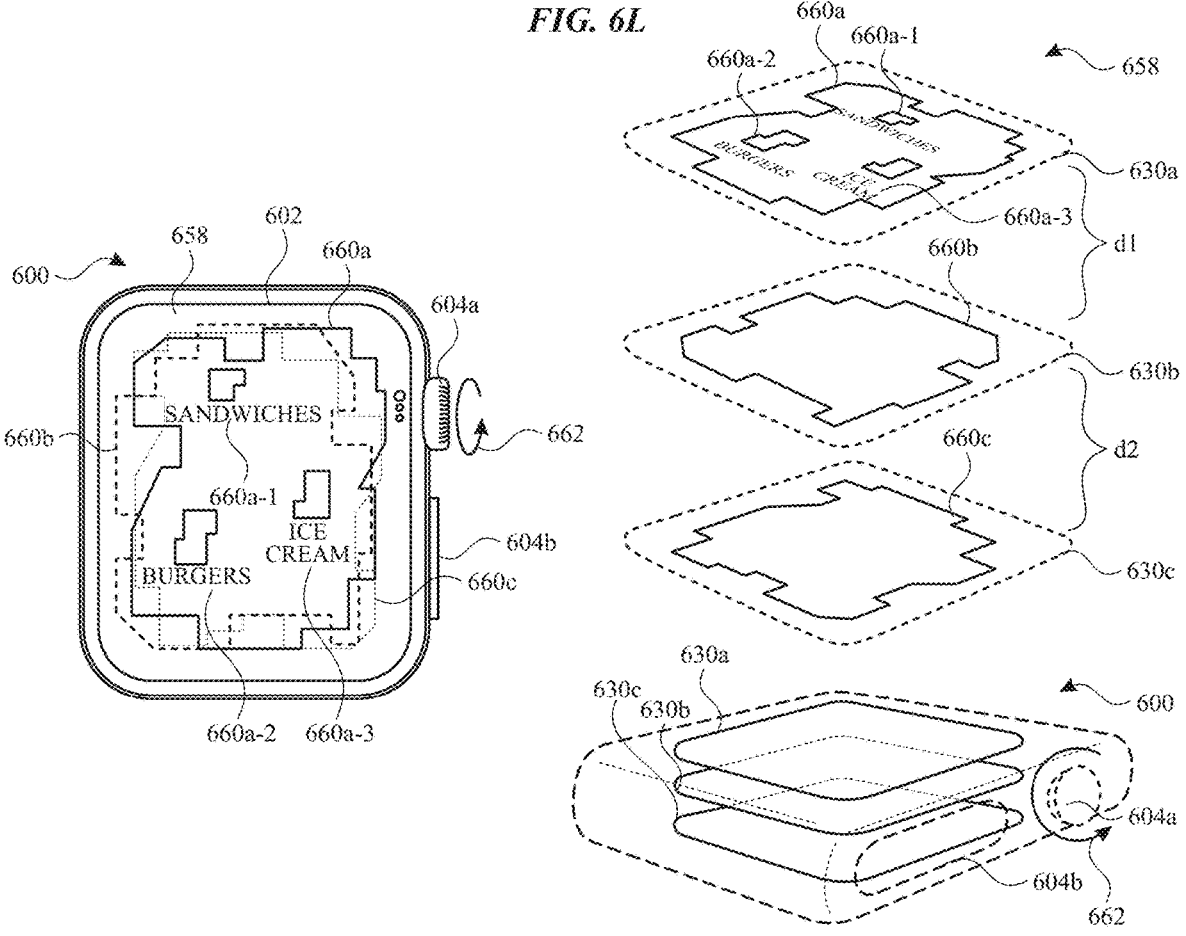

At FIG. 6M, in response to user input 656, computer system 600 ceases display of two-dimensional user interface

654, and displays, via display 602, three-dimensional user interface 658, which has greater stereoscopic depth than two-dimensional user interface 654. User interface 658 includes floor-by-floor map information of the physical building. Map 660*a* of the top floor (e.g., the third floor), is displayed in top layer 630*a* (e.g., a layer that has a higher stereoscopic depth position than layer 630*b* and layer 630*c*). Map 660*b* of the second floor is displayed in middle layer 630*b* (e.g., an intermediate layer and/or a layer that has a higher stereoscopic depth position than layer 630*c* and a lower stereoscopic depth position than layer 630*a*). Map 660*c* of the first floor is displayed in bottom layer 630*c* (e.g., a layer that has a lower stereoscopic depth position than layer 630*a* and layer 630*b*). In FIG. 6M, based on map 660*a* being displayed in top layer 630*a*, additional information 660*a*-1, 660*a*-2, 660*a*-3 pertaining to map 660*a* is displayed in layer 630*a*. Additional information pertaining to maps 660*b*-660*c* (shown in FIGS. 6N-6O) are not shown in FIG. 6M based on map 660*b* and map 660*c* being displayed in layer 630*b* and layer 630*c*, respectively, and not in layer 630*a*.

In some embodiments, from FIG. 6M, a user is able to provide a rotation of rotatable input mechanism 604*a* (e.g., in the opposite direction of user input 656) to return to the state shown in FIG. 6L. In some embodiments, from FIG. 6L to 6M, as the user provides further rotation of rotatable input mechanism 604*a* (e.g., as user input 656 progresses), layers 630*a*-630*c* move further away from one another such that the stereoscopic depth of user interface 658 increases as the user continues user input 656 (e.g., until a maximum permissible stereoscopic depth is reached). In some embodiments, from FIG. 6M, should the user provide an opposite rotational input of rotatable input mechanism 604*a*, layers 630*a*-630*c* move closer together to one another until user interface 658 has less than a threshold amount of stereoscopic depth (e.g., a non-zero threshold amount of stereoscopic depth or zero stereoscopic depth), and user interface 658 is replaced with user interface 654.

At FIG. 6M, computer system 600 detects user input 662, which is a rotation of rotatable input mechanism 604*a* (e.g., in the same direction as user input 656). At FIG. 6N, in response to user input 662, computer system 600 ceases display of map 660*a*, and displays map 660*b* (of the second floor of the building) move from layer 630*b* to layer 630*a*, and displays map 660*c* (of the first floor of the building) move from layer 630*c* to layer 630*b*. Furthermore, based on map 660*b* moving into layer 630*a*, computer system 600 displays additional information 660*b*-1, 660*b*-2, and 660*b*-3 pertaining to map 660*b* that was not previously displayed when map 660*b* was displayed in layer 630*b*. In some embodiments, from FIG. 6N, a user is able to provide a rotational input (e.g., rotation of rotatable input mechanism 604*a*) in the opposite direction of user input 662 to return to the state shown in FIG. 6M.

Figure 6N:
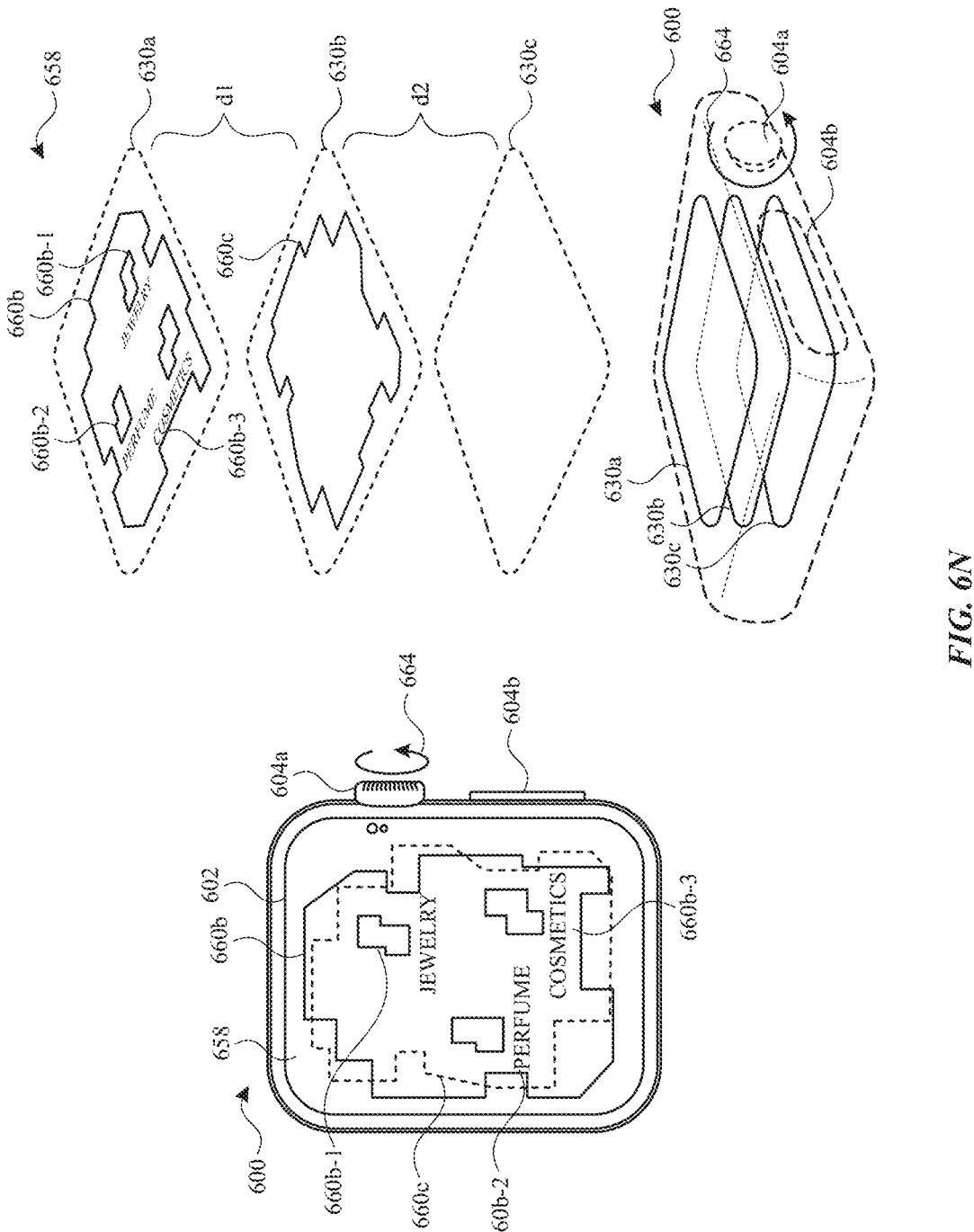
Figure 60:
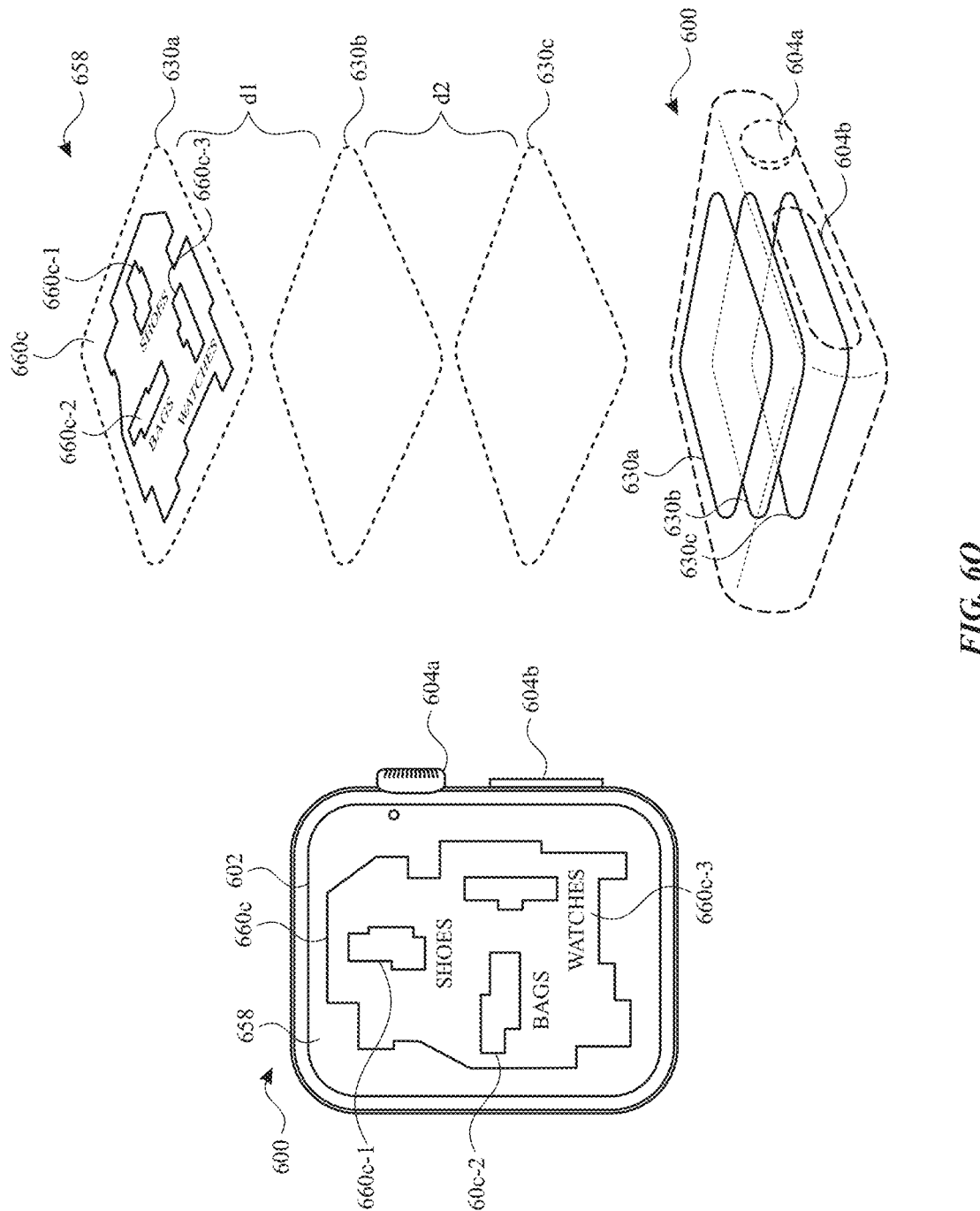

At FIG. 6N, computer system 600 detects user input 664, which is a rotation of rotatable input mechanism 604*a* (e.g., in the same direction as user input 656 and/or user input 662). At FIG. 6O, in response to user input 664, computer system 600 ceases display of map 660*b*, and displays map 660*c* (e.g., of the first floor of the building) move from layer 630*b* to layer 630*a*. Furthermore, based on map 660*c* moving into top layer 630*a*, computer system 600 displays additional information 660*c*-1, 660*c*-2, and 660*c*-3 pertaining to map 660*c* that was not previously displayed when map 660*c* was displayed in layer 630*b* or layer 630*c*. In some embodiments, from FIG. 6O, a user is able to provide a rotational input (e.g., rotation of rotatable input mechanism 604*a*) in the opposite direction of user input 664 to return to the state shown in FIG. 6N.

Figure 6P:
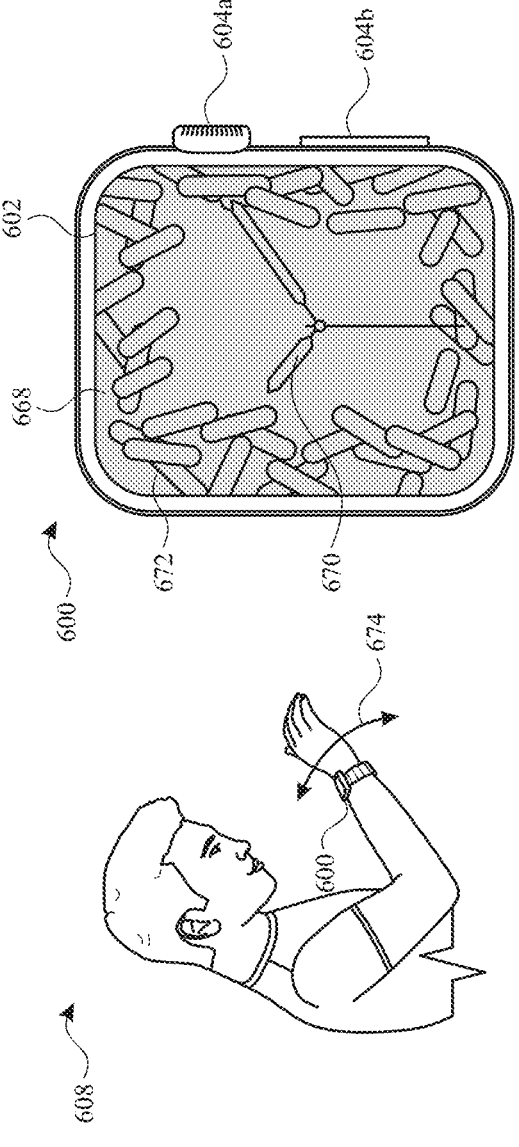

At FIG. 6P, computer system 600 displays user interface 668. User interface 668 is a two-dimensional user interface that does not have any stereoscopic depth. User interface 668 includes watch hands 670 and confetti 672. As user interface 668 is a two-dimensional user interface, watch hands 670 and confetti 672 are displayed at the same stereoscopic depth position and/or in a single plane. At FIG. 6P, computer system 600 detects user input 674, which is a shaking of computer system 600.

Figure 6Q:
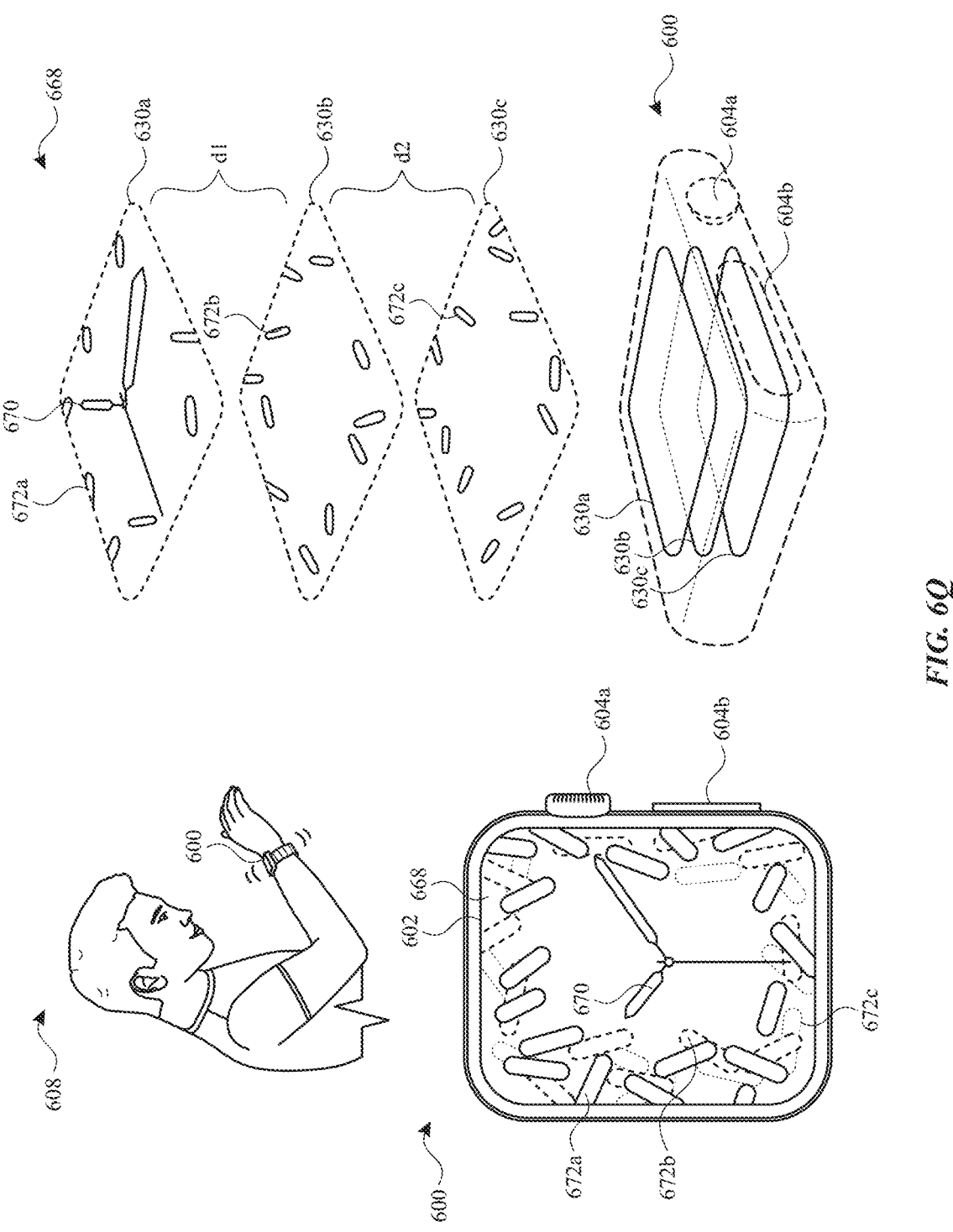

At FIG. 6Q, in response to user input 674, computer system 600 expands user interface 668 into a three-dimensional user interface that has greater stereoscopic depth than in FIG. 6P. At FIG. 6Q, watch hands 670 are displayed in top layer 630*a* (e.g., a layer that has a higher stereoscopic depth position than layer 630*b* and layer 630*c*) along with a portion 672*a* of confetti 672. Furthermore, a portion 672*b* of confetti 672 is displayed in middle layer 630*b* (e.g., a layer that has a higher stereoscopic depth position than layer 630*c* and a lower stereoscopic depth position than layer 630*a*), and a portion 672*c* of confetti 672 is displayed in bottom layer 630*c* (e.g., a layer that has a lower stereoscopic depth position than layer 630*a* and layer 630*b*). In this way, a user is able to increase the amount of stereoscopic depth in a user interface via user input.

Figure 6R:
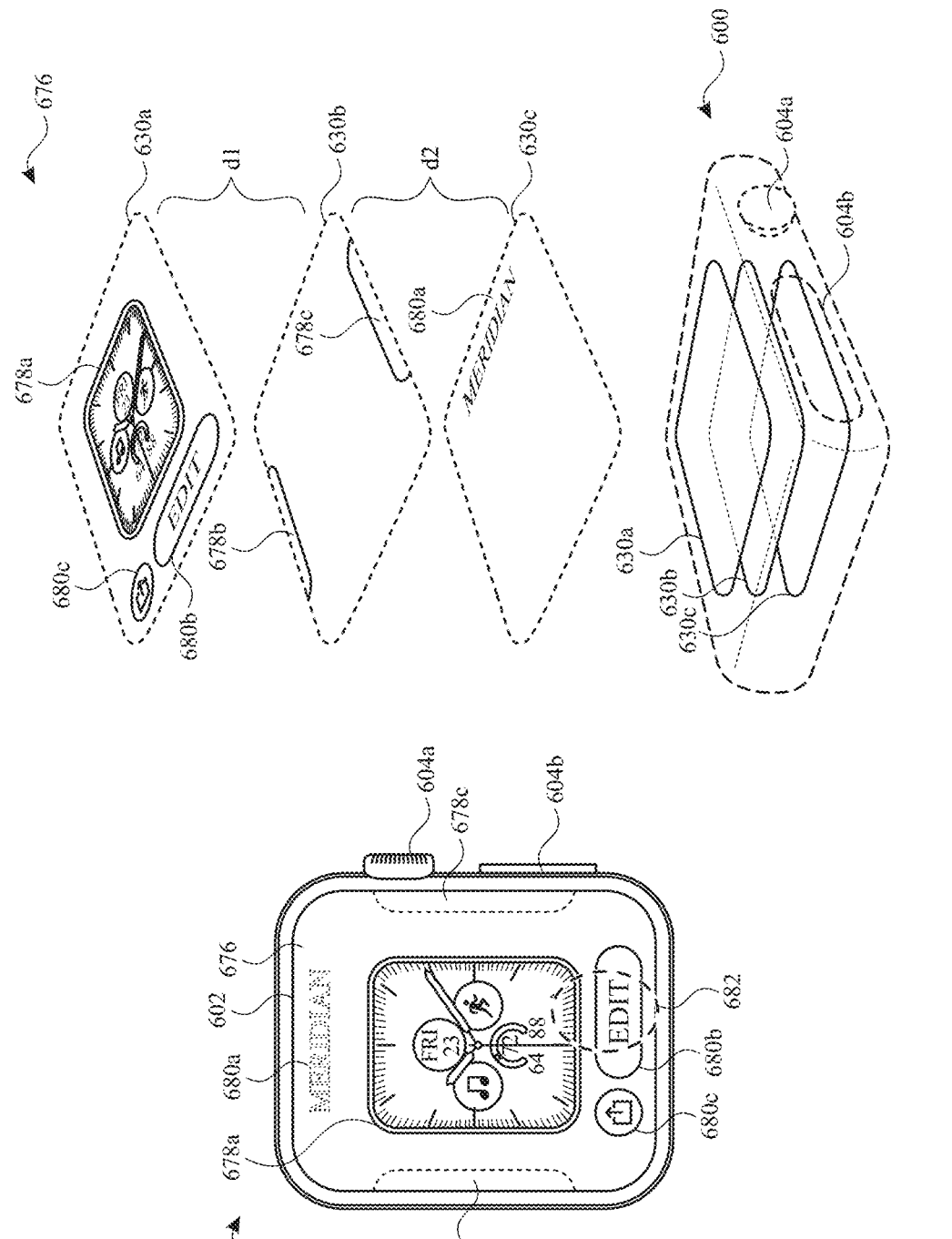

At FIG. 6R, computer system 600 displays watch face selection user interface 676. Watch face selection user interface 676 is a three-dimensional user interface with non-zero stereoscopic depth, and allows a user to change and/or modify the watch face of computer system 600. For example, in some embodiments, a user can provide a swipe left or swipe right input to move between different watch face options. Watch face selection user interface 676 displays currently displayed watch face 678*a*, and also representations 678*b*-678*c* which represent other watch face options that the user can navigate to by swiping right or left. In FIG. 6R, watch face selection user interface 676 includes name indication 680*a*, which identifies the currently displayed watch face 678*a*, share button 680*c* that is selectable to initiate a process for sharing watch face 678*a* with another person, and edit button 680*b* that is selectable to initiate a process for modifying one or more aspects of watch face 678*a*. In FIG. 6R, interactive and/or selectable elements of watch face selection user interface 676 are displayed in layer 630*a* (e.g., a layer that has a higher stereoscopic depth position than layer 630*b* and layer 630*c*), while non-interactive elements are displayed in layer 630*b* (e.g., an intermediate layer and/or a layer that has a higher stereoscopic depth position than layer 630*c* and a lower stereoscopic depth position than layer 630*a*) or layer 630*c* (e.g., a layer that has a lower stereoscopic depth position than layer 630*a* and layer 630*b*). Accordingly, watch face 678*a*, share button 680*c*, and edit button 680*b*, which are all user interface elements that respond to user input, are displayed in layer 630*a* (e.g., to indicate that the user is able to interact with these user interface elements). Representations 678*b*-678*c* are displayed in layer 630*b*, and name indication 680*a* is displayed in layer 630*c*, indicating that these are non-interactive elements (e.g., user interface elements that do not respond to user input). At FIG. 6R, computer system 600 detects user input 682, which is a tap input selecting edit button 680*b*.

At FIG. 6S, in response to user input 682, computer system 600 displays dial color editing user interface 684*a*. Dial color editing user interface 684*a* allows a user to modify the color of watch face background 688a and watch hands 688b (e.g., by tapping button 686b). In FIG. 6S, button 686b is displayed in layer 630a to indicate that it is a selectable button that the user can select to modify the color of watch face background 688a and watch hands 688b. Furthermore, watch face background 688a and watch hands 688b are also displayed in layer 630a to indicate that those portions of watch face 678a are being modified. In contrast, complications 690a-690d are displayed in layer 630c, as those elements are not interactive (e.g., are not selectable) and are not being modified. Indication 686a is also displayed in layer 630c to indicate that it is not a selectable or interactive element. At FIG. 6S, computer system 600 detects user input 692, which is a swipe left input via touch-sensitive display 602.

At FIG. 6T, in response to user input 692, computer system 600 displays complications editing user interface 684b. Complications editing user interface 684b allows a user to modify complications 690a-690d that are shown in watch face 678a (e.g., changing the complications for other complications) (e.g., by tapping an individual complication 690a-690d). In FIG. 6T, complications 690a-690d are displayed in layer 630a to indicate that they are selectable and/or interactive user interface elements. In contrast, watch face background 688a and watch hands 688b are displayed in layer 630c to indicate that they are not selectable and/or interact user interface elements (and/or to indicate that these portions of watch face 678a are not being edited while user interface 684b is displayed).

FIG. 7 is a flow diagram illustrating a method for providing and/or displaying a three-dimensional user interface using a computer system in accordance with some embodiments. Method 700 is performed at a computer system (e.g., 100, 300, 500, and/or 600) (e.g., a smart phone, a smart watch, a tablet, a laptop, a desktop, a wearable device, wrist-worn device, and/or head-mounted device) that is in communication with one or more display generation components (e.g., a display, a touch-sensitive display, a display controller, a 3D display, a three-dimensional display, and/or a stereoscopic display) and one or more input devices (e.g., a touch-sensitive surface, a touch-sensitive display, a button, a rotatable input mechanism, a depressible and rotatable input mechanism, a camera, an accelerometer, an inertial measurement unit (IMU), a blood flow sensor, a photoplethysmography sensor (PPG), and/or an electromyography sensor (EMG)). Some operations in method 700 are, optionally, combined, the orders of some operations are, optionally, changed, and some operations are, optionally, omitted.

As described below, method 700 provides an intuitive way for providing and/or displaying three-dimensional user interfaces. The method reduces the cognitive burden on a user for accessing and/or viewing content, including three-dimensional content, thereby creating a more efficient human-machine interface. For battery-operated computing devices, enabling a user to access, view, and/or interact with content faster and more efficiently conserves power and increases the time between battery charges.

The computer system (e.g., 600) displays (702), via the one or more display generation components (e.g., 602), first content (e.g., 610, 612a-612d, 614a-614d, and/or 616a-616d) (e.g., first three-dimensional content or first two-dimensional content) with a first amount of stereoscopic depth (e.g., in FIG. 6A, user interface 610 has a stereoscopic depth of zero) (e.g., a first number of distinct layers in the z-direction (e.g., a depth direction; a direction that is perpendicular to a display; and/or a direction that is perpendicular to at least one of the one or more display generation components) (e.g., one or more layers)) (In some embodiments, the first amount of stereoscopic depth is and/or comprises a first amount of simulated depth between a foremost content item of the first content and a rearmost content item of the first content (e.g., 0 cm of simulated depth, 0.25 cm of simulated depth; 0.5 cm of simulated depth, 1 cm of simulated depth, 3 cm of simulated depth, 5 cm of simulated depth, or 10 cm of simulated depth).), wherein the content includes a respective user interface element that is responsive to user input (e.g., 612a-612d and/or 616a-616d). In some embodiments, displaying the first content with the first amount of stereoscopic depth comprises displaying the first content as two-dimensional content that has no stereoscopic depth between the foremost content item and the rearmost content item of the first content (e.g., FIG. 6A). In some embodiments, displaying the first content with the first amount of stereoscopic depth comprises displaying the first content as three-dimensional content that has greater than zero stereoscopic depth between the foremost content item and the rearmost content item (e.g., FIGS. 6F-6I).

While displaying the first content with the first amount of stereoscopic depth (704), the computer system detects (706) input (e.g., 618a, 618b, 618c, and/or 618d) (e.g., a user input; one or more user inputs; and/or movement of the computer system) without detecting input directed to the respective user interface element (e.g., 612a-612d and/or 616a-616d). In some embodiments, in addition to detecting the input and/or alternatively to detecting the input (e.g., instead of detecting the input), the computer system detects information and/or data received at the computer system and/or the computer system detects an operation performed at the computer system.

In response to detecting the input (708), the computer system displays (710), via the one or more display generation components, a change in an amount of stereoscopic depth of a portion of the first content (e.g., some or all of the first content) that includes the respective user interface element (e.g., FIGS. 6A-6B, computer system 600 displays two-dimensional user interface 610 expand into corresponding three-dimensional user interface 620), wherein changing the amount of stereoscopic depth of the portion of the first content includes changing the portion of the first content that includes the respective user interface element from having the first amount of stereoscopic depth to having a second amount of stereoscopic depth (e.g., a second number of distinct layers in the z-direction (e.g., depth direction; a direction that is perpendicular to a display; and/or a direction that is perpendicular to at least one of the one or more display generation components) (e.g., one or more layers)) (e.g., in some embodiments, a second amount of simulated depth between a foremost content item of the first content and a rearmost content item of the first content (e.g., 0 cm of simulated depth, 0.25 cm of simulated depth; 0.5 cm of simulated depth, 1 cm of simulated depth, 3 cm of simulated depth, 5 cm of simulated depth, or 10 cm of simulated depth)) different from the first amount of stereoscopic depth. In some embodiments, displaying the portion of the first content with the second amount of stereoscopic depth comprises displaying the portion of the first content as two-dimensional content that has no stereoscopic depth between the foremost content item and the rearmost content item of the portion of the first content (e.g., FIG. 6A). In some embodiments, displaying the portion of the first content with the second amount of stereoscopic depth comprises displaying the portion of the first content as three-dimensional content that has greater than zero stereoscopic depth between the foremost content item and the rearmost content item (e.g., FIG. 6B). In some embodiments, displaying the portion of the first content changing from having the first amount of stereoscopic depth to having the second amount of stereoscopic depth includes displaying the portion of the first content changing from being displayed as two-dimensional content to being displayed as three-dimensional content (e.g., FIGS. 6A-6B).

In some embodiments, displaying the portion of the first content changing from having the first amount of stereoscopic depth to having the second amount of stereoscopic depth includes displaying the portion of the first content changing from being displayed as three-dimensional content to being displayed as two-dimensional content (e.g., going from FIG. 6K to 6J, or going from FIG. 6M to FIG. 6L). In some embodiments, displaying the portion of the first content changing from having the first amount of stereoscopic depth to having the second amount of stereoscopic depth includes displaying the portion of the first content changing from being displayed as three-dimensional content with a first amount of stereoscopic depth to being displayed as three-dimensional content with a second amount of stereoscopic depth different from the first amount of stereoscopic depth (e.g., going from FIG. 6B to FIG. 6C; or, in some embodiments, going from FIG. 6M to 6L, gradually decreasing the stereoscopic depth of user interface 658 in response to user input). Allowing a user to change the stereoscopic depth of displayed content with an input allows for a greater amount of visual content to be provided to a user within a limited amount of display space. Furthermore, changing the amount of stereoscopic depth of displayed content in response to an input enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently. Doing so also provides the user with feedback about the state of the system (e.g., that the system has detected the input), thereby providing improved visual feedback.

In some embodiments, detecting the input includes detecting one or more user inputs corresponding to a user request to change a state of the computer system from a first state to a second state (e.g., 618a-618d in FIG. 6A). For example, in some embodiments, the input represents a user request to a transition the computer system from a low power state to a high power state. For example, in some embodiments, the low power state is an off state; a sleep state; a state in which the one or more display generation components do not display content; a state in which the computer system consumes less power than in a high power state; a state in which the one or more display generation components display content at a decreased brightness than in a high power state; and/or a state in which the one or more display generation components update displayed content at a lower frequency than in a high power state. For example, in some embodiments, the high power state is an active state; an on state; an operating state; a state in which the one or more display generation components display content; a state in which the computer system consumes more power than in a low power state; a state in which the one or more display generation components display content at an increased brightness than in a low power state; and/or a state in which the one or more display generation components update displayed content at a higher frequency than in a low power state. In some embodiments, the one or more user inputs corresponding to the user request to change the state of the computer system from the first state to the second state includes a wrist raise (e.g., 618a), a tap input (e.g., 618d), a crown rotation (e.g., rotation of rotatable input mechanism 604a), and/or a button press (e.g., 618c). In some embodiments, in addition to and/or alternatively to detecting the one or more user inputs corresponding to the user request to change the state of the computer system from the first state to the second state, the computer system detects a notification arriving at the computer system, and displays the change in the amount of stereoscopic depth of the portion of the first content in response to detecting the notification arriving at the computer system. In some embodiments, the second amount of stereoscopic depth (e.g., FIG. 6B) is greater than the first amount of stereoscopic depth (e.g., FIG. 6A) (e.g., in some embodiments, the second amount of stereoscopic depth includes at least one additional distinct layer in the z-direction (e.g., a depth direction; a direction that is perpendicular to a display; and/or a direction that is perpendicular to at least one of the one or more display generation components) (e.g., one or more layers) than the first amount of stereoscopic depth). In some embodiments, the first amount of stereoscopic depth has a first amount of simulated depth, and the second amount of stereoscopic depth has a second amount of simulated depth that is greater than the first amount of simulated depth. Allowing a user to change the stereoscopic depth of displayed content with an input (e.g., a wake input) allows for a greater amount of visual content to be provided to a user within a limited amount of display space. Furthermore, changing the amount of stereoscopic depth of displayed content in response to an input enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently. Doing so also provides the user with feedback about the state of the system (e.g., that the system has detected the input), thereby providing improved visual feedback.

In some embodiments, detecting the input includes detecting a change in orientation of the computer system from a first orientation to a second orientation (e.g., user input 632 and/or 634) (e.g., change in angle, change in angle relative to gravity, and/or change in angle relative to a user's face (e.g., in some embodiments, as determined via camera and/or inertial measurement unit)) different from the first orientation. In some embodiments, the second amount of stereoscopic depth is greater than the first amount of stereoscopic depth (e.g., from FIGS. 6C-6D, in response to user input 632, corner affordances 626a-626d increase in stereoscopic depth by moving affordance 626a from bottom layer 630c to top layer 630a) (e.g., in some embodiments, the second amount of stereoscopic depth includes at least one additional distinct layer in the z-direction (e.g., a depth direction; a direction that is perpendicular to a display; and/or a direction that is perpendicular to at least one of the one or more display generation components) (e.g., one or more layers) than the first amount of stereoscopic depth) (e.g., in some embodiments, the first amount of stereoscopic depth has a first amount of simulated depth, and the second amount of stereoscopic depth has a second amount of simulated depth that is greater than the first amount of simulated depth). Allowing a user to change the stereoscopic depth of displayed content with an input (e.g., an input that changes the orientation of the computer system) allows for a greater amount of visual content to be provided to a user within a limited amount of display space. Furthermore, changing the amount of stereoscopic depth of displayed content in response to an input enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently. Doing so also provides the user with feedback about the state of the system (e.g., that the system has detected the input), thereby providing improved visual feedback.

In some embodiments, detecting the input includes detecting a change in orientation of the computer system from a first orientation to a second orientation (e.g., change in angle, change in angle relative to gravity, and/or change in angle relative to a detected or estimated location of a user's face (e.g., in some embodiments, as determined via camera and/or inertial measurement unit)) different from the first orientation (e.g., user input 632 and/or 634); and the first amount of stereoscopic depth is greater than the second amount of stereoscopic depth (e.g., in some embodiments, from FIG. 6D and/or FIG. 6E, user 608 can rotate computer system 600 to a level position in which no corner affordances are displayed in top layer 630a (e.g., return to the state of FIG. 6C)) (e.g., in some embodiments, the first amount of stereoscopic depth includes at least one additional distinct layer in the z-direction (e.g., a depth direction; a direction that is perpendicular to a display; and/or a direction that is perpendicular to at least one of the one or more display generation components) (e.g., one or more layers) than the second amount of stereoscopic depth) (e.g., in some embodiments, the first amount of stereoscopic depth has a first amount of simulated depth, and the second amount of stereoscopic depth has a second amount of simulated depth that is less than the first amount of simulated depth). Allowing a user to change the stereoscopic depth of displayed content with an input (e.g., an input that changes the orientation of the computer system) allows for a greater amount of visual content to be provided to a user within a limited amount of display space. Furthermore, changing the amount of stereoscopic depth of displayed content in response to an input enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently. Doing so also provides the user with feedback about the state of the system (e.g., that the system has detected the input), thereby providing improved visual feedback.

In some embodiments, the second amount of stereoscopic depth is greater than the first amount of stereoscopic depth (e.g., in FIG. 6B, user interface 620 has a greater amount of stereoscopic depth than user interface 610 in FIG. 6A). In some embodiments, the second amount of stereoscopic depth includes at least one additional distinct layer in the z-direction (e.g., a depth direction; a direction that is perpendicular to a display; and/or a direction that is perpendicular to at least one of the one or more display generation components) (e.g., one or more layers) than the first amount of stereoscopic depth. In some embodiments, the first amount of stereoscopic depth has a first amount of simulated depth, and the second amount of stereoscopic depth has a second amount of simulated depth that is greater than the first amount of simulated depth. In some embodiments, after displaying the portion of the first content changing from having the first amount of stereoscopic depth to having the second amount of stereoscopic depth (e.g., FIGS. 6A-6B), the computer system displays, via the one or more display generation components, the portion of the first content changing from having the second amount of stereoscopic depth (e.g., FIG. 6B) to having a third amount of stereoscopic depth (e.g., FIG. 6C) (e.g., a third number of distinct layers in the z-direction (e.g., depth direction; a direction that is perpendicular to a display; and/or a direction that is perpendicular to at least one of the one or more display generation components) (e.g., one or more layers)) (e.g., in some embodiments, a third amount of simulated depth between a foremost content item of the first content and a rearmost content item of the first content (e.g., 0 cm of simulated depth, 0.25 cm of simulated depth; 0.5 cm of simulated depth, 1 cm of simulated depth, 3 cm of simulated depth, 5 cm of simulated depth, or 10 cm of simulated depth)), wherein the second amount of stereoscopic depth is greater than the third amount of stereoscopic depth (e.g., decrease depth (e.g., the second amount of stereoscopic depth includes at least one additional distinct layer in the z-direction (e.g., a depth direction; a direction that is perpendicular to a display; and/or a direction that is perpendicular to at least one of the one or more display generation components) (e.g., one or more layers) than the third amount of stereoscopic depth). In some embodiments, displaying the portion of the first content changing from having the second amount of stereoscopic depth to having the third amount of stereoscopic depth comprises displaying the portion of the first content gradually changing from having the second amount of stereoscopic depth to having a third amount of stereoscopic depth over a period of time (e.g., in some embodiment, the change in the amount of stereoscopic depth occurs over a predefined period of time (e.g., 1 millisecond, 10 milliseconds, 100 milliseconds, 1 second, 5 seconds, or 10 seconds)) (e.g., FIGS. 6B-6C). In some embodiments, the third amount of stereoscopic depth is the same as the first amount of stereoscopic depth. In some embodiments, the third amount of stereoscopic depth is different from the first amount of stereoscopic depth. In some embodiments, after detecting the input, the computer system displays the portion of the first content increasing in stereoscopic depth (e.g., displays the first content changing from having the first amount of stereoscopic depth to having the second amount of stereoscopic depth) (e.g., FIGS. 6A-6B) and then displays the portion of the first content gradually decreasing in stereoscopic depth (e.g., displays the first content changing from having the second amount of stereoscopic depth to having the third amount of stereoscopic depth) (e.g., FIGS. 6B-6C). Displaying the portion of the first content changing from having the first amount of stereoscopic depth to having the second amount of stereoscopic depth in response to detecting the input, and then changing the portion of the first content to have the third amount of stereoscopic depth, enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently. Doing so also provides the user with feedback about the state of the system (e.g., that the system has detected the input), thereby providing improved visual feedback.

In some embodiments, the first content includes a plurality of elements (e.g., user interface 676 in FIG. 6R includes a plurality of elements 678a-678c and/or 680a-680c) (e.g., a plurality of visual elements; a plurality of visual objects; and/or a plurality of displayed elements) including a first element and a second element different from the first element (in some embodiments, the portion of the first content includes a plurality of elements including the first element and the second element different from the first element). In some embodiments, displaying the first content (e.g., 676) with the first amount of stereoscopic depth includes (or, in some embodiments, displaying the first content with the second amount of stereoscopic depth and/or displaying the portion of the first content with the second amount of stereoscopic depth includes): displaying the first element (e.g., 678a, 680b, and/or 680c) at a first stereoscopic depth (e.g., 630a) (e.g., at a first simulated distance from a rearmost and/or a frontmost layer of the first content; and/or at a first simulated distance from a rearmost and/or frontmost layer of the portion of the first content); and displaying the second element (e.g., 678b, 678c, and/or 680a) at a second stereoscopic depth (e.g., 630b and/or 630c) different from the first stereoscopic depth (e.g., 630a) (e.g., at a second simulated distance from a rearmost and/or a frontmost layer of the first content; and/or at a second simulated distance from a rearmost and/or frontmost layer of the portion of the first content). In some embodiments, displaying the first element (e.g., 678a, 680b, and/or 680c) at the first stereoscopic depth (e.g., 630a) is indicative of the first element being an interactive element (e.g., an element that a user can interact with via user input; an element that is displayed as a result of and/or in response to a user input; and/or an element that is indicative of a received user input). In some embodiments, the first element is an affordance that is selectable by a user (e.g., via a gesture input, an air gesture input, a touch input, and/or a hardware input (e.g., a crown rotation and/or button press)). In some embodiments, the first element is selectable by a user to modify a device setting (e.g., brightness, volume, enable a setting, and/or disable a setting), cause display of a user interface element, cause display of a user interface, cause visual modification of a user interface, cause visual modification of a user interface element, cause a user interface element to cease to be displayed, and/or cause a user interface to cease to be displayed. In some embodiments, displaying the second element (e.g., 678b, 678c, and/or 680a) at the second stereoscopic depth (e.g., 630b and/or 630c) is indicative of the second element being a non-interactive element (e.g., an element that the user cannot interact with via user input; an element that is not displayed as a result of and/or in response to a user input; and/or an element that is not indicative of a received user input). In some embodiments, the first stereoscopic depth is a further simulated distance away from a rearmost layer (e.g., 630c) of the first content (or the portion of the first content) than the second stereoscopic depth (e.g., the first stereoscopic depth appears closer to the viewpoint of the user and/or appears to be higher than the second stereoscopic depth). Displaying interactive elements at a different stereoscopic depth positions than non-interactive elements enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently. Doing so also provides the user with feedback about the state of the system (e.g., feedback about which displayed elements are interactive or non-interactive), thereby providing improved visual feedback.

In some embodiments, detecting the input includes detecting shaking of the computer system (e.g., user input 674) (e.g., detecting that the user is shaking the computer system; and/or detecting that the user is shaking a wrist on which the computer system is worn) (e.g., detecting that the computer system is moving in a plurality of different directions at greater than a threshold acceleration and/or velocity). In some embodiments, the second amount of stereoscopic depth is greater than the first amount of stereoscopic depth (e.g., from FIGS. 6P-6R, in response to user input 674, user input 668 is expanded from a two-dimensional user interface to a three-dimensional user interface with a greater amount of stereoscopic depth) (e.g., in some embodiments, the second amount of stereoscopic depth includes at least one additional distinct layer in the z-direction (e.g., a depth direction; a direction that is perpendicular to a display; and/or a direction that is perpendicular to at least one of the one or more display generation components) (e.g., one or more layers) than the first amount of stereoscopic depth) (e.g., in some embodiments, the first amount of stereoscopic depth has a first amount of simulated depth, and the second amount of stereoscopic depth has a second amount of simulated depth that is greater than the first amount of simulated depth). Allowing a user to change the stereoscopic depth of displayed content with an input (e.g., a shaking input) allows for a greater amount of visual content to be provided to a user within a limited amount of display space. Furthermore, changing the amount of stereoscopic depth of displayed content in response to an input enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently. Doing so also provides the user with feedback about the state of the system (e.g., that the system has detected the input), thereby providing improved visual feedback.

In some embodiments, detecting the input includes detecting rotation of a rotatable input mechanism (e.g., 604a) (e.g., user input 650 and/or 656) (e.g., physical rotation of a physically rotatable input mechanism). In some embodiments, displaying the change in the amount of stereoscopic depth of the portion of the first content is performed based on the direction and/or magnitude of the rotation of the rotatable input mechanism. In some embodiments, in response to detecting rotation of the rotatable input mechanism (e.g., 604a): in accordance with a determination that the rotatable input mechanism is rotated in a first direction (e.g., clockwise or counter-clockwise), the second amount of stereoscopic depth is greater than the first amount of stereoscopic depth (e.g., from FIG. 6L to FIG. 6M, in response to user input 656, stereoscopic depth is increased); and in accordance with a determination that the rotatable input mechanism is rotated in a second direction different from (e.g., opposite) the first direction (e.g., counter-clockwise or clockwise), the second amount of stereoscopic depth is less than the first amount of stereoscopic depth (e.g., in some embodiments, going from FIG. 6M to 6L, in response to a user input rotating rotatable input mechanism in a direction opposite user input 656, stereoscopic depth is decreased). In some embodiments, in response to detecting rotation of the rotatable input mechanism: in accordance with a determination that the rotatable input mechanism is rotated by a first magnitude (e.g., a first rotational distance and/or a first angular distance), the amount of stereoscopic depth of the portion of the first content is displayed changing by a first amount (e.g., by a first simulated distance and/or depth); and in accordance with a determination that the rotatable input mechanism is rotated by a second magnitude (e.g., a second rotational distance and/or a second angular distance) different from the first magnitude, the amount of stereoscopic depth of the portion of the first content is displayed changing by a second amount (e.g., by a second simulated distance and/or depth) different from the first amount (e.g., in some embodiments, from FIG. 6L to 6M, in response to user input 656, stereoscopic depth is gradually increased such that rotation by a first amount results in a first stereoscopic depth and rotation by a second amount that is greater than the first amount results in a second stereoscopic depth that is greater than the first stereoscopic depth). Allowing a user to change the stereoscopic depth of displayed content with an input (e.g., a rotation of a rotatable input mechanism) allows for a greater amount of visual content to be provided to a user within a limited amount of display space. Furthermore, changing the amount of stereoscopic depth of displayed content in response to an input enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently. Doing so also provides the user with feedback about the state of the system (e.g., that the system has detected the input), thereby providing improved visual feedback.

In some embodiments, in response to detecting the input (e.g., 650 and/or 656), and while displaying the change in the amount of stereoscopic depth of the portion of the first content, displaying, via the one or more display generation components, contour information corresponding to a physical object (e.g., FIG. 6K and/or FIG. 6M) (e.g., displaying an outline indicative of the shape and/or height of the physical object). In some embodiments, the contour information corresponding to the physical object (e.g., an outline of the physical object) is displayed extending across a plurality of stereoscopic depths to indicate the heights of different portions of the physical object. Allowing a user to change the stereoscopic depth of displayed content and reveal contour information with an input (e.g., a rotation of a rotatable input mechanism) allows for a greater amount of visual content to be provided to a user within a limited amount of display space.

In some embodiments, the second amount of stereoscopic depth is greater than the first amount of stereoscopic depth (e.g., in some embodiments, the second amount of stereoscopic depth includes at least one additional distinct layer in the z-direction (e.g., a depth direction; a direction that is perpendicular to a display; and/or a direction that is perpendicular to at least one of the one or more display generation components) (e.g., one or more layers) than the first amount of stereoscopic depth) (e.g., in some embodiments, the first amount of stereoscopic depth has a first amount of simulated depth, and the second amount of stereoscopic depth has a second amount of simulated depth that is greater than the first amount of simulated depth). In some embodiments, displaying the portion of the first content changing from having the first amount of stereoscopic depth to having the second amount of stereoscopic depth includes: in response to detecting rotation of the rotatable input mechanism (e.g., 604a) and while detecting further rotation of the rotatable input mechanism, displaying the portion of the first content changing from having the first amount of stereoscopic depth to having a first intermediate amount of stereoscopic depth that is greater than the first amount of stereoscopic depth and less than the second amount of stereoscopic depth (e.g., in some embodiments, from FIG. 6L to FIG. 6M, as user input 656 progresses, layers 630a-630c gradually move further away from one another) (e.g., in some embodiments, the first intermediate amount of stereoscopic depth includes at least one additional distinct layer in the z-direction (e.g., a depth direction; a direction that is perpendicular to a display; and/or a direction that is perpendicular to at least one of the one or more display generation components) (e.g., one or more layers) than the first amount of stereoscopic depth and/or at least one less distinct layer in the z-direction than the second amount of stereoscopic depth) (e.g., in some embodiments, the first amount of stereoscopic depth has a first amount of simulated depth, the second amount of stereoscopic depth has a second amount of simulated depth that is greater than the first amount of simulated depth, and the first intermediate amount of stereoscopic depth has a third amount of simulated depth that is greater than the first amount of simulated depth and less than the second amount of simulated depth). In some embodiments, in response to detecting the further rotation of the rotatable input mechanism (e.g., 604a), the computer system displays the portion of the first content changing from having the first intermediate amount of stereoscopic depth to having the second amount of stereoscopic depth (e.g., in some embodiments, from FIG. 6L to FIG. 6M, as user input 656 progresses, layers 630a-630c gradually move further away from one another). Allowing a user to change the stereoscopic depth of displayed content with an input (e.g., a rotation of a rotatable input mechanism) allows for a greater amount of visual content to be provided to a user within a limited amount of display space. Furthermore, changing the amount of stereoscopic depth of displayed content in response to an input enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently. Doing so also provides the user with feedback about the state of the system (e.g., that the system has detected the input), thereby providing improved visual feedback.

In some embodiments, in response to detecting the input (e.g., 650 and/or 656), and while displaying the change in the amount of stereoscopic depth of the portion of the first content, the computer system displays, via the one or more display generation components, replacement of a first visual element of the first content with a second visual element different from the first visual element (e.g., FIGS. 6J-6K, two-dimensional image of Mount Fuji is replaced with topographical map of Mount Fuji; and in FIGS. 6L-6M, two-dimensional image of building is replaced with topographical floor-by-floor map of the building) (e.g., in response to detecting the input, ceasing display of the first visual element of the first content and displaying the second visual element (e.g., a second visual element that was not displayed prior to detecting the input)). Allowing a user to change the stereoscopic depth of displayed content and display new content with an input (e.g., a rotation of a rotatable input mechanism) allows for a greater amount of visual content to be provided to a user within a limited amount of display space.

Note that details of the processes described above with respect to method 700 (e.g., FIG. 7) are also applicable in an analogous manner to the methods described herein. For brevity, these details are not repeated below.

FIGS. 8A-8M are exemplary schematics and user interfaces for providing and/or displaying three-dimensional user interfaces based on a position of a user, in accordance with some embodiments. The schematics and user interfaces in these figures are used to illustrate the processes described below, including the processes in FIG. 9.

Figure 8A:
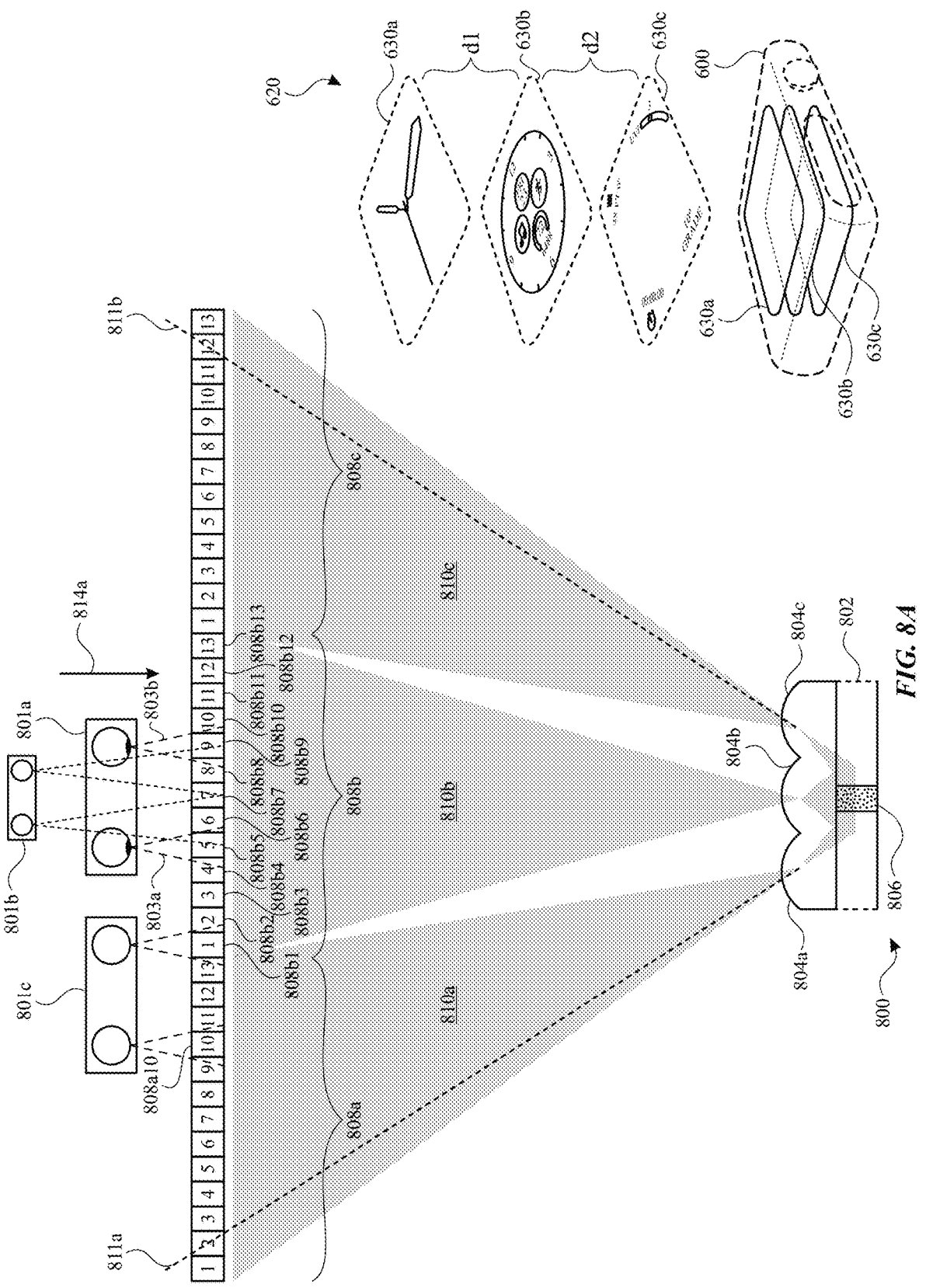
FIGS. 8A-8M illustrate exemplary devices and user interfaces for providing and/or displaying three-dimensional user interfaces based on a position of a user.

FIG. 8A includes, on the left-hand side, display schematic 800 that illustrates portion 802 that is a sub-portion of display 602 of computer system 600. Display schematic 800 also includes user representation 801a that represents the viewing position of a primary user of computer system 600, user representation 801b that represents the viewing position of a first secondary user of computer system 600 who is positioned further away from display 602 in comparison to the primary user, and user representation 801c that represents the viewing position of a second secondary user of computer system 600 who is positioned to the side of the primary user. In the exemplary embodiment of FIGS. 8A-8M, display 602 is a stereoscopic display that creates different views in different regions (e.g., a Lenticular Display that has a plurality of lenses that focus and direct light from display elements (e.g., pixels) of a display, Parallax Barrier, Micro Lens Array, Volume Phase Holographic Gratings, Time-Multiplexing, Ray-based Light Field Display, and/or Wavefront-based Light Field Display). In some embodiments, display 602 includes one or more features of the lenticular displays described in US Patent Application Publication 2021/0072556 A1, which is incorporated by reference in its entirety and, in particular, for its disclosure of lenticular displays, or lenticular displays described above with reference to FIG. 3H above. In FIG. 8A, portion 802 includes three lenses, 804a, 804b, and 804c. Portion 802 also includes pixel array 806, which is a subset of one or more pixels of the overall pixels of display 602 that are positioned under lens 804b. In FIG. 8A, pixel array 806 is displaying content that is being redirected through each of lenses 804a, 804b, and 804c. Displayed content 808a corresponds to the content being redirected through lens 804a, displayed content 808b corresponds to the content being redirected through lens 804b, and displayed content 808c corresponds to the content being redirected through lens 804c. Because the three lenses are redirecting the same content from pixel array 806, content 808a, 808b, and 808c are essentially repeats of the same content, as shown in FIG. 8A and as described in more detail below. While the examples below are described with reference to a lenticular display, it should be understood that any stereoscopic display that can generate different views could, optionally, use a different technology (e.g., Parallax Barrier, Micro Lens Array, Volume Phase Holographic Gratings, Time-Multiplexing, Ray-based Light Field Display, and/or Wavefront-based Light Field Display) to generate the described views.

As seen in FIG. 8A, displayed content 808b, directed through lens 804b, includes 13 discrete views (also referred to herein as slices) of content that are visible from within the viewing angles (e.g., +/−20°, with 0° representing a viewing angle directly perpendicular to the surface of display 602 at the position of pixel array 806) indicated by viewing cone 810b. The 13 discrete views (e.g., view 808b5 and 808b9) are different two-dimensional ("2D") images that, when viewed by a user, can create the illusion of a three-dimensional ("3D") image. For example, as shown on the right-hand side of FIG. 8A, when viewed from the position of user representation 801a, a user's right eye would see view 808b5 and the user's left eye would see view 808b9, which seen together, would create the illusion of the 3D view of user interface 620 (also discussed with reference to FIG. 6B). In some embodiments, each view is formed by a single pixel; in some embodiments, each view is formed by a plurality of pixels that display the same content. From the position of user representation 801a, user interface 620 appears to include three distinct layers 630a-630c having different stereoscopic depth positions. Layer 630a is a topmost layer that has a highest stereoscopic depth position (and/or a layer that has a higher stereoscopic depth position than layer 630c and layer 630b), layer 630c is a bottommost layer that has a lowest stereoscopic depth position (and/or a layer that has a lower stereoscopic depth position than layer 630a and layer 630b), and layer 630b is a middle layer that has a stereoscopic depth position between layer 630a and layer 630c. Layer 630a is shown as being separated from layer 630b by a first stereoscopic distance d1, and layer 630b is shown as being separated from layer 630c by a second stereoscopic distance d2. In FIG. 8A, if a user where to see view 808b7 with their right eye and view 808b11 with their left eye, the user would perceive the same three discrete layers, with the same perceived amount of stereoscopic distance, albeit from a perspective shifted slightly to the user's left compared to the perspective seen from the viewing position of user representation 801a. Shifting the perspective further enhances the illusion of stereoscopic depth (e.g., as compared to displaying a static, 2D image throughout) by presenting the illusion that the viewer is seeing the content of user 620 from a different viewing angle. In contrast, from the viewing position of user representation 801c, a user would see view 808b6 with their right eye and view 808b8 with their left eye, which would create the illusion of a 3D user interface with less stereoscopic depth between each of the layers, as compared to user interface 620. The user would perceive less stereoscopic depth from the viewing position of user representation 801c because the difference between view 808b6 and view 808b8 are less than the difference between view 808b5 and view 808b9.

In FIG. 8A, displayed content 808a presents the same set of 13 views of content 808b, but redirected through lens 804a and displayed content 808c presents the same set of 13 views of content 808b, but redirected through lens 804c. In some embodiments, displayed content 808a would cover a lesser range of viewing angles (e.g., −28° to)−10°, indicated by viewing cone 810b, compared to displayed content 808b due to a difference in position of lens 804a compared to lens 804b, with respect to pixel array 806. The same is true for displayed content 808c and viewing cone 810c.

In FIG. 8A, when viewed from the position of user representation 801b, a user would see view 808a10 (which is the same view as 808b10) with their right eye and view 808b1. Because view 808a10 and view 808b1 differ in a way that would not be properly perceived by a user as the illusion of user interface 620, the user perceives an undesirable visual artifact (e.g., the layers appear flipped from their intended order, appear as overlapping, and/or distorted). Thus, in FIG. 8A, only a limited set of viewing positions (e.g., within viewing cone 810b and at certain distances) allow a user to perceive the displayed content with the intended stereoscopic depth (e.g., the depth shown in user interface 620).

Note that for simplicity and ease of understanding, FIG. 8A does not depict the other pixels included in portion 802 (e.g., subsets of pixels under lenses 804a and 804c) or the content/views that are displayed by those other pixels while pixel array 806 is displaying the views shown in FIG. 8A. In some embodiments, such other pixels can be one or more pixels immediately adjacent to pixel array 806. In some embodiments, such other pixels display content that is similar to and/or based on the content displayed by pixel array 806, but with differences based on the spatial separation between such other pixels and pixel array 806 (e.g., such other pixels display a portion of a larger, contiguous image that are adjacent to the portion displayed by pixel array 806). In some embodiments, such other pixels display the same content as pixel array 806.

FIG. 8A also includes lines 811a and 811b that indicate field-of-view (FOV) of an optical sensor (e.g., camera) of computer system 600 that is configured to detect the position (e.g., head position) of a user of computer system and/or the positions of each eye of a user of the computer system. In some embodiments, the FOV of the optical sensor is +/30°, for a total FOV of 60°. In some embodiments, the optical sensor is positioned at or near an edge of display 602. In some embodiments, a plurality of optical sensors are used to track a position of a user. In some embodiments, computer system 600 tracks a head of a user and estimates the position of each eye based on an average interpupillary distance (IPD) for a human. In some embodiments, computer system 600 tracks, independently, the positions of each eye of a user. In the exemplary embodiment of FIGS. 8A-8M, gaze lines 803a and 803b depict, respectively, the detected viewing positions of the right and left eyes of the user (e.g., the gaze lines indicate a degree of potential uncertainty in the viewing position of the user).

At FIG. 8A, the primary user corresponding to user representation 801a moves closer to display 602, as indicated by arrow 814a, which computer system 600 detects via the optical sensor corresponding to lines 811a and 811b.

Figure 8B:
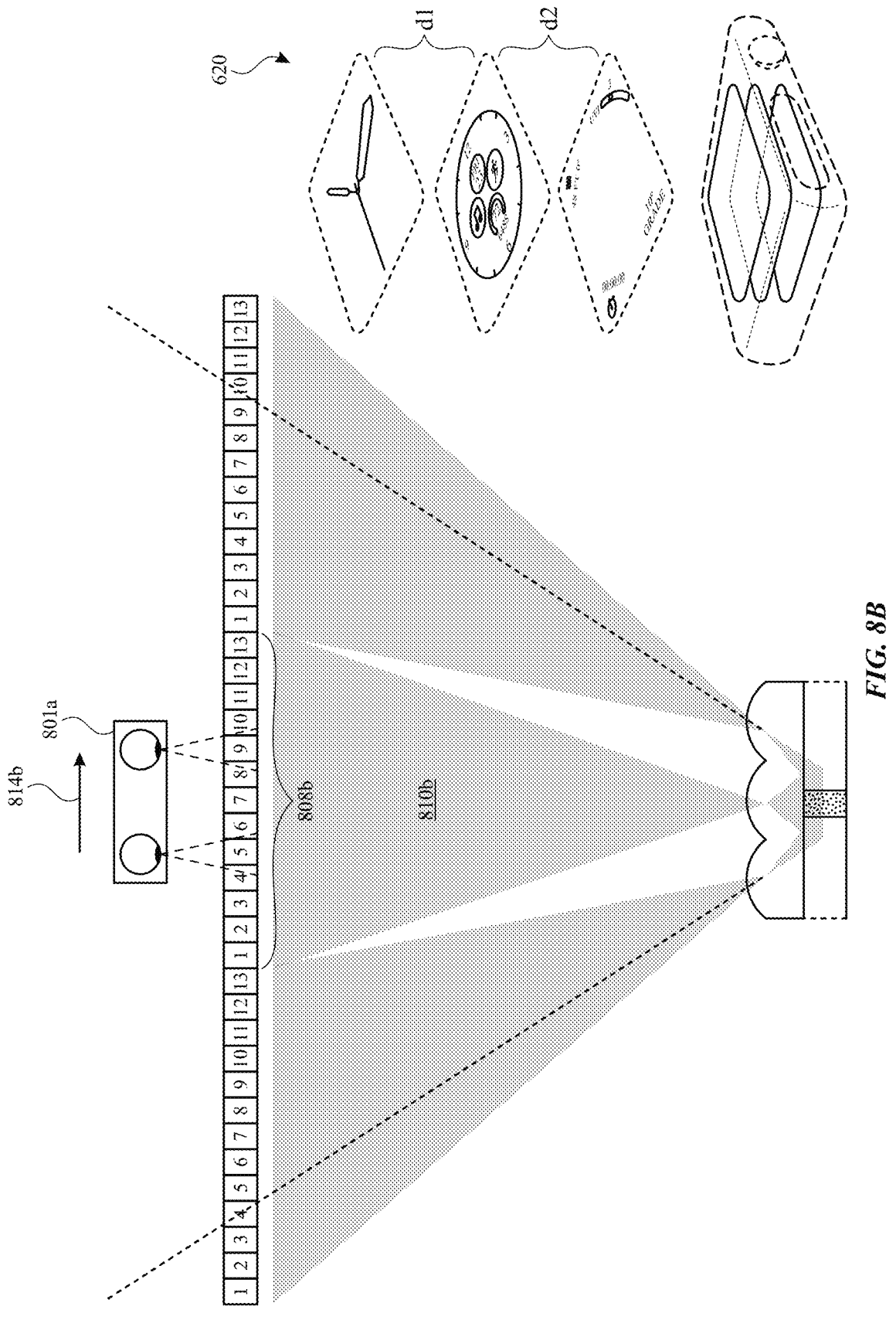

At FIG. 8B, in response to detecting that the primary user corresponding to user representation 801a has moved closer to display 602, computer system 600 adjusts the content being displayed by display 600 (e.g., adjusts the content displayed by pixel array 806 and/or other pixels of display 600) so that view 808b5 continues to be viewed by the right eye of the user and view 808b9 continues to be viewed by the left eye of the user. Accordingly, the viewer continues to perceive user interface 620 with the same amount of stereoscopic depth between its layers, as shown on the right-hand side of FIG. 8B. Had computer system 600 not adjusted the content being displayed by display 600 (e.g., had computer system 600 continued to display content as seen in FIG. 8A), the primary user would have seen view 808b4 with their right eye and view 808b10 with their left eye, creating the illusion of a greater degree of stereoscopic depth between the layers of user interface 620, which would not be as intended. Thus, computer system 600 uses data from the optical sensor corresponding to lines 811a and 811b to track the position of a user and to adjust for changes in distance of the user to reduce and/or minimize unintended visual artifacts due to movement of the user. In some embodiments, in addition to tracking user movement via the optical sensor corresponding to lines 811a and 811b, computer system 600 uses one or more non-optical sensors to track the position of a user relative to display 602. For example, when computer 600 is a wearable device (e.g., a smart watch), one or more accelerometers and/or gyroscopes are used to detect movement of computer system 600 relative to a user. In some embodiments, computer system 600 uses one or more depth sensors to detect the distance of the user from display 602. In some embodiments, the optical sensor corresponding to lines 811a and 811b and the one or more non-optical sensors obtain data at different frequencies and/or at different intervals. For example, the optical sensor corresponding to lines 811a and 811b can sample data at a frequency of 10 Hz while the one or more optical sensors sample data at a frequency of 50 Hz. In this way, multiple sensors can be used to more accurately ascertain the position of a user, while potentially conserving system resources (e.g., when the sensors have varying accuracy and/or amounts of energy usage). At FIG. 8B, the primary user corresponding to user representation 801a moves to the user's left, as indicated by arrow 814b, which computer system 600 detects via the optical sensor corresponding to lines 811a and 811b.

Figure 8C:
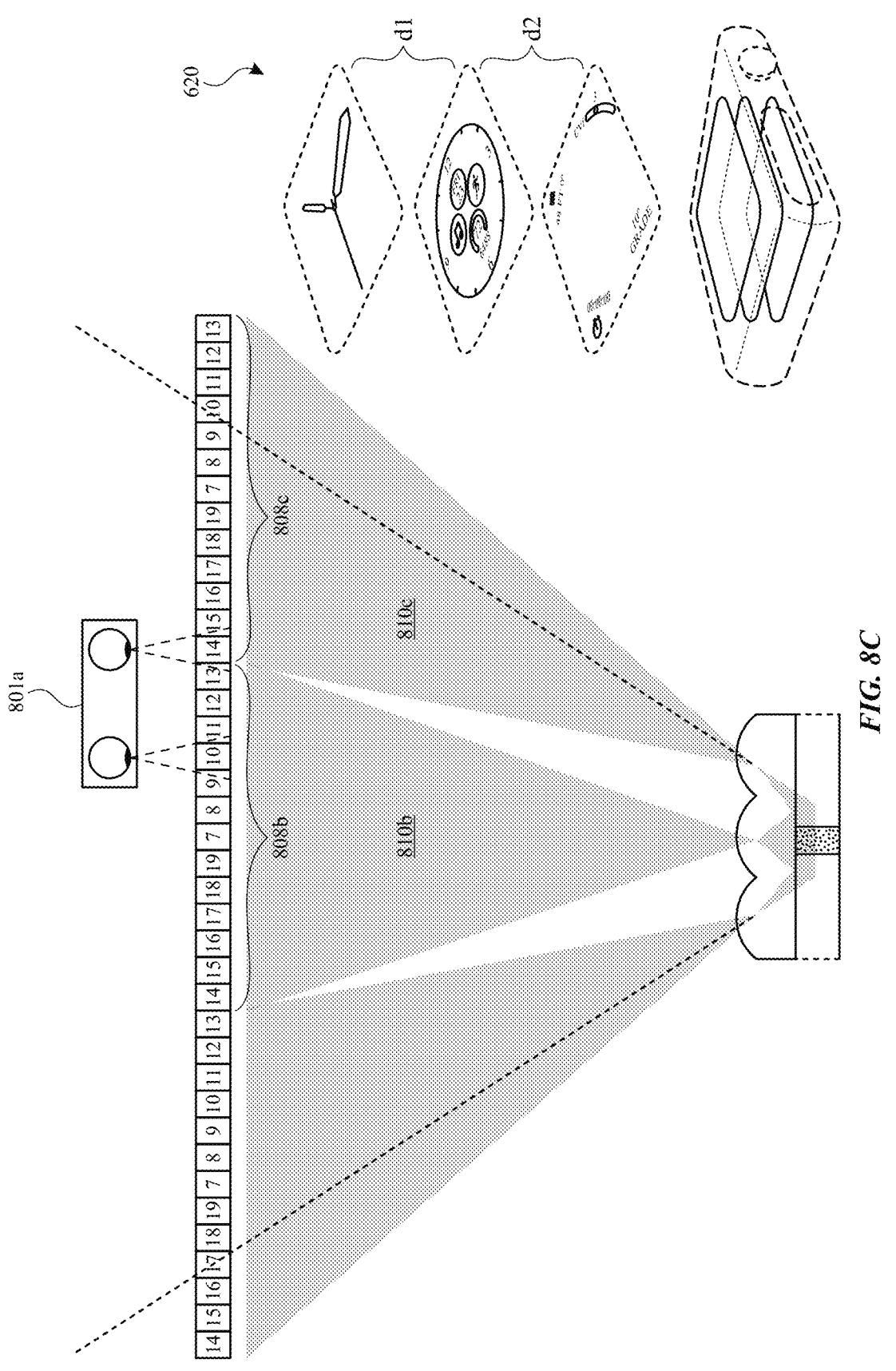

At FIG. 8C, in response to detecting that the primary user corresponding to user representation 801a has moved to the user's left, computer system 600 adjusts the content being displayed by display 600 (e.g., adjusts the content displayed by pixel array 806 and/or other pixels of display 600) so that the views displayed in viewing cone 810b are now, appearing from left to right, 808b14-808b19 and 808b7-808b13. Viewing cones 810a and 810c include the same sequence of views. That is, because computer system 600 detects, via the optical sensor corresponding to lines 811a and 811b, that the user is now positioned with the user's right eye in viewing cone 810b, at the position of view 810b10, and the user's left eye in viewing cone 810c, at the position of view 810c14, computer system 600 adjusts the displayed content so that the user continues to perceive user interface 620 with the intended degree of stereoscopic depth, as shown on the right-hand side of FIG. 8C, and from a perspective that matches the leftward shifted position of the user. Note that in FIG. 8C, computer system 600 maintains a buffer of views around the detected position of user (or the detected positions of the individual eyes of the user) such that even if the eyes were actually shifted from their detected positions, visual artifacts would be reduced and/or minimized. For example, if the user were, in actuality, positioned more to the user's right than as detected, the user would see view 808b7 with their right eye and view 808b11 with their left eye, which would still provide the illusion of stereoscopic depth of user interface 620 as shown on the right-hand side of FIG. 8C. the same is true if the user were, in actuality, more shifted to the left than the detected position. In some embodiments, computer system 600 determines the content to be displayed based on a detected direction of movement. For example, because computer system detected that the user moved to the user's left, computer system 600 provides a greater buffer in the direction of movement, as shown in FIG. 8C (e.g., views 808b15-19 provide a greater buffer to the user's left compared to views 808b7-9 operating as a buffer to the user's right). In this way, sensor lag can be mitigated.

Figure 8D:
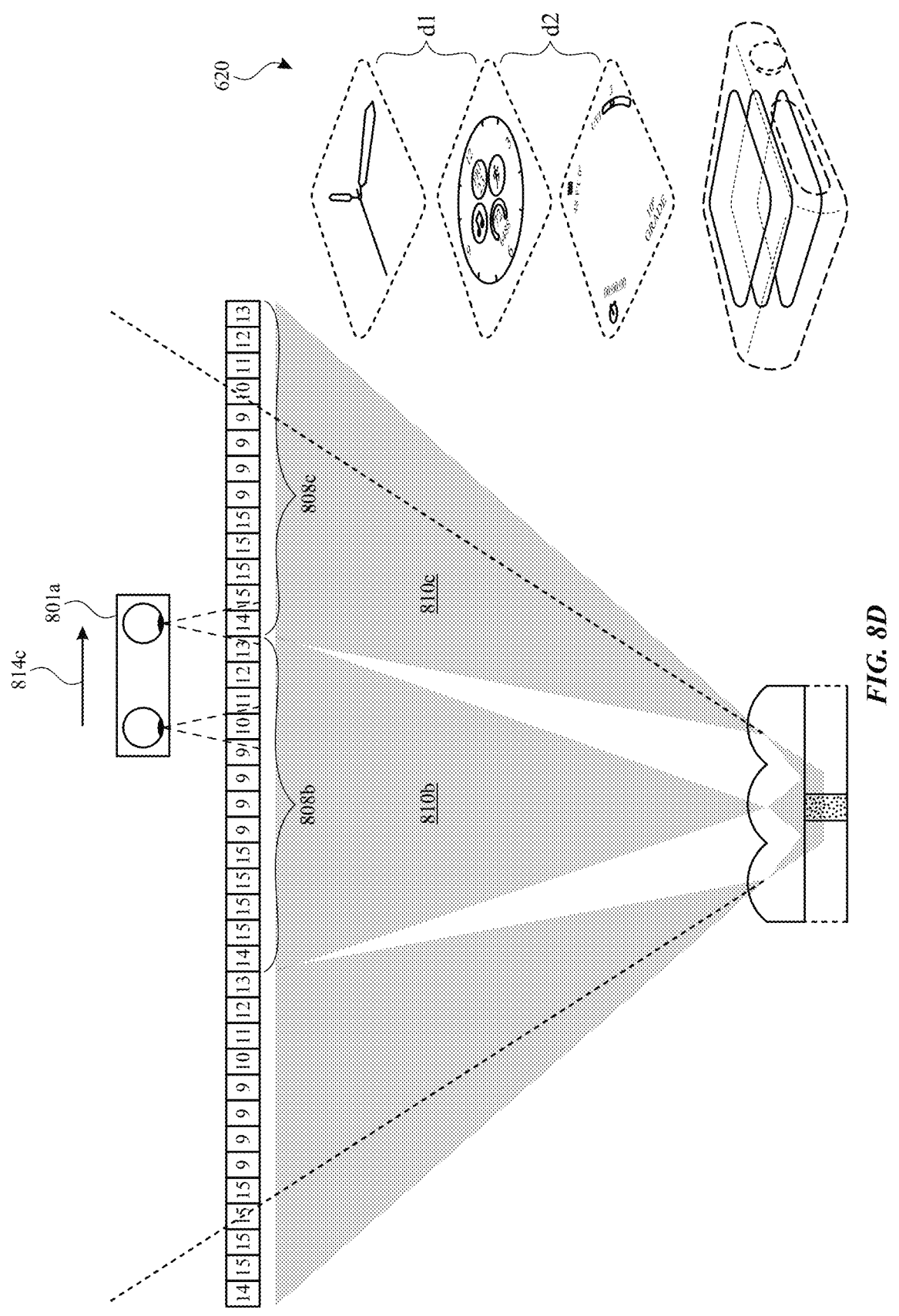

FIG. 8D depicts an alternative response to the leftward motion of the primary user corresponding to user representation 801a that is indicated by arrow 814b in FIG. 8B. At FIG. 8D, in response to detecting that the primary user corresponding to user representation 801a has moved to the user's left from the position of FIG. 8B, computer system 600 adjusts the content being displayed by display 600 (e.g., adjusts the content displayed by pixel array 806 and/or other pixels of display 600) so that the views displayed in view cone 810b are now, from left to right, 808b14, 808b15, 808b15, 808b15, 808b15, 808b9, 808b9, 808b9, 808b9, 808b10, 808b11, 808b12, and 808b13. Viewing cones 810a and 810c include the same sequence of views. That is, because computer system 600 detects, via the optical sensor corresponding to lines 811a and 811b, that the user is now positioned with the user's right eye in viewing cone 810b, at the position of view 810*b*10, and the user's left eye in viewing cone 810*c*, at the position of view 810*b*14, computer system 600 adjusts the displayed content so that the user continues to perceive user interface 620 with the intended degree of stereoscopic depth, as shown on the right-hand side of FIG. 8D, and from a perspective that matches the leftward shifted position of the user. At FIG. 8D, computer system 600 repeats, restricts, collapses, and/or clamps the views to the right of the user's right eye and the views to the left of the user's left eye to create buffer regions. Specifically, computer system 600 repeats view 808*b*9 four times to the right of the detected viewing position of the user's right eye and repeats view 808*c*15 four times to the left of the detected viewing position of the user's left eye. By doing so, computer system 600 can conserve resources (e.g., by needing to generate a lesser number of different views), while still reducing artifacts that can arise for imprecision in detecting the position of the user. For example, if the user's actual position is such that the user sees view 808*b*9 with the right eye and view 808*b*12 with the left eye (e.g., the user is actually two viewing positions further to the right than the detected position), the user would still see user interface 620 with a degree of stereoscopic depth that is only a small amount less than from the detected viewing position. At FIG. 8D, the primary user corresponding to user representation 801*a* moves further to the user's left, as indicated by arrow 814*c*, which computer system 600 detects via the optical sensor corresponding to lines 811*a* and 811*b*.

Figure 8E:
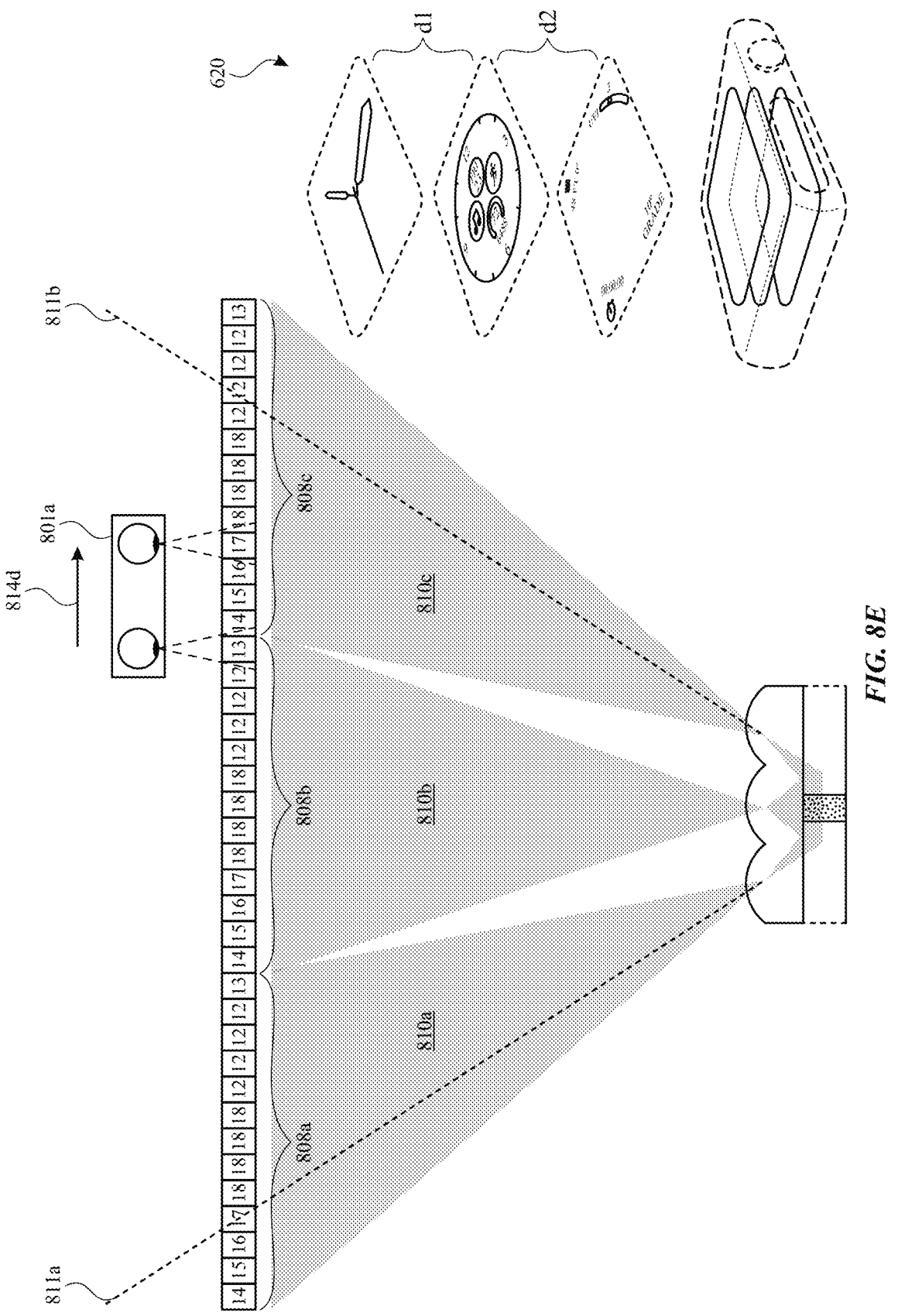

At FIG. 8E, in response to detecting that the primary user corresponding to user representation 801*a* has moved to the user's left from the position shown in FIG. 8D, computer system 600 adjusts the content being displayed by display 600 (e.g., adjusts the content displayed by pixel array 806 and/or other pixels of display 600) so that the views displayed in viewing cone 810*b* are now, appearing from left to right, 808*b*14-808*b*17, 808*b*18, 808*b*18, 808*b*18, 808*b*18, 808*b*12, 808*b*12, 808*b*12, and 808*b*13. Thus, computer system 600 has, again, updated the content displayed by pixel array 806 and/or other pixels of display 602 based on the tracked position of the primary user corresponding to user representation 801*a*. At FIG. 8E, computer system 600 repeats, restricts, and/or clamps the views to the right of the user's right eye and the views to the left of the user's left eye to create buffer regions, while continuing to present views to the user's right and left eyes that, when viewed by the user, create the illusion of stereoscopic depth for user interface 620, as shown in the right-hand side FIG. 8E. In FIG. 8E, the position of user representation 801*a* remains well within the FOV of the optical sensor corresponding to lines 811*a* and 811*b* and computer system 600 continues to be able to track the user's position with a high degree of accuracy. At FIG. 8E, the primary user corresponding to user representation 801*a* moves further to the user's left, as indicated by arrow 814*d*, which computer system 600 detects via the optical sensor corresponding to lines 811*a* and 811*b*.

Figure 8F:
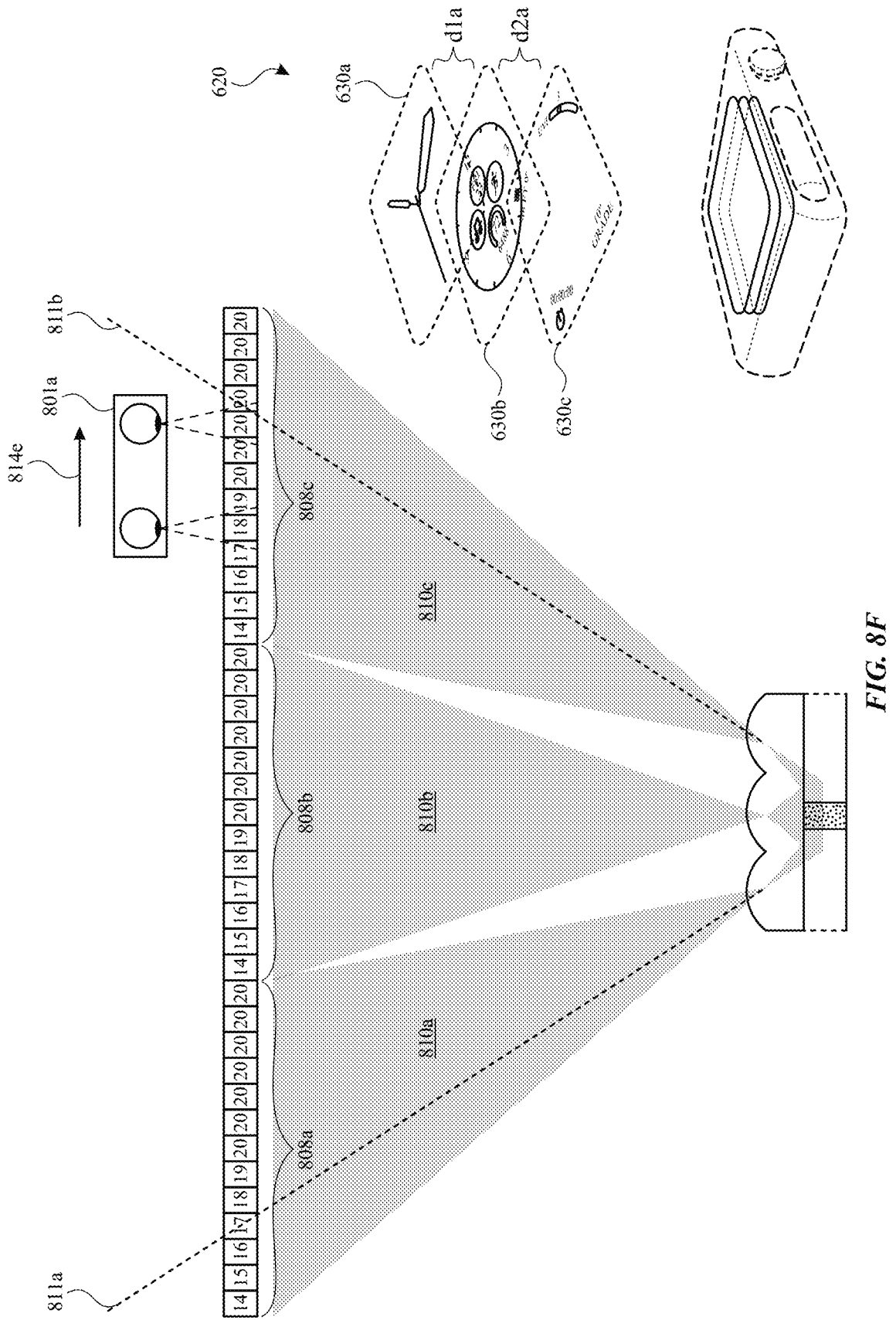

At FIG. 8F, in response to detecting that the primary user corresponding to user representation 801*a* has moved to the user's left from the position shown in FIG. 8E, computer system 600 adjusts the content being displayed by display 600 (e.g., adjusts the content displayed by pixel array 806 and/or other pixels of display 600). Notably, in FIG. 8F, the detected position of the primary user corresponding to user representation 801*a* is now fully within the region of viewing cone 810*c* and, while the user still remains within the FOV of the optical sensor corresponding to lines 811*a* and 811*b*, the user is now approaching the edge of that FOV, as indicated by line 811*b*. In response to detecting the movement indicated by arrow 814*d* and in accordance with a determination that the user has moved to viewing position that is nearing the edge of the FOV of the optical sensor corresponding to lines 811*a* and 811*b*, computer 600 repeats views extending in the direction towards the edge of the FOV. Specifically in FIG. 8F, computer system 600 displays views in viewing cone 810*c* with the sequence, from left to right, of 808*c*14-808*c*19, 808*c*20, 808*c*20, 808*c*20, 808*c*20, 808*c*20, 808*c*20, and 808*c*20 (e.g., view 810*c* is repeated seven times). Accordingly, based on the detected position of the user, computer system presents the right eye of the user with view 808*c*18 and the left eye of the user with view 808*c*20. Because the differences between the view seen by the user's right eye and the user's left eye is less than the differences between the views in FIGS. 8A-8D, the user now sees user interface 620 with less stereoscopic depth than before, as shown on the right-hand side of FIG. 8F. For example, the user now sees a perceived distance of dla between layer 630*a* and layer 630*b* as compared to the previous distance of d1, which is greater than dla. In some embodiments, computer system 600 repeats view 808*c*20 to create a larger buffer in the predicted direction of movement of the primary user corresponding to user representation 801*a* due to potential delay/lag/latency in detected motion of the user and/or because further movement of the user would place the user outside the FOV of the optical sensor corresponding to lines 811*a* and 811*b*. For example, referring back to the sequence of views shown in FIG. 8E, if the user's actual position was further to the user left from the detected position in FIG. 8F, such that the user saw, via their right eye, view 808*c*18 and view 808*c*13 (or 808*c*12), via their left eye, the user would experience flipping and/or other visual artifacts. In contrast, at FIG. 8F, if the user's actual position were further left of the detected position of user representation 801*a*, the user might see view 808*c*19 and view 808*c*20, via their right and left eyes, respectively, or the viewer might see view 808*c*20 at both eyes. While this would result in less or no stereoscopic effect (e.g., the user would perceive a 2D image), the user would not experience flipping and/or other visual artifacts. In some embodiments, displaying content as shown in FIG. 8F provides a gradual transition from the degree of stereoscopic depth shown in FIGS. 8A-8E to the lesser degree of stereoscopic depth shown in FIG. 8F to a fully 2D view, as the user continues to move in a direction that takes the user outside the FOV of the optical sensor corresponding to lines 811*a* and 811*b*. In some embodiments, the effect (e.g., the modification of displayed content) shown in FIG. 8F is applied by computer system 600 within a predetermined angular distance (e.g., 5°, 10°, or) 15° from an edge of the FOV of the optical sensor corresponding to lines 811*a* and 811*b*. In some embodiments, the effect shown in FIG. 8F is applied at a variable angular distance from an edge of the FOV of the optical sensor corresponding to lines 811*a* and 811*b* that is based on a predicted direction and/or speed of movement of a user. For example, if the user is moving at a speed and a direction that would potentially place the user outside of the FOV before a next sampling interval of the optical sensor and/or other sensors, computer system 600 would engage the effect shown in FIG. 8F before tracking is lost to reduce, minimize, and/or eliminate the likelihood that the user will experience visual artifacts. At FIG. 8F, the primary user corresponding to user representation 801*a* continues to move further to the user's left, as indicated by arrow 814*e*, which computer system 600 detects via the optical sensor corresponding to lines 811*a* and 811*b*.

Figure 8G:
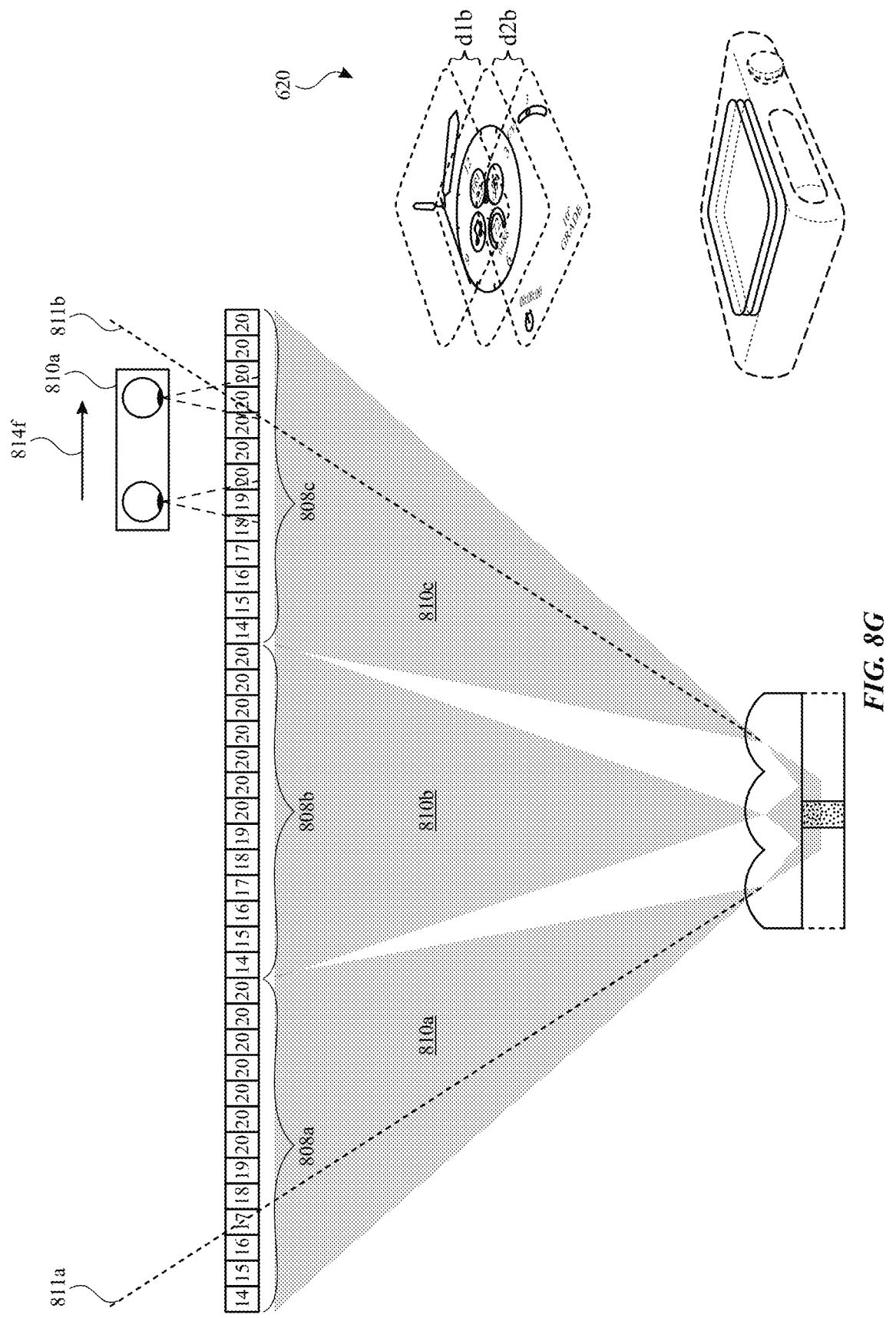

At FIG. 8G, while computer system detects that the position of the primary user corresponding to user representation 801*a* has shifted further to the left of the user, computer system does not adjust the content displayed by display 602 (e.g., the sequence of views in viewing cone 810*c* remains the same as shown in FIG. 8F). As a result, the user sees, via their right eye, view 808*c*19 and view 808*c*20, via their left eye. The user now sees a perceived distance of d1*b* between layer 630*a* and layer 630*b* as compared to the previous distance of d1*a* (FIG. 8F), which is greater than d1*b*. Thus, as the user continues to move on a predicted course that would take the user outside the FOV of the optical sensor corresponding to lines 811*a* and 811*b*, the user continues to perceive a transition from a 3D view to a 2D view. At FIG. 8F, the primary user corresponding to user representation 801*a* continues to move further to the user's left, as indicated by arrow 814*f*, which computer system 600 detects via the optical sensor corresponding to lines 811*a* and 811*b*.

Figure 8H:
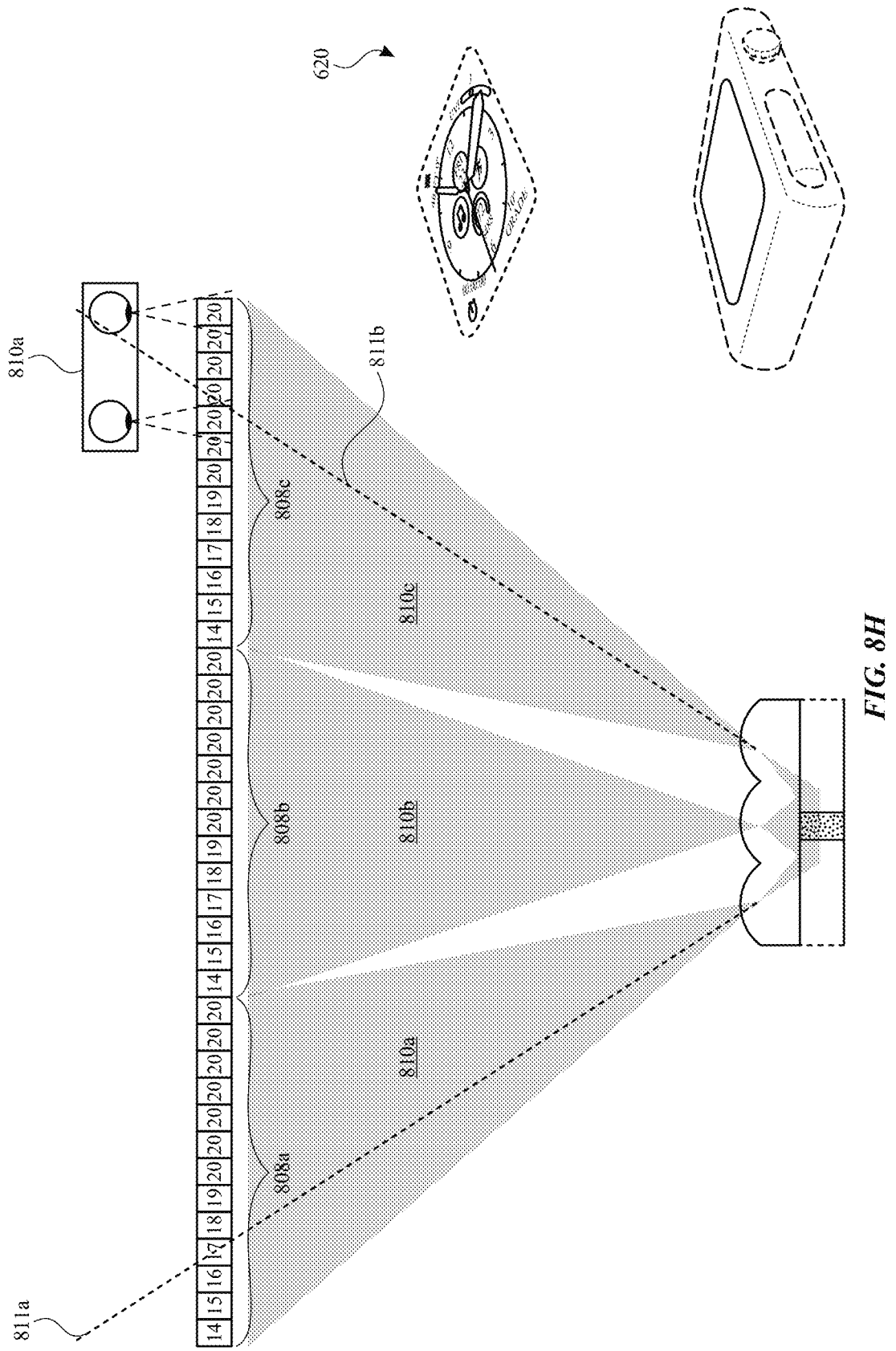

At FIG. 8H, computer system 600 now detects only a portion of the head of the primary user corresponding to user representation 801*a*. Computer system 600 does not adjust the content displayed by display 602 (e.g., the sequence of views in viewing cone 810*c* remains the same as shown in FIGS. 8F and 8G) in response to detecting the movement corresponding to arrow 814*f*. As a result, the user sees, via both eyes, view 808*c*20 and therefore perceives a 2D view of user interface 620, as shown on the right-hand side of FIG. 8H. Thus, as illustrated in FIGS. 8E-8H, the user experiences a gradual transition from a full 3D stereoscopic view to a 2D view without experiencing visual artifacts.

Figure 8I:
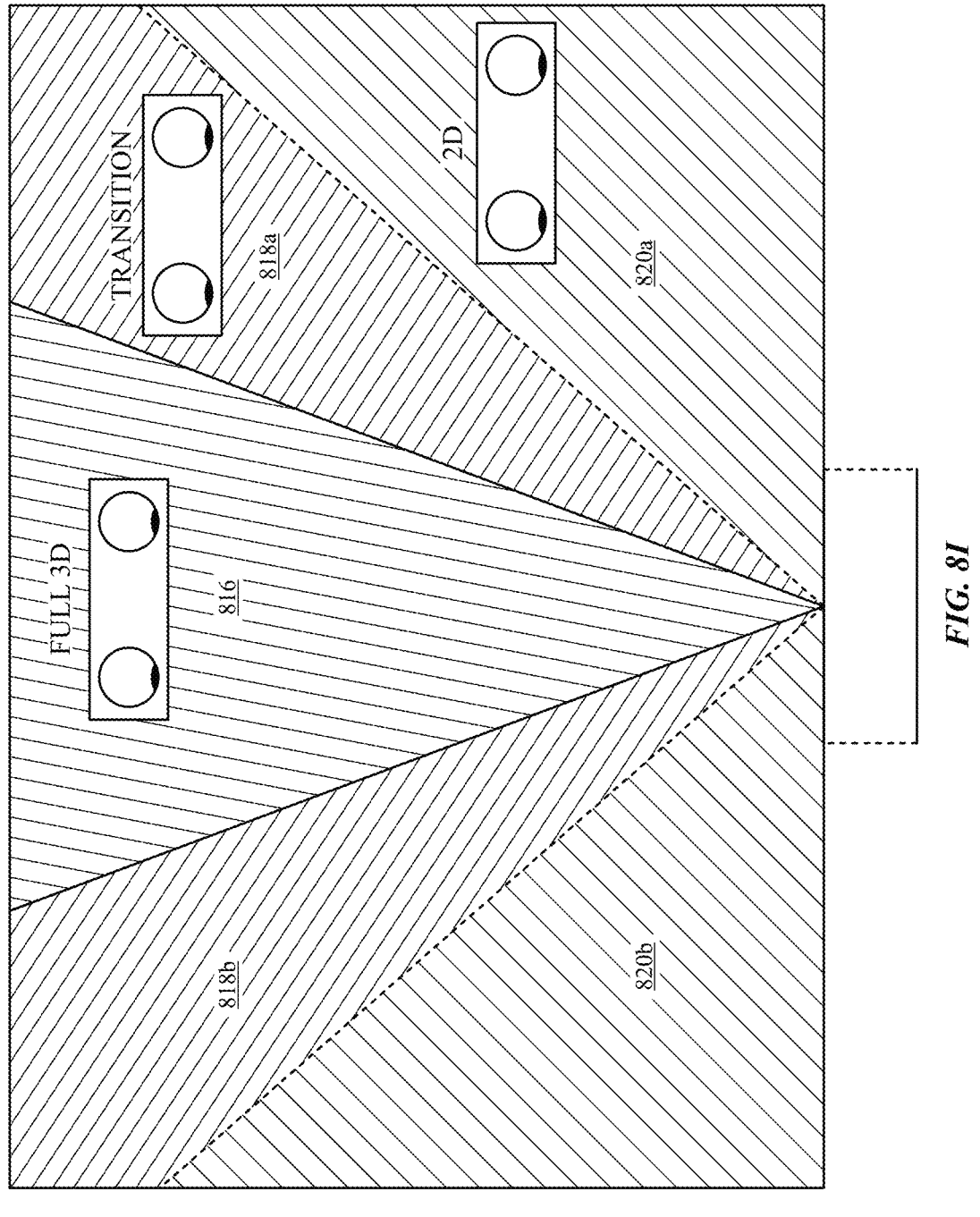

FIG. 8I is a schematic depicting different zones of viewing positions. When a user is positioned within zone 816 (e.g., FIGS. 8A-8E), the user would perceive the full stereoscopic effect when viewing content (e.g., user interface 620). When a user is positioned within zone 818*a* or corresponding zone 818*b* (e.g., transition zones), the user would perceive a reduced stereoscopic effect (e.g., FIGS. 8F and 8G). When a user is positioned within zone 820*a* or corresponding zone 820*b* (e.g., 2D zones), the user would perceive 2D views without a stereoscopic effect (e.g., FIG. 8H). As discussed above, the positions of the zones can be static (e.g., based on the FOV of the optical sensor corresponding to lines 811*a* and 811*b*) or dynamic (e.g., based on the FOV of optical sensor corresponding to lines 811*a* and 811*b* and the direction and/or speed of detected movement of the user).

Figure 8J:
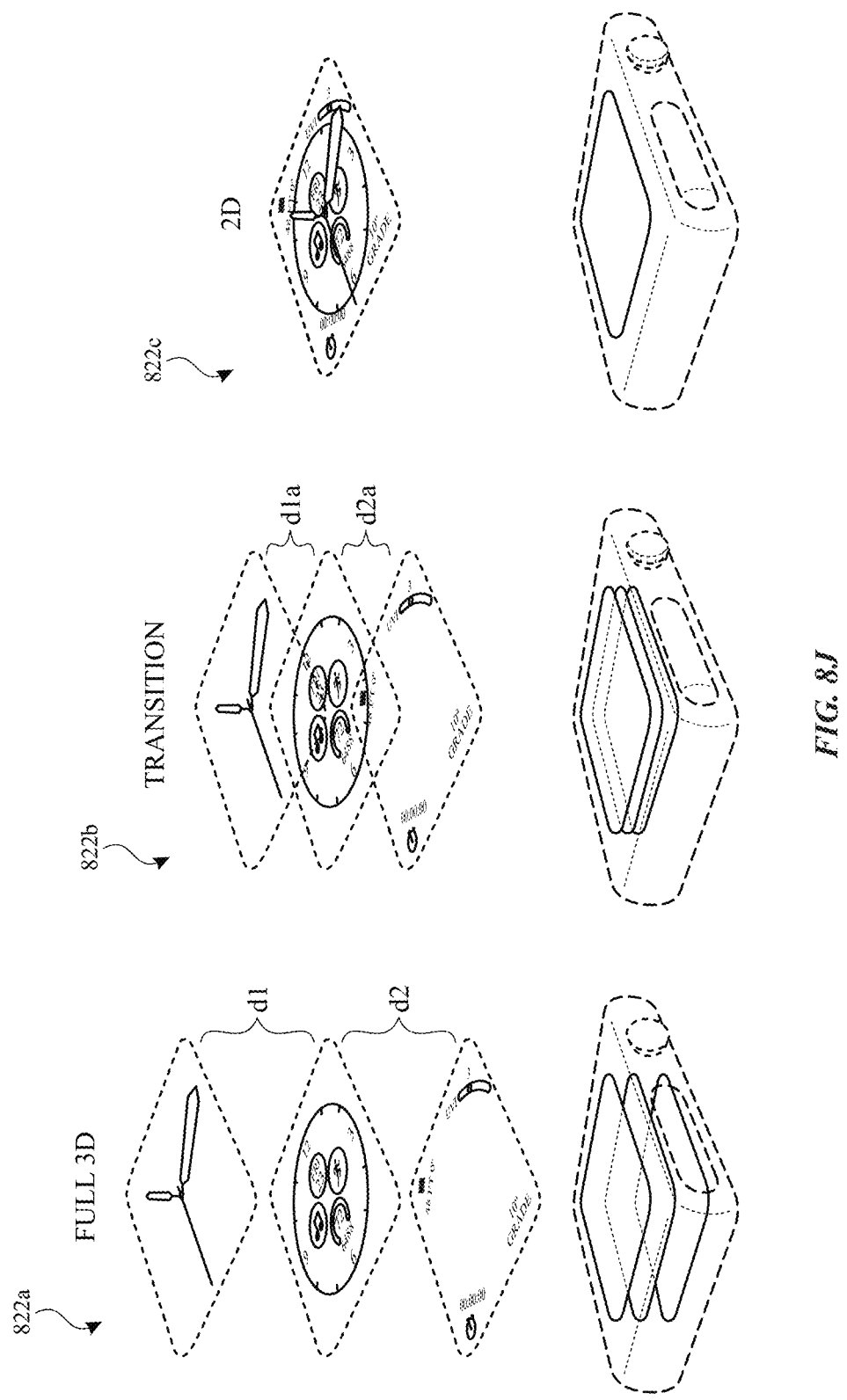

FIG. 8J is schematic of exemplary views perceived by a user within the zones discussed with reference to FIG. 8I. When a user is positioned within zone 816, a full 3D zone, the user perceives user interface 620 with the full stereoscopic effect, as shown in view 822*a*. When a user is positioned within zones 818*a* or 818*b*, transition zones, the user perceives user interface 620 with a reduced stereoscopic effect, such as that shown in view 822*b*. When a user is positioned within zones 820*a* or 820*b*, 2D zones, the user perceives user interface 620 as a 2D image with no stereoscopic effect, such as that shown in view 822*c*.

Figure 8K:
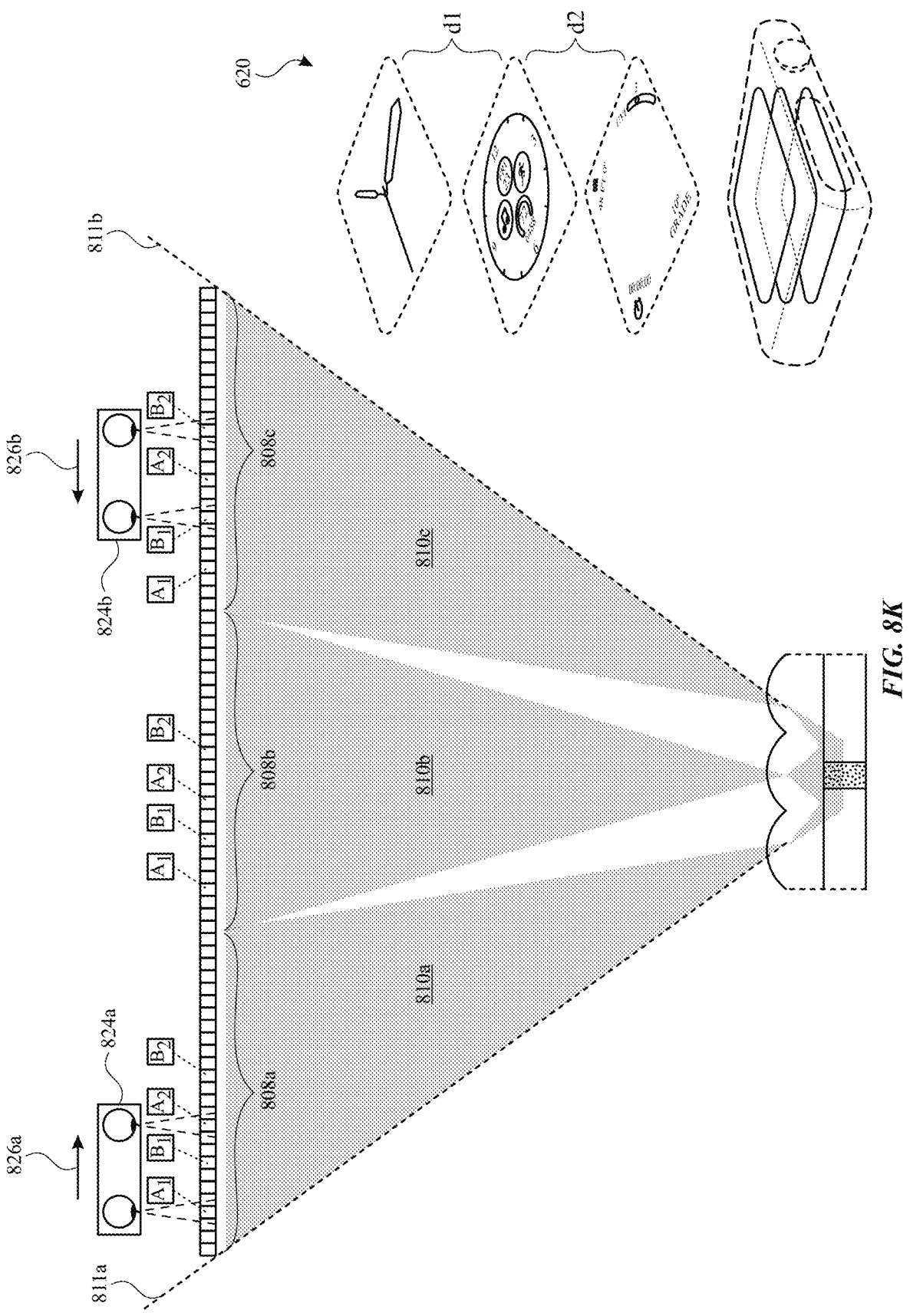

FIG. 8K depicts a schematic of computer system 600 independently tracking two users and displaying content based on the detected positions of both users. At FIG. 8K, pixel array 806 is configured to display 26 potentially different views of content (e.g., twice the number of views shown in FIGS. 8A-8H). A first user is detected at a viewing position corresponding to user representation 824*a*, that is fully within viewing cone 810*a*. A second viewer is detected at a viewing position corresponding to user representation

824*b*, which is fully within viewing cone 810*a*. Based on the detected viewing positions of the first and second users, computer system 600 displays content via pixel array 806 that presents view $A_1$ to the right eye of the first user and view $A_2$ to the left eye of first user. Computer system 600 also displays content via pixel array 806 that presents view $B_1$ to the right eye of the second user and view $B_2$ to the left eye of the second user. As noted above, the same sequence of views is repeated in viewing cones 810*a*-810*c*. The difference between views $A_1$ and $A_2$ and the difference between views $B_1$ and $B_2$ provide the same amount of illusion of stereoscopic depth such that both users perceive user interface 620 with the amount of stereoscopic depth shown in the right-hand side of FIG. 8K (e.g., both users perceive that layer 630*a* and 630*b* are separated by a distance d1). Views $A_1$ and $B_1$ are not the same, however, nor are views $A_2$ and $B_2$. Rather, views $A_1$ and $A_2$ are generated so as to depict user interface 620 from a perspective that matches the position/angle of the first user that corresponds to user representation 824*a* while views $B_1$ and $B_2$ are generated so as to depict user interface 620 from the perspective that matches the position/angle of the second user that corresponds to user representation 824*b*. At FIG. 8K, the first user that corresponds to user representation 824*a* moves to the user's left, as indicated by arrow 826*a*, while the second user that corresponds to user representation 824*b* moves to the user's right, as indicated by arrow 826*b* (e.g., both user's move towards each other).

Figure 8L:
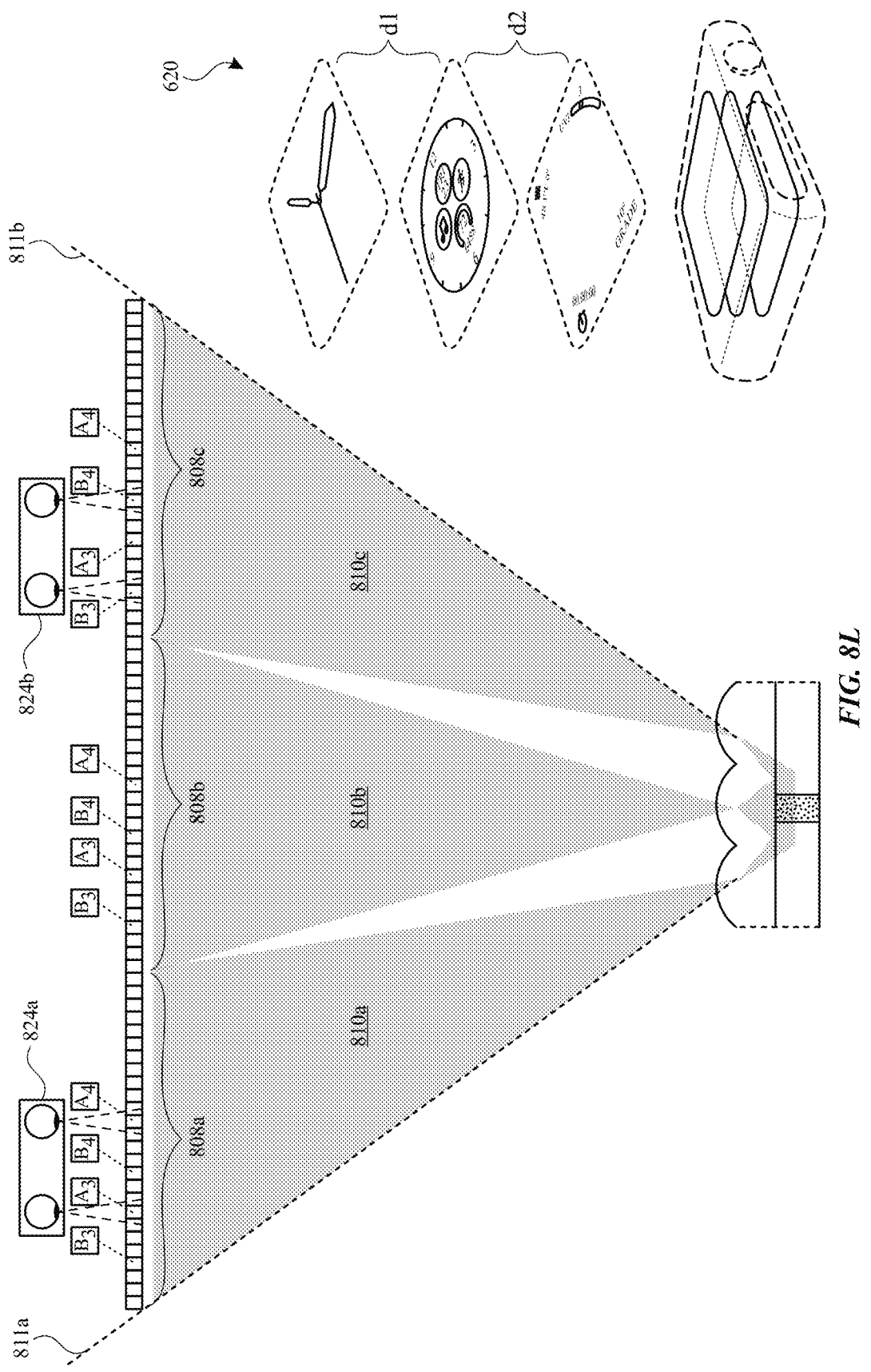

At FIG. 8L, in response to detecting the movement of the first user as indicated by arrow 826*a*, computer system 600 adjust the content being displayed by display 600 (e.g., adjusts the content displayed by pixel array 806 and/or other pixels of display 600) so that the first user corresponding to user representation 824*a* now sees view $A_3$ with their right eye and view $A_4$ with their left eye. The first user continues to see user interface 620 with the same degree of stereoscopic depth, as shown in the right-hand side of FIG. 8L, albeit from a perspective that is shifted to the first user's left, as compared to FIG. 8K. Similarly, in response to detecting the movement of the second user as indicated by arrow 826*b*, computer system 600 adjust the content being displayed by display 600 (e.g., adjusts the content displayed by pixel array 806 and/or other pixels of display 600) so that the second user corresponding to user representation 824*b* now sees view $B_3$ with their right eye and view $B_4$ with their left eye. The second user continues to see user interface 620 with the same degree of stereoscopic depth, as shown in the right-hand side of FIG. 8L, albeit from a perspective that is shifted to the second user's right, as compared to FIG. 8K. In some embodiments, computer system 600 employs one or more of the buffering techniques shown in FIGS. 8D-8H (e.g., as one or both of the tracked users moves towards an edge of the FOV of the optical sensor corresponding to lines 811*a* and 811*b*).

Figure 8M:
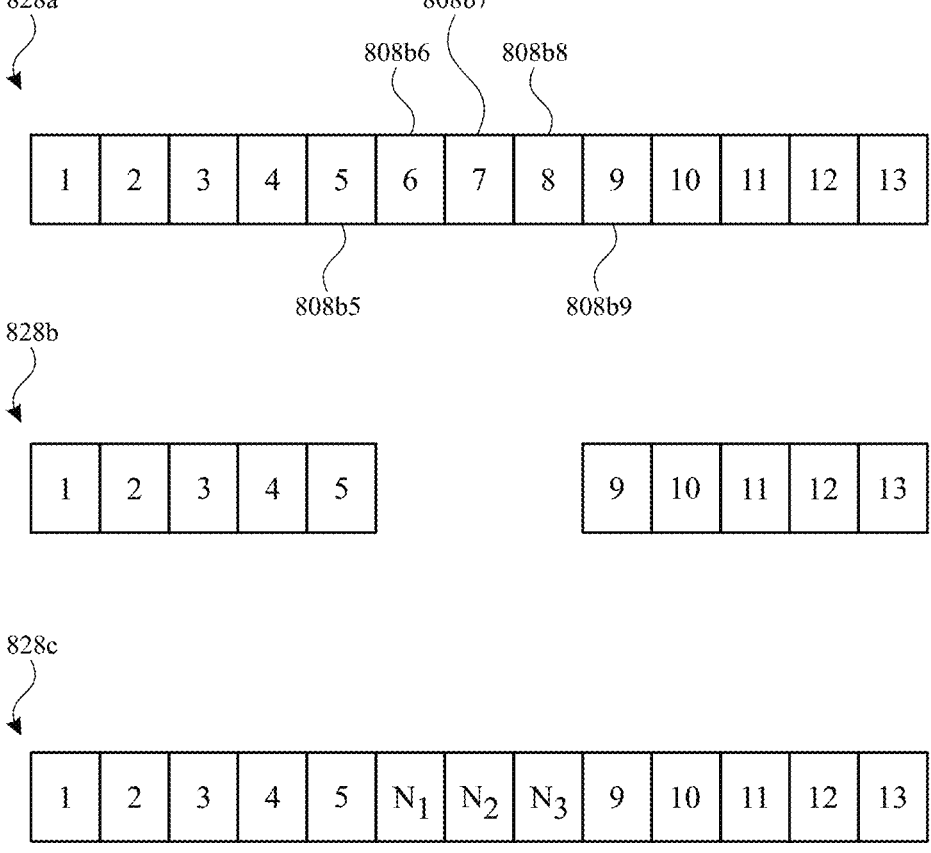

FIG. 8M depicts different sequences of views that can be displayed by pixel array 806 when a user is detected at a viewing position that causes view 808*b*5 to be visible to the user's right eye while view 808*b*9 is visible to the user's left eye (e.g., the user is at a position that corresponds to user representation 801*a* of FIG. 8A). In some embodiments, pixel array 806 displays content in sequence 828*a*, with content displayed at positions 808*b*6-808*b*8 that are determined to be in between the user's two eyes. In some embodiments, doing so provides a buffer for potential imprecision in the detected position of the user's eyes. In some embodiments, pixel array 806 displays content in sequence 828*b*, which omits content at positions determined to be in between the user's two eyes. In some embodiments, doing so conserves system resources (e.g., by avoiding the need to calculate and/or generate for views corresponding to those positions and/or by avoiding the need to activate pixels corresponding to those positions). In some embodiments, pixel array 806 displays content in sequence 828c, which displays predetermined content ($N_1$-$N_3$), at the positions that are determined to be in between the user's two eyes that is selected to reduce cross-talk/interference with the views that are seen by the user's eyes. In some embodiments, the predetermined content is a predetermined pattern of content (e.g., a repeating pattern having a color and/or other optical property that reduces and/or minimizes crosstalk). In some embodiments, each of $N_1$-$N_3$ is the same content. In some embodiments, each of $N_1$-$N_3$ includes different content (e.g., different patterns of content selected to reduce and/or minimize cross-talk/interference).

FIG. 9 is a flow diagram illustrating a method for providing and/or displaying a three-dimensional user interface based on a position of a user using a computer system in accordance with some embodiments. Method 900 is performed at a computer system (e.g., 100, 300, 500, and/or 600) (e.g., a smart phone, a smart watch, a tablet, a laptop, a desktop, a wearable device, wrist-worn device, and/or head-mounted device) that is in communication with one or more input devices (e.g., one or more sensors, a touch-sensitive surface, and/or one or more image sensors such as cameras or non-camera image sensors, such as the one or more optical sensors corresponding to lines 811a and 811b) and one or more display generation components (e.g., a display, a touch-sensitive display, a display controller, a 3D display, a three-dimensional display, and/or a stereoscopic display, such as display 802). In some embodiments, the one or more image sensors are capable of detecting a gaze direction and/or viewing angle of a user. In some embodiments, the one or more display generation components includes a lenticular display (e.g., a lenticular lens system) that can concurrently display images to different angular ranges, which enables the lenticular display to display different images to two different eyes of a user, where the different images are generated to create the illusion of stereoscopic depth. Some operations in method 900 are, optionally, combined, the orders of some operations are, optionally, changed, and some operations are, optionally, omitted.

The computer system (e.g., 600) while displaying, via the one or more display generation components (e.g., 802), first content (e.g., graphical content and/or text content) (e.g., content 808b) with a first magnitude of stereoscopic depth (e.g., a perceived degree of three-dimensional (3D) effect; a first number of distinct layers in the z-direction (e.g., a depth direction; a direction that is perpendicular to a display; and/or a direction that is perpendicular to at least one of the one or more display generation components)) (e.g., the depth depicted in 620 at FIG. 8A) from a first viewing position (e.g., an initial viewing position) (e.g., 801a at FIG. 8A) that is in a first range of viewing positions (e.g., a first viewing angle relative to a display generation component of the one or more display generation components), detects (902), via the one or more input devices, a change in viewing position from the first viewing position to an updated viewing position (e.g., a second viewing position, such as 801a in FIG. 8C). In some embodiments, the first range of viewing positions is 0° to 45°, 0° to 35°, 0° to 25°, or 0° to 15°. In some embodiments, the first range of viewing positions is based on (e.g., a subset of) a FOV of one or more optical sensors used to determine a position of a user. In some embodiments, the first amount of stereoscopic depth is and/or comprises a first amount of simulated depth between a foremost content item of the first content and a rearmost content item of the first content (e.g., 0 cm of simulated depth, 0.25 cm of simulated depth; 0.5 cm of simulated depth, 1 cm of simulated depth, 3 cm of simulated depth, 5 cm of simulated depth, or 10 cm of simulated depth). In some embodiments, the viewing position is based on the viewing angle and/or viewing distance. In some embodiments, the viewing angle is expressed an angle relative to an angle normal to a display surface of the display generation component. For example, a viewing angle of 0° is directly normal to the display surface (e.g., looking straight at the display surface and/or looking straight at the center of the display surface) and a viewing angle of 45° is looking diagonally at the display surface. In some embodiments, the first range of viewing positions is range of viewing positions that is within an optimal or more optimal range for tracking of viewing positions (e.g., the first range is within a field-of-detection and/or field-of-view of a tracking sensor or tracking camera).

The computer system, in response (904) to detecting the change in viewing position from the first viewing position to the updated viewing position (e.g., 801a in FIG. 8F) and in accordance with a determination that the updated viewing position is in a second range of viewing positions that is different from the first range of viewing positions, displays (906), via the one or more display generation components, the first content with a second magnitude of stereoscopic depth that is less than the first magnitude of stereoscopic depth (e.g., the first content is displayed with less stereoscopic depth and/or 3D effect from the updated viewing position as compared to the first viewing position (e.g., the stereoscopic depth seen for 620 in FIG. 8F or 8G)). In some embodiments, displaying the first content with less stereoscopic depth and/or 3D effect includes modifying the content being displayed so that it is presented at the updated viewing position with less stereoscopic depth. In some embodiments, displaying the first content with less stereoscopic depth includes displaying reduced number of varying, discrete views within a given angular range of viewing positions (e.g., displaying 5 varying, discrete views at the second magnitude of stereoscopic depth rather than 10 varying, discrete views that are displayed at the first magnitude of stereoscopic depth for the same angular range (e.g., +/−10° of viewing positions). In some embodiments, the second magnitude of stereoscopic depth is zero stereoscopic depth (e.g., the first content is displayed without depth/without a 3D effect). In some embodiments, the second range of viewing positions is 16° or greater, 26° or greater, 36° or greater, or 45° or greater. In some embodiments, the second range of viewing positions does not overlap the first range of viewing positions. In some embodiments, the second range of viewing positions is contiguous with the first range of viewing positions. Displaying the first content with second magnitude of stereoscopic depth that is less than the first magnitude of stereoscopic depth when the updated viewing position is in the second range of viewing positions can reduce the chance that a viewer will experience optical artifacts (e.g., when the user is positioned at the edge or outside of an optimal range of viewing positions). Doing so can also reduce viewer disorientation from rapid transitions between content with stereoscopic depth (e.g., 3D content) and content without depth (e.g., 2D content). Doing so can also provide improved visual feedback to the user as to changes in viewing position. Reducing visual artifacts, viewer disorientation, and providing improved visual feedback enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, in response to detecting the change in viewing position from the first viewing position to the updated viewing position (e.g., 801*a* in FIG. 8B or 8C) and in accordance with a determination that the updated viewing position is in the first range of viewing positions, the computer system displays (908), via the one or more display generation components, the first content with the first magnitude of stereoscopic depth (e.g., the first content is displayed with the same stereoscopic depth and/or 3D effect from the updated viewing position as compared to the first viewing position). In some embodiments, the computer system displays the first content with the same first magnitude of stereoscopic depth for a range of viewing positions (e.g., viewing angles and/or viewing distances). Continuing to display the first content with second magnitude of stereoscopic depth when the updated viewing position is in the first range of viewing positions provides improved visual feedback that the updated position remains within the first range of viewing positions.

In some embodiments, the one or more input devices includes one or more biometric sensors (e.g., biometric trackers such as a camera, a depth sensor, and/or an eye-tracker) (e.g., the one or more optical sensors corresponding to lines 811*a* and 811*b*); and detecting the change in viewing position from the first viewing position to an updated viewing position includes detecting a change in a biometric feature (e.g., a face, head, and/or eye(s)) of a user of the computer system (e.g., a change that is indicative of a change in a position of the user relative to the one or more display generation components and/or relative to the computer system). Detecting the change in viewing position based on changes in a biometric feature can improve the accuracy of a determination of a viewing position of a user, relative to the computer system. Improving accuracy enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the first viewing position is within a first sub-range (e.g., a sub-range that is within a central sub-range of the first range of viewing positions and/or is not within one or predetermined boundary regions of the first range of viewing positions) (e.g., 801*a* in FIG. 8B) of the first range of viewing positions. While the viewing position is the first viewing position, the computer system tracks viewing position (e.g., the computer system collects and/or analyzes position data) at a first tracking frequency (e.g., a frequency of 5 hertz). In response to detecting the change in viewing position from the first viewing position to the updated viewing position and in accordance with a determination that the updated viewing position is in a second sub-range (e.g., 801*a* in FIG. 8C) of the first range of viewing positions (e.g., a sub-range that is within one or predetermined boundary regions of the first range of viewing positions and/or within a predetermined distance of a boundary of the first range of viewing positions), the computer system increases (908) the frequency at which the computer system tracks viewing position from the first tracking frequency to a second tracking frequency, greater than the first tracking frequency (e.g., increasing from a frequency of 5 hertz to 10 hertz). Increasing the frequency at which the computer system tracks viewing position when a determination that the updated viewing position is in a second sub-range of the first range of viewing positions can improve the accuracy and responsiveness of tracking in a sub-range of the first region (e.g., near the boundary) when there is an increased likelihood that the viewing position will transition out of the first range, while allowing for conservation of system resources (e.g., processing power and/or battery life) when a transition is less likely. Doing so enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the viewing position is determined (e.g., estimated) based on at least information (e.g., data) indicative of motion of the one or more display generation components (e.g., 802) and/or the computer system. In some embodiments, the information is data collected by one or more motion sensors (e.g., inertial measurement units (IMUs)) of the computer system. In some embodiments, detecting the change in viewing position from the first viewing position to the updated viewing position is based on at least information indicative of motion of the one or more display generation components and/or the computer system. Determining viewing position based on motion data for the one or more display generation components and/or the computer system can improve the accuracy of a determination of a viewing position of a user, relative to the computer system. Improving accuracy enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the viewing position is determined (e.g., estimated) based on at least: information (e.g., data) indicative of motion of the one or more display generation components and/or the computer system; and information (e.g., data) from a set of one or more biometric sensors (e.g., the one or more optical sensors corresponding to lines 811*a* and 811*b*) (e.g., biometric trackers such as a camera, a depth sensor, and/or an eye-tracker). In some embodiments, detecting the change in viewing position from the first viewing position to the updated viewing position is based on at least information indicative of motion of the one or more display generation components and/or the computer system and information from the set of one or more biometric sensors. Determining viewing position based on motion data for the one or more display generation components and/or the computer system and information from biometric sensors can improve the accuracy of a determination of a viewing position of a user, relative to the computer system. For example, doing so can make the determination less susceptible to errors specific to given source of information. Improving accuracy enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the information from the set of one or more biometric sensors includes: first biometric tracking information (e.g., a first frame of biometric tracking information) that corresponds to a first period of time; and second biometric tracking information (e.g., a second frame of biometric tracking information) that corresponds to a second period of time that is after the first period of time and non-contiguous with the first period of time. The information indicative of motion of the one or more display generation components and/or the computer system includes first motion information indicative of motion of the one or more display generation components and/or the computer system that corresponds to a third period of time that is after the first period of time and before the second period of time. The computer system interpolates the viewing position at the third period of time (e.g., estimated and/or extrapolated) based on the first motion information and the first biometric tracking information and/or the second biometric tracking information (e.g., 801a in FIG. 8C can be interpolated from detected positions 801a in FIGS. 8B and 8D). In some embodiments, biometric tracking information is collected at a respective frequency and is used as the primary source information for determining viewing position (e.g., of a user); motion information is collected in during periods in between the collection of biometric tracking information and is used to interpolate viewing position in the intervening periods between "frames" of biometric tracking information. For example, biometric information is collected at t=0 seconds and t=1 second; viewing position for t=0.5 seconds is interpolated based on motion information collected at t=0.5 seconds. Interpolating the viewing position using motion information in between periods of time when biometric tracking information is available can improve accuracy and also conserve power (e.g., when motion information is less resource-intensive to obtain as compared to biometric tracking information). Doing so enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, while collecting the information from the set of one or more biometric sensors at a first collection frequency (e.g., 5 hertz), the computer system detects, via the one or more input devices, respective motion information indicative of motion of the one or more display generation components and/or the computer system. In response to detecting the respective motion information indicative of motion of the one or more display generation components and/or the computer system, the computer system changes the frequency at which the information from the set of one or more biometric sensors is collected from the first collection frequency to a second collection frequency (e.g., 10 hertz) that is different from the first collection frequency (e.g., a higher frequency) (e.g., the collection frequency can be increased as 801a approaches closer to line 811b). In some embodiments, the computer system changes (e.g., increases) the rate at which biometric tracking information is collected when motion of the computer system is detected. Changing the frequency at which the information from the set of one or more biometric sensors is collected when motion is detected can improve the accuracy of viewing position determinations during periods of time when viewing position can be changing at a higher rate (e.g., due to motion of the computer system); doing so also performs an operation when a set of conditions has been met without requiring further user input. Improving accuracy of viewing position determinations enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently. Moreover, when the change in frequency is an increase in frequency, collecting data at a higher frequency when the system is in motion and a lower frequency when the system is not in motion reduces power usage and improves battery life of the device by enabling the user to use the device more quickly and efficiently.

In some embodiments, the respective motion information indicative of motion of the one or more display generation components and/or the computer system indicates that the one or more display generation components and/or the computer system has started to move (e.g., started to move from a stationary position as opposed to continued motion); and the second collection frequency is higher than the first collection frequency (e.g., the collection frequency can be increased as 801a approaches closer to line 811b). Changing the frequency at which the information from the set of one or more biometric sensors is collected when motion is detected can improve the accuracy of viewing position determinations during periods of time when viewing position can be changing at a higher rate (e.g., due to motion of the computer system); doing so also performs an operation when a set of conditions has been met without requiring further user input. Improving accuracy of viewing position determinations enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently. Moreover, when the change in frequency is an increase in frequency, collecting data at a higher frequency when the system is in motion and a lower frequency when the system is not in motion reduces power usage and improves battery life of the device by enabling the user to use the device more quickly and efficiently.

In some embodiments, the respective motion information indicative of motion of the one or more display generation components and/or the computer system is detected while a respective viewing position is within the first range of viewing positions. In accordance with a determination that the respective motion information indicative of motion of the one or more display generation components and/or the computer system indicates that the respective viewing position is shifting towards (e.g., the respective motion information indicates that the viewing position is heading towards being the second rage of viewing positions) (e.g., as seen for 801a in FIG. 8C) the second range of viewing positions (e.g., is shifting towards a boundary of the second range of viewing positions), the computer system changes the frequency at which the information from the set of one or more biometric sensors is collected includes increasing the frequency at which the information from the set of one or more biometric sensors is collected (e.g., the second respective frequency is higher than the first respective frequency). In some embodiments, in accordance with a determination that the respective motion information indicative of motion of the one or more display generation components and/or the computer system indicates that the respective viewing position is shifting away from the second range of viewing positions, changing the frequency at which the information from the set of one or more biometric sensors is collected includes decreasing the frequency at which the information from the set of one or more biometric sensors is collected. Increasing the frequency at which the information from the set of one or more biometric sensors is collected when motion is detected can improve the accuracy of viewing position determinations during periods of time when viewing position is more likely to be transitioning to the second range of viewing positions (e.g., due to motion of the computer system in a direction towards the second range); doing so also performs an operation when a set of conditions has been met without requiring further user input. Improving accuracy of viewing position determinations enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently. Moreover, when the change in frequency is an increase in frequency, collecting data at a higher frequency when the system is in motion and a lower frequency when the system is not in motion reduces power usage and improves battery life of the device by enabling the user to use the device more quickly and efficiently.

In some embodiments, the set of one or more biometric sensors includes one or more optical sensors (e.g., cameras) (e.g., the one or more optical sensors that correspond to lines 811*a* and 811*b*); the first range of viewing positions is within a field-of-view of the one or more optical sensors; and at least a portion of the second range of viewing positions is within the field-of-view of the one or more optical sensors. In some embodiments, at least a second portion of the second range of viewing positions is outside the field-of-view of the one or more optical sensors. In some embodiments, the at least portion of the second range of viewing positions corresponds to an outer region of the field-of-view of the one or more optical sensors (e.g., the sensor have a FOV of +/−20° and the at least a portion of the second range of viewing positions corresponds to +/−15° to) 20°. The first range of viewing positions and at least a portion of the second range of viewing positions being within the field of view of one or more optical sensors allows the use of the sensors for determining a current viewing position, which can improve the accuracy of the viewing position determination.

In some embodiments, displaying the first content with the second magnitude of stereoscopic depth includes displaying, via the one or more display generation components, the first content as two-dimensional content (e.g., the second magnitude is zero or no stereoscopic depth) (e.g., as seen for 620 in FIG. 8H). Displaying the first content as two-dimensional content when the viewing position is within the second range of viewing positions (e.g., outside the first range of viewing positions) can reduce the chance that a viewer will experience optical artifacts (e.g., when the user is positioned at the edge or outside of an optimal range of viewing positions). Doing so enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, displaying the first content with the second magnitude of stereoscopic depth includes displaying, via the one or more display generation components, the first content as three-dimensional content with less stereoscopic depth than the first magnitude of stereoscopic depth (e.g., as seen for 620 in FIG. 8F or 8G) (e.g., less simulated stereoscopic depth, while still having at least a degree of stereoscopic depth so that it remains three-dimensional content). Displaying the first content as three-dimensional content with less stereoscopic depth when the viewing position is within the second range of viewing positions (e.g., outside the first range of viewing positions) can reduce the chance that a viewer will experience optical artifacts (e.g., when the user is positioned at the edge or outside of an optimal range of viewing positions). Doing so can also reduce viewer disorientation from rapid transitions between content with stereoscopic depth (e.g., 3D content) and content without depth (e.g., 2D content). Doing so enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, displaying the first content with the second magnitude of stereoscopic depth includes: in accordance with a determination that the updated viewing position is at a first position in the second range of viewing positions, displaying, via the one or more display generation components, the first content with a third magnitude of stereoscopic depth that is less than the first magnitude of stereoscopic depth (e.g., as seen for 620 in FIG. 8F); and in accordance with a determination that the updated viewing position is at a second position in the second range of viewing positions, displaying, via the one or more display generation components, the first content with a fourth magnitude of stereoscopic depth that is less than third magnitude of stereoscopic depth (e.g., as seen for 620 in FIG. 8G). In some embodiments, the first content is displayed with different magnitudes of stereoscopic depth depending on the position of the updated viewing position within the second range of viewing positions (e.g., positions within the second range that are further away from the first range of viewing positions are displayed with less stereoscopic depth). Displaying the first content with different magnitudes of stereoscopic depth for different positions within the second range of viewing positions can reduce the chance that a viewer will experience optical artifacts (e.g., when the user is positioned at the edge or outside of a more optimal range of viewing positions). Doing so can also reduce viewer disorientation from rapid transitions between content with stereoscopic depth (e.g., 3D content) and content without depth (e.g., 2D content). Doing so enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, displaying the first content with the second magnitude of stereoscopic depth includes: in accordance with a determination that the updated viewing position is within a first subset of positions in the second range of viewing positions, displaying, via the one or more display generation components, the first content as three-dimensional content with a fifth magnitude of stereoscopic depth that is less than the first magnitude of stereoscopic depth (e.g., as seen for 620 in FIG. 8G); and in accordance with a determination that the updated viewing position within a second subset of positions in the second range of viewing positions, displaying, via the one or more display generation components, the first content as two-dimensional content without stereoscopic depth (e.g., as seen for 620 in FIG. 8H) (e.g., the second magnitude is zero stereoscopic depth). Displaying the first content as 3D content within a first subset of positions of the second range of viewing positions and as 2D content within a second subset of positions of the second range of viewing positions can reduce the chance that a viewer will experience optical artifacts (e.g., when the user is positioned at the edge or outside of a more optimal range of viewing positions). Doing so can also reduce viewer disorientation from rapid transitions between content with stereoscopic depth (e.g., 3D content) and content without depth (e.g., 2D content). Doing so enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, while detecting a plurality of viewers (e.g., 801*a*-801*c*) (e.g., users) via the one or more input devices, the computer system selects (e.g., identifies) a first viewer (e.g., 801*a*) of the plurality of viewers (e.g., as a primary user), wherein the viewing position (e.g., the first viewing position and updated viewing position) corresponds to a determined viewing position (e.g., determined via the one or more input devices) of the first viewer. In some embodiments, a viewer that meets a set of criteria (e.g., is the user closest to the computer system and/or that is closest to being on a target axis (e.g., an axis normal to a surface of the one or more display generation components)) is selected as the first user. In some embodiments, the computer system does not display content that is modified (in some embodiments, adjusted and/or optimized) based on the viewing position (e.g., detected viewing position) of at least a second user of the plurality of users that is different from the first viewer of the plurality of users. Thus, in some embodiments, when content is modified and/or optimized for the first viewer, this can affect the viewing experience of the second user. Selecting a first viewer when multiple viewers are selected provides consistency when determining updates to the viewing position, which can reduce the chance that the first viewer will experience optical artifacts. Doing so enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the first viewing position and the updated viewing position correspond to a first viewer (e.g., 824*a*) (e.g., a first detected viewer) of a plurality of viewers (e.g., 824*a* and 824*b*) (e.g., a plurality of detected viewers). While displaying, via the one or more display generation components, second content (e.g., graphical content and/or text content; in some embodiments, the first content and the second content are the same) with a first respective magnitude of stereoscopic depth from a first respective viewing position that corresponds to a respective viewing position (e.g., a determined and/or detected viewed position) of a second user of the plurality of viewers and that is in the first range of viewing positions, the computer system detects, via the one or more input devices, a change in respective viewing position of the second user from the first respective viewing position to a respective updated viewing position; in some embodiments, the second content is the same underlying content as the first content, other than magnitudes of stereoscopic depth. In some embodiments, the first viewing position is different from the respective viewing position and the updated viewing position is different from the respective updated viewing position. In some embodiments, the first user and the second user are different users. In response to detecting the change in respective viewing position of the second user from the first respective viewing position to the updated respective viewing position and in accordance with a determination that the updated respective viewing position is in the second range of viewing positions that is different from the first range of viewing positions, the computer system displays, via the one or more display generation components, the second content with a second respective magnitude of stereoscopic depth that is less than the first respective magnitude of stereoscopic depth. In some embodiments, the viewing positions of the first user and the second viewer are independently tracked and/or independently determined (e.g., by the computer system). In some embodiments, the first content is presented to the first user concurrently with the second content being presented to the second user. In some embodiments, in response to detecting the change in respective viewing position of the second user from the first respective viewing position to the updated respective viewing position: in accordance with a determination that the updated respective viewing position is in the first range of respective viewing positions, displaying, via the one or more display generation components, the second content with the first respective magnitude of stereoscopic depth (e.g., the second content is displayed with the same stereoscopic depth and/or 3D effect from the updated respected viewing position as compared to the first respective viewing position). In some embodiments, the computer system displays the second content with the same first respective magnitude of stereoscopic depth for a range of viewing positions (e.g., viewing angles and/or viewing distances). Displaying second content with differing magnitudes of the stereoscopic depth to the second user (e.g., while the first content is displayed to the first user with different magnitudes of stereoscopic depth) can reduce the chance that the viewers will experience optical artifacts (e.g., when the user is positioned at the edge or outside of an optimal range of viewing positions). Doing so can also reduce viewer disorientation from rapid transitions between content with stereoscopic depth (e.g., 3D content) and content without depth (e.g., 2D content). Doing so can also provide improved visual feedback to the viewers as to changes in viewing position for each viewer. Reducing visual artifacts, viewer disorientation, and providing improved visual feedback enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the one or more display generation components include at least one lenticular display (e.g., 802 as shown in FIG. 8A); in some embodiments, the lenticular display can concurrently display different images/views to different angular ranges, which enables the lenticular display to display different images to two different eyes of a user, where the different images are generated to create the illusion of stereoscopic depth. The at least one lenticular display is configured to display a plurality of different views of first respective content across a range of viewing positions (e.g., 808b1-808b13, as shown in FIG. 8A). In some embodiments, the at least one lenticular display is configured (e.g., is capable of) displaying a first predetermined number of different views (e.g., capable of displaying 30 different views). In some embodiments, the at least one lenticular display displays the same content to multiple views of the plurality of different views. For example, the display generates and displays 10 discrete/different views of content to the 30 potentially different views, such that the same content is repeated to multiple potentially different views. For example, potentially different views 1-3 of 30 are presented with the same content and 4-6 of 30 are presented with the same content and so forth. In accordance with a determination that a first predetermined magnitude of stereoscopic depth (e.g., a maximum magnitude of stereoscopic depth being presented across the plurality of different views) has a first value, the at least one lenticular display displays a first number of discrete (e.g., different, varying, and/or non-repeated) views of the first respective content in the plurality of different views of the first respective content (e.g., 808b1-808b13 in FIG. 8A). In some embodiments, in accordance with a determination that the first predetermined magnitude of stereoscopic depth has the first value, the at least one lenticular display displays a third predetermined number of repeated views of the first respective content. For example, the at least one lenticular display is capable of displaying 30 different views; the display displays 10 discrete views across the plurality of views with multiple "copies" (e.g., 3 copies each) of one or more of the 10 discrete views. In accordance with a determination that a first predetermined magnitude of stereoscopic depth (e.g., a maximum magnitude of stereoscopic depth being presented across the plurality of different views) has a second value, less than the first value, the at least one lenticular display displays a second number of discrete (e.g., different, varying, and/or non-repeated) views of the first respective content in the plurality of different views of the first respective content (e.g., 808b9-808b15 in FIG. 8D), wherein the second number of discrete views of the respective content is less than the first number of discrete views of the respective content. In some embodiments, in accordance with a determination that the first predetermined magnitude of stereoscopic depth has the second value, the at least one lenticular display displays a fourth predetermined number of repeated views of the first respective content that is less than the third number of repeated views of the first respective content. For example, the at least one lenticular display is capable of displaying 30 different views; the display displays 5 discrete views across the plurality of views with multiple "copies" of one or more of the 5 discrete views (e.g., 6 copies of each of the 5 discrete views), such that there are more "copied" views when the first predetermined magnitude of stereoscopic depth has the second value, as compared to when it has the first value. Accordingly, in some embodiments, as the magnitude of the stereoscopic depth effect being presented by the increases, the number of discrete views increases and vice versa. Adjusting the number of discrete views based on a predetermined magnitude of stereoscopic depth can allow for more gradual transitions in the views when a greater amount of stereoscopic depth is employed, which can reduce the chance that a viewer will experience optical artifacts (e.g., due to more abrupt transitions between the discrete views). Doing so can also reduce viewer disorientation from rapid transitions between content with stereoscopic depth (e.g., 3D content) and content without depth (e.g., 2D content). Doing so can also provide improved visual feedback to the user as to changes in viewing position. Reducing visual artifacts, viewer disorientation, and providing improved visual feedback enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, displaying the first content with the second magnitude of stereoscopic depth includes: in accordance with a determination that the updated viewing position is at a third position (e.g., 801a in FIG. 8F) in the second range of viewing positions, displaying, via the one or more display generation components, a first discrete view of the first content directed towards the third position (e.g., 808c20 in FIG. 8F); and in accordance with a determination that the updated viewing position is at a fourth position (e.g., 801a in FIG. 8G) in the second range of viewing positions, different from the third position, displaying, via the one or more display generation components, the first discrete view of the first content directed towards the fourth position. In some embodiments, the same discrete view of the first content is displayed at multiple viewing positions within the second range of viewing positions. In some embodiments, because the same discrete view is directed to multiple viewing positions within the second range of viewing positions, the content is perceived as being 2D as it appears the same from multiple viewing positions/angles. Displaying the same first discrete view of the first content directed to both the third and fourth viewing positions in the second range (e.g., repeating the same view to two different viewing positions) reduces the likelihood that the viewer will experience optical artifacts (e.g., that can result from inaccuracies in determining the view position of the user in a less than optimal range of viewing positions). Doing so enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the first discrete view is a two-dimensional view of the first content (e.g., as seen in FIG. 8H) (e.g., a two-dimensional view/effect is implemented by displaying one or more repeats of the same discrete view to multiple viewing positions). Displaying the same two-dimensional, first discrete view of the first content directed to both the third and fourth viewing positions in the second range (e.g., repeating the same2D view to two different viewing positions) reduces the likelihood that the viewer will experience optical artifacts (e.g., that can result from inaccuracies in determining the view position of the user in a less than optimal range of viewing positions). Doing so enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the at least one lenticular display is configured to display content from a plurality of ranges of viewing positions that includes the first range of viewing positions and the second range of viewing positions (e.g., 801*a* in FIGS. 8A and 801*a* in FIG. 8H). While the viewing position is the first viewing position, the at least one lenticular display is actively displaying content to a first sub-set of the plurality of ranges of viewing positions and is not actively displaying content to a second sub-set of the plurality of ranges of viewing positions. In some embodiments, the second sub-set corresponds to viewing positions that are determined to be not visible from the first viewing position. In some embodiments, actively displaying content includes dynamically modifying the rendering of content that is visible from different viewing positions based on detected changes in the viewing position of a selected user/viewer. In response to detecting the change in viewing position from the first viewing position to the updated viewing position, the computer system shifts (e.g., modifying, changing) to actively displaying content, via the at least one lenticular display, to a third sub-set of the plurality of ranges of viewing positions that is different from the first sub-set. In some embodiments, and ceasing to actively display content to viewing positions that are determined to be not visible from the updated viewing position. Shifting the display of content from a first sub-set of the plurality of ranges of viewing positions to a third sub-set of the plurality of ranges of viewing positions based on changes to the viewing position can conserve system resources by reducing the areas of active display and reduce the risk that viewers outside of the currently active sub-set of viewing positions experience optical artifacts. Doing so enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, in accordance with a determination that a current viewing position is a first distance from the computer system (e.g., 801*a* in FIG. 8A), the first range of viewing positions corresponds to a first range of viewing angles. In accordance with a determination that the current viewing position is a second distance from the computer system (e.g., 801*a* in FIG. 8B), different from the first distance, the first range of viewing positions corresponds to a second range of viewing angles, different from the first range of viewing angles. In some embodiments, as a distance of a viewing position of a user changes, the first range of viewing positions (e.g., the range of viewing positions at which the first content is presented with the first magnitude of stereoscopic depth) changes from corresponding to a first range of viewing angles to a second range of viewing angles. In some embodiments, as the distance increases, the range of viewing angles of the first range of viewing positions decreases. Changing the range of viewing angles based on a distance of a current viewing position can reduce the chance that the viewer will experience optical artifacts (e.g., because a viewer that is closer can have angular transitions that are faster than viewers that are further away). Doing so can also reduce viewer disorientation from rapid transitions between content with stereoscopic depth (e.g., 3D content) and content without depth (e.g., 2D content). Doing so can also provide improved visual feedback to the user as to changes in viewing position. Reducing visual artifacts, viewer disorientation, and providing improved visual feedback enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, the at least one lenticular display is configured to display content from a plurality of ranges of viewing positions that includes the first range of viewing positions and the second range of viewing positions. While the viewing position is the first viewing position, the lenticular display is not actively displaying content to a respective sub-set of the plurality of ranges of viewing positions that is determined to be between the eyes (e.g., within the gap between the eyes) of a viewer of the computer system (e.g., viewer that is positioned at the first viewing position) (e.g., as per 828*b* and 828*c* in FIG. 8M). Not actively displaying content to a respective sub-set of the plurality of ranges of viewing positions that is determined to be between the eyes can conserve system resources to a viewing range that is not within the view of the viewer. Doing so enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, not actively displaying content to a respective sub-set of the plurality of ranges of viewing positions that is determined to be between the eyes of a viewer of the computer system includes not displaying content to the respective sub-set of the plurality of ranges of viewing positions (e.g., as per 828*b* in FIG. 8M).

In some embodiments, the lenticular display is configured to display content from a plurality of ranges of viewing positions that includes the first range of viewing positions and the second range of viewing positions. While the viewing position is the first viewing position, the lenticular display displays content that is different from the respective content to a respective sub-set of the plurality of ranges of viewing positions that is determined to be between the eyes (e.g., within the gap between the eyes) of a viewer of the computer system (e.g., viewer that is positioned at the first viewing position) (e.g., as per 828*c* in FIG. 8M). In some embodiments, the respective content is primary content that is selected/intended for presentation to the viewer (e.g., the user interface of an application or media being played back) and the content that is different from the respective content is visual content that can improve and/or enhance the image quality of the primary content (e.g., by reducing the appearance and/or magnitude of visual artifacts). In some embodiments, the content that is different from the respective content has a predetermined pattern (e.g., a "white noise" pattern) and is presented without stereoscopic depth. Displaying content that is different from the respective content (e.g., different from primary content) to a respective sub-set of the plurality of ranges of viewing positions that is determined to be between the eyes can enhance the image quality of the primary content and/or reduce visual artifacts. Doing so enhances the operability of the system and makes the user-system interface more efficient (e.g., by preventing erroneous inputs, and helping the user to provide proper inputs and reducing errors) which, additionally, reduces power usage and improves battery life of the device by enabling the user to use the system more quickly and efficiently.

In some embodiments, aspects/operations of methods 700 and 900 can be interchanged, substituted, and/or added between these methods. For example, method 900 can be used to reduce and/or eliminate the risk of visual artifacts when displaying content with changing stereoscopic depth per method 700. For brevity, these details are not repeated here.

FIGS. 10A-10P are exemplary schematics and user interfaces for providing and/or displaying three-dimensional user interfaces that are responsive to a user (e.g., to movements and/or inputs of the user), in accordance with some embodiments. The schematics and user interfaces in these figures are used to illustrate the processes described below, including the processes in FIG. 11.

FIG. 10A includes, on the left-hand side, computer system 1000, which is a tablet computer that includes display 1002 and front facing sensors 1004. Although the depicted embodiments show an example in which computer system 1000 is a tablet computer, in other embodiments, computer system 1000 is a different type of computer system (e.g., a wearable computer system (e.g., a smart watch), a smart phone, a laptop computer, and/or a desktop computer). In some embodiments, computer system 1000 includes one or more features of device 100, 300, and/or 500 and/or computer system 600. Display 1002 is a touch-sensitive display that integrates a touch-sensitive surface (e.g., a capacitive touch-sensitive surface capable of detecting multiple touches) and a display screen (e.g., an OLED, LED, or LCD display). In some embodiments, computer system 1000 and/or display 1002 includes one or more features of display 602 and/or portion 802 of display 602. For example, display 1002 can be a lenticular display that is capable of displaying stereoscopic content that varies (e.g., in stereoscopic magnitude) and/or responds to the position of one or more users, as described with reference to FIGS. 8A-8M. In some embodiments, front facing sensors 1004 include one or more sensors for detecting a position and/or gaze direction of a user of computer system 1000, such as one or more cameras, depth sensors, and/or gaze sensors.

FIG. 10A also includes, at the top side, schematic 1001 of an environment that shows the position of computer system 1000 with respect to user 1003 and light 1005. As seen in schematic 1001, computer system 1000 is positioned with display 1002 facing at and visible to user 1003 who is at a distance of approximately 10 feet from computer system 1000. Light from light 1005 is detectable via front facing sensors 1004 of computer system 1000.

At FIG. 10A, computer system 1000 displays stereoscopic user interface 1006 that includes a background image that includes lamb 1008, hill 1010, and clouds 1012. Stereoscopic user interface 1006 also includes analog clock 1014 that includes hour hand 1014a, minute hand 1014b, and second hand 1014c. Each of the hands of analog clock 1014 includes lighting effects (e.g., specular lighting effects). In FIG. 10A, the time is 10:07:26, as shown by analog clock 1014. In some embodiments, the lighting effects are based on one or more of the position of light sources in the environment (e.g., light 1005) and/or the position of users of computer system 1000 (e.g., user 1003).

Stereoscopic user interface 1006 presents different content to a user's left eye and a user's right eye that, when viewed together, create the illusion of content that appears at different depths. The right-hand side of FIG. 10A includes schematic 1007 that depicts various layers 1009a-1009g of depth at which content can be displayed via display 1002. In some embodiments, layer 1009a appears to be separated from layer 1009g by a distance of approximately 8 inches, as seen by a user. Layer 1009b appears to be approximately 4 inches from layer 1009f, as seen by a user, such that each of layers 1009b-1009f are spaced evenly apart and by a distance that is less than the distance separating layer 1009a from layer 1009b or layer 1009f from layer 1009g. In schematic 1007, the separation between each of layers 1009a-1009g is exaggerated for ease of understanding. As seen in the bottom of schematic 1007 with reference to computer system 1000, the layers would appear closer together, with layer 1009a appearing to the user as if the layer is above display 1002 (e.g., closer to a user), given the illusion that layer 1009a is floating above the display. In contrast, layer 1009g would appear below display 1002 (e.g., further from a user), giving the illusion that layer 1009g is sunken into the surface of display 1002. As shown in FIG. 10A, analog clock 1014 appears in layer 1009c, lamb 1010 appears below in layer 1009d, and hill 1010 and clouds 1012 appear even lower in layer 1009e. Thus, when viewed by a user, analog clock 1014 appears closest to the user while hill 1010 and clouds 1012 appear further from the user, as compared to the other content displayed in stereoscopic user interface 1006 at FIG. 10A. At FIG. 10A, analog clock 1014 appears to be approximately 2 inches closer than hill 1010 and clouds 1012. Note that while FIG. 10A is shown with different displayed content show at discrete layers, in some embodiments content can appear to have volumetric depth (e.g., lamb 1008 could be shown at multiples depths spanning two or more layers).

At FIG. 10B, computer system 1000 displays stereoscopic user interface 1006 at a time of 10:07:37, which is 11 seconds later than the time shown in FIG. 10A. As seen in schematic 1001, the environment has not changed and user 1003 remains in the same position as shown in FIG. 10A. Because 11 seconds have elapsed, the position of second hand 1014c has changed. As a result of this change, computer system 1000 has updated the lighting effect on second hand 1014c, based on the change in position of second hand 1014c. In some embodiments, the lighting effect on second hand 1014c at the new position is determined based on the position of one or more of the light sources in the environment (e.g., light 1005) and/or the position of users of computer system 1000 (e.g., user 1003) relative to the new position of second hand 1014c. In contrast, the lighting effects on hour hand 1014a and minute hand 1014b remain substantial the same as they did in FIG. 10A, as the positions of hour hand 1014a and minute hand 1014b have not substantially changed in the 11 seconds of elapsed time. At FIG. 10B, user 1003 moves closer to computer system 1000, as indicated by arrow 1011a. Computer system 1000 detects the movement of user 1003 via front facing sensors 1004.

Figure 10C:
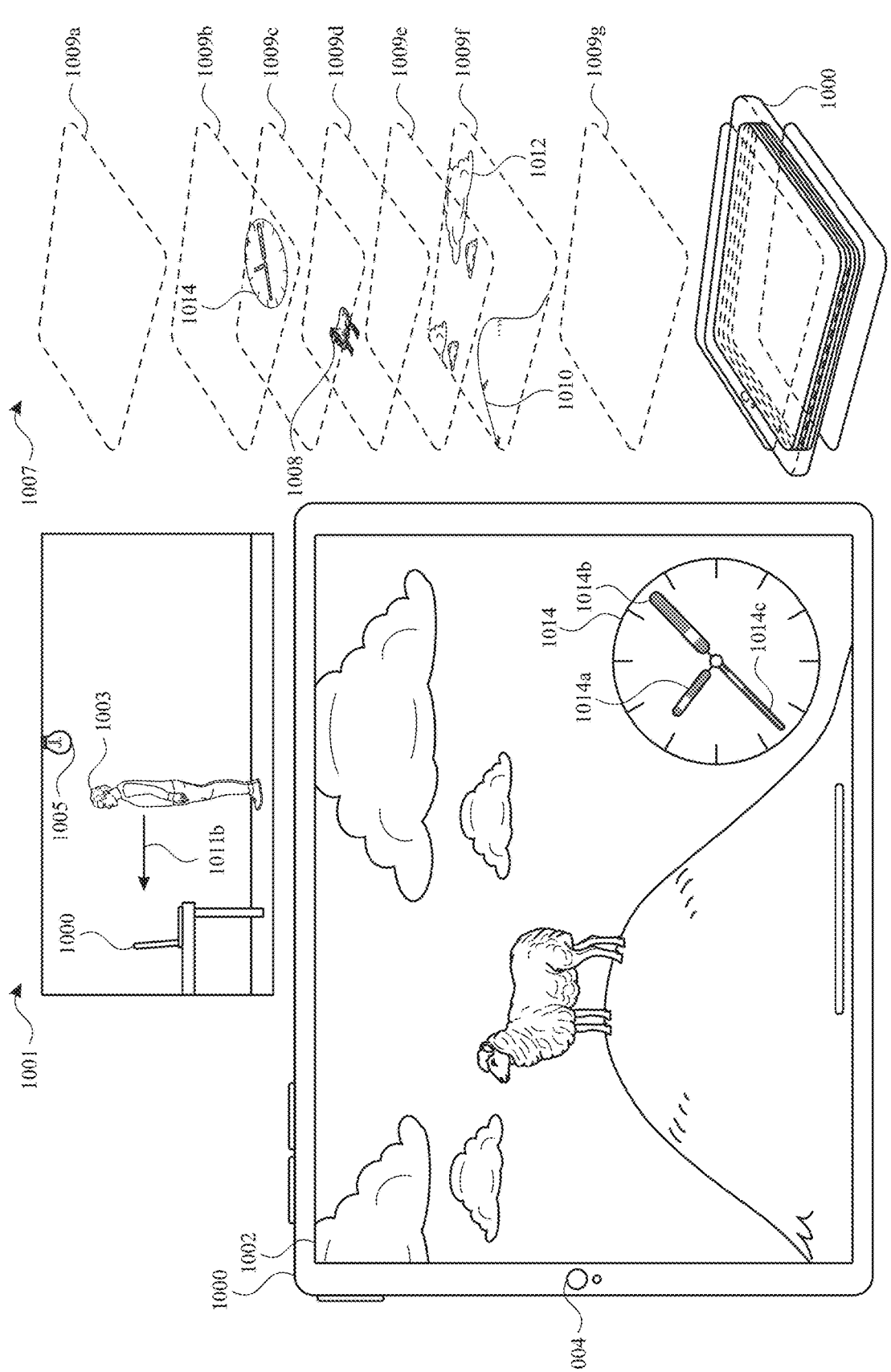

At FIG. 10C, user 1003 is now positioned approximately 5 feet from computer system 1000, as shown in schematic 1001, while the time remains 10:07:37. Computer system 1000 continues to display stereoscopic user interface 1006. In FIG. 10C, the lighting effects on hour hand 1014a, minute hand 1014b, and second hand 1014c have all changed in response to the change in position of user 1003. Computer system 1000 changes the lighting effects on the hands to reflect the change in viewing angle/position of user 1003 and to simulate the difference in how environmental light sources (e.g., light 1005) reflect off the simulated surfaces of the hands from the current perspective of user 1003. In some embodiments, the lighting effects also change because user 1003 partially blocks the amount of light from light 1005 that falls on computer system 1000 (e.g., as detected by front facing sensors 1004). In some embodiments, had user 1003 moved to a different position than that shown in FIG. 10C

(e.g., had user 1003 moved laterally relative to computer system 1000), the lighting effects on hour hand 1014*a*, minute hand 1014*b*, and second hand 1014*c* would have changed in a different manner.

Further at FIG. 10C, computer system 1000 increases the magnitude of the stereoscopic depth separating the content of stereoscopic user interface 1006 in response to the change in position of user 1003. Specifically, analog clock 1014 now appears at the depth of layer 1009*b*, lamb 1008 remains at layer 1009*d*, while hill 1010 and clouds 1012 are now at the depth of layer 1009*e*. At FIG. 10C, analog clock 1014 now appears to be approximately 4 inches closer to the user than hill 1010 and clouds 1012, compared to the approximately 2 inches of separation at FIG. 10A. In some embodiments, computer system 1000 increases the magnitude of the stereoscopic depth to provide feedback to user 1003 that the user's presence has been detected and to signal to the user that stereoscopic user interface 1006 can be interacted with (e.g., via touch inputs). At FIG. 10C, user 1003 moves closer to computer system 1000, as indicated by arrow 1011*b*. Computer system 1000 detects the movement of user 1003 via front facing sensors 1004.

Figure 10D:
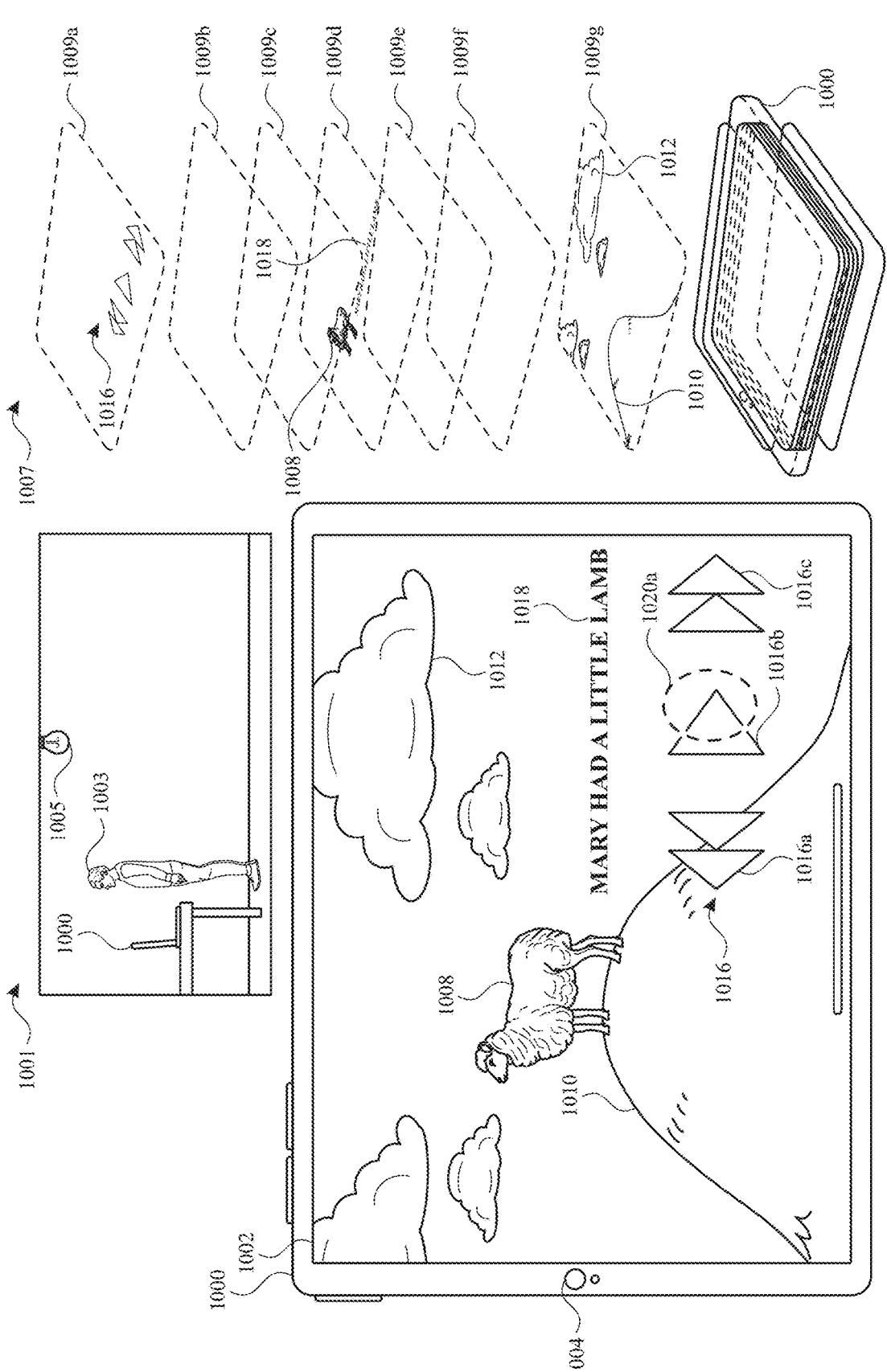

At FIG. 10D, user 1003 is now positioned approximately 1 foot from computer system 1000 (e.g., within touch interaction range). In response to detecting the movement of user 1003 and/or in response to detecting that user 1003 is within touch interaction range (e.g., within a predetermined distance), computer system ceases to display analog clock 1014 and displays media playback controls 1016 and media title 1018. Media playback controls 1016 include previous track affordance 1016*a*, play affordance 1016*b*, and next track affordance 1016*c*. At FIG. 10D, playback controls 1016 are displayed at the depth of layer 1009*a*, appearing to user 1003 as the closest visual element of stereoscopic user interface 1006. In some embodiments, computer system 1000 displays interactive user interface elements, like playback controls 1016, at a depth that is closest to user(s) to provide improved feedback as to the interactive nature of those elements. Media title 1018 is displayed at the same stereoscopic depth as lamb 1008.

At FIG. 10D, further in response to detecting the movement of user 1003, computer system 1000 increases the depth separation between lamb 1008 and hill 1010 and clouds 1012 by pushing hill 1010 and clouds 1012 to the depth of layer 1009*g*, such that the separation between media playback controls 1016 and hill 1010 and clouds 1012 appears to user(s) as approximately 8 inches. In some embodiments, increasing the separation further provides additional visual feedback to the user as to the interactive nature of media playback controls 1016. At FIG. 10D, computer system 1000 detects touch input 1020*a* at play affordance 1016*b*. In some embodiments, touch input 1020*a* is a single finger tap, a multi-finger tap, a tap-and-hold, a swipe, or another touch input made using one or more fingers.

Figure 10E:
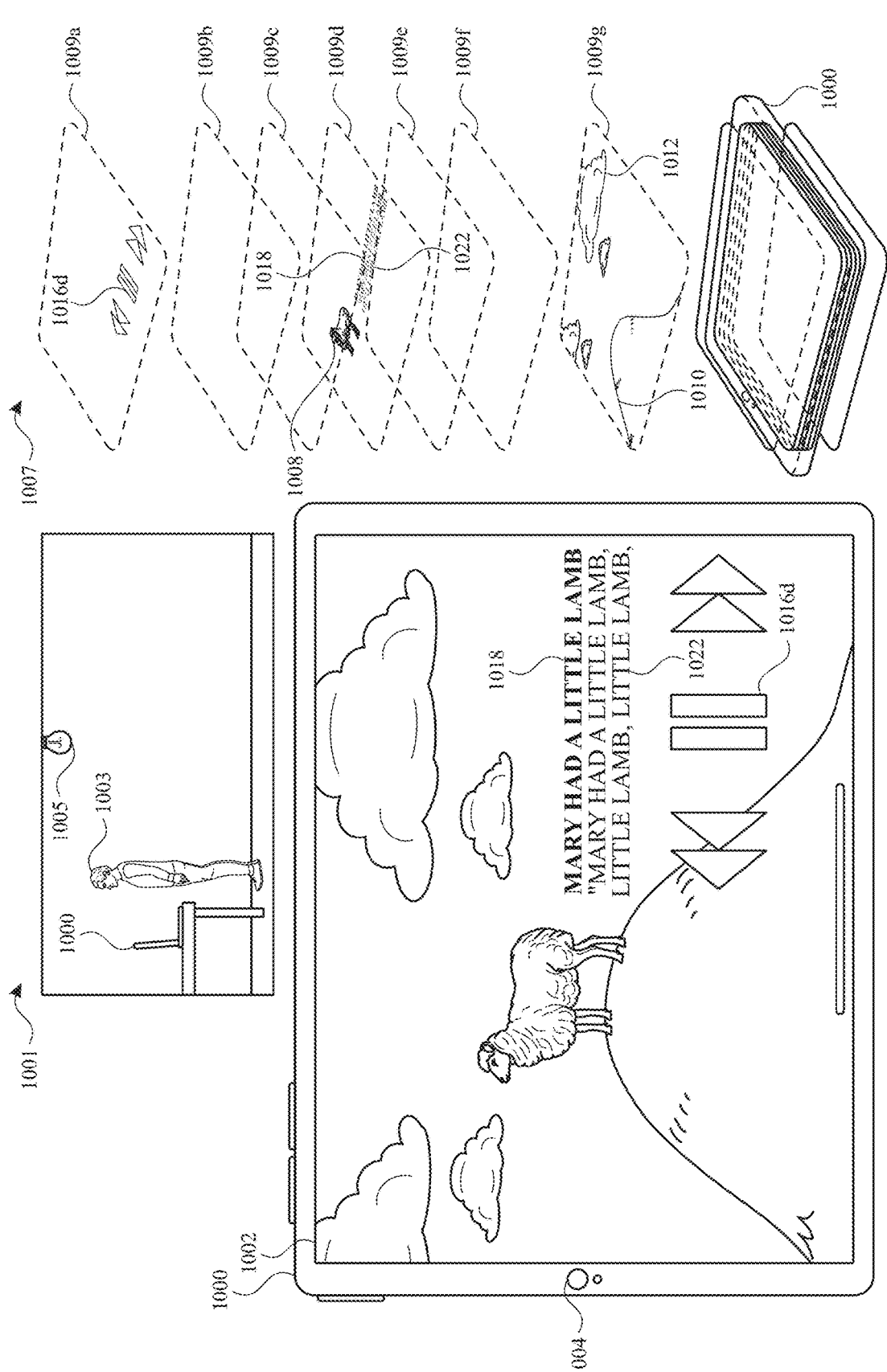

At FIG. 10E, in response to touch input 1020*a*, computer system 1000 begins audio playback of the current media item (e.g., the song "Mary Had a Little Lamb") and displays lyrics 1022. Lyrics 1022 are displayed at the depth of layer 1009*d*, which is the same depth at which lamb 1008 and media title 1018 are displayed. In some embodiments, lyrics 1022 are user-selectable (e.g., a user can touch on the lyrics and scroll them forwards or backwards by moving the contact). Computer system 1000 also replaces play affordance 1016*b* with pause affordance 1016*d*. In some embodiments, computer system 1000 displays additional content at a stereoscopic depth that is different than the stereoscopic depth of the selectable user interface element (e.g., the affordance or control) that was selected by a user to better utilize screen real estate and to provide visual feedback as to the element invoked by selection of a selectable user interface element (e.g., play affordance 1016*b*).

Figure 10F:
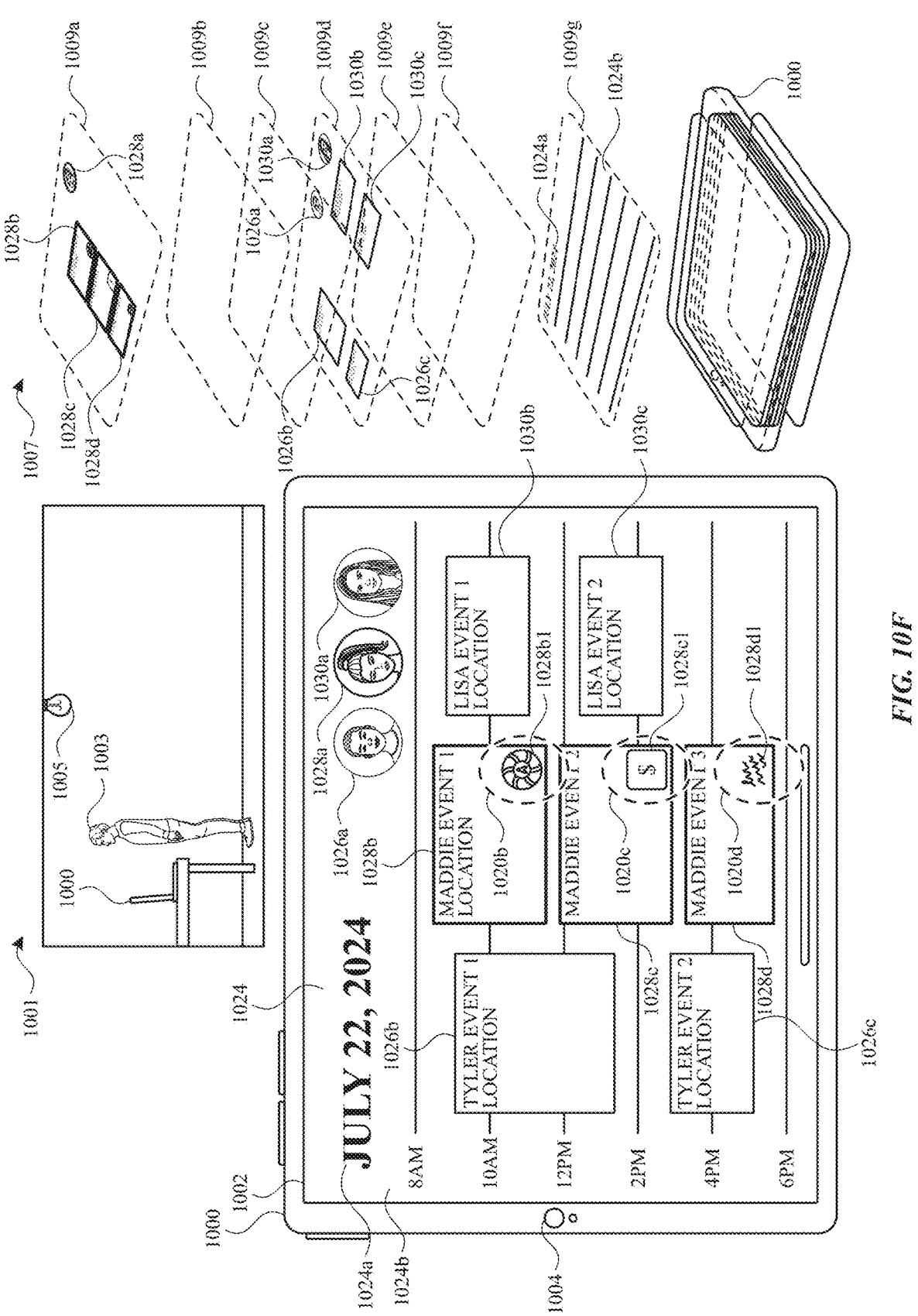

At FIG. 10F, computer system 1000 displays stereoscopic calendar user interface 1024. In some embodiments, stereoscopic calendar user interface 1024 is managed and/or generated by a calendar application installed on computer system 1000. Stereoscopic calendar user interface 1024 provides a day view of the current day, Jul. 22, 2024, and includes first member affordance 1026*a* that corresponds to a first member ("Tyler") of a household associated with computer system 1000, second member affordance 1028*a* that corresponds to a second member ("Maddie") of the household, and third member affordance 1030*a* that corresponds to a third member ("Lisa") of the household. At FIG. 10F, second member, Maddie, is currently selected (e.g., in focus), as indicated by the visual emphasis of second member affordance 1028*a*. Stereoscopic calendar user interface 1024 also includes first member event object 1026*b* and first member event object 1026*c* that correspond to events scheduled for the first member of the household. Similarly, stereoscopic calendar user interface 1024 also includes second member event object 1028*b*, second member event object 1028*c*, and second member event object 1028*d* that correspond to events scheduled for the second member of the household. Stereoscopic calendar user interface 1024 also includes third member event object 1030*b* and third member event object 1030*c* that correspond to events scheduled for the third member of the household. Because second member, Maddie, is currently selected, second member event object 1028*b*, second member event object 1028*c*, and second member event object 1028*d* are also visually emphasized. Second member event object 1028*b* includes map affordance 1028*b*1, second member event object 1028*c* includes reminder affordance 1028*c*1, and second member affordance 1028*d* includes note affordance 1028*d*1, the functions of which are discussed in more detail below. At FIG. 10F, stereoscopic calendar user interface 1024 also includes date indication 1024*a* ("Jul. 22, 2024") and time indications 1024*b*.

At the right-hand side of FIG. 10F, schematic 1007 depicts the perceived depth at which computer system 1000 displays each visual element of stereoscopic calendar user interface 1024. Specifically, second member affordance 1028*a*, second member event object 1028*b*, second member event object 1028*c*, and second member event object 1028*d* are all displayed at the depth of layer 1009*a* and appear closest from the perspective of a user, because second member, Maddie, is currently selected. First member affordance 1026*a* and third member affordance 1030*a*, along with corresponding first member event object 1026*b*, first member event object 1026*c*, third member event object 1030*b*, and third member event object 1030*c*, are displayed at the depth of layer 1009*d* because the first and third members are not currently selected. Date indication 1024*a* and time indications 1024*b* are displayed at the depth of layer 1009*g* and appear further from the perspective of a user.

At FIG. 10F, computer system 1000 detects touch input 1020*b* corresponding to map affordance 1028*b*1, touch input 1020*c* corresponding to reminder affordance 1028*c*1, and touch input 1020*d* corresponding to note affordance 1028*d*1. In some embodiments touch inputs 1020*b*, 1020*c*, and 1020*d* are independently a single finger tap, a multi-finger tap, a tap-and-hold, a swipe, or another touch input made using one or more fingers.

Figure 10G:
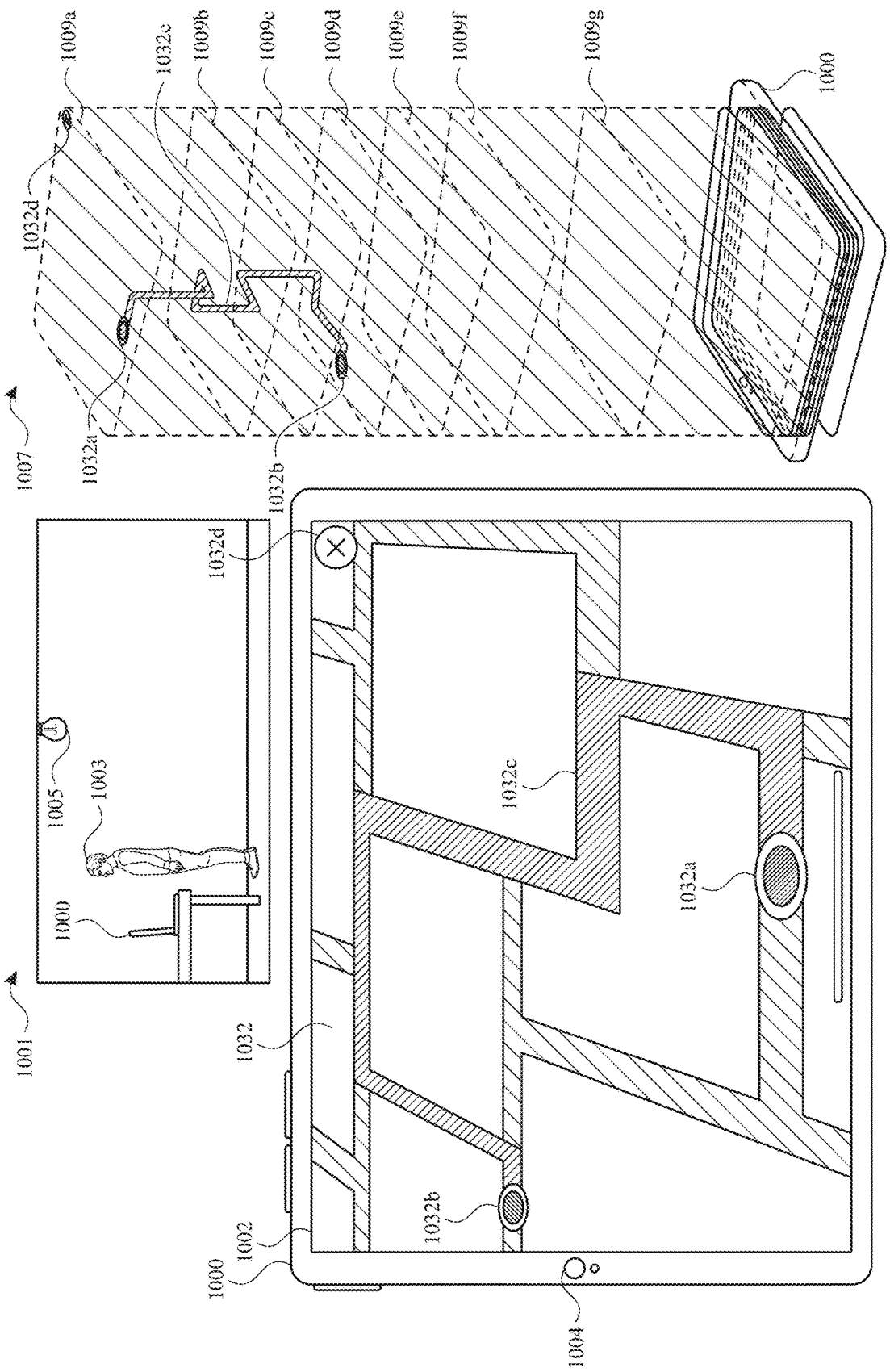

At FIG. 10G, in response to detecting touch input 1020*b* corresponding to map affordance 1028*b*, computer system 1000 displays stereoscopic map user interface 1032. As shown in FIG. 10G, stereoscopic map user interface 1032 replaces stereoscopic calendar user interface 1024. In some embodiments, stereoscopic map user interface 1032 is overlayed on stereoscopic calendar user interface 1024 such that it appears visually on top of stereoscopic calendar user interface 1024 and at a depth higher than that of stereoscopic calendar user interface 1024. Map user interface 1032 shows a route to the location of event 1 that corresponds to second member event object 1026*b*. The route starts at current location 1032*a* and ends at destination location 1032*b* and includes recommended street route 1032*c* for navigating to the location of event 1. As shown in the right-hand side of FIG. 10G, the route is stereoscopically depicted with current location 1032*a* shown at a depth corresponding to layer 1009*a*, destination location 1032*b* shown at a depth corresponding to layer 1009*d* and recommended street route 1032 shown at multiple depths connecting current location 1032*a* and destination location 1032*b*. Thus, a user perceives the route as progressing from a depth closest to the user to a depth further away. In some embodiments, one or more elements of stereoscopic map user interface 1032 are user selectable. For example, a user can interact with one or more elements of interface to scroll the map, to preview the route, and/or to alter the starting point or ending point. Stereoscopic map user interface 1032 also includes close affordance 1032*d*, displayed at a depth corresponding to layer 1009*a*, that can be selected (e.g., via a touch input) to return to stereoscopic calendar user interface 1024, as seen in FIG. 10F.

Figure 10H:
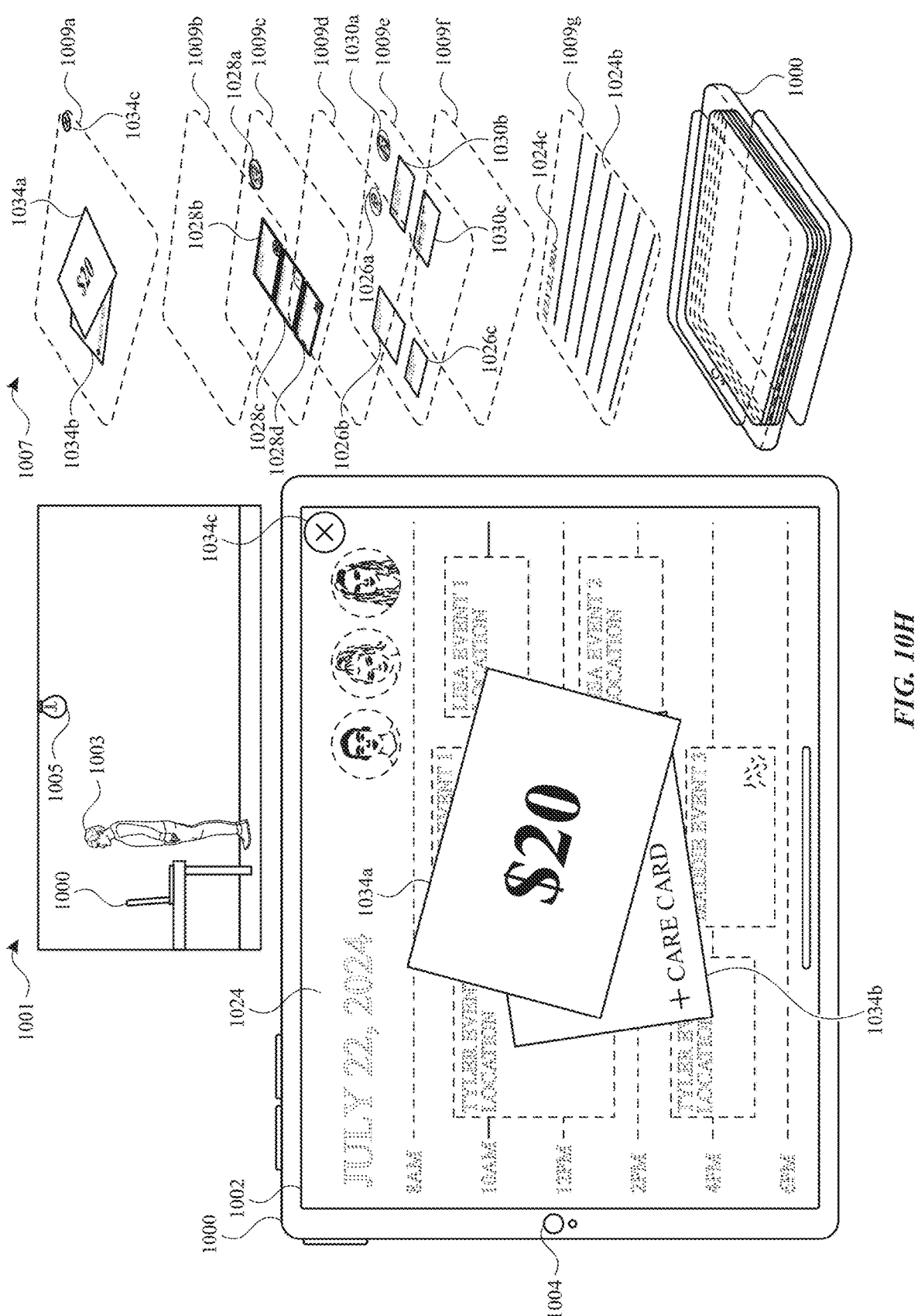

At FIG. 10H, in response to detecting touch input 1020*c* corresponding to reminder affordance 1028*c* (FIG. 10F), computer system 1000 displays, in stereoscopic calendar user interface 1024, reminder object 1034*a* and reminder object 1034*b*. Event 2 for second member, Maddie, is a medical appointment and reminder object 1034*a* indicates that a copayment of $20 is required for the appointment, while reminder object 1034*b* indicates that an insurance card is also required for the appointment. At FIG. 10H, computer system 1000 also displays close affordance 1034*c* that can be selected to return to stereoscopic calendar user interface 1024, as seen in FIG. 10F. In some embodiments, reminder object 1034*a* and/or reminder object 1034*b* are selectable (e.g., to display additional information about the copayment and/or the insurance card item). As shown in schematic 1007 of FIG. 10H, reminder objects 1034*a* and 1034*b*, along with close affordance 1034*c*, are shown closest from the perspective of the user at a depth corresponding to layer 1009*a* while the remainder of stereoscopic calendar user interface 1024 is shown at depths that are perceived as being further away from the perspective of the user. As shown in FIG. 10H, the other visual elements of stereoscopic calendar user interface 1024 are pushed further away from the perspective of the user relative to the depths at which those elements were displayed in FIG. 10F. In some embodiments, those other elements remain at the depths they were displayed in FIG. 10F and reminder objects 1034*a* and 1034*b* are displayed at a depth that is closer than the depth at which any element of stereoscopic calendar user interface 1024 was displayed in FIG. 10F.

Figure 10I:
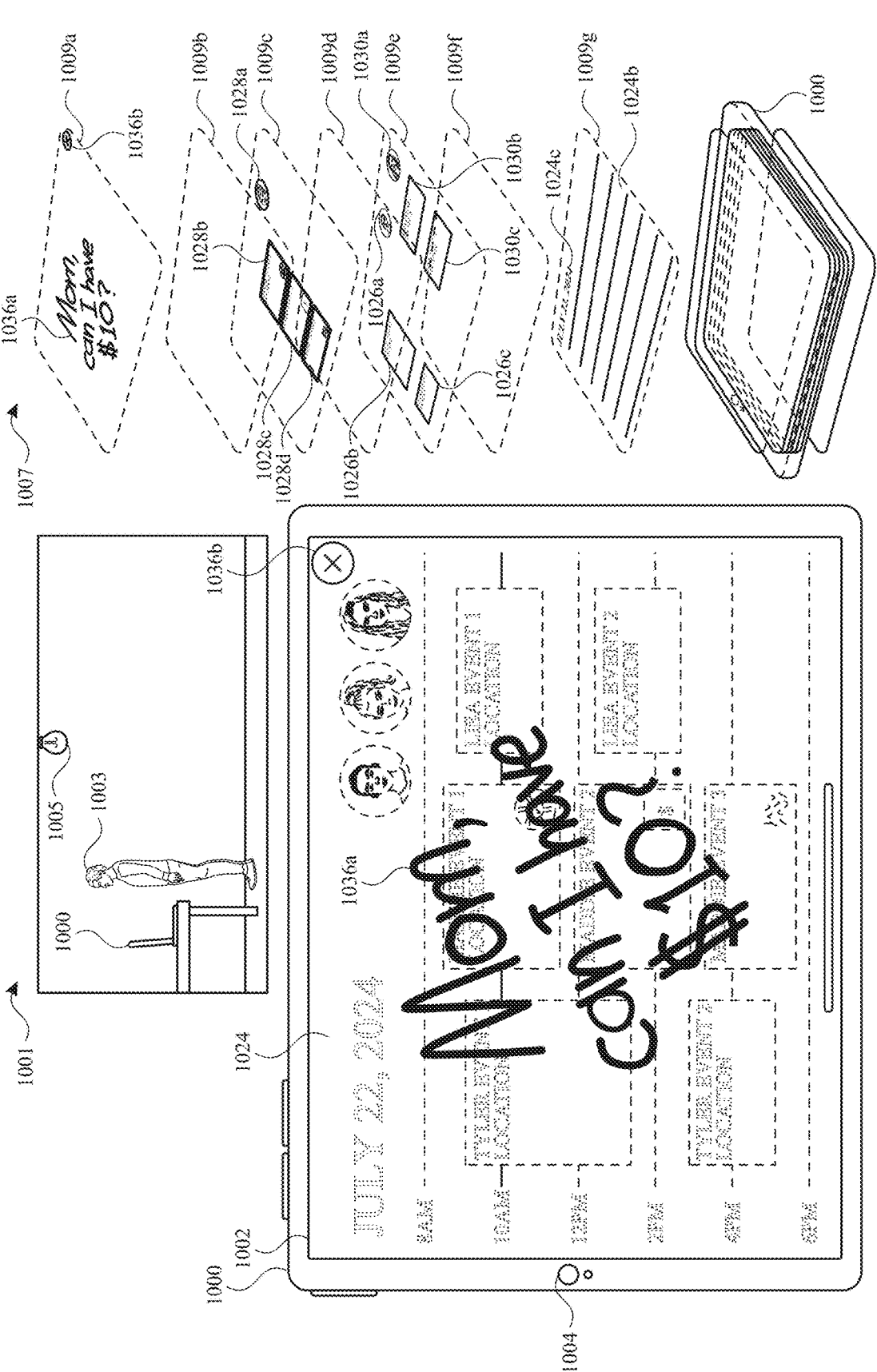

At FIG. 10I, in response to detecting touch input 1020*d* corresponding to note affordance 1028*d* (FIG. 10F), computer system 1000 displays, in stereoscopic calendar user interface 1024, note object 1036*a*. Event 3 for second member, Maddie, is a movie and corresponds to a note from Maddie requesting $10. At FIG. 10I, computer system 1000 also displays close affordance 1036*b* that can be selected to return to stereoscopic calendar user interface 1024, as seen in FIG. 10F. As shown in schematic 1007 of FIG. 10I, note object 1036*a*, along with close affordance 1036*b*, is shown closest from the perspective of the user at a depth corresponding to layer 1009*a* while the remainder of stereoscopic calendar user interface 1024 is shown at depths that are perceived as being further away from the perspective of the user. As shown in FIG. 10I, the other visual elements of stereoscopic calendar user interface 1024 are pushed further away from the perspective of the user relative to the depths at which those elements were displayed in FIG. 10F. In some embodiments, those other elements remain at the depths they were displayed in FIG. 10F and note object 1036*a* is displayed at a depth that is closer than the depth at which any element of stereoscopic calendar user interface 1024 was displayed in FIG. 10F.

Figure 10J:
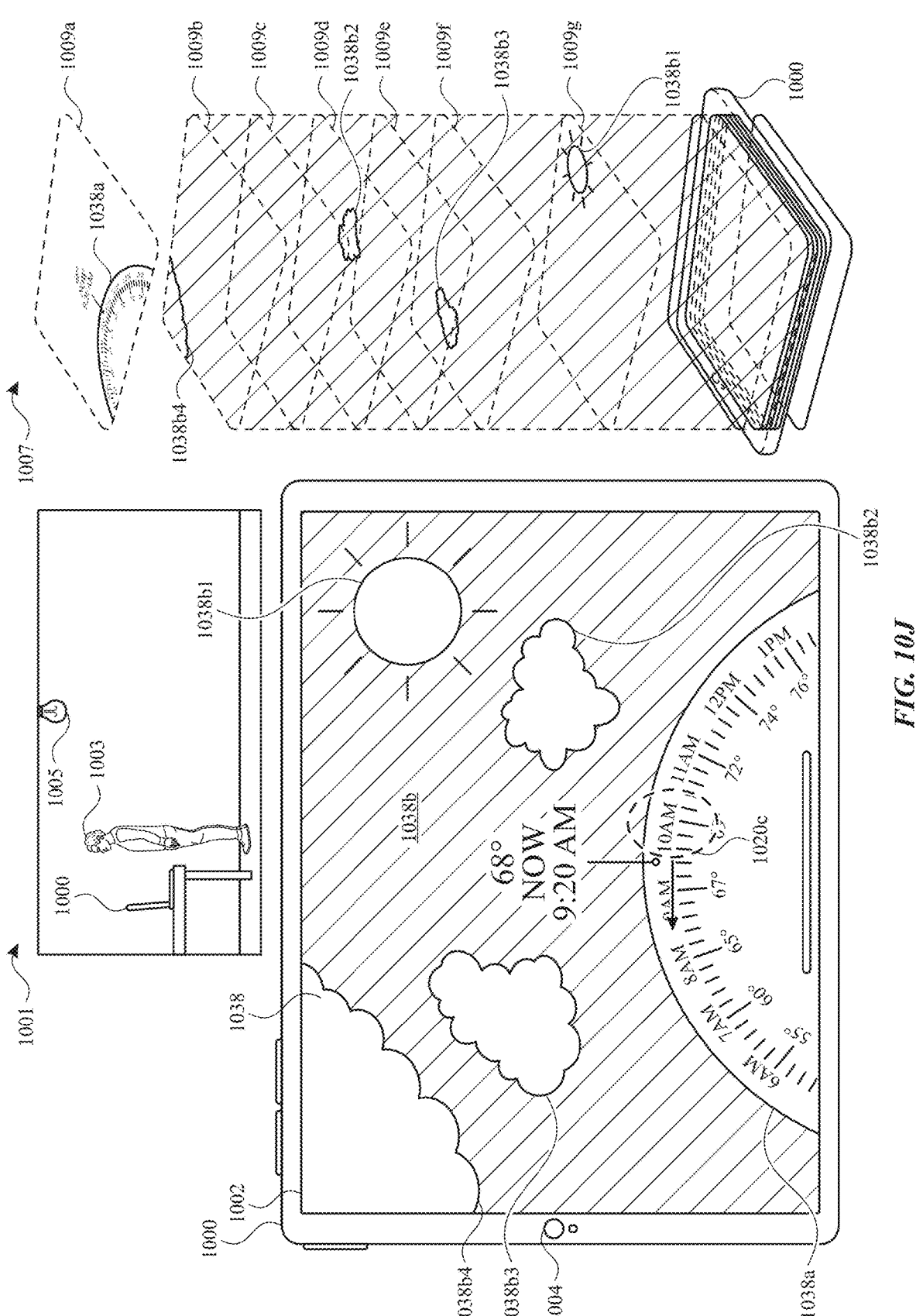

At FIG. 10J, computer system 1000 displays stereoscopic weather user interface 1038. In some embodiments, stereoscopic weather user interface 1038 is managed and/or generated by a weather application installed on computer system 1000. Stereoscopic weather user interface 1038 includes user-selectable dial 1038*a* that indicates past and forecasted temperatures at various times throughout the day. In FIG. 10J, dial 1038*a* is currently set to the current time (9:20 AM) and shows a current temperature of 68°. Stereoscopic weather user interface 1038 also includes stereoscopic weather representation 1038*b* that graphically depicts weather conditions at the current location. Because weather conditions are currently fair, with clear skies, stereoscopic weather representation 1038*b* includes sun 1038*b*1 and light clouds 1038*b*2-1038*b*4.

At the right-hand side of FIG. 10J, schematic 1007 depicts the perceived depth at which computer system 1000 displays each visual element of stereoscopic weather user interface 1038. Specifically, dial 1038*a* are displayed at the depth of layer 1009*a*, while elements of stereoscopic weather representation 1038*b* are displayed at varying depths ranging from layer 1009*b* (cloud 1038*b*4) to layer 1009*f* (sun 1038*b*1). In some embodiments, each visual element of stereoscopic weather representation 1038*b* is shown with volumetric depth, rather than being constrained to a single depth layer. At FIG. 10J, computer system 1000 detects leftwards swipe input 1020*e* at dial 1038*a*. In some embodiments, swipe input 1020*e* is a single finger tap, a multi-finger tap, a tap-and-hold, a swipe in a different direction, or another touch input made using one or more fingers.

Figure 10K:
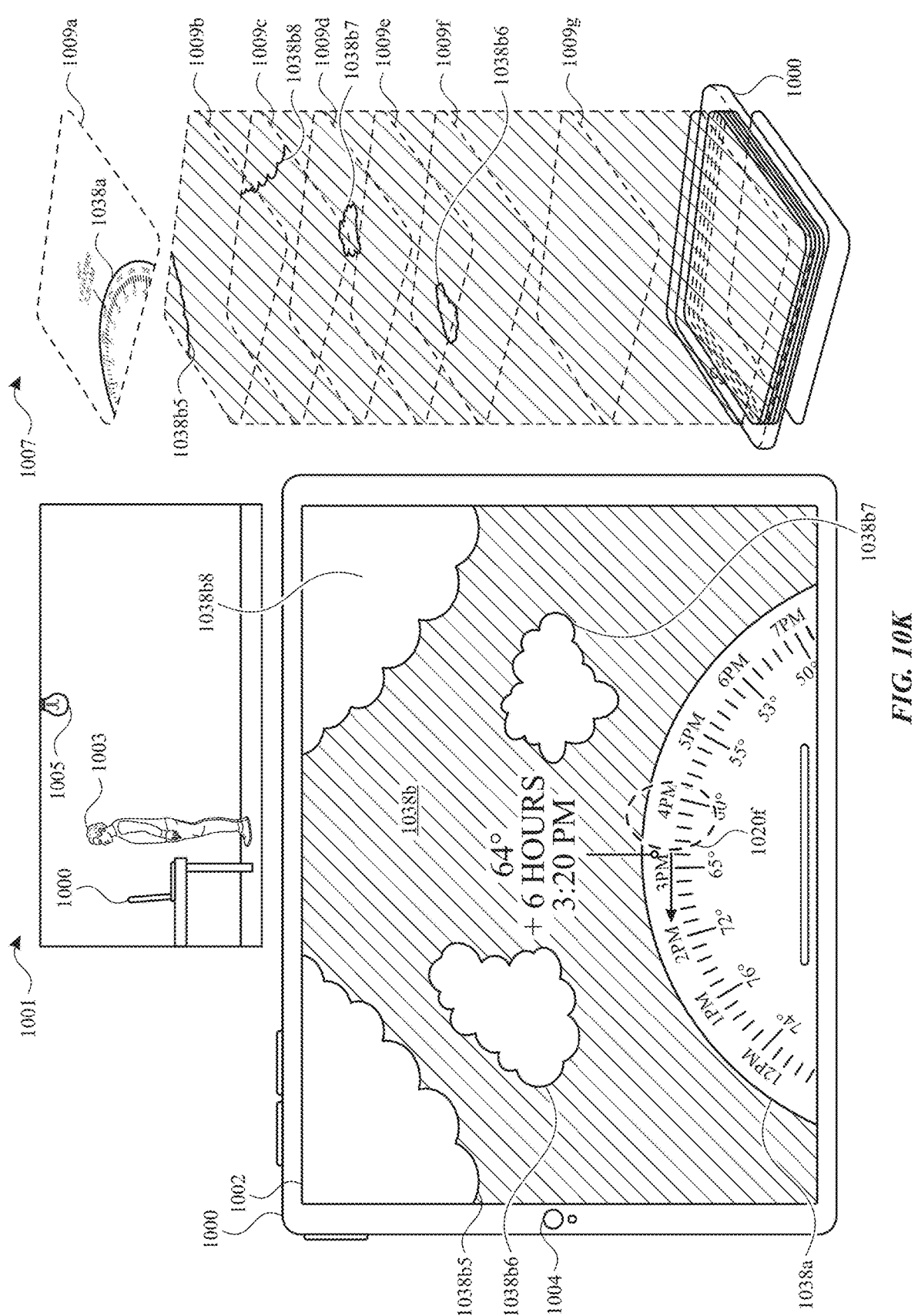

At FIG. 10K, in response to swipe input 1020*e*, computer system 1000 rotates dial 1038*a* by an amount that is based on the amount of movement of swipe input 1020*e*. Dial 1038*a* now shows the forecasted temperature (64°) at 3:20 PM, which is 6 hours forward from the current time. Further in response to swipe input 1020*e*, computer system 1000 updates stereoscopic weather representation 1038*b* to graphically depict the forecasted weather conditions at the current location at 3:20 PM. Specifically, stereoscopic weather representation 1038*b* now includes heavier clouds 1038*b*5-1038*b*8 and no longer includes sun 1038*b*1, representing cloudy skies. At FIG. 10K, computer system 1000 detects further swipe input 1020*f*, which is a continuation of swipe input 1020*e* (e.g., the contact of swipe input 1020*e* was maintained).

Figure 10L:
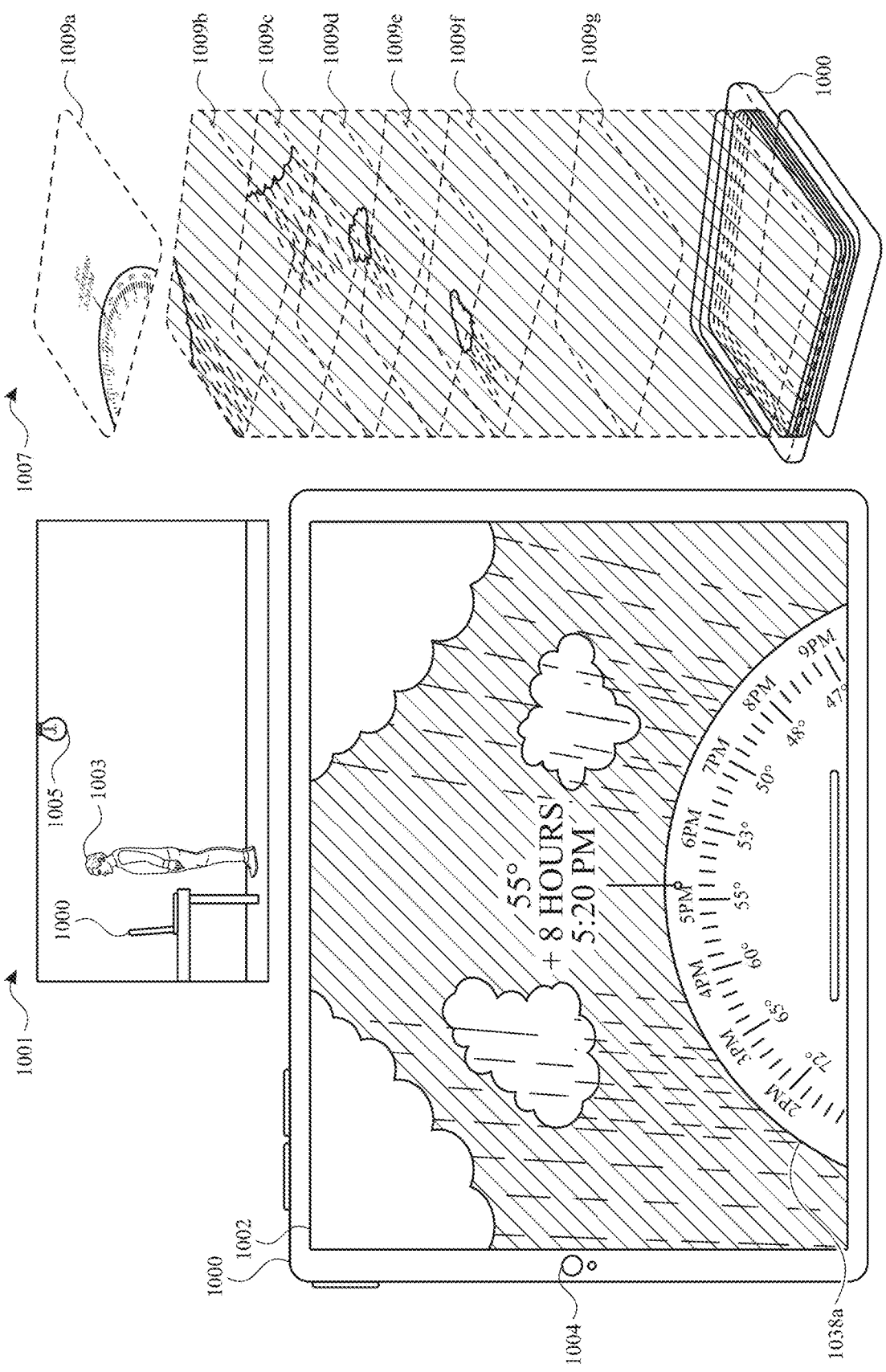

At FIG. 10L, in response to further swipe input 1020*f*, computer system 1000 rotates dial 1038*a* by an amount that is based on the amount of movement of further swipe input 1020*f*. Dial 1038*a* now shows the forecasted temperature (64°) at 5:20 PM, which is 8 hours forward from the current time. Further in response to further swipe input 1020f, computer system 1000 updates stereoscopic weather representation 1038b to graphically depict the forecasted weather conditions at the current location at 5:20 PM. Specifically, stereoscopic weather representation 1038b now includes rain, representing rainy conditions. In some embodiments, computer system maintains the state shown in FIG. 10L only as long as touch contact (e.g., the contact of swipe input 1020e and/or further swipe input 1020f) is maintained. Upon detecting cessation of the contact, computer system 1000 reverts stereoscopic weather user interface 1038 to the state shown in FIG. 10J (e.g., to the current time).

Figure 10M:
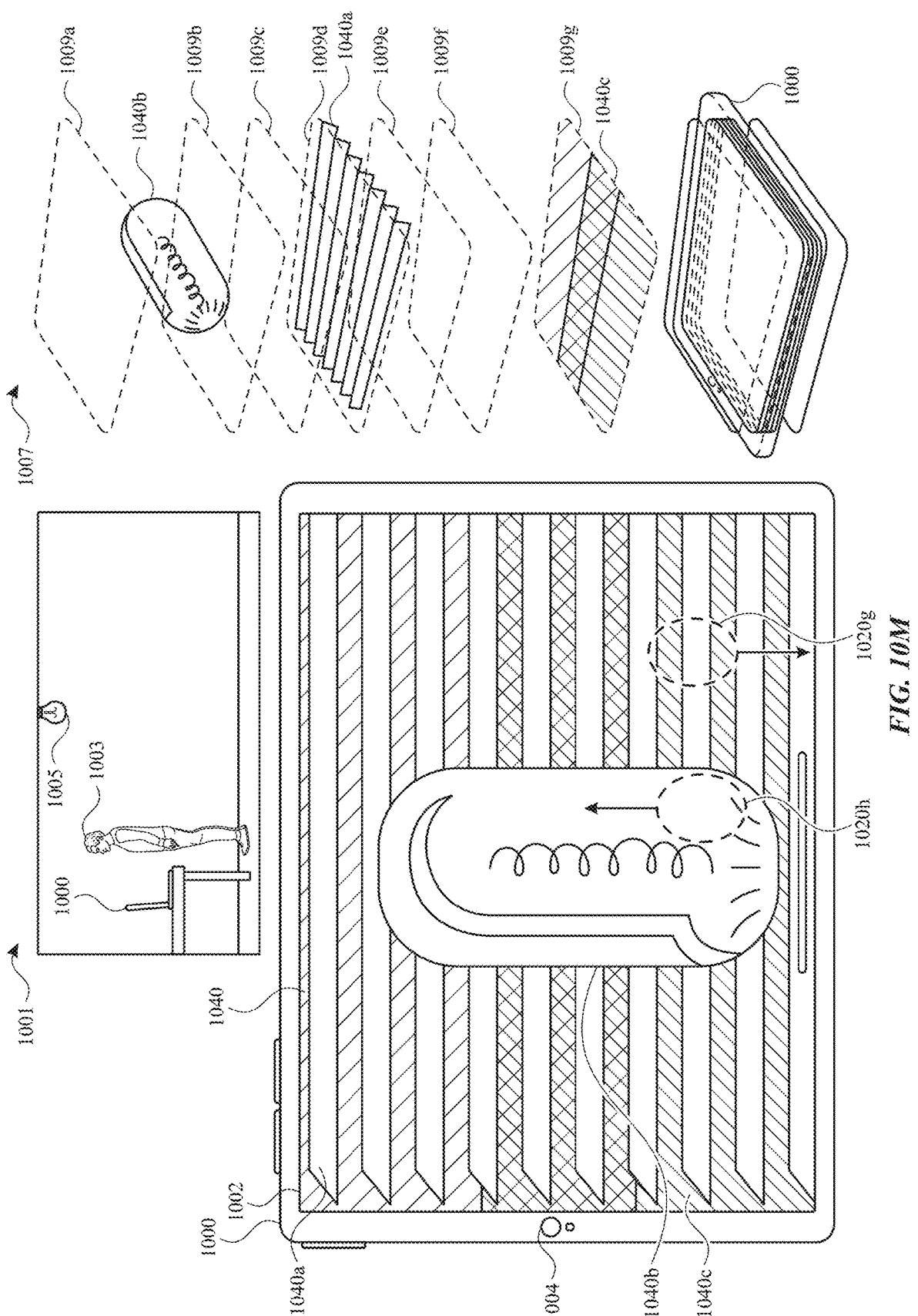

At FIG. 10M, computer system 1000 displays stereoscopic control user interface 1040. In some embodiments, stereoscopic control user interface 1040 is managed and/or generated by a home automation and/or accessory control application installed on computer system 1000. Stereoscopic control user interface 1040 includes user-selectable blinds affordance 1040a that controls a set of smart blinds installed in a location (e.g., a home) associated with computer system 1000. Stereoscopic control user interface 1040 also includes user-selectable light affordance 1040b that controls a smart light bulb (e.g., light 1005) installed at the location associated with computer system 1000. Environmental representation 1040c depicts a portion of the environment that would be visible behind the smart blinds controlled by blinds affordance 1040a. At FIG. 10M, the appearance of blinds affordance 1040a indicates that the set of blinds are mostly open and the appearance of light affordance 1040b indicates that the associated light is off.

At the right-hand side of FIG. 10M, schematic 1007 depicts the perceived depth at which computer system 1000 displays each visual element of stereoscopic control user interface 1040. Specifically, light affordance 1040b appears to the user as an object having volumetric depth at a depth position between layers 1009a and 1009b. Blinds affordance 1040a appears to the user as an object having volumetric depth at a depth position corresponding to layer 1009d. Environmental representation 1040c appears to the user as being the further away, at a depth corresponding to layer 1009g.

At FIG. 10M, computer system 1000 detects downwards swipe input 1020g at blinds affordance 1040a and upwards swipe input 1020h at light affordance 1040b. In some embodiments, downwards swipe input 1020g and/or upwards swipe input 1020h are independently a single finger tap, a multi-finger tap, a tap-and-hold, a swipe in a different direction, or another touch input made using one or more fingers.

Figure 10N:
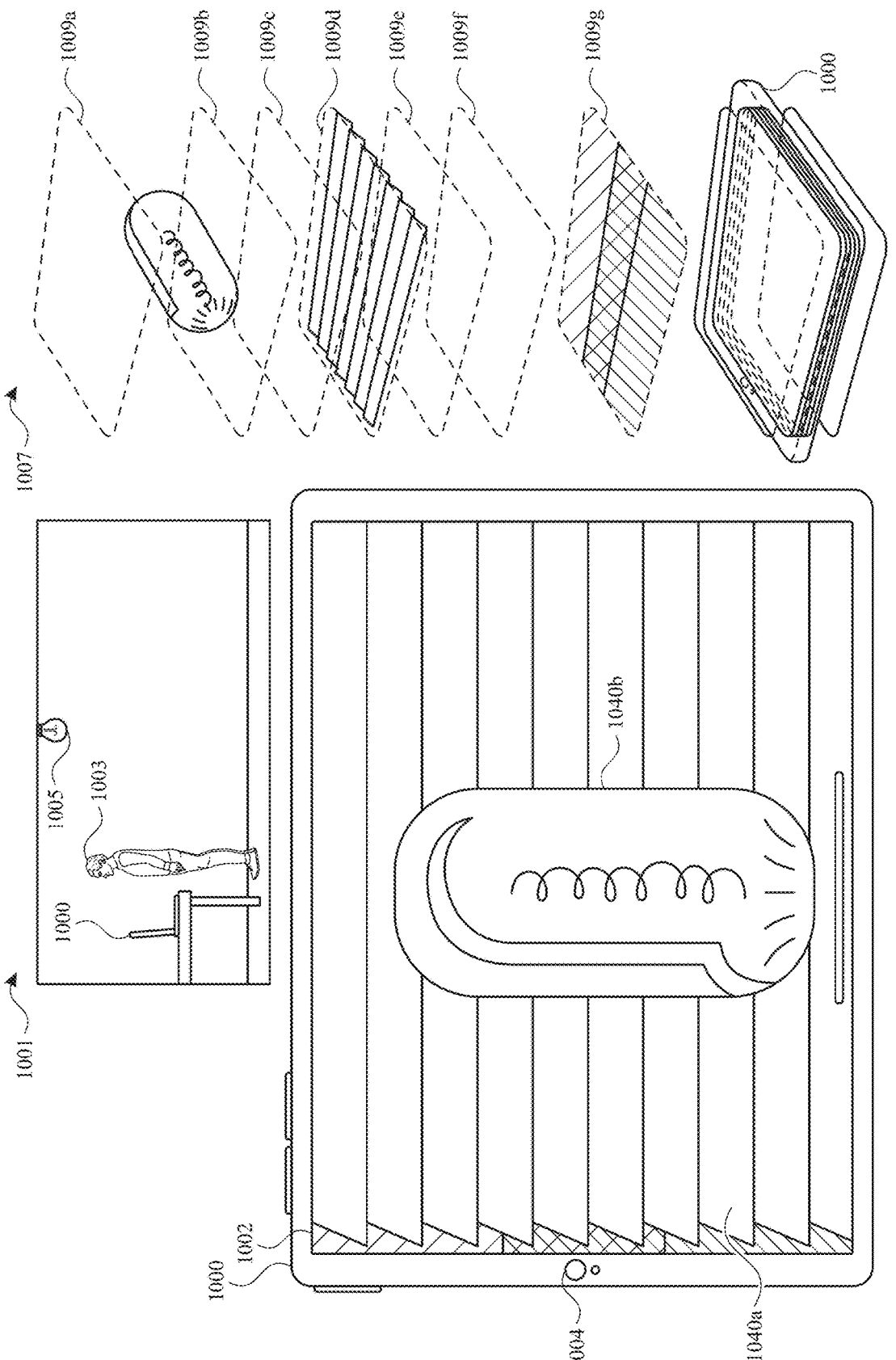
Figure 100:
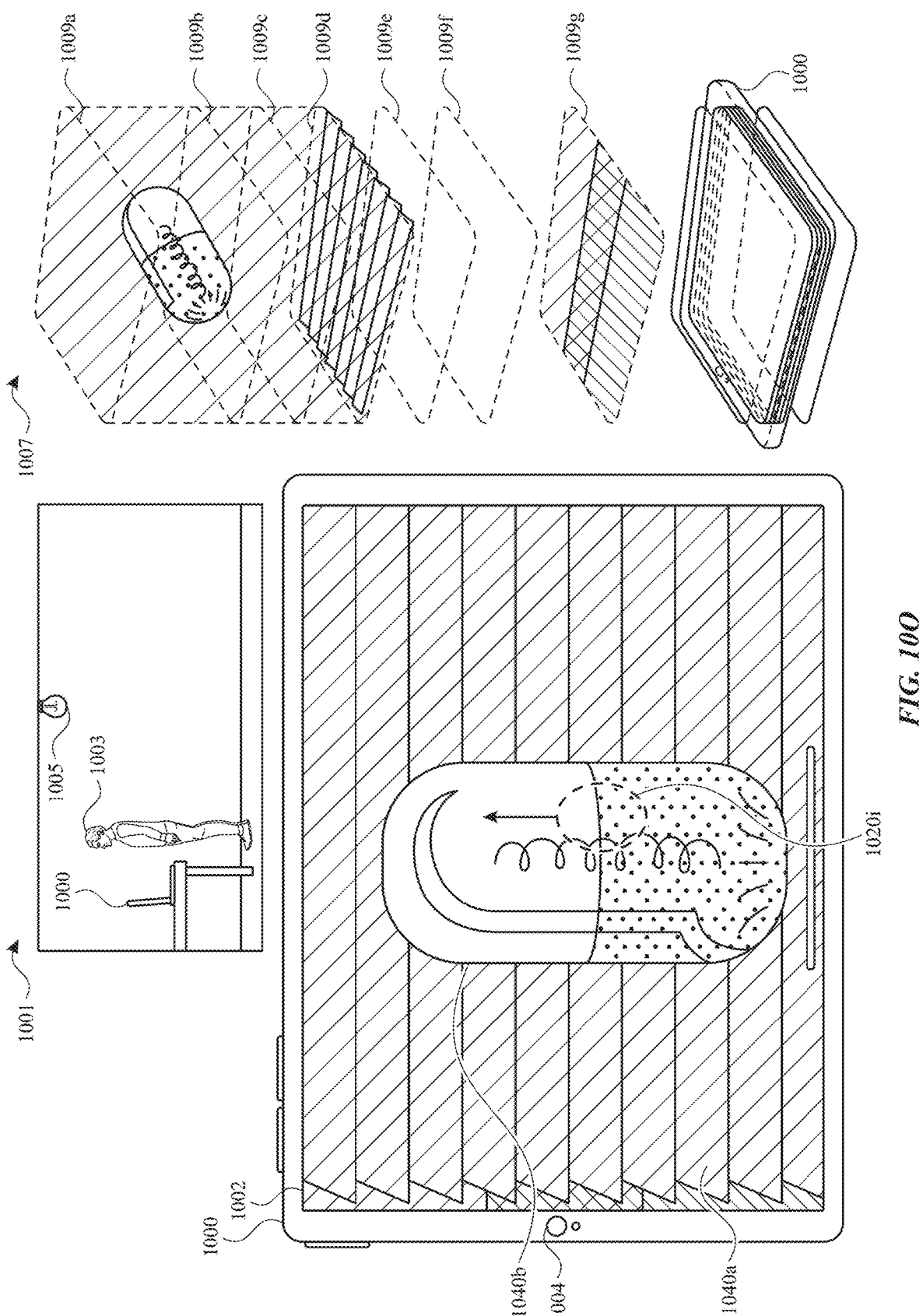
Figure 10P:
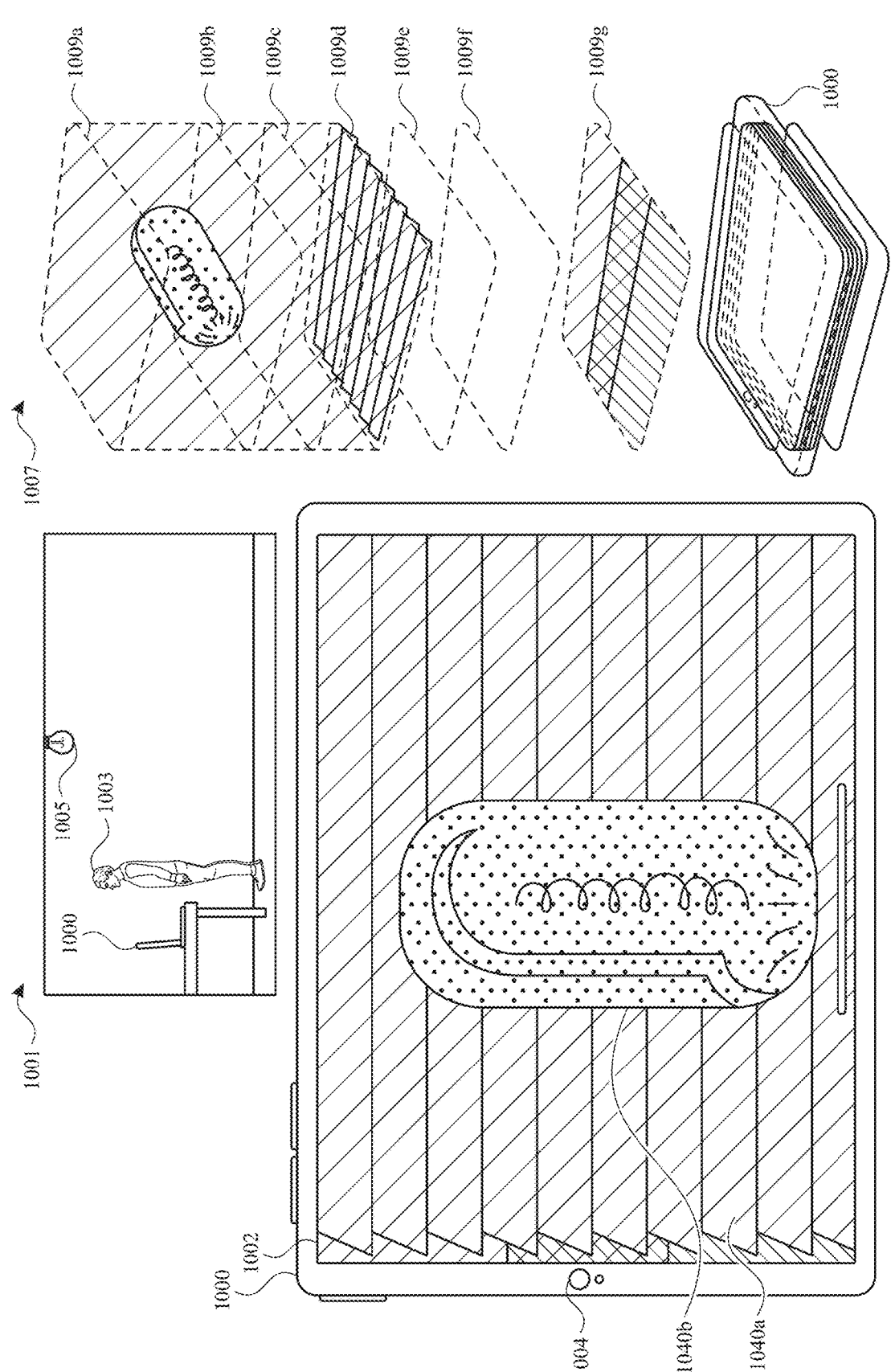

At FIG. 10N, in response to downwards swipe input 1020g, computer system 1000 sends a control signal to the set of smart blinds that are controlled via blinds affordance 1040a that causes the slats of the set of smart blinds to rotate towards a closed position by an amount that is based on the amount of movement of downwards swipe input 1020g; computer system also updates the appearance of blinds affordance 1040a to reflect the updated closed state of the set of smart blinds.

At FIG. 10O, in response to upwards swipe input 1020h (FIG. 10M), computer system 1000 sends a control signal to the light that is controlled via light affordance 1040b that causes the light to illuminate by an amount that is based on the amount of movement of upwards swipe input 1020h. As seen in FIG. 10O, the light is illuminated to 50% of its maximum brightness, as reflected by the change in appearance of light affordance 1040b. Computer system 1000 also updates the appearance of blinds affordance 1040a to reflect light being outputted by light affordance 1040b. At FIG. 10O, computer system detects further swipe input 1020i, which is a continuation of the upwards input of upwards swipe 1020h.

At FIG. 10P, in response to further swipe input 1020i, computer system 1000 sends a control signal to the light that is controlled via light affordance 1040b that causes the light to illuminate by an additional amount that is based on the amount of movement of further swipe input 1020i. As seen in FIG. 10P, the light is now illuminated to 100% of its maximum brightness, as reflected by the change in appearance of light affordance 1040b. Computer system 1000 also further updates the appearance of blinds affordance 1040a to reflect the increased light being outputted by light affordance 1040b.

FIG. 11 is a flow diagram illustrating a method for providing and/or displaying a three-dimensional user interface based on input from a user using a computer system in accordance with some embodiments. Method 1100 is performed at a computer system (e.g., 100, 300, 500, 600, and/or 1000) (e.g., a smart phone, a smart watch, a tablet, a laptop, a desktop, a wearable device, a wrist-worn device, and/or a head-mounted device) that is in communication with a touch-sensitive surface (e.g., a capacitive or resistive touch-sensitive surface configured to detect one or more contacts, such as finger contacts) and one or more stereoscopic display generation components (e.g., a stereoscopic display). In some embodiments, the one or more stereoscopic display generation components includes a touch-sensitive display that integrates the touch-sensitive surface. In some embodiments, the one or more stereoscopic display generation components includes a lenticular display (e.g., a lenticular lens system) that can concurrently display images to different angular ranges, which enables the lenticular display to display different images to two different eyes of a user, where the different images are generated to create the illusion of stereoscopic depth. In some embodiments, the computer system is in communication with one or more sensors that are capable of detecting a position of a user and/or a gaze direction and/or viewing angle of a user.

The computer system (e.g., 1000) displays (1102), via the one or more stereoscopic display generation components (e.g., 1002) (e.g., a touch-sensitive stereoscopic display), a first user interface object (e.g., 1016b) at a first stereoscopic depth (e.g., 1009a) (e.g., a simulated depth such that the user perceives the first user interface object as being a predetermined distance (e.g., 1 inch, 6 inches, 1 foot, or 2 feet closer or further) from a display surface of the one or more stereoscopic display generation components); in some embodiments, the content of the user interface includes a plurality of distinct layers in the z-direction (e.g., a depth direction; a direction that is perpendicular to a display surface; and/or a direction that is perpendicular to at least one of the one or more stereoscopic display generation components) and the first user interface object is perceived to be at one layer of the plurality of layers. In some embodiments, the layer at which the first user interface object is perceived appears to the user as being closer to the user than a display surface of the one or more stereoscopic display generation components. In some embodiments, the layer at which the first user interface object is perceived appears to the user as being further from the user than a display surface of the one or more stereoscopic display generation components. In some embodiments, the first user interface object is displayed at a layer that is perceived by the user to be at the same depth as the display surface of the one or more stereoscopic display generation components (e.g., the stereoscopic user interface include various elements that are perceived as being at various depths relative to the display surface of the one or more stereoscopic display generation components, but the first user interface object appears to be on the display surface).

The computer system detects (1104), via the touch-sensitive surface (e.g., 1002), a first input (e.g., 1020*a*) (e.g., a touch input and/or finger contact, such as a tap, swipe, or pinch gesture) corresponding to the first user interface object (e.g., 1016*b*) (e.g., the object displayed via the stereoscopic display, such as a touch-sensitive stereoscopic display).

In response to detecting the first input (e.g., 1020*a*), the computer system displays (1106), via the one or more stereoscopic display generation components, a second user interface object (e.g., 1022) at a second stereoscopic depth (e.g., 1009*d*) that is different from the first stereoscopic depth (e.g., 1009*a*) (e.g., the second user interface object appears closer or further from a reference point, such as a surface of the stereoscopic display generation component and/or a viewpoint of the user, than the first user interface object). In some embodiments, the first user interface object continues to be displayed when the second user interface object is displayed. In some embodiments, the first user interface object ceases to be displayed or its appearance changes, when the second user interface object is displayed. In some embodiments, the second user interface object is displayed at a layer that appears further away than a display surface of the one or more stereoscopic display generation components while the first user interface object is displayed at a layer that appears closer than a display surface of the one or more stereoscopic display generation components, or vice versa. Displaying a second user interface object at a second stereoscopic depth in response to an input corresponding to the first user interface object provides improved visual feedback to the user regarding the detected input. Doing so also allows for better utilization of display real estate by utilizing depth, which can allow for objects to occupy the same space within a given plane (e.g., a plane that is parallel to a display surface), while helping users to better perceive different objects. Allowing for better utilization of the display real estate enhances the operability of the computer system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first user interface object (e.g., 1016*b*) is displayed in a three-dimensional user interface (e.g., 1006) (e.g., an interface, presented by a stereoscopic display, that includes visual elements/objects at different perceived depths; a stereoscopic user interface). The three-dimensional user interface includes a third user interface object (e.g., 1010) (e.g., an interactive/selectable object) at a third stereoscopic depth (e.g., 1009*g*) that is different from the first stereoscopic depth (in some embodiments, and different from the second stereoscopic depth) and that is displayed concurrently with the first user interface object (e.g., the three-dimensional user interface includes user interface objects at a plurality of different stereoscopic depths). Displaying the first user interface object in a three-dimensional user interface allows for better utilization of display real estate by utilizing depth.

In some embodiments, the third user interface object (e.g., 1010) is a non-selectable user interface object (e.g., an object that cannot be selected and/or that does not cause an operation to be performed when the user directs an input (e.g., a tap) at the object) and the first stereoscopic depth (e.g., 1009*a*) is closer to a viewpoint of a user of the computer system (e.g., a viewer of the three-dimensional user interface and/or content generated by the one or more stereoscopic display generation components) than the third stereoscopic depth (e.g., 1009*g*) (e.g., the first user interface object, which is selectable, appears closer to the user than the third user interface object). In some embodiments, the computer system generates/positions (e.g., automatically) content in the three-dimensional user interface such that selectable content is presented closer to the viewpoint of the user than non-selectable content (e.g., closer than all non-selectable content). In such embodiments, when a new selectable object is displayed, it is positioned closer to the viewpoint of the user than all existing non-selectable objects (but may or may not be closer than existing selectable objects). Displaying the selectable first user interface at a depth that is closer than a depth of a non-selectable user interface object provides improved visual feedback to the user regarding the selectability of the first user interface object. Doing so also allows for better utilization of display real estate by utilizing depth to organize objects by selectability.

In some embodiments, displaying the second user interface object (e.g., 1038*b*6) in response to detecting the first user input (e.g., 1020*d*) includes displaying the second user interface object with a first visual appearance (e.g., an initial appearance of the second user interface object). In some embodiments, the first visual appearance includes one or more of a first color, first pattern, first size, and/or first shape of the second user interface object. While displaying the second user interface object with the first visual appearance, the computer system detects (1108), via the touch-sensitive surface, a second input (e.g., 1020*f*) (e.g., a touch input and/or finger contact, such as a tap, swipe, or pinch gesture) (in some embodiments, the second input is a continuation of the first input. For example, the first input is an initial touch/contact and the second input is a subsequent drag of the same initial touch/contact). In response to detecting the second input, the computer system modifies (1110) (e.g., changing and/or updating) the second user interface object (e.g., 108*b*6) to have a second visual appearance, different from the first visual appearance (e.g., the color, shape, size, pattern, and/or content of the second user interface object changes, as seen in FIGS. 10K and 10L). In some embodiments, the second user interface object continues to be displayed at the second stereoscopic depth as its appearance is modified. In some embodiments, a characteristic (e.g., a magnitude, selected color, and/or selected pattern) of the modification is based on a characteristic of the second input (e.g., a distance and/or direction of a drag input). Modifying the second user interface object to have a second visual appearance based on input provides improved visual feedback to the user regarding the detected input.

In some embodiments, the second stereoscopic depth (e.g., 1009*a* where 1034*a* is displayed) is closer (e.g., appears closer) to the viewpoint of a user of the computer system than the first stereoscopic depth (e.g., 1009*c* where 1028*c*1 is displayed) (e.g., the second user interface object appears, to the user, as being closer than the first user interface object). Displaying the second user interface object closer to the viewpoint of the user than the first user interface object allows for better utilization of display real estate by utilizing depth.

In some embodiments, the second stereoscopic depth (e.g., 1009*d* where 1022 is displayed) is further from (e.g., appears further) a viewpoint of a user of the computer system than the first stereoscopic depth (e.g., 1009a where 1016b is displayed) (e.g., the second user interface object appears, to the user, as being further away than the first user interface object). Displaying the second user interface object further from the viewpoint of the user than the first user interface object allows for better utilization of display real estate by utilizing depth.

In some embodiments, a first portion of the second user interface object (e.g., 1038b6 at 1009f) is at the second stereoscopic depth and a second portion of the second user interface object (e.g., 1038b7) is at a fourth stereoscopic depth (e.g., 1009d), different from the second stereoscopic depth (e.g., the second user interface object includes content that is at multiple different depths). In some embodiments, the fourth stereoscopic depth is different from the first stereoscopic depth.

In some embodiments, displaying the second user interface object (e.g., 1014c) at the second stereoscopic depth includes displaying the second user interface object with first content (e.g., the second user interface includes the first content). The computer system detects a change of a viewpoint of a user (e.g., 1003) of the computer system from a first viewpoint (e.g., as seen in FIG. 10B) to a second viewpoint (e.g., as seen in FIG. 10C), different from the first viewpoint. In response to detecting the change of the viewpoint of the user of the computer system from the first viewpoint to the second viewpoint, displaying, via the one or more display generation components, the second user interface object with second content, different from the first content. In some embodiments, the second content is displayed with or without the first content when the user is at the second viewpoint. In some embodiments, displaying the second user interface object at the second stereoscopic depth includes: in accordance with a determination that a user of the computer system is at a first viewpoint, displaying the second user interface object with first content (e.g., the second user interface includes the first content); and in accordance with a determination that a user of the computer system is at a second viewpoint, different from the first viewpoint, displaying the second user interface object with second content, different from the first content. In some embodiments, the second content is displayed with or without the first content when the user is at the second viewpoint. Displaying the second user interface object with second content in response to detecting a change of the viewpoint of the user provides improved visual feedback as to the detected change. Doing so also provides the user with additional control options for interacting with the computer system, without cluttering the UI with additional controls.

In some embodiments, the change of the viewpoint of the user of the computer system from the first viewpoint to the second viewpoint is based on (e.g., includes, is determined based on, or is determined in accordance with detecting) a change in position of the one or more stereoscopic display generation components (e.g., 1002) (in some embodiments, a change in the position of the computer system). In some embodiments, detecting the change includes detecting (e.g., using one or more sensors that are in communication with the computer system, such as an accelerometer or IMU) a change in position of the one or more stereoscopic display generation components (e.g., a change in position of computer system 1000). Displaying the second user interface object with second content in response to detecting a change of the viewpoint of the user that is based on a change in position of the one or more stereoscopic display generation components provides improved visual feedback as to the detected change in position. Doing so also provides the user with additional control options for interacting with the computer system, without cluttering the UI with additional controls.

In some embodiments, the change of the viewpoint of the user (e.g., 1003) of the computer system from the first viewpoint to the second viewpoint is based on (e.g., includes, is determined based on, or is determined in accordance with detecting) a change in position of a head of the user of the computer system (e.g., as seen in FIGS. 10B and 10C). In some embodiments, a change in the position of one or more eyes of the user of the computer system. In some embodiments, detecting the change includes detecting (e.g., using one or more sensors that are in communication with the computer system, such as a camera, proximity sensor, or object position tracking sensor) a change in position of the head of the user of the computer system. In some embodiments, the change is based on both a change in position of the one or more stereoscopic display generation components and of the head of the user. Displaying the second user interface object with second content in response to detecting a change of the viewpoint of the user that is based on a change in position of the user provides improved visual feedback as to the detected change in position of the user. Doing so also provides the user with additional control options for interacting with the computer system, without cluttering the UI with additional controls.

In some embodiments, the first user interface object (e.g., 1028b1) and the second user interface object (1032) are displayed within a stereoscopic user interface (e.g., a graphical user interface that is capable of displaying graphical objects at different positions and/or depths within the user interface; a three-dimensional user interface). While the stereoscopic user interface is displayed, the computer system detects, via the touch-sensitive surface, a third input (e.g., an input directed to an element of 1032) (e.g., a tap input, a swipe input, or a touch-and-drag input corresponding to a user interface object). In response to detecting the third input, navigating within the stereoscopic user interface including modifying a position and/or depth at which the first user interface object and/or the second user interface is displayed (e.g., as discussed with reference to FIG. 10G). In some embodiments, modifying the position and/or depth at which the first user interface object and/or the second user interface are displayed includes navigating through the content displayed in the stereoscopic user interface, including one or more of panning, zooming, moving forwards or backwards (e.g., appearing to navigate through different depths of content) within the interface. In some embodiments, the first user interface object and/or the second user interface object are elements of a three-dimensional map (e.g., locations and/or markers within the map) and navigating within the stereoscopic user interface include navigating through the contents of the map. Navigating within the stereoscopic user interface in response to the third input provides improved user feedback as to the detected input. Doing so also provides an additional control option for navigation without cluttering the UI with additional displayed controls.

In some embodiments, the first user interface object (e.g., 1028d1) is an indication (e.g., a graphical and/or textual indication) of an annotation (e.g., a note or comment added by a user to existing content); and the second user interface object (e.g., 1036a) includes expanded content of the annotation (e.g., the expanded content includes content not included in the first user interface object, such as text, graphical content, one or more images, and/or video). Displaying expanded content of an annotation in response to the first input provides additional control options without cluttering the UI with the expanded content, until requested. Doing so also allows for better utilization of display real estate by utilizing depth to display the expanded content.

In some embodiments, the first user interface object (e.g., 1028*b*1) is a representation of location information (e.g., a graphical or textual representation, such as a link to an address or map location); and the second user interface object (e.g., 1032) is a representation of a map (e.g., a graphical map that includes one or more points-of-interest). Displaying a representation of a map in response to the first input provides additional control options without cluttering the UI with the representation of the map, until requested. Doing so also allows for better utilization of display real estate by utilizing depth to display the representation of the map.

In some embodiments, the representation of a map (e.g., 1032) is a stereoscopic representation of a map that includes map content that extends away from a viewpoint of a user of the computer system. In some embodiments, the map is a perspective view of the map from a user selectable viewing angle or a "street level" orthogonal view of the map. Displaying the representation of the map as stereoscopic content allows for better utilization of display real estate by utilizing depth.

In some embodiments, the computer system displays, via the one or more stereoscopic display generation components, a first lighting effect (e.g., lighting effect on 1014*c*) (e.g., a specular highlight lighting effect that simulates the effect of a defined light source from a predetermined location). In some embodiments, the first lighting effect interacts with and/or modifies the appearance of the first user interface object and/or the second user interface object. The computer system detects (e.g., via a visual light or infrared camera and/or a glint detection system), a change (in some embodiments, the change is based on movement of one or more stereoscopic display generation components, the computer system, and/or the user's head) of a viewpoint of a user (e.g., 1003) of the computer system from a third viewpoint to a fourth viewpoint, different from the third viewpoint. In response to detecting the change of the viewpoint of the user of the computer system from the third viewpoint to the fourth viewpoint, modifying a characteristic of the first lighting effect (e.g., as seen in FIGS. 10B and 10C) (e.g., a position and/or visual characteristic such as intensity, color, and/or size). Displaying a first lighting effect that is modified in response to a change of viewpoint provides improved visual feedback as to the detected change in viewpoint.

In some embodiments, the computer system concurrently displays, via the one or more stereoscopic display generation components: a second lighting effect (e.g., lighting effect on 1014*c*) (e.g., a specular highlight lighting effect that simulates the effect of a defined light source from a respective location or a predetermined location) (in some embodiments, the second lighting effect is different or the same as the first lighting effect); and a fourth user interface object (e.g., 1014*c*) at a first position (e.g., a first position that appears on or at a stereoscopic depth that appears above or below the plane of the one or more stereoscopic display generation components). In some embodiments, the fourth user interface object is the first user interface object or the second user interface object. In some embodiments, the second lighting effect affects the appearance of the fourth user interface object (e.g., the second effect is a specular highlight on the surface of the fourth user interface object). The computer system detects a change (in some embodiments, the change is based on movement of one or more stereoscopic display generation components, the computer system, and/or the user's head) in position of the fourth user interface object from the first position to a second position that is different from the first position (e.g., as shown in FIGS. 10A and 10B) (in some embodiments, the second position is at a different stereoscopic depth than the stereoscopic depth of the first position). In some embodiments, the change in position of the fourth user interface object occurs in response to a user input (e.g., a touch-and-drag input that corresponds to the fourth user interface object). In response to detecting the change in position of the fourth user interface object, the computer system modifies a characteristic of the second lighting effect (e.g., as shown in FIGS. 10A and 10B) (e.g., a position and/or visual characteristic such as intensity, color, and/or size). Displaying a second lighting effect that is modified in response to a change in position of the fourth user interface object provides improved visual feedback as to the detected change in viewpoint.

In some embodiments, after detecting (e.g., after initially detecting and/or after detecting a first portion of) the first input and in accordance with a determination that the first input continues to be detected (e.g., is maintained), the computer system continues to display the second user interface object (e.g., 1038*b*6). In some embodiments, the first input is a touch-and-hold where contact is maintained with the touch-sensitive surface and the second user interface object continues to be displayed as long as contact is maintained. In accordance with a determination that the first input has ended (e.g., detecting lift off of the first input and/or ceasing to detect the first input on the touch-sensitive surface), the computer system ceases to display the second user interface object (e.g., 1038*b*6 as discussed with reference to FIG. 10K). Ceasing to display the second user interface object in response to the first input ending provides improved visual feedback as to the detected ending.

In some embodiments, while a viewpoint of a user (e.g., 1003) of the computer system is a first distance (e.g., 10 feet, as seen in FIG. 10A) from the one or more stereoscopic display generation components and/or the computer system, the computer system displays, via the one or more stereoscopic display generation components, a fourth user interface object (e.g., 1006) that includes a third portion (e.g., 1008) and a fourth portion (e.g., 1010) that are separated by a first magnitude of depth (e.g., are displayed at different stereoscopic depths that are spaced apart by a first degree of depth separation). In some embodiments, the fourth user interface object is the first user interface object or the second interface object. The computer system detects (e.g., via a visual light or infrared camera and/or a glint detection system) that the viewpoint of the user (e.g., 1003) of the computer system has changed to a second distance (e.g., 5 feet, as seen in FIG. 10C), different from the first distance, from the one or more stereoscopic display generation components and/or the computer system. In some embodiments, as the user moves closer to or further from the stereoscopic display generation components and/or the computer system, the stereoscopic depth with which one or more displayed interface objects are displayed increases or decreases. In response to detecting that the viewpoint of the user of the computer system has changed to the second distance, the computer system changes a separation of the third portion from the fourth portion to a second magnitude of depth (e.g., as seen in FIG. 10C), different from the first magnitude of depth (e.g., the third portion and the fourth portion move closer together or further apart) (e.g., by changing a distance between images used to generate a stereoscopic effect or by changing a parameter that adjusts a simulated depth parameter). In some embodiments, as the user moves closer a stereoscopic effect with which the fourth user interface object is displayed increases and vice versa. Changing a separation of the third portion from the fourth portion to a second magnitude of depth in response to detecting that the viewpoint of the user of the computer system has changed distance provides improved visual feedback as to the detected change in distance.

In some embodiments, the first user interface object is a three-dimensional user interface object (e.g., 1040a) (e.g., is displayed with a stereoscopic effect such that it is perceived as having depth). In response to the first input (e.g., 1020g), changing a stereoscopic characteristic (e.g., a depth at which one or more portions of the first user interface object are displayed, via the one or more display generation components, and or changing a magnitude of depth with which the first user interface object is displayed) with which the first user interface object is displayed (in some embodiments, one or more other visual characteristics of the first user interface object are changed, such as color, size, position, pattern, and/or shape). Changing a stereoscopic characteristic of the first user interface object in response to the first input provides improved visual feedback as to the detected input.

In some embodiments, the computer system detects, via the touch-sensitive surface, a respective input (e.g., 1020h) (e.g., swipe, a drag, a pinch, or a de-pinch) corresponding to the first user interface object. In response to detecting the respective input: in accordance with a determination that the respective input includes movement in a first direction, performing a first operation (e.g., increasing the brightness of 1040b) associated with the first user interface object (e.g., adjusting a visual appearance of the first user interface object, adjusting a display characteristic of the one or more stereoscopic display generation components and/or the computer system, such as brightness or color temperature, and/or performing an operation that affects an external device, such as the brightness of an external light). In accordance with a determination that the respective input includes movement in a second direction, different from the first direction, performing a second operation (e.g., reducing the brightness of 1040b) associated with the first user interface object that is different from the first operation (in some embodiments, the second operation is associated with the first operation, such as the first operation including increasing a display brightness while the second operation includes decreasing the display brightness). Performing different operations based on a direction of input provides additional control options without cluttering the UI with additional displayed controls.

In some embodiments, changing the stereoscopic characteristic with which the first user interface object (e.g., 1040a) is displayed includes rotating the first user interface object (e.g., as seen in FIG. 10N) (e.g., rotating within a surface plane of the one or more stereoscopic display generation components or in a plane orthogonal to the surface plane of the one or more stereoscopic display generation components).

In some embodiments, aspects/operations of methods 700, 900, and 1100 can be interchanged, substituted, and/or added between these methods. For example, method 900 can be used to reduce and/or eliminate the risk of visual artifacts when displaying content that reacts to user inputs according to method 1100. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of user interfaces and/or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing, displaying, and/or delivering content, including three-dimensional content, the present technology can be configured to allow users to select to "opt in" or "opt out" of participation in the collection of personal information data during registration for services or anytime thereafter. In another example, users can select not to provide personal and/or private data for targeted content delivery services. In yet another example, users can select to limit the length of time private and/or personal data is maintained or entirely prohibit the development of a baseline user profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A computer system configured to communicate with one or more display generation components and one or more input devices, comprising:

one or more processors; and memory storing one or more programs configured to be executed by the one or more processors, the one or more programs including instructions for:

displaying, via the one or more display generation components, first content with a first amount of stereoscopic depth, wherein the first content includes a respective selectable user interface element that, when selected via user input, causes the computer system to perform a respective function;

while displaying the first content with the first amount of stereoscopic depth, detecting input without detecting input directed to the respective selectable user interface element, wherein detecting the input includes detecting one or more user inputs corresponding to a user request to change a state of the computer system from a low power state to a high power state; and in response to detecting the input:

displaying, via the one or more display generation components, a change in an amount of stereoscopic depth of a first portion of the first content that includes the respective selectable user interface element, wherein changing the amount of stereoscopic depth of the first portion of the first content includes changing the first portion of the first content that includes the respective selectable user interface element from having the first amount of stereoscopic depth to having a second amount of stereoscopic depth different from the first amount of stereoscopic depth; and displaying, via the one or more display generation components, a change in an amount of stereoscopic depth of a second portion of the first content, wherein the second portion of the first content is different from the first portion of the first content that includes the respective selectable user interface element, wherein changing the amount of stereoscopic depth of the second portion of the first content includes changing the second portion of the first content from having the first amount of stereoscopic depth to having a third amount of stereoscopic depth that is different from the second amount of stereoscopic depth.

2. The computer system of claim 1, wherein the second amount of stereoscopic depth is greater than the first amount of stereoscopic depth.

3. The computer system of claim 1, wherein:

detecting the input includes detecting a change in orientation of the computer system from a first orientation to a second orientation different from the first orientation; and the second amount of stereoscopic depth is greater than the first amount of stereoscopic depth.

4. The computer system of claim 1, wherein:

detecting the input includes detecting a change in orientation of the computer system from a first orientation to a second orientation different from the first orientation; and the first amount of stereoscopic depth is greater than the second amount of stereoscopic depth.

5. The computer system of claim 1, wherein:

the second amount of stereoscopic depth is greater than the first amount of stereoscopic depth; and the one or more programs further include instructions for:

after displaying the first portion of the first content changing from having the first amount of stereoscopic depth to having the second amount of stereoscopic depth, displaying, via the one or more display generation components, the first portion of the first content changing from having the second amount of stereoscopic depth to having a fourth amount of stereoscopic depth, wherein the second amount of stereoscopic depth is greater than the fourth amount of stereoscopic depth.

6. The computer system of claim 1, wherein:

the first content includes a plurality of elements including a first element and a second element different from the first element; and displaying the first content with the first amount of stereoscopic depth includes:

displaying the first element at a first stereoscopic depth; and displaying the second element at a second stereoscopic depth different from the first stereoscopic depth, wherein:

displaying the first element at the first stereoscopic depth is indicative of the first element being an interactive element; and displaying the second element at the second stereoscopic depth is indicative of the second element being a non-interactive element.

7. The computer system of claim 1, wherein:

detecting the input includes detecting shaking of the computer system; and the second amount of stereoscopic depth is greater than the first amount of stereoscopic depth.

8. The computer system of claim 1, wherein:

detecting the input includes detecting rotation of a rotatable input mechanism.

9. The computer system of claim 8, the one or more programs further including instructions for:

in response to detecting the input, and while displaying the change in the amount of stereoscopic depth of the first portion of the first content, displaying, via the one or more display generation components, contour information corresponding to a physical object.

10. The computer system of claim 8, wherein:

the second amount of stereoscopic depth is greater than the first amount of stereoscopic depth; and displaying the first portion of the first content changing from having the first amount of stereoscopic depth to having the second amount of stereoscopic depth includes:

in response to detecting rotation of the rotatable input mechanism and while detecting further rotation of the rotatable input mechanism, displaying the first portion of the first content changing from having the first amount of stereoscopic depth to having a first intermediate amount of stereoscopic depth that is greater than the first amount of stereoscopic depth and less than the second amount of stereoscopic depth; and in response to detecting the further rotation of the rotatable input mechanism, displaying the first portion of the first content changing from having the first intermediate amount of stereoscopic depth to having the second amount of stereoscopic depth.

11. The computer system of claim 8, the one or more programs further including instructions for:

in response to detecting the input, and while displaying the change in the amount of stereoscopic depth of the first portion of the first content, displaying, via the one or more display generation components, replacement of a first visual element of the first content with a second visual element different from the first visual element.

12. The computer system of claim 1, wherein the first content includes a respective non-interactive user interface element, wherein the respective non-interactive user interface element is different from the respective selectable user interface element.

13. A non-transitory computer-readable storage medium storing one or more programs configured to be executed by one or more processors of a computer system that is in communication with one or more display generation components and one or more input devices, the one or more programs including instructions for:

displaying, via the one or more display generation components, first content with a first amount of stereoscopic depth, wherein the first content includes a respective selectable user interface element that, when selected via user input, causes the computer system to perform a respective function;

while displaying the first content with the first amount of stereoscopic depth, detecting input without detecting input directed to the respective selectable user interface element, wherein detecting the input includes detecting one or more user inputs corresponding to a user request to change a state of the computer system from a low power state to a high power state; and in response to detecting the input:

displaying, via the one or more display generation components, a change in an amount of stereoscopic depth of a first portion of the first content that includes the respective selectable user interface element, wherein changing the amount of stereoscopic depth of the first portion of the first content includes changing the first portion of the first content that includes the respective selectable user interface element from having the first amount of stereoscopic depth to having a second amount of stereoscopic depth different from the first amount of stereoscopic depth; and displaying, via the one or more display generation components, a change in an amount of stereoscopic depth of a second portion of the first content, wherein the second portion of the first content is different from the first portion of the first content that includes the respective selectable user interface element, wherein changing the amount of stereoscopic depth of the second portion of the first content includes changing the second portion of the first content from having the first amount of stereoscopic depth to having a third amount of stereoscopic depth that is different from the second amount of stereoscopic depth.

14. The non-transitory computer-readable storage medium of claim 13, wherein:

detecting the input includes detecting a change in orientation of the computer system from a first orientation to a second orientation different from the first orientation; and the second amount of stereoscopic depth is greater than the first amount of stereoscopic depth.

15. The non-transitory computer-readable storage medium of claim 13, wherein:

detecting the input includes detecting a change in orientation of the computer system from a first orientation to a second orientation different from the first orientation; and the first amount of stereoscopic depth is greater than the second amount of stereoscopic depth.

16. The non-transitory computer-readable storage medium of claim 13, wherein:

the second amount of stereoscopic depth is greater than the first amount of stereoscopic depth; and the one or more programs further include instructions for:

after displaying the first portion of the first content changing from having the first amount of stereoscopic depth to having the second amount of stereoscopic depth, displaying, via the one or more display generation components, the first portion of the first content changing from having the second amount of stereoscopic depth to having a third amount of stereoscopic depth, wherein the second amount of stereoscopic depth is greater than the third amount of stereoscopic depth.

17. The non-transitory computer-readable storage medium of claim 13, wherein:

the first content includes a plurality of elements including a first element and a second element different from the first element; and displaying the first content with the first amount of stereoscopic depth includes:

displaying the first element at a first stereoscopic depth; and displaying the second element at a second stereoscopic depth different from the first stereoscopic depth, wherein:

displaying the first element at the first stereoscopic depth is indicative of the first element being an interactive element; and displaying the second element at the second stereoscopic depth is indicative of the second element being a non-interactive element.

18. The non-transitory computer-readable storage medium of claim 13, wherein:

detecting the input includes detecting rotation of a rotatable input mechanism.

19. The non-transitory computer-readable storage medium of claim 13, wherein the first content includes a respective non-interactive user interface element, wherein the respective non-interactive user interface element is different from the respective selectable user interface element.

20. A method, comprising:

at a computer system that is in communication with one or more display generation components and one or more input devices:

displaying, via the one or more display generation components, first content with a first amount of stereoscopic depth, wherein the first content includes a respective selectable user interface element that, when selected via user input, causes the computer system to perform a respective function;

while displaying the first content with the first amount of stereoscopic depth, detecting input without detecting input directed to the respective selectable user interface element, wherein detecting the input includes detecting one or more user inputs corresponding to a user request to change a state of the computer system from a low power state to a high power state; and in response to detecting the input:

displaying, via the one or more display generation components, a change in an amount of stereoscopic depth of a first portion of the first content that includes the respective selectable user interface element, wherein changing the amount of stereoscopic depth of the first portion of the first content includes changing the first portion of the first content that includes the respective selectable user interface element from having the first amount of stereoscopic depth to having a second amount of stereoscopic depth different from the first amount of stereoscopic depth; and displaying, via the one or more display generation components, a change in an amount of stereoscopic depth of a second portion of the first content, wherein the second portion of the first content is different from the first portion of the first content that includes the respective selectable user interface element, wherein changing the amount of stereoscopic depth of the second portion of the first content includes changing the second portion of the first content from having the first amount of stereoscopic depth to having a third amount of stereoscopic depth that is different from the second amount of stereoscopic depth.

21. The method of claim 20, wherein:

detecting the input includes detecting a change in orientation of the computer system from a first orientation to a second orientation different from the first orientation; and the second amount of stereoscopic depth is greater than the first amount of stereoscopic depth.

22. The method of claim 20, wherein:

detecting the input includes detecting a change in orientation of the computer system from a first orientation to a second orientation different from the first orientation; and the first amount of stereoscopic depth is greater than the second amount of stereoscopic depth.

23. The method of claim 20, wherein:

the second amount of stereoscopic depth is greater than the first amount of stereoscopic depth; and the method further comprising:

after displaying the first portion of the first content changing from having the first amount of stereoscopic depth to having the second amount of stereoscopic depth, displaying, via the one or more display generation components, the first portion of the first content changing from having the second amount of stereoscopic depth to having a third amount of stereoscopic depth, wherein the second amount of stereoscopic depth is greater than the third amount of stereoscopic depth.

24. The method of claim 20, wherein:

the first content includes a plurality of elements including a first element and a second element different from the first element; and displaying the first content with the first amount of stereoscopic depth includes:

displaying the first element at a first stereoscopic depth; and displaying the second element at a second stereoscopic depth different from the first stereoscopic depth, wherein:

displaying the first element at the first stereoscopic depth is indicative of the first element being an interactive element; and displaying the second element at the second stereoscopic depth is indicative of the second element being a non-interactive element.

25. The method of claim 20, wherein:

detecting the input includes detecting rotation of a rotatable input mechanism.

26. The method of claim 20, wherein the first content includes a respective non-interactive user interface element, wherein the respective non-interactive user interface element is different from the respective selectable user interface element.

* * * * *